United States Patent
Chan et al.

(10) Patent No.: US 10,134,291 B2
(45) Date of Patent: *Nov. 20, 2018

(54) SYSTEM AND METHOD FOR MANAGEMENT OF AIRSPACE FOR UNMANNED AIRCRAFT

(71) Applicant: Elwha LLC, Bellevue, WA (US)

(72) Inventors: Alistair K. Chan, Bainbridge Island, WA (US); Jesse R. Cheatham, III, Seattle, WA (US); William David Duncan, Sammamish, WA (US); Eun Young Hwang, Sausalito, CA (US); Roderick A. Hyde, Redmond, WA (US); Tony S. Pan, Bellevue, WA (US); Clarence T. Tegreene, Mercer Island, WA (US); Victoria Y. H. Wood, Livermore, CA (US)

(73) Assignee: Elwha LLC

( * ) Notice: Subject to any disclaimer, the term of this patent is extended or adjusted under 35 U.S.C. 154(b) by 0 days.

This patent is subject to a terminal disclaimer.

(21) Appl. No.: 15/643,129

(22) Filed: Jul. 6, 2017

(65) Prior Publication Data

US 2017/0323572 A1    Nov. 9, 2017

Related U.S. Application Data

(63) Continuation of application No. 14/501,302, filed on Sep. 30, 2014, now Pat. No. 9,754,496.

(51) Int. Cl.
*G08G 5/00* (2006.01)
*G05D 1/00* (2006.01)
(Continued)

(52) U.S. Cl.
CPC ........... *G08G 5/0043* (2013.01); *B64C 39/02* (2013.01); *B64C 39/024* (2013.01);
(Continued)

(58) Field of Classification Search
CPC .... G08G 5/0034; G08G 5/0069; G08G 5/045; G08G 5/0091; G08G 5/0086;
(Continued)

(56) References Cited

U.S. PATENT DOCUMENTS

| 5,203,520 A | 4/1993 | Przygodzki et al. |
| 5,717,593 A | 2/1998 | Gvili |

(Continued)

FOREIGN PATENT DOCUMENTS

| CN | 103274226 A | 9/2013 |
| CN | 103872795 A | 6/2014 |

(Continued)

OTHER PUBLICATIONS

"Integration of Civil Unmanned Aircraft Systems (UAS) in the National Airspace System (NAS) Roadmap"; U.S. Department of Transportation Federal Aviation Administration; First Edition—2013; bearing a date of Nov. 7, 2013; pp. 1-74; Produced by FAA Communications.
PCT International Search Report; International App. No. PCT/US2015/063204; dated May 19, 2016; pp. 1-3.
(Continued)

*Primary Examiner* — Russell Frejd

(57) ABSTRACT

A system and method for management of airspace for unmanned aircraft is disclosed. The system and method comprises administration of the airspace including designation of flyways and zones with reference to features in the region. The system and method comprises administration of aircraft including registration of aircraft and mission. A monitoring system tracks conditions and aircraft traffic in the airspace. Aircraft may be configured to transact with the management system including to obtain rights/priority by license and to operate in the airspace under direction of the system. The system and aircraft may be configured for dynamic transactions (e.g. licensing/routing). The system will set rates for licenses and use/access to the airspace and
(Continued)

aircraft will be billed/pay for use/access of the airspace at rates using data from data sources.

20 Claims, 70 Drawing Sheets

(51) Int. Cl.
B64C 39/02 (2006.01)
G08G 5/04 (2006.01)

(52) U.S. Cl.
CPC .......... *G05D 1/0011* (2013.01); *G08G 5/006* (2013.01); *G08G 5/0013* (2013.01); *G08G 5/0026* (2013.01); *G08G 5/0034* (2013.01); *G08G 5/0039* (2013.01); *G08G 5/0069* (2013.01); *G08G 5/0082* (2013.01); *G08G 5/0086* (2013.01); *G08G 5/0091* (2013.01); *G08G 5/045* (2013.01); *B64C 2201/021* (2013.01); *B64C 2201/027* (2013.01); *B64C 2201/123* (2013.01); *B64C 2201/141* (2013.01); *B64C 2201/146* (2013.01)

(58) Field of Classification Search
CPC .... G08G 5/0082; G08G 5/006; G08G 5/0026; G08G 5/0039; G08G 5/0013; G08G 5/0043; B64C 39/02; B64C 39/024; B64C 2201/146; B64C 2201/141; B64C 2201/021; B64C 2201/027; B64C 2201/123; G05D 1/0011
See application file for complete search history.

(56) References Cited

U.S. PATENT DOCUMENTS

| | | |
|---|---|---|
| 5,799,900 A | 9/1998 | McDonnell |
| 5,819,234 A | 10/1998 | Slavin et al. |
| 6,134,500 A | 10/2000 | Tang et al. |
| 6,377,875 B1 | 4/2002 | Schwaerzler |
| 6,804,607 B1 | 10/2004 | Wood |
| 6,871,816 B2 | 3/2005 | Nugent et al. |
| 7,059,566 B2 | 6/2006 | Byers et al. |
| 7,231,294 B2 | 6/2007 | Bodin et al. |
| 7,302,316 B2 | 11/2007 | Beard et al. |
| 7,543,780 B1 | 6/2009 | Marshall et al. |
| 7,714,536 B1 | 5/2010 | Silberg et al. |
| 7,999,698 B2 | 8/2011 | Annati |
| 8,052,081 B2 | 11/2011 | Olm et al. |
| 8,060,295 B2 | 11/2011 | Estkowski |
| 8,082,102 B2 | 12/2011 | Ravenscroft |
| 8,133,155 B2 | 3/2012 | Ehinger et al. |
| 8,260,479 B2 | 9/2012 | Christenson et al. |
| 8,355,834 B2 | 1/2013 | Duggan et al. |
| 8,368,584 B2 | 2/2013 | Askelson et al. |
| 8,380,425 B2 | 2/2013 | Duggan et al. |
| 8,437,956 B2 | 5/2013 | Limbaugh et al. |
| 8,453,962 B2 | 6/2013 | Shaw |
| 8,494,760 B2 | 7/2013 | Yoel |
| 8,502,456 B2 | 8/2013 | Jarrell |
| 8,511,606 B1 | 8/2013 | Lutke et al. |
| 8,515,593 B2 | 8/2013 | Marty et al. |
| 8,532,846 B2 | 9/2013 | Tollenaere et al. |
| 8,543,255 B2 | 9/2013 | Wood et al. |
| 8,577,535 B2 | 11/2013 | Cummings et al. |
| 8,600,602 B1 | 12/2013 | McAndrew et al. |
| 8,716,942 B2 | 5/2014 | Jarrell |
| 8,862,285 B2 | 10/2014 | Wong et al. |
| 9,004,396 B1 | 4/2015 | Colin et al. |
| 9,045,223 B2 | 6/2015 | Connaulte et al. |
| 9,087,451 B1 | 7/2015 | Jarrell |
| 9,108,728 B2 | 8/2015 | Shaw |
| 2002/0104922 A1 | 8/2002 | Nakamura |
| 2005/0178882 A1 | 8/2005 | Akaro et al. |
| 2005/0236517 A1 | 10/2005 | Akaro et al. |
| 2007/0023581 A1 | 2/2007 | La |
| 2007/0101242 A1 | 5/2007 | Yancey et al. |
| 2007/0118502 A1 | 5/2007 | Aragones et al. |
| 2007/0129855 A1 | 6/2007 | Coulmeau |
| 2007/0214026 A1 | 9/2007 | Cheng et al. |
| 2007/0244608 A1 | 10/2007 | Rath et al. |
| 2008/0072284 A1 | 3/2008 | Horvitz et al. |
| 2009/0008499 A1 | 1/2009 | Shaw |
| 2009/0316755 A1 | 12/2009 | Collette et al. |
| 2010/0012769 A1 | 1/2010 | Alber et al. |
| 2010/0013436 A1 | 1/2010 | Lowenthal et al. |
| 2010/0044499 A1 | 2/2010 | Dragen et al. |
| 2010/0145540 A1 | 6/2010 | McKenna |
| 2010/0145610 A1 | 6/2010 | Bacabara |
| 2010/0243794 A1 | 9/2010 | Jermyn |
| 2010/0250022 A1 | 9/2010 | Hines |
| 2010/0274418 A1 | 10/2010 | Coulmeau et al. |
| 2011/0015034 A1 | 1/2011 | Ehinger et al. |
| 2011/0017865 A1 | 1/2011 | Achtelik et al. |
| 2011/0084162 A1 | 4/2011 | Goossen et al. |
| 2011/0087561 A1 | 4/2011 | Cormack et al. |
| 2011/0161140 A1 | 6/2011 | Polt et al. |
| 2011/0202206 A1 | 8/2011 | Karthikeyan et al. |
| 2011/0202217 A1 | 8/2011 | Kempton |
| 2011/0245997 A1 | 10/2011 | Marty et al. |
| 2012/0022719 A1 | 1/2012 | Matos |
| 2012/0083945 A1 | 4/2012 | Oakley et al. |
| 2012/0208673 A1 | 8/2012 | Ehinger et al. |
| 2012/0223191 A1 | 9/2012 | Roberts |
| 2012/0298793 A1 | 11/2012 | Weddendorf et al. |
| 2012/0299751 A1 | 11/2012 | Verna et al. |
| 2013/0033381 A1 | 2/2013 | Breed |
| 2013/0068892 A1 | 3/2013 | Bin Desa et al. |
| 2013/0105620 A1 | 5/2013 | Abde Qader Alzu'bi et al. |
| 2013/0105635 A1 | 5/2013 | Alzu'bi et al. |
| 2013/0134254 A1 | 5/2013 | Moore |
| 2013/0206922 A1 | 8/2013 | Riedinger |
| 2013/0240673 A1 | 9/2013 | Schlosser et al. |
| 2013/0261850 A1 | 10/2013 | Smith et al. |
| 2013/0261853 A1 | 10/2013 | Shue et al. |
| 2014/0021908 A1 | 1/2014 | McCool et al. |
| 2014/0022051 A1 | 1/2014 | Levien |
| 2014/0032034 A1 | 1/2014 | Raptopoulos et al. |
| 2014/0061362 A1 | 3/2014 | Olm et al. |
| 2014/0062215 A1 | 3/2014 | Seo et al. |
| 2014/0129059 A1 | 5/2014 | Scarlatti et al. |
| 2014/0138477 A1 | 5/2014 | Keennon et al. |
| 2014/0142785 A1 | 5/2014 | Fuentes et al. |
| 2014/0151496 A1 | 6/2014 | Shaw |
| 2014/0229094 A1 | 8/2014 | La Civita et al. |
| 2014/0236388 A1 | 8/2014 | Wong et al. |
| 2014/0250412 A1 | 9/2014 | Vogelmeier et al. |
| 2014/0254896 A1 | 9/2014 | Zhou et al. |
| 2014/0263822 A1 | 9/2014 | Malveaux |
| 2014/0263823 A1 | 9/2014 | Wang et al. |
| 2015/0012154 A1 | 1/2015 | Senkel et al. |
| 2015/0021429 A1 | 1/2015 | Reichert |
| 2015/0057844 A1 | 2/2015 | Callou et al. |
| 2015/0151950 A1 | 6/2015 | Schafer |
| 2015/0158392 A1 | 6/2015 | Zhao |
| 2015/0170524 A1 | 6/2015 | Stefani et al. |
| 2015/0212523 A1 | 7/2015 | Wolf et al. |
| 2015/0228196 A1 | 8/2015 | Sampigethaya |
| 2015/0298799 A1 | 10/2015 | Bertrand et al. |
| 2015/0259066 A1 | 11/2015 | Johannesson et al. |
| 2015/0314881 A1 | 11/2015 | Tsaliah et al. |
| 2015/0331427 A1 | 11/2015 | Chaudary |
| 2015/0336669 A1 | 11/2015 | Kantor et al. |
| 2015/0348424 A1 | 12/2015 | Duffy et al. |
| 2016/0001879 A1 | 1/2016 | Johannesson et al. |
| 2016/0010627 A1 | 1/2016 | Austin |
| 2016/0016664 A1 | 1/2016 | Basuni |
| 2016/0068261 A1 | 3/2016 | Niederberger |
| 2016/0107751 A1 | 4/2016 | D'Andrea et al. |
| 2016/0114887 A1 | 4/2016 | Zhou et al. |
| 2016/0122016 A1 | 5/2016 | Mintchev et al. |

(56) References Cited

U.S. PATENT DOCUMENTS

2016/0137298 A1    5/2016  Youngblood
2016/0214728 A1    7/2016  Rossi et al.
2016/0371989 A1   12/2016  D'Alto et al.

FOREIGN PATENT DOCUMENTS

GB         2 455 374 A      6/2009
WO    WO 2010/096104 A1     8/2010
WO    WO 2013/060693 A2     5/2013

OTHER PUBLICATIONS

PCT International Search Report; International App. No. PCT/US2016/042475; dated Oct. 12, 2016; pp. 1-3.
Perry, Tekla; "Matternet's Package Delivery Drones"; IEEE Spectrum, Dec. 19, 2013; pp. 1-7, IEEE.
Schneider, David; "Would You Shoot Your Neighbor's Drone?"; IEEE Spectrum, Dec. 31, 2013; pp. 1-4; IEEE.
"Unmanned Aircraft Operations in the National Airspace System"; Department of Transportation; Federal Aviation Administration; bearing a date of Feb. 6, 2007, pp. 1-6; Washington DC, USA.
"Unmanned Aircraft Systems (UAS) Comprehensive Plan, A Report on the Nation's UAS Path Forward"; Sep. 2013; pp. 1-30; Prepared by the Joint Planning and Development Office (JPDO).
European Patent Office, Extended European Search Report, Pursuant in Rule 62 EPC; App. No. EP 15864636.4; dated Apr. 18, 2018; pp. 1-10.
Dydek et al.; "Adaptive Control of Quadrotor UAVs: A Design Trade Study With Flight Evaluations"; IEEE Transactions on Control Systems Technology; Jul. 2013; pp. 1409-1406; vol. 21, No. 4; IEEE 2012.

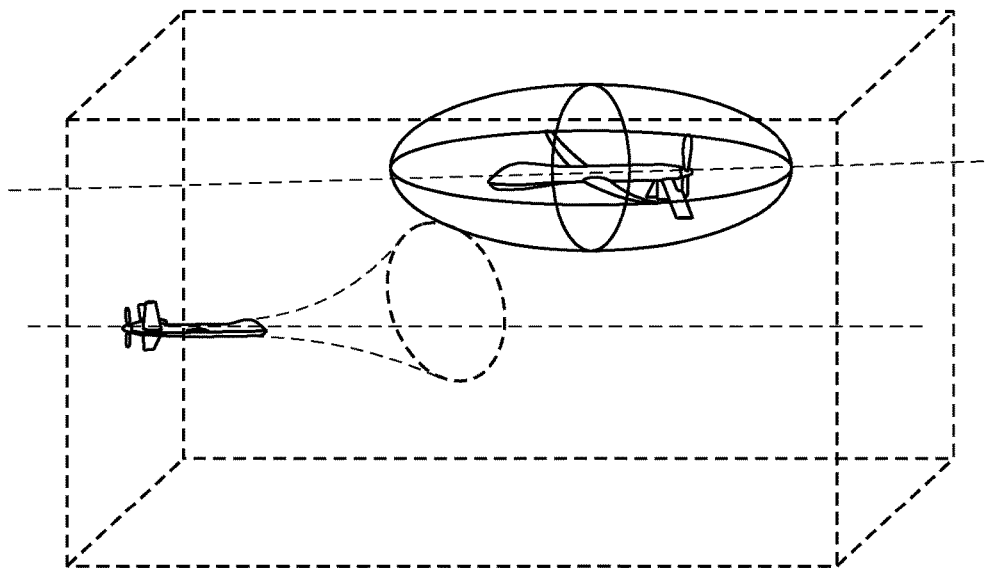
FIG. 25
PRIOR ART
U.S. PATENT NO. 8,368,584
FIG. 26
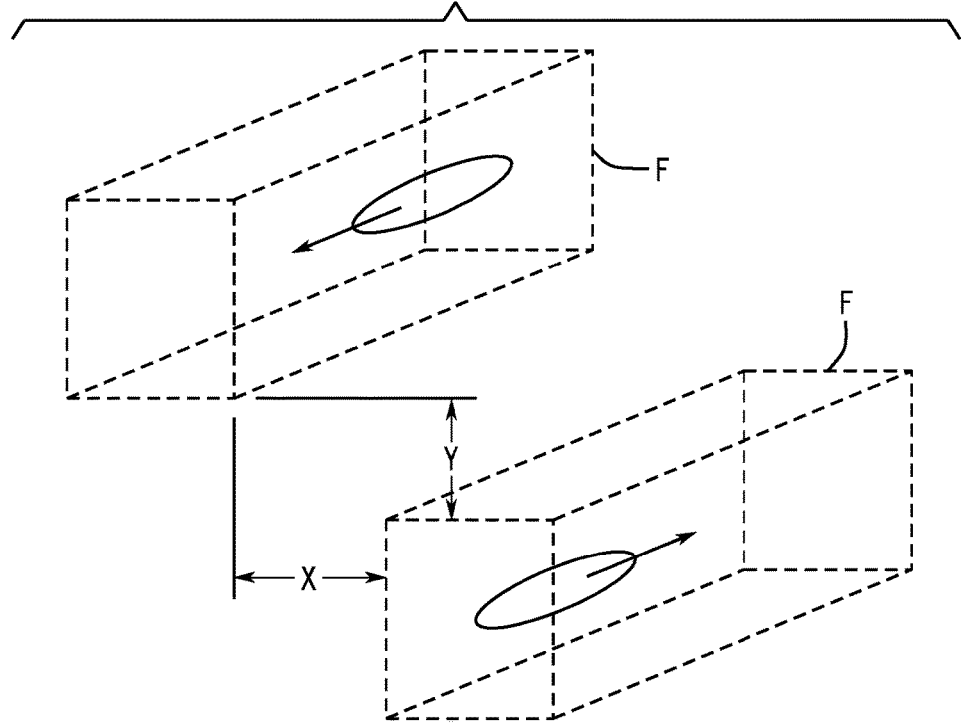

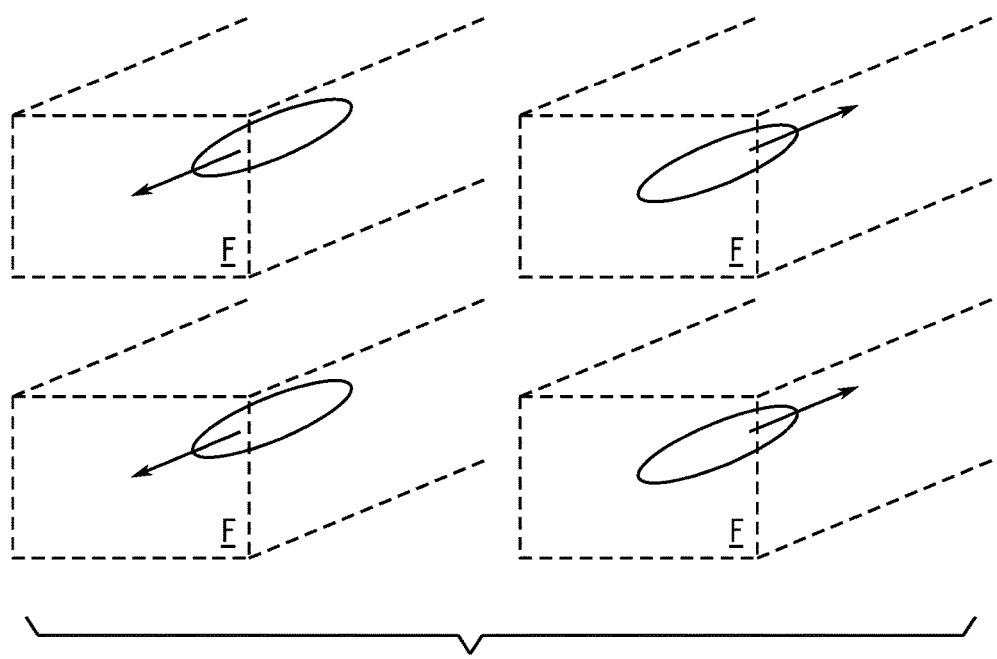
FIG. 30
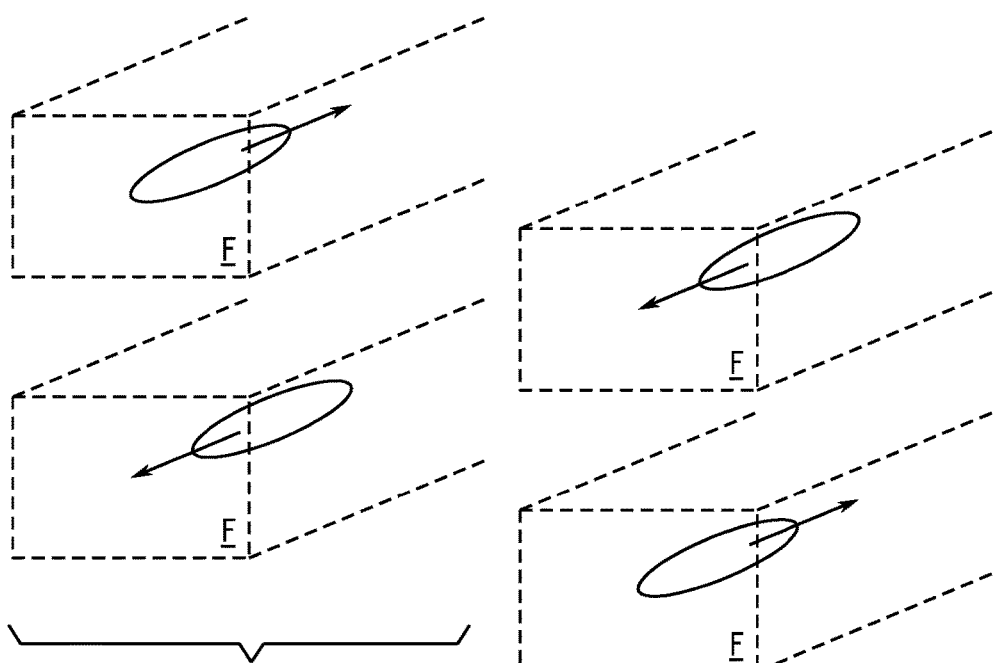
FIG. 31
FIG. 32

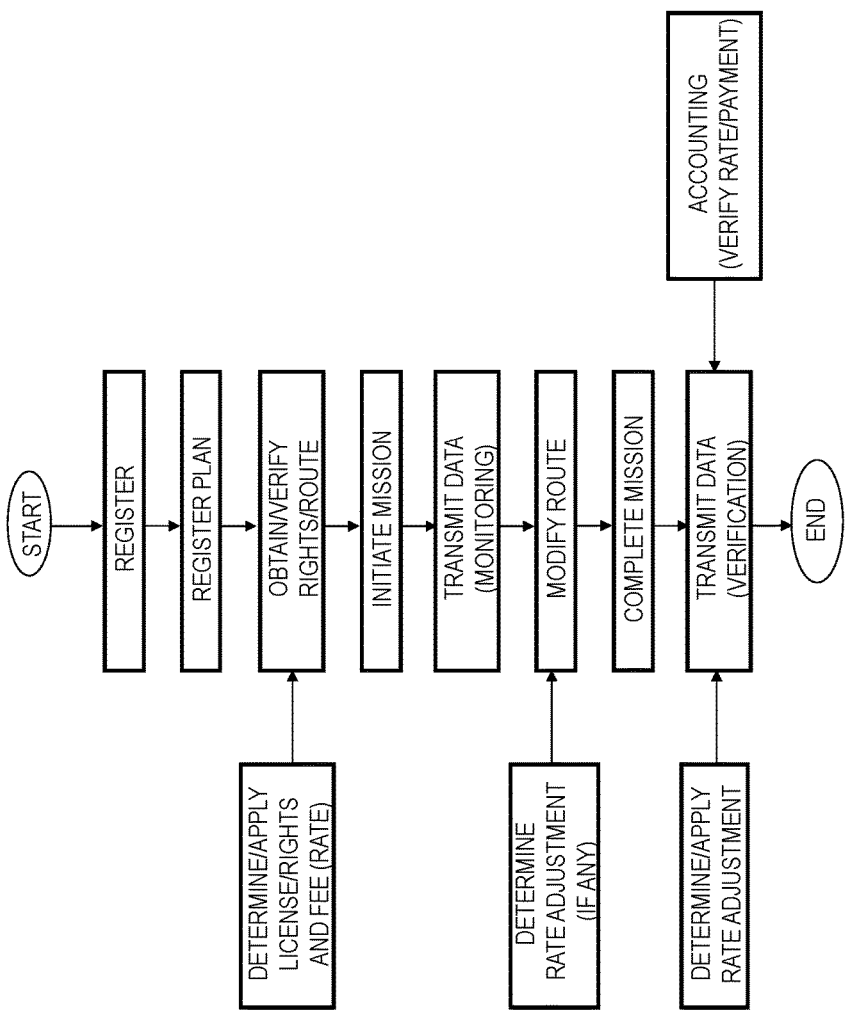

SYSTEM AND METHOD FOR MANAGEMENT OF AIRSPACE FOR UNMANNED AIRCRAFT

CROSS-REFERENCE TO RELATED APPLICATIONS

Priority Applications:

The present application constitutes a continuation of U.S. Pat. No. 9,754,496, issued 5 Sep. 2017 entitled SYSTEM AND METHOD OF MANAGEMENT OF AIRSPACE FOR UNMANNED AIRCRAFT, naming ALISTAIR K. CHAN, JESSE R. CHEATHAM III, WILLIAM DAVID DUNCAN, EUN YOUNG HWANG, RODERICK A. HYDE, TONY S. PAN, CLARENCE T. TEGREENE, VICTORIA Y.H. WOOD as inventors, filed 30 Sep. 2014 which is an application of which a currently co-pending application is entitled to the benefit of the filing date.

U.S. patent application Ser. No. 14/501,343, entitled UNMANNED AIRCRAFT CONFIGURED FOR OPERATION IN A MANAGED AIRSPACE, naming Alistair K. Chan et al. as inventors, filed Sep. 30, 2014, is related to and incorporated by reference in the present application; (b) U.S. patent application Ser. No. 14/501,365, entitled SYSTEM AND METHOD FOR OPERATION OF UNMANNED AIRCRAFT WITHIN A MANAGED AIRSPACE, naming Alistair K. Chan et al. as inventors, filed Sep. 30, 2014, is related to and incorporated by reference in the present application.

FIELD

The present invention relates to a system and method for management of an airspace for unmanned aircraft. The present invention also relates to a system and method for operation of an unmanned aircraft in an airspace. The present invention further relates to an unmanned aircraft configured to operate in an airspace.

BACKGROUND

It is well-known to provide a system and method for administration and management of manned aircraft (e.g. with on-board pilot) in an airspace. Systems and methods for air traffic control of manned aircraft such as for (piloted) commercial flights are very well established in use. Employment of staff such as air traffic controllers to facilitate management of commercial/military flights of manned aircraft operating in and across airspaces in larger urban areas is well known; air traffic controllers interact with on-board pilots of manned aircraft in an airspace and facilitate safe and efficient air traffic in and across the airspace including take-off/landing of aircraft at airports and passage of aircraft through the airspace.

A well-established system of governmental regulation and oversight (e.g. through the U.S. Federal Aviation Administration (FAA)) is in operation. The system of governmental regulation administered by the FAA (and other governmental agencies globally) has evolved over many decades to adapt to various changes and advances in technology, aircraft, society, etc. and to events; governmental regulations for air travel are administered in a generally consistent framework by governmental agencies around the world such that manned aircraft such as commercial flights are generally to travel across the country and around the world between most larger urban centers safely and efficiently in accordance with a consistently administered routine. The air traffic control system now in place operates with a relatively exceptional degree of accuracy and efficiency as indicated by the relatively low number of serious incidents/mishaps that occur involving manned aircraft safety.

It is also known to use unmanned aircraft (e.g. referred to as unmanned air/aerial vehicle (UAV), unmanned aircraft system (UAS) to include an operator/pilot at a remote location, drone, etc.). Such unmanned aircraft (UAV/drone craft) at present exist in a wide variety of forms (shapes/sizes), types (e.g. winged craft, rotor-driven craft, etc.), propulsion systems (e.g. engines, thrust-production, etc.), capacities, etc., with a wide variety of capabilities, carrying capacities, control systems, telemetry systems, robustness, range, etc., and as exist at present are able to perform a wide variety of functions in military, commercial, and recreational applications. At present, the typical UAV/drone craft is significantly smaller than a typical manned aircraft and may lack the functionality of typical commercial aircraft; some UAV/drone craft have sophisticated on-board control systems; some UAV/drone craft are operated by pilots at remote stations with data communications and instrumentation/feedback from the craft; other UAV/drone craft may have relatively simple control systems (e.g. basic remote control by line of sight by the operator).

The size and form and operation of UAV/drone craft are different from typical commercial aircraft and may vary significantly between types of UAV/drone craft from relatively simple to relatively difficult to control in flight conditions (and in comparison to a typical manned aircraft). Airworthiness/robustness, controllability/telemetry, data communications and failure modes for UAV/drone systems may vary widely between UAV/drone craft and in comparison to manned aircraft. Costs to build/purchase and operate a UAV/drone system may vary widely between UAV/drone craft and in comparison to manned aircraft. UAV/drone craft may be configured to perform functions for which a manned aircraft is generally not suitable (for various reasons) such as local/light parcel delivery, surveillance/monitoring, communications, military/government action, etc. Some UAV/drone craft may be designed as "expendable" or for finite/one-time use; some UAV/drone craft may be designed for cost-efficiency and simplicity; other UAV/drone systems may be designed for lengthy useful lives in operation. UAV/drone systems also have gained appeal in a segment of the recreation/hobby/toy industry.

The present trends indicate that the number of UAV/drone systems in existence/use and the volume of UAV/drone traffic will continue to increase in the future as forms and functions of UAV/drone systems and market uses and acceptance/penetration expands. UAV/drone system technology and capability is likely to continue to advance as will evolution of designs/standards for UAV/drone craft in various categories of use.

As the number of UAV/drone systems and the density of UAV/drone traffic increases so also will increase the need for a safe and efficient system and method for administration and management of UAV/drone craft in an airspace.

Government regulation of UAV/drone traffic is in an evolutionary phase (as are related jurisdictional/threshold issues) at the present time (e.g. filing date of the present application). It may take several years for an efficient framework to be established for safe and efficient regulation of UAV/drone systems under the FAA and/or agencies of other governments. (it is presently uncertain whether the existing framework of FAA regulation is well-suited for UAV/drone systems operating in local municipalities where local police/law enforcement agencies may be better positioned for monitoring/enforcement.) Differences in aircraft as well as in purpose and mission of aircraft may vary materially for the regulatory framework and enforcement. UAV/drone craft are capable of operating in airspaces that differ considerably from airspaces established or generally accepted for manned aircraft. Airports and/or terminals for UAV/drone craft may vary widely (e.g. according to needs dictated by the form/type and function of the various UAV/drone craft) from essentially similar to a typical airport to a much smaller base or simple landing pad.

There is a need for structure and consistency in the administration and management of airspaces for UAV/drone craft as well as for systems and methods for configuring and operating UAV/drone systems and airspaces, among other reasons, to enhance safe and efficient UAV/drone traffic (e.g. prevent undesired interactions, near-collisions, collisions, etc. between aircraft of all kinds) to facilitate the realization of the promising potential for productive use of UAV/drone craft in commerce and society.

SUMMARY

Accordingly, it would be advantageous to provide for a system and method for management of an airspace for unmanned aircraft. It would also be advantageous to provide an unmanned aircraft configured for operation in a managed airspace. It would further be advantageous to provide a system and method for operation of unmanned aircraft in a managed airspace comprising flyways for unmanned aircraft traffic.

The present invention relates to a system for managing an airspace comprising a plurality of flyway segments for unmanned aircraft comprising a computing system configured (1) for administrating the airspace and aircraft and (2) for directing aircraft in the airspace; and a monitoring system configured to monitor conditions in the airspace. The computing system is connected to data sources to provide data for administrating and directing aircraft in the airspace. Administrating the airspace comprises designation of a set of zones comprising a set of flyway segments in the airspace for operation of aircraft.

The present invention also relates to a method of management of an airspace comprising a plurality of flyway segments configured to be used by a plurality of unmanned aircraft comprising the steps of administrating the airspace, administrating the aircraft in the airspace, directing the aircraft in the airspace, and monitoring conditions in the airspace. Administrating the airspace comprises designation of a set of zones comprising a set of flyway segments in the airspace for operation of aircraft. Administrating the aircraft also comprises registration of aircraft to operate in the airspace.

The present invention further relates to a method of management of an airspace comprising a plurality of flyway segments configured to be used by a plurality of unmanned aircraft comprising the steps of administrating the airspace, administrating aircraft in the airspace, directing aircraft in the airspace, and monitoring conditions in the airspace. Administrating the airspace comprises of designation of a set of zones comprising a set of flyway segments in the airspace for operation of aircraft. Administrating the aircraft also comprises registration of aircraft to operate in the airspace and at least one transaction with an aircraft.

The present invention further relates to a system for managing an airspace comprising a plurality of flyway segments and at least one zone for unmanned aircraft comprising a computing system configured (1) for administrating the airspace and aircraft and (2) for directing aircraft in the airspace, and a monitoring system configured for monitoring of conditions in the airspace. Administrating the aircraft also comprises registration of aircraft to operate in the airspace and at least one transaction with an aircraft.

The present invention relates to an unmanned aircraft configured for operation on a mission in an airspace comprising flyway segments managed by a management system of the airspace comprising a profile for the aircraft used for registration of the aircraft with the management system before operation in the airspace, an identifier for the aircraft used for monitoring of the aircraft by the management system during operation in the airspace, and a license for the aircraft used by the system to manage the operation of the aircraft in the airspace; so that the aircraft can be operated according to terms of the license during the mission in the airspace. The aircraft can be registered by the management system before the mission and monitored by the management system during the mission.

The present invention also relates to an unmanned aircraft configured for operation on a mission in an airspace comprising flyway segments managed by a management system for the airspace comprising a profile for the aircraft used for registration of the aircraft with the management system before operation in the airspace, an identifier for the aircraft used for monitoring of the aircraft by the management system during operation in the airspace, and rights for the aircraft obtained by transaction and used by the management system to manage the operation of the aircraft in the airspace. The aircraft is to be operated according to rights obtained to perform the mission in the airspace. The aircraft is registered by the management system before the mission and monitored by the management system during the mission and charged a rate for use of the airspace determined by terms of the transaction and data obtained by the management system from data sources.

The present invention further relates to a method of configuring an unmanned aircraft for operation on a mission in an airspace comprising flyway segments managed by a management system for the airspace comprising the steps of creating a profile for the aircraft used for registration of the aircraft with the management system before operation in the airspace, providing an identifier for the aircraft used for monitoring of the aircraft by the management system during operation in the airspace, and transacting a license for the aircraft used by the management system to manage the operation of the aircraft in the airspace. The aircraft is to be operated according to terms of the license during the mission in the airspace. The aircraft is registered by the management system before the mission and monitored by the management system during the mission.

The present invention further relates to a method of configuring an unmanned aircraft for operation on a mission in an airspace comprising flyway segments managed by a management system for the airspace comprising the steps of creating a profile for the aircraft used for registration of the aircraft with the management system before operation in the airspace, providing an identifier for the aircraft used for monitoring of the aircraft by the management system during operation in the airspace, and transacting a transaction for the aircraft to obtain rights for the operation of the aircraft in the airspace; so that the aircraft can be operated according to rights obtained to perform the mission in the airspace.

The present invention relates to a method of operating an unmanned aircraft to perform a mission in an airspace comprising zones managed by a management system for the airspace comprising the steps of registering the aircraft with the management system, obtaining rights for the aircraft in a transaction with the management system, and performing the mission. The aircraft is to be operated according to terms of the transaction with the management system during the mission in the airspace.

The present invention also relates to a method of operating an unmanned aircraft to perform a mission in an airspace comprising flyway segments and at least one zone managed by a management system for the airspace comprising the steps of registering the aircraft with the management system, transacting a license with the management system providing rights for the aircraft in the airspace at a rate, and performing the mission. The aircraft is to be operated according to terms of the license during the mission in the airspace.

The present invention further relates to an unmanned aircraft system configured to operate on a mission in an airspace managed by a management system for the airspace comprising an aircraft comprising a profile and an identifier, a license provided to the aircraft by the management system at a rate, and a computing system configured to provide data relating to the operation of the aircraft to the management system. The computing system is connected to data sources to provide data for operation of the aircraft in the airspace.

The present invention further relates to an unmanned aircraft system configured to operate on a mission in an airspace managed by a management system for the airspace comprising an aircraft comprising a profile and an identifier, a license provided to the aircraft by the management system, a computing system on the aircraft configured (1) to conduct at least one transaction with the management system and (2) to provide data relating to the operation of the aircraft to the management system. The computing system is connected to data sources to provide data for operation of the aircraft.

FIGURES AND TABLES

FIG. 25 is a schematic perspective view of segment of airspace according to an exemplary embodiment.

FIG. 26 is a schematic perspective view of a flyway segment set in an airspace according to an exemplary embodiment.

FIG. 30 is a schematic plan diagram of a flyway segment set in an airspace according to an exemplary embodiment.

FIG. 31 is a schematic plan diagram of a flyway segment set in an airspace according to an exemplary embodiment.

FIG. 32 is a schematic plan diagram of a flyway segment set in an airspace according to an exemplary embodiment.

FIG. 80 is a schematic process flow diagram for use/operation of an unmanned aircraft system in the system/airspace according to an exemplary embodiment.

DESCRIPTION

Figure 1:
FIG. 1 is a schematic/representational diagram of a UAV/drone craft according to an exemplary embodiment.
Figure 2A:
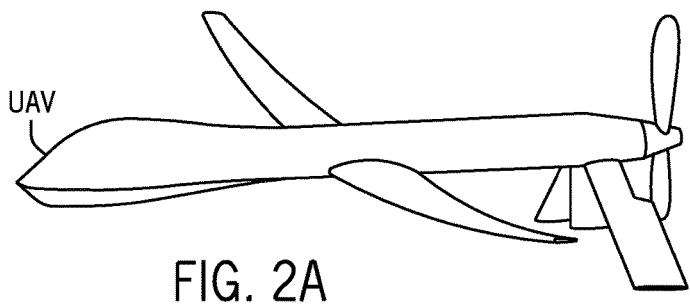
FIG. 2A is a schematic perspective view of an unmanned aircraft according to an exemplary embodiment.
Figure 2B:
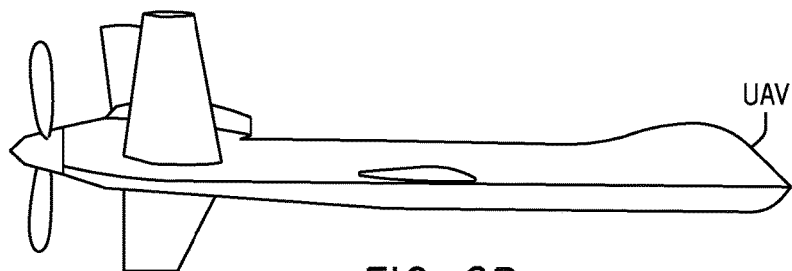
FIG. 2B is a schematic perspective view of an unmanned aircraft according to an exemplary embodiment.
Figure 2C:
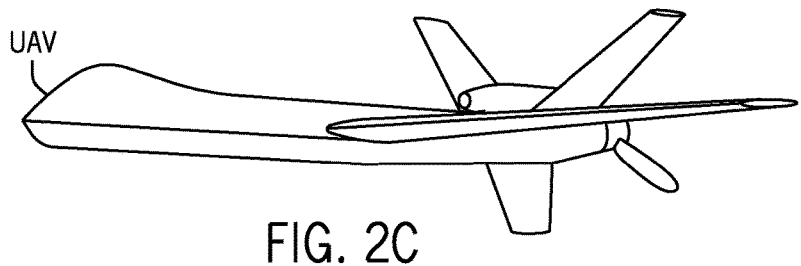
FIG. 2C is a schematic perspective view of an unmanned aircraft according to an exemplary embodiment.
Figure 3A:
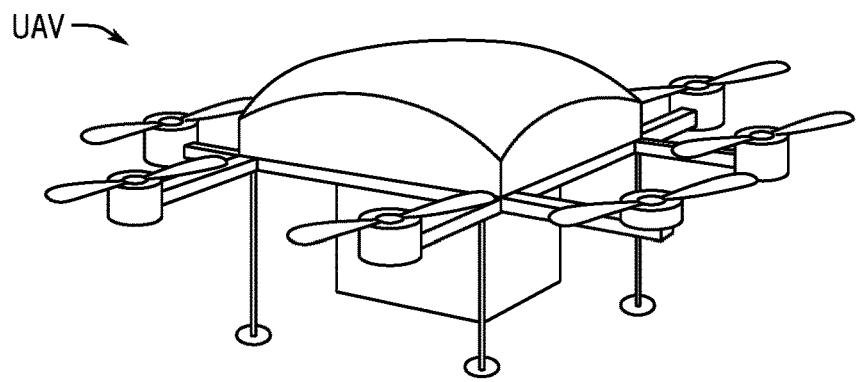
FIG. 3A is a schematic perspective view of an unmanned aircraft according to an exemplary embodiment.
Figure 3B:
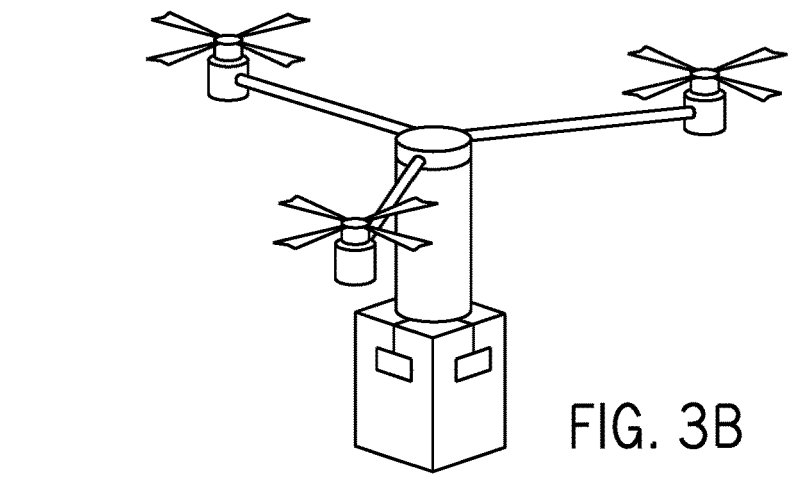
FIG. 3B is a schematic perspective view of an unmanned aircraft according to an exemplary embodiment.
Figure 3C:
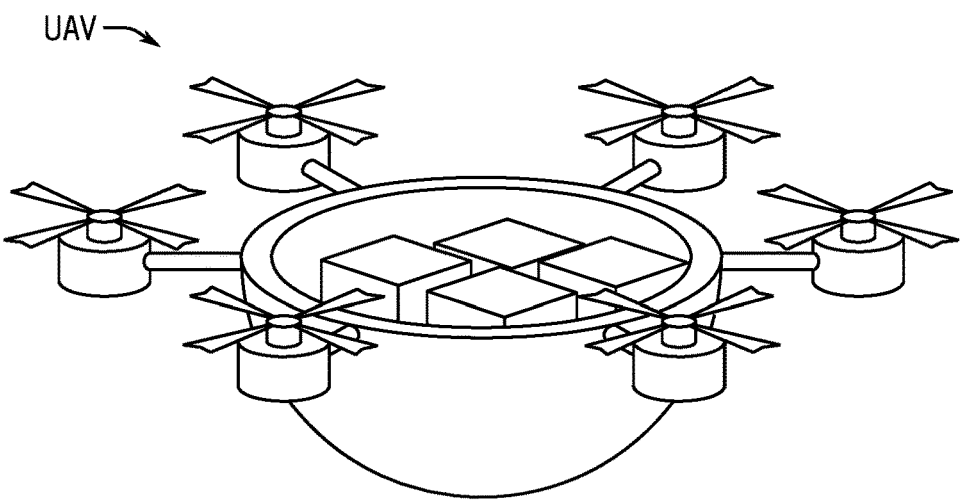
FIG. 3C is a schematic perspective view of an unmanned aircraft according to an exemplary embodiment.
Figure 3D:
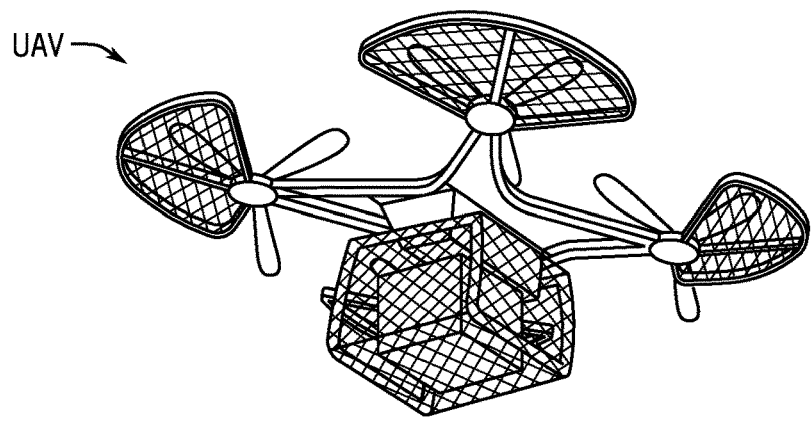
FIG. 3D is a schematic perspective view of an unmanned aircraft according to an exemplary embodiment.
Figure 3E:
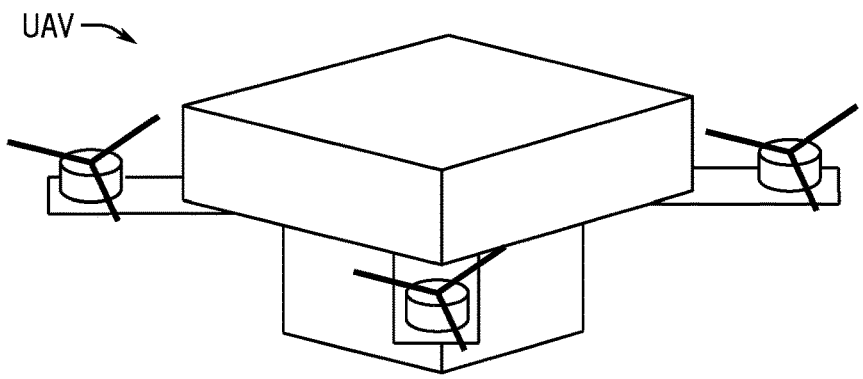
FIG. 3E is a schematic perspective view of an unmanned aircraft according to an exemplary embodiment.
Figure 3F:
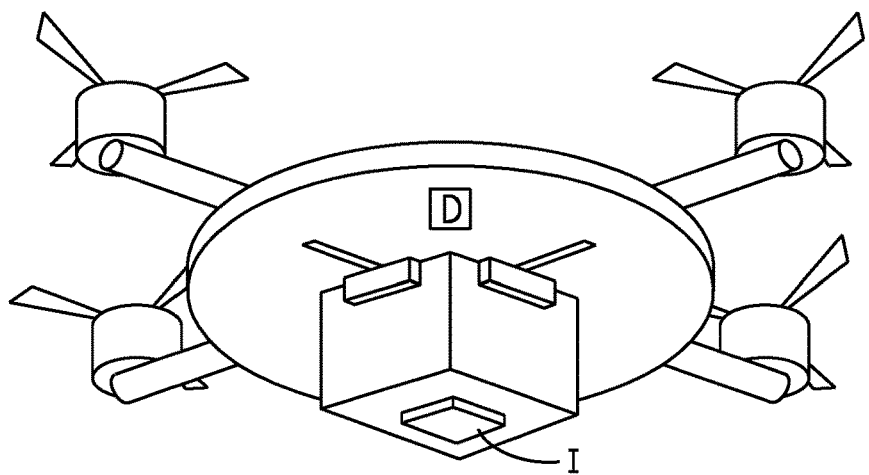
FIG. 3F is a schematic perspective view of an unmanned aircraft according to an exemplary embodiment.

A system and method for management of an airspace for unmanned aircraft is disclosed according to exemplary and alternative embodiments. An unmanned aircraft configured for operation in a managed airspace is also disclosed according to exemplary and alternative embodiments. A system and method for operation of unmanned aircraft in a managed airspace comprising flyways for unmanned aircraft traffic is further disclosed according to exemplary and alternative embodiments. Each system and method comprises a modification/improvement of technology intended to facilitate management/operation of an airspace for UAV/drone traffic and UAV/drone craft in a safe, efficient manner. According to an exemplary embodiment, the airspace comprises a set of flyway segments in a set of zones/regions designated and established with reference to feature the region under the airspace. See, e.g. FIGS. 4A to 22B. The system and method for management of the airspace comprises the administration of the airspace, the administration of the UAV/drone craft to operate in the airspace, the direction of UAV/drone craft in operation in the airspace, monitoring of conditions/aircraft in the airspace, etc. See, e.g. FIGS. 23A to 49B and 50-60. The UAV/drone craft are configured to interact/transact with the management system with rights/priority and at rates/fees paid for use/access of the airspace and for registration/operation in the airspace under the monitoring/direction of the management system for the airspace. See FIGS. 1-3F and 61-81C. According to an exemplary embodiment, the management system and UAV/drone craft are configured to engage in transactions so that the management system functions (among other things) as a commercial enterprise in which UAV/drone craft are registered/managed and operated/charged for use/access of the airspace according to standard rules/regulations and market-based rates/fees.

System/Management—Introduction

Referring to the FIGURES, the system and method of managing an airspace for UAV/drone craft is shown schematically according to an exemplary embodiment. According to an exemplary embodiment, the airspace comprises a set of flyway segments in a set of zones/regions designated with reference to features such as exist in the region under the airspace. See, e.g. FIGS. 4A to 22B. The system and method for management of the airspace comprises the administration of the airspace, the administration of the UAV/drone craft, the direction of UAV/drone craft in operation in the airspace, monitoring of conditions/aircraft in the airspace, etc. See, e.g. FIGS. 50-63. According to an exemplary embodiment, management of the airspace will comprise a set of functions/tasks of the system and/or a system administrator.

According to an exemplary embodiment, the administration of the airspace will comprise (among other functions/tasks) designation/establishment and maintenance of a set/system of flyways and flyway segments within zones/regions, establishment of protocol/policy and rules/regulations for the airspace, compliance with governmental regulation, communication with craft/operators of UAV/drone craft, monitoring/evaluation of conditions in the airspace, etc.

According to an exemplary embodiment, the administration of aircraft (e.g. UAV/drone craft) will comprise (among other functions/tasks) registration of aircraft (e.g. collection and/or verification of information relating to the craft), transactions with aircraft, assignment of rights/privileges and priority/status to aircraft, registration of missions for aircraft, creation of a profile (e.g. data file/set of information) for craft operating in the airspace, assignment of routes for craft operating in the airspace, monitoring/enforcement of rules/regulation for aircraft operating in the airspace, etc.

According to an exemplary embodiment, an aircraft that is to conduct a mission (e.g. travel into and/or through the airspace of the administrator) will register the mission with the administrator of the system. According to an exemplary embodiment, registration of the mission will include collection and/or verification of data/information relating to the mission date; destination, departure, time of day, route, speed, etc.

According to an exemplary embodiment, direction of aircraft will comprise communication with and/or direction/control of control of craft in operation during a mission and related management of traffic and other functions.

According to an exemplary embodiment, monitoring of conditions in the airspace and of aircraft will comprise the functions of monitoring environmental conditions and traffic and other conditions.

According to an exemplary embodiment, the system and method is configured to manage and administrate the airspace as a commercial operation in which transactions with the system UAV/drone craft purchase rights/licenses and/or pay fees/tolls at commercial rates for passage/access and use of the airspace. As indicated schematically, use and access of the airspace may be provided at rates that vary according to factors (including the size/type of craft, time/day of travel, flyway zone/lanes in use, conditions in the airspace/traffic, environmental/weather conditions, commercial considerations, etc.). License rights/rates for UAV/drone craft may be determined before a mission of the craft in the airspace, during the mission, and after the mission (i.e. the system and craft may be configured for "dynamic" transactions that occur when the craft is in operation in the airspace).

According to an exemplary embodiment, license rights for use/access of the airspace may be sold by a single vendor, at multiple outlets, in multiple markets (e.g. primary and secondary, etc.). Commercial entities/other entities or vendors operating the system may obtain rights/easements from and through governmental/municipal agencies and/or operate in conjunction with such agencies to establish/designate and operate flyways in an airspace in a region. According to an exemplary embodiment, rates for license/rights for use/access of the airspace can be adjusted by market pricing/effects and sold/traded by brokers who may employ various business strategies.

According to an exemplary embodiment, the system may facilitate the operation of any present or future type/configuration of UAV/drone craft in the airspace. Such UAV/drone craft may be operated by an operator (e.g. pilot/system) at a remote station (see e.g. FIGS. 52 and 53) or by other methods/systems. According to an exemplary embodiment, the UAV/drone system (e.g. craft with control/communication system) will be configured to transact (e.g. register and/or license) with the system and to communicate (e.g. tracking/monitoring and/or data transmission by network connection, etc.) to facilitate the operation of the UAV/drone craft in the airspace and the management of the airspace by the system (e.g. according to protocol/policy, rules/guidelines, legal/regulatory compliance, etc.).

According to an exemplary embodiment, the system will function as part of a commercial enterprise using data from data sources (including UAV/drone craft) to establish safe and efficient methods of management for the airspace in a commercially successful manner (e.g. with appropriate rates set and billed/paid by or on behalf of UAV/drone craft in operation in the airspace). According to an exemplary embodiment, UAV/drone craft in operation and the system for the airspace will be adapted for interaction as indicated, for example, in the FIGURES.

Configuration of UAV/Drone Craft

Referring to FIGS. 1, 2A-2C and 3A-3F, unmanned aerial/air vehicles (UAV) or drone aircraft (UAV/drone craft) are shown schematically according to exemplary/representative embodiments. As indicated schematically, a UAV/drone craft may be provided in any of a variety of forms, shapes, sizes, capabilities, etc. according to exemplary embodiments, including a fixed wing configuration (such as commonly referred to as an airplane) (see FIGS. 2A-2C) or rotating blade configuration (such as commonly referred to as a helicopter) (see FIGS. 3A-3F) or any other form that presently exists or may exist as technology for UAV/drone craft evolves in the future. According to any exemplary embodiment, the management system and airspace can be configured to operate with any of a wide variety of types and forms of UAV/drone craft. As indicated, FIG. 1 is intended to show a schematic/representational form of a UAV/drone craft of any form able to operate in the airspace managed by the system and method according to exemplary and alternative embodiments. See also FIGS. 22A to 49A/B.

According to an exemplary embodiment, the system is configured to manage/direct any UAV/drone craft capable of operation in flyway segments and zones/regions of the airspace under the control of an operator/pilot or with a suitable control system that can be directed to operate the UAV/drone craft in and along an assigned route in the airspace. According to an exemplary embodiment, the UAV/drone craft may comprise an on-board computing system with a control module that can be accessed by a remote operator and/or by network to direct the UAV/craft on a route/mission and to track location, speed, etc. See e.g. FIGS. 50-56 and 61-63.

According to an exemplary embodiment, the system comprises a monitoring system (e.g. detectors and data links/communications) to monitor UAV/drone craft operating in the airspace (e.g. including position/location, speed, time, time of day, etc.) so that the system can determine rates to be charged. According to an exemplary embodiment, the detectors may comprise transceiver/transponder technology such as used in toll roads with the EZ-PASS system. See e.g. U.S. Pat. No. 5,819,234 and U.S. Patent Application Publication No. 2011/0161140 (e.g. using RFID/DSRC or other technology). According to an exemplary embodiment as indicated schematically in FIG. 3F and FIG. 16B, a UAV/drone craft may comprise a detector-ready device (e.g. transceiver/transponder) configured to connect by data communications with a detector of the system (e.g. to manage a checkpoint or otherwise track the UAV/drone craft across flyway segments and zones/regions). According to other exemplary embodiments, the UAV/drone craft may comprise a wireless communication device (e.g. employing conventional wireless/radio/cellular/other technology) configured to be detected by the monitoring system (e.g. at detectors of the system) along the flyway segments during a mission. According to an exemplary embodiment, the UAV/drone craft will comprise an identifier (such as a unique alphanumeric code of a type appearing on a visible license plate for a registered motor vehicle, a unique RF code, or the like). See FIG. 3F (e.g. UAV/drone craft with schematic representation of identifier I as a device/system/object to function passively and/or actively to allow identification of UAV/drone craft to the system including during operation in the airspace).

According to an exemplary embodiment, a UAV/drone craft may comprise a data collection system including for example a global positioning system (GPS) (or other technology) that will record/track the position/path of the UAV/drone craft and create data/data file(s) that can be transmitted to the system during the mission (e.g. continuously, at intervals, periodically/when possible/when data connector can be established, when queried, etc.) or after the mission (e.g. at a detector in the airspace, at an exit station from the airspace, by direct data link, by network connection, from the operator/by the pilot, etc.); as indicated, the UAV/drone craft may operate at the direction of a remote pilot/operator and data may be transmitted to the system by the pilot/operator network connection. According to an exemplary embodiment, a UAV/drone craft may comprise an imaging system such as a camera that records images that are transmitted to the system (e.g. time/date-stamped photographs taken during operation on the route and/or at checkpoints and markings, etc.) to record the position/path (and other information such as speed, etc.) for the UAV/drone craft to transmit to the system (e.g. in or near real-time during the mission or after completion of the mission). As indicated schematically in FIG. 3F an identifier I (e.g. device to facilitate/transmit identification) is provided on the UAV/drone craft; the identifier is intended to represent any device/system that can be mounted/installed or placed on a UAV/drone craft (e.g. detector, GPS, transceiver/transponder, camera, identifier, etc.).

According to an exemplary embodiment, the UAV/drone craft will comprise a device/system for data recording, a data communication system, a computing/control system, as well as other systems for operability of the UAV/drone craft in flight.

According to an exemplary embodiment, the UAV/drone craft will be provided a profile (e.g. data set/file) comprising the attributes of the UAV/drone craft to facilitate administrator and director (e.g. transacting, registering, tracking/monitoring, communications, control, licensing, billing, payment, etc.) of the UAV/drone craft and management of the airspace. See FIGS. 61-63. According to an exemplary embodiment, the registration/profile of a UAV/drone craft will indicate to the system the method and manner of anticipated operation and interaction of the UAV/drone craft in the airspace. (According to an exemplary embodiment, UAV/drone craft having enhanced data/communication and control/direction capability may be entitled to enhanced status, discounted rates, etc. in the airspace.) According to an exemplary embodiment, UAV/drone craft will operate in the airspace to perform a mission according to assigned rights/priority/status and routing by the system subject to tracking/monitoring and will be billed/obligated to pay for use/access of the airspace at a rate/terms transacted with the system (e.g. by license). According to an exemplary embodiment, the rate/terms and rights/priority/status will be contained in the profile of the UAV/drone craft as a data set (along with billing/payment and operation history). See e.g. FIGS. 61-63.

Designation of Airspace/Flyways

As indicated in the FIGURES; according to an exemplary embodiment, an airspace may exist or be established in any of a wide variety of environments in any of a wide variety of terrain/layout with any of a wide variety of features that may experience any of a wide variety of conditions. As indicated schematically in FIGS. 4A to 22B, according to an exemplary embodiment the flyways/routes and zones/regions in an airspace can be designated and configured based on the environment/terrain, features and conditions that exist or that may be experienced by UAV/drone traffic and craft (or other purposes). As indicated in the FIGURES, features may include geologic features, geographic features, man-made features, natural features and other features, for example, hills/mountains, valleys, plains/open spaces, rivers/creeks, canals, lakes, ponds, roads/streets, highways/expressways, rail/transit lines, walkways/sidewalks, trails/paths, buildings/structures, commercial/office complexes, business/industrial locations, urban centers, homes/apartments, shopping centers/malls, water towers, utility installations, power/communication towers, power/communication transmission lines, pipelines, fences, basements, borders, excavations, trees/forests, fields/farms, transportation ports/stations, easements, obstacles, etc. According to an exemplary embodiment, such features may be used to designate and develop and establish routes and flyways in an airspace; such flyways and zones may be configured for or based upon the features, terrain and environment/conditions that exist.

According to an exemplary embodiment, the airspace will comprise a set of flyways/zones providing routes for craft operating in the airspace suitable for the airspace and craft in view of the environment, features, conditions, terrain, etc.

According to an exemplary embodiment, as indicated in FIGS. 4A through 22B, flyways/zones may be designated with reference to features on the underlying terrain such as roads, streets, highways, expressways, waterways, rivers, canals, railways, utility lines, easements, power transmission lines, pipelines, other geographic features, etc.

As indicated, flyways/zones may be established to comprise a transit network to facilitate safe and convenient/efficient operation and passage of craft in the airspace. According to an exemplary embodiment, flyways/zones may be configured in a manner to designate/segregate craft according to type and/or priority and/or mission and/or route. As indicated schematically, for example, a flyway segment designated with reference to a street may be used for "local" craft operating at relatively lower speed and performing localized missions while a flyway segment designated with reference to a rail/transit line or river or expressway may be used for "express" craft in passage through the airspace and/or operating at relatively higher speed; for example, a zone designated over an urban area may be used for "local" craft or operation in the urban area while a zone designated over a non-urban/outlying area may be used for "express" craft in passage through the airspace. See FIGS. 4A through 22B.

As indicated, routes for UAV/drone craft on a mission in the airspace can be assigned to comprise flyway segments and zones appropriate for safe and efficient operation of the craft and traffic management. According to other exemplary embodiments, flyway segments can be occupied by the UAV/drone craft while carrying out aspects of a mission, either directly (e.g. for imaging/sensing while traveling along a flyway segment, for picking up or dropping off a parcel at a location underneath a flyway segment, etc.) or indirectly (e.g. for travel to or from a site at which mission operations are performed). In some embodiments, zones can be occupied by the UAV/drone craft while carrying out aspects of a mission (e.g. a UAV/drone craft may acquire rights to perform imaging/sensing or parcel pickup/delivery at any location within a zone, to hover/loiter/travel freely within the zone, etc.). See FIGS. 23A to 49B.

Referring to FIGS. 4A through 22B, various representative diagrams of airspaces for UAVs/drone craft of various types are shown schematically according to an exemplary embodiment. As indicated, the airspaces can be located in any of a wide variety of geographic locals and regions (including those of a type shown in the FIGURES and other locations); as indicated such locales and regions may comprise zones having various types/forms and density of features (such as ports, roads, rail lines, rivers/waterways, buildings, sites, trees, towers, etc.) as well as of terrain (such as hills, valleys, etc.). As indicated, designated flyways/routes for UAV/drone craft can be provided or established in each zone or region of an airspace. (In FIGS. 4A/4B through 21A/21B, in the "A" figure the airspace is shown with terrain/features schematically/representationally; in the "B" figure with examples of the airspace of the "A" figure is shown flyways/routes for UAV/drone traffic in the airspace.)

According to an exemplary embodiment (as indicated schematically), in an airspace providing a network of features such as roads/streets, highways/expressways, rivers/waterways, rail/transit lines, etc., a corresponding network of flyways/routes for UAV/drone craft can be provided. Passage of UAV/drone craft in an airspace can be administered and managed on designated flyways/routes and zones/regions in the airspace (e.g. with reference to the corresponding features on which each flyway is designated). According to an exemplary embodiment, establishment of designated flyways/routes for UAV/drone traffic in an airspace will facilitate safe and efficient managed passage and transit of UAV/drone craft in and through the airspace. As indicated, according to an exemplary embodiment, flyways/routes can be designated by features under the airspace or by other considerations notwithstanding features under the airspace so as to facilitate safe/efficient management and administration of UAV/drone craft in the airspace.

According to an exemplary embodiment, the airspace will be configured to provide ports and stations to provide utilities for craft (e.g. refueling/recharging, service/maintenance, parking, shelter, etc.). See FIGS. 5A, 9A, 21A, 35-36. According to an exemplary embodiment, the airspace may be configured to assist/retrieve disabled or downed craft by facilitating access by service crews.

Figure 4A:
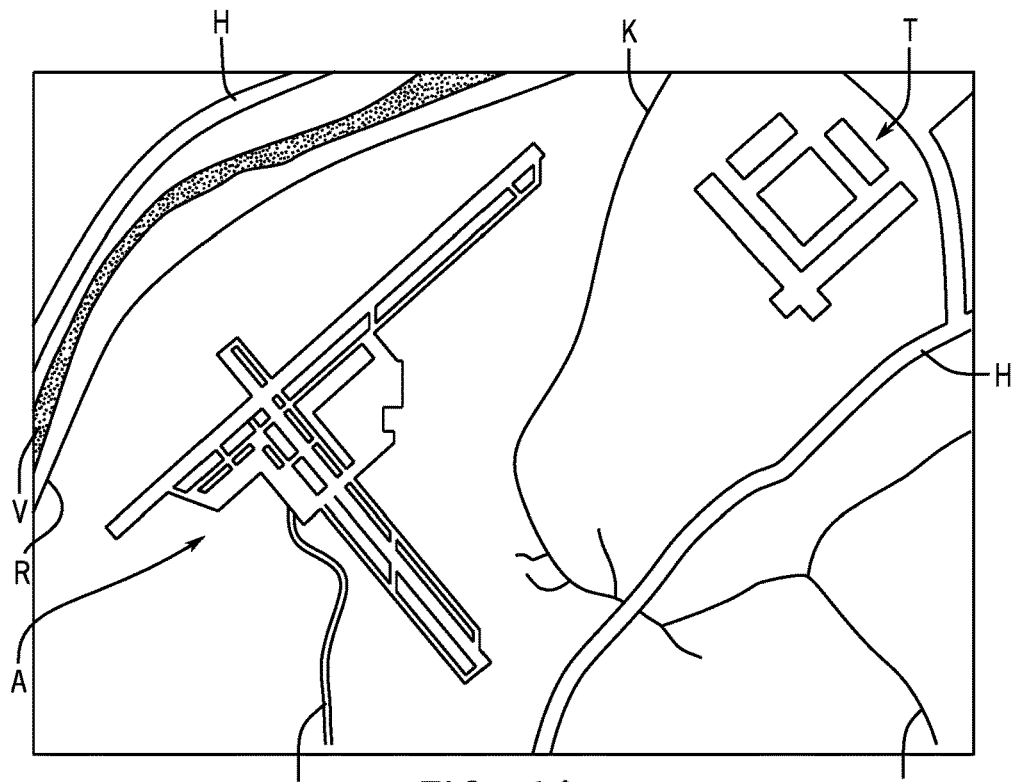
FIG. 4A is a schematic plan view of an airspace according to an exemplary embodiment.
Figure 4B:
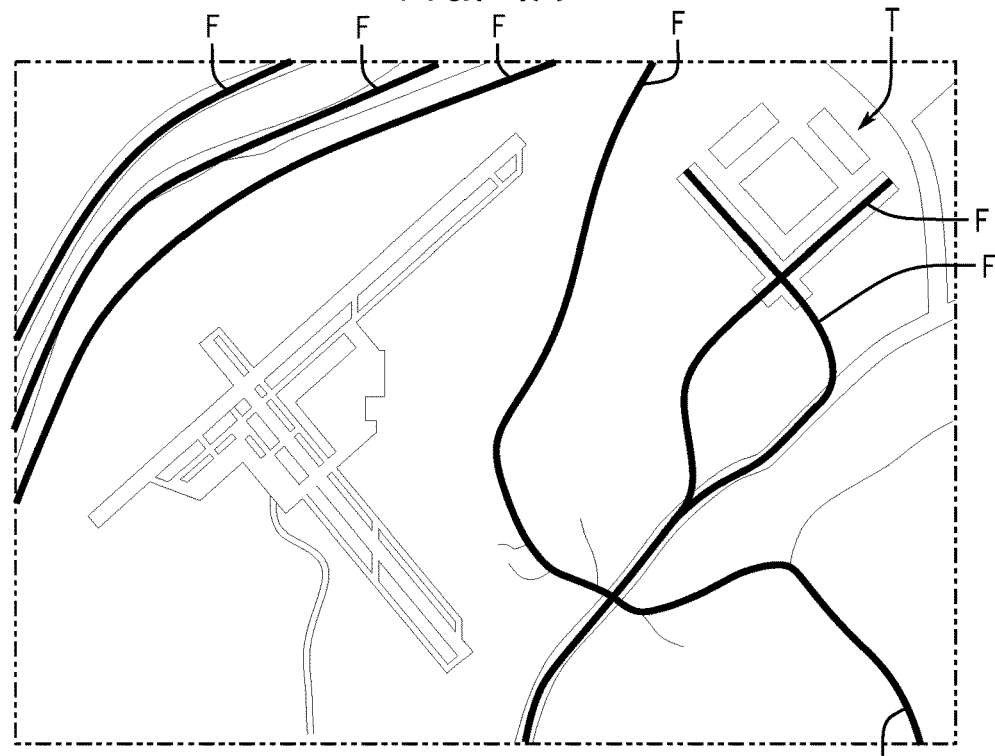
FIG. 4B is a schematic plan view of the airspace of FIG. 4A showing a flyway/route for aircraft according to an exemplary embodiment.

Referring to FIGS. 4A and 4B, an airspace over terrain with features such as a river V, creek K, roads R, highway H, municipal/commercial airport A and UAV/drone airport P is shown schematically and representationally. The airspace (and features) with designated representative flyways/routes F for UAV/drone traffic is shown schematically and representationally in FIG. 4B. As indicated in FIG. 4B, flyways/routes for UAV/drone traffic can be designated with reference to features and terrain in the airspace of FIG. 4A. For example, as indicated in FIG. 4B, routes/flyways F for UAV/drone traffic connecting UAV/drone airport/station T and elsewhere in the airspace are designated over creek K, road R, highway H, river V. (A conventional airport A for conventional aircraft is shown.)

Figure 5A:
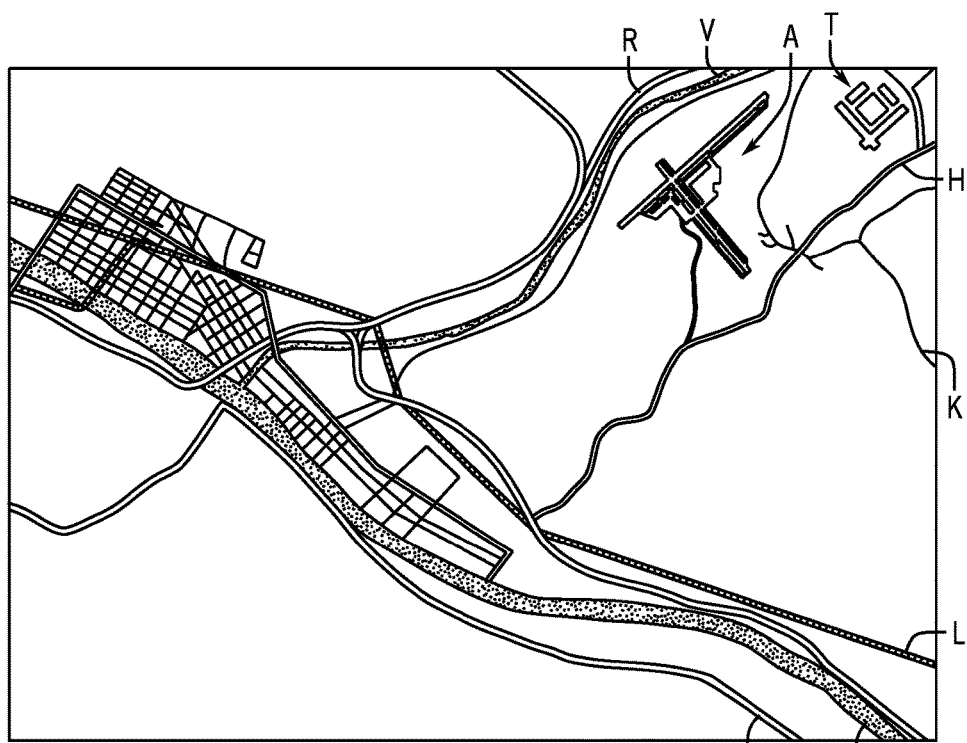
FIG. 5A is a schematic plan view of an airspace according to an exemplary embodiment.
Figure 5B:
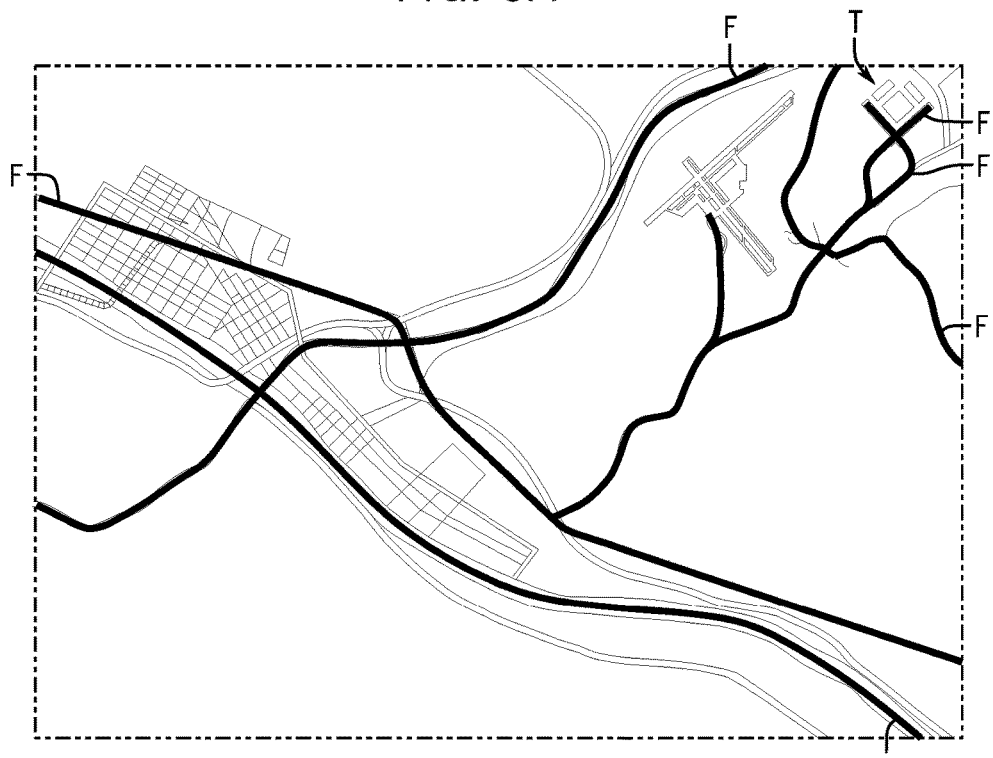
FIG. 5B is a schematic plan view of the airspace of FIG. 5A showing flyway/route segments for aircraft according to an exemplary embodiment.
Figure 6A:
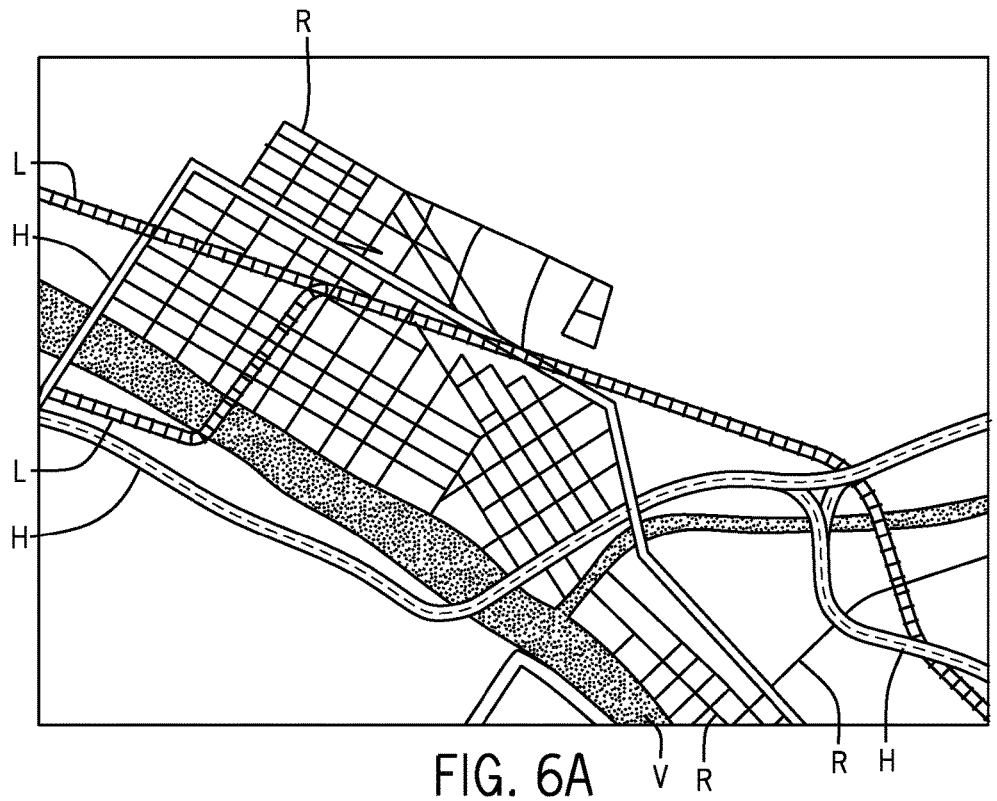
FIG. 6A is a schematic plan view of an airspace according to an exemplary embodiment.
Figure 6B:
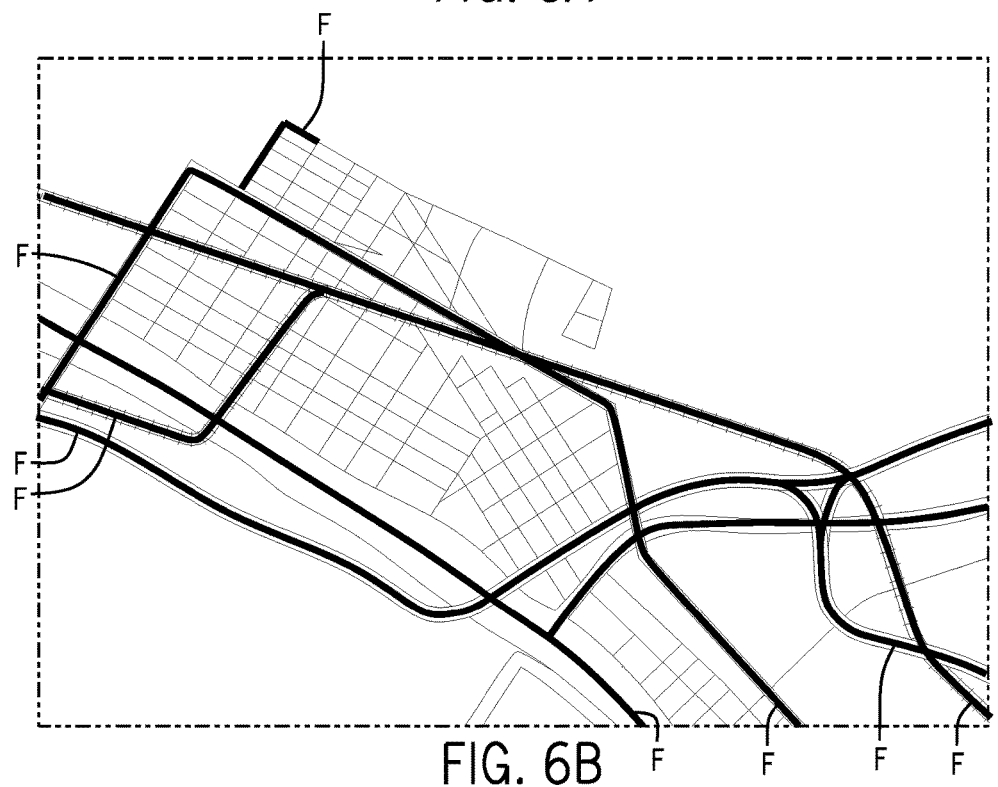
FIG. 6B is a schematic plan view of the airspace of FIG. 6A showing flyway/route segments for aircraft according to an exemplary embodiment.

Referring to FIGS. 5A and 5B and FIGS. 6A and 6B, an airspace over an urban area/zone is shown schematically; flyways F for UAV/drone traffic in the airspace of FIGS. 5A and 6A are designated over rail line L, roads/streets R, river V, highway H as shown schematically and representationally in FIGS. 5B and 6B. Station T is shown connected to the network of flyways in FIGS. 5A-5B.

Figure 7A:
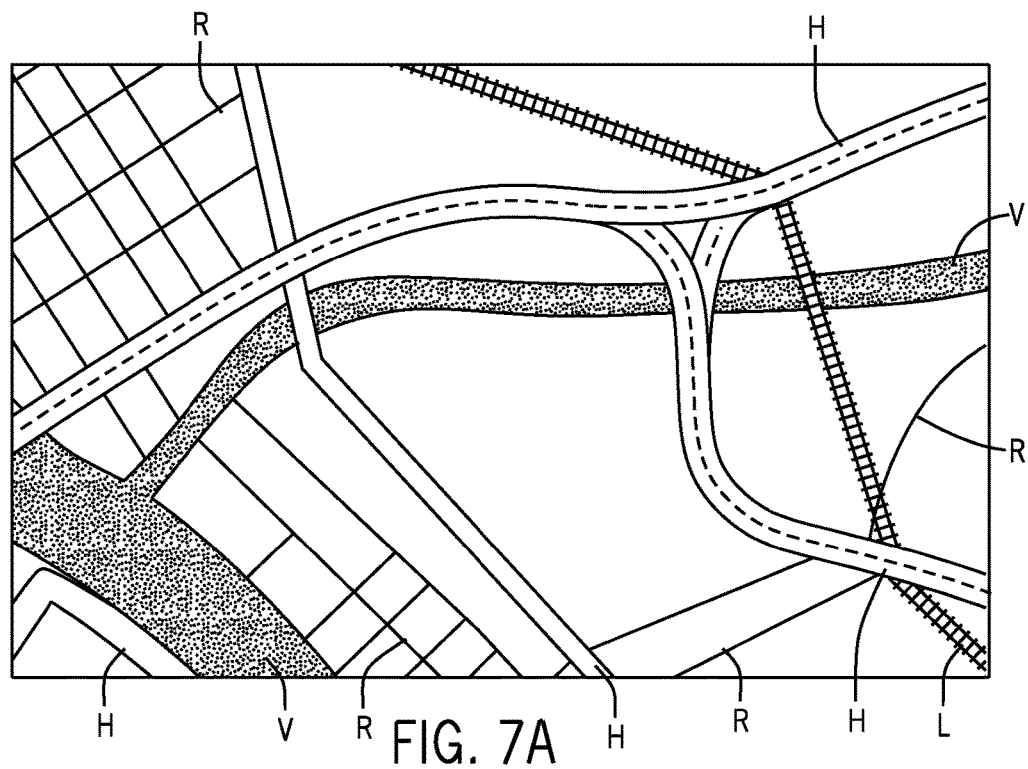
FIG. 7A is a schematic plan view of an airspace according to an exemplary embodiment.
Figure 7B:
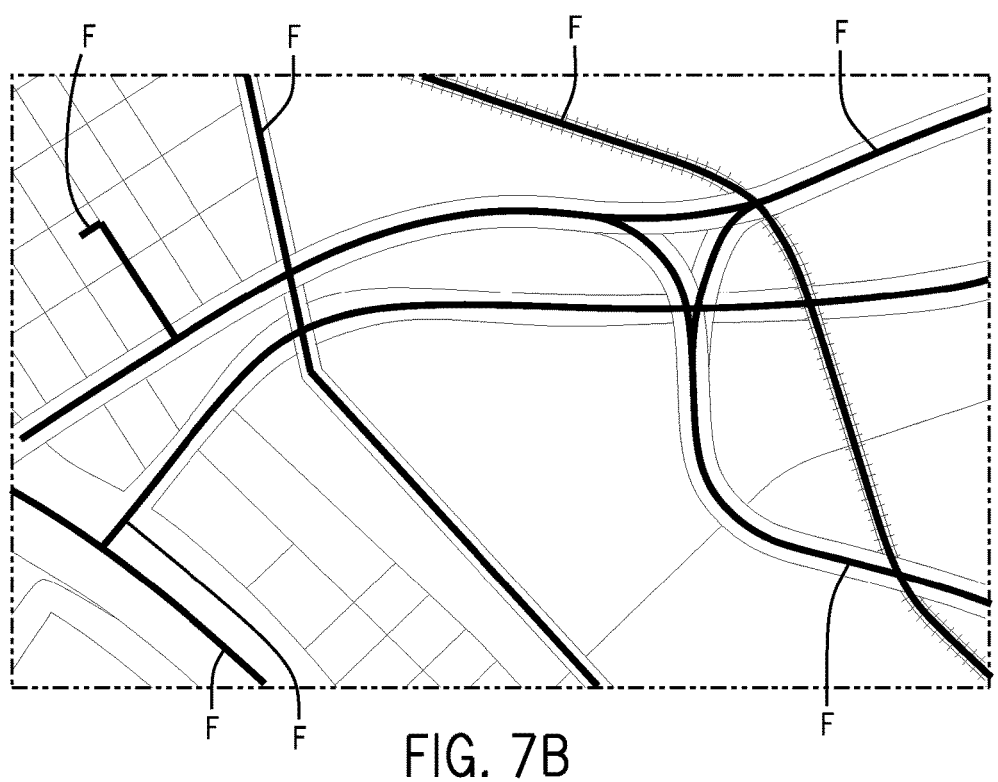
FIG. 7B is a schematic plan view of the airspace of FIG. 7A showing flyway/route segments for aircraft according to an exemplary embodiment.

Referring to FIGS. 7A and 7B, an airspace over an urban/commercial zone or region is shown schematically and representationally. As indicated schematically in FIG. 7B, flyways F for UAV/drone traffic are designated over features such as rail/transmit line L, expressway/highway H, streets/roads R, river V, etc.; as indicated schematically, interchanges for craft can be provided generally in a manner as used for interchange/routing of ground vehicle traffic. According to other embodiments, flyways can cross over each other at different altitudes. See also FIGS. 33A/B and 34A/B. As also indicated schematically in FIG. 7B, routes to locations such as residential homes, commercial business offices, factories/industrial plants, schools, hospitals, etc., can be designated or established for UAV/drone craft (e.g. as a delivery route to a representative building).

Figure 8A:
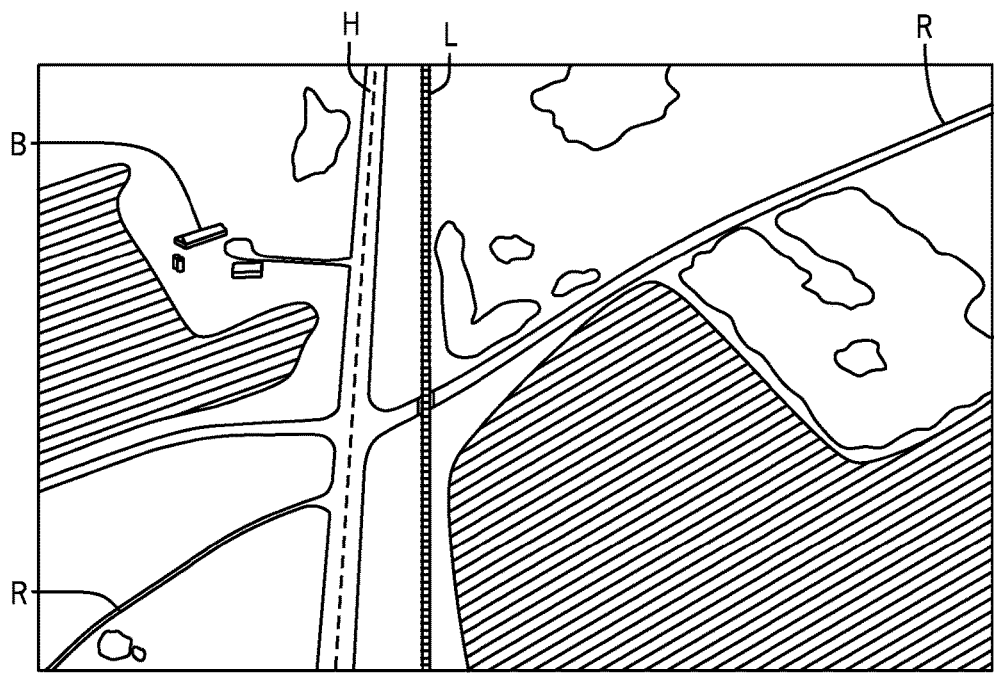
FIG. 8A is a schematic perspective view of an airspace according to an exemplary embodiment.
Figure 8B:
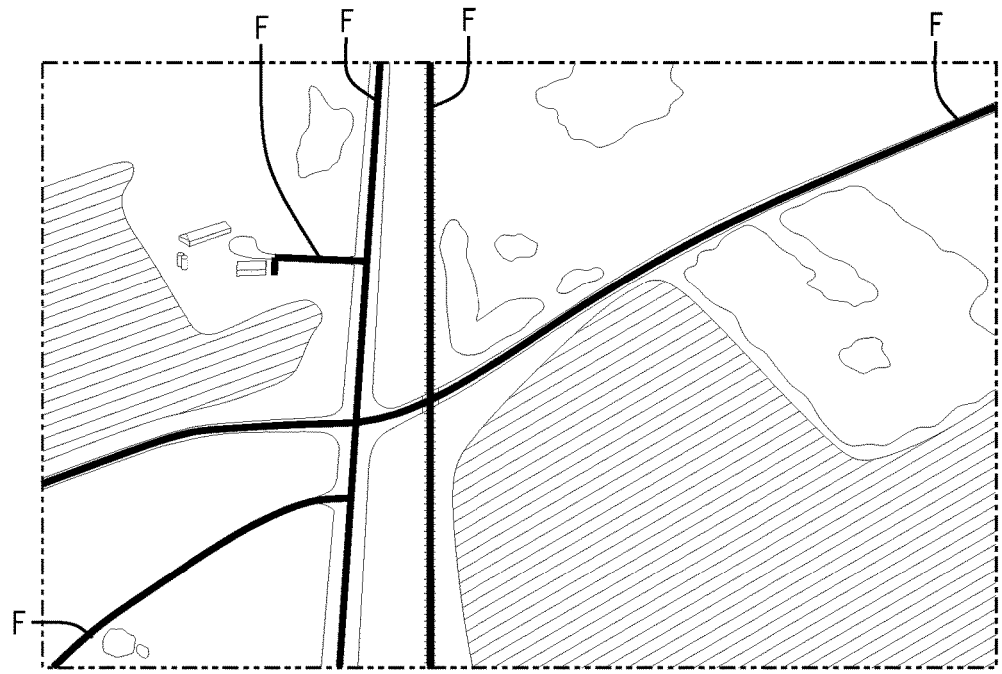
FIG. 8B is a schematic perspective view of the airspace of FIG. 8A showing flyway/route segments for aircraft according to an exemplary embodiment.

Referring to FIGS. 8A and 8B, an airspace in a rural/farm area/zone or region is shown schematically with features in the farmland such as rail/transit line L, streets/road R, highway H; flyways F for UAV/drone traffic can be designated over the features in the airspace as indicated schematically and representationally in FIG. 8B; delivery route FD shown as following a flyway and exiting to a farm/rural residence is also shown schematically.

Figure 9A:
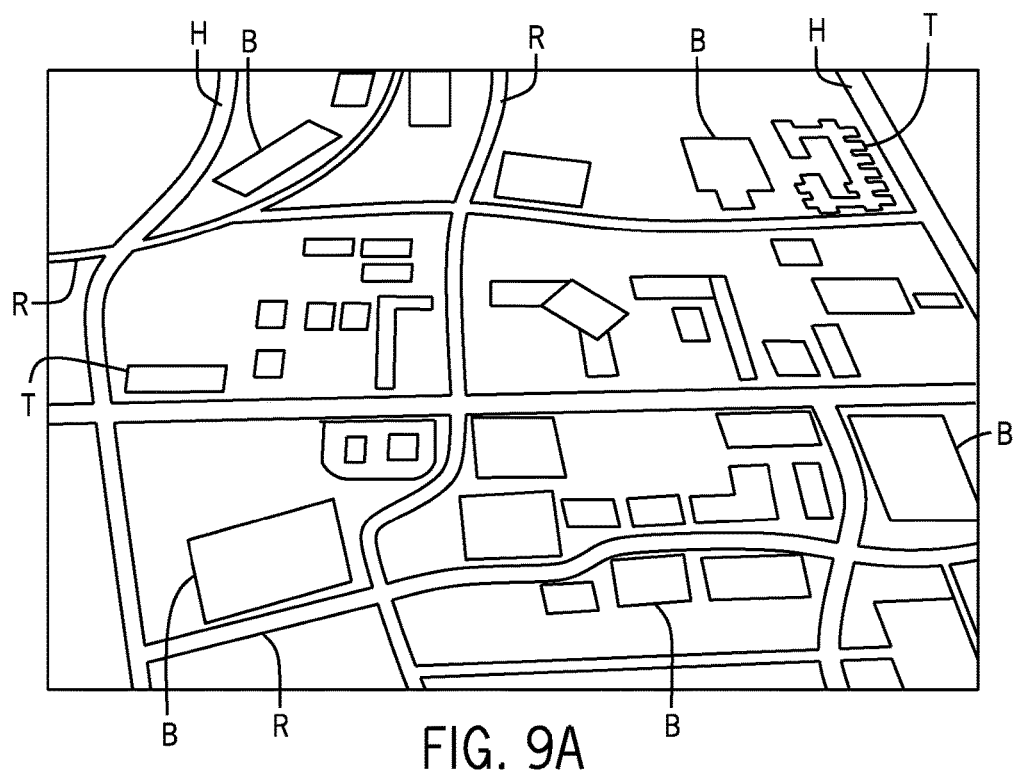
FIG. 9A is a schematic perspective view of an airspace according to an exemplary embodiment.
Figure 9B:
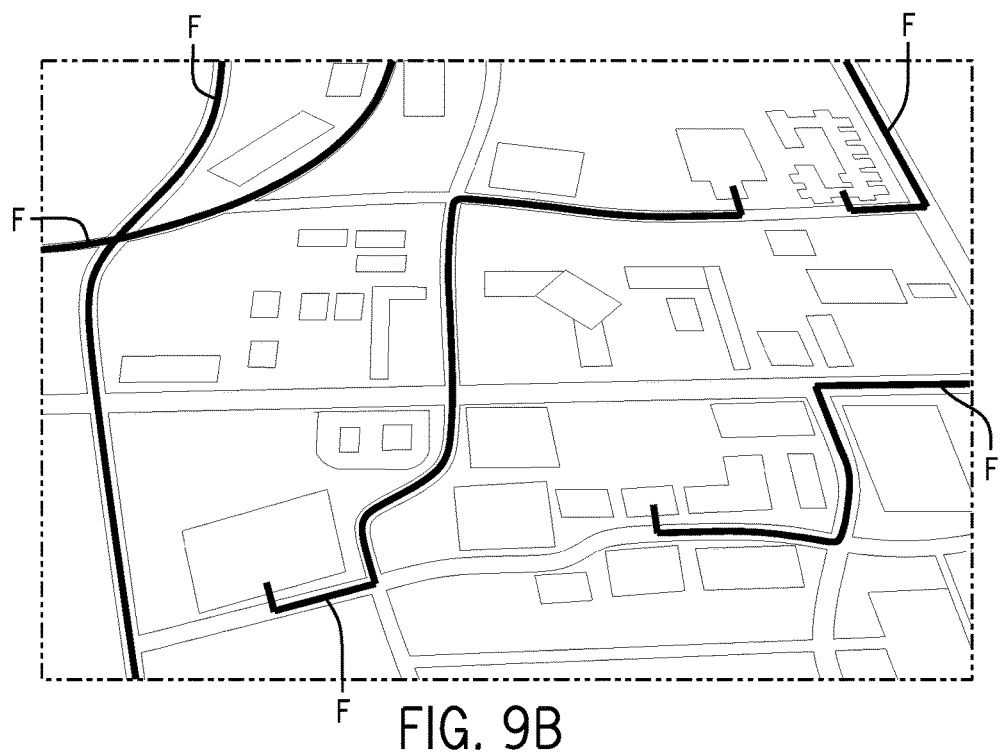
FIG. 9B is a schematic perspective view of the airspace of FIG. 9A showing flyway/route segments for aircraft according to an exemplary embodiment.

Referring to FIGS. 9A and 9B, an airspace in an urban/industrial/commercial zone or region is shown schematically with features such as office buildings, factories, warehouses, distribution locations, residential buildings, schools/educational centers, municipal buildings/offices, etc. and streets, roads/drives, highways, transit lines, etc. Flyways F for UAV/drone traffic and routes for delivery can be designated in the airspace as indicated schematically and representationally in FIG. 9B. Stations T for craft are shown schematically in the zone and flyway network.

Figure 10A:
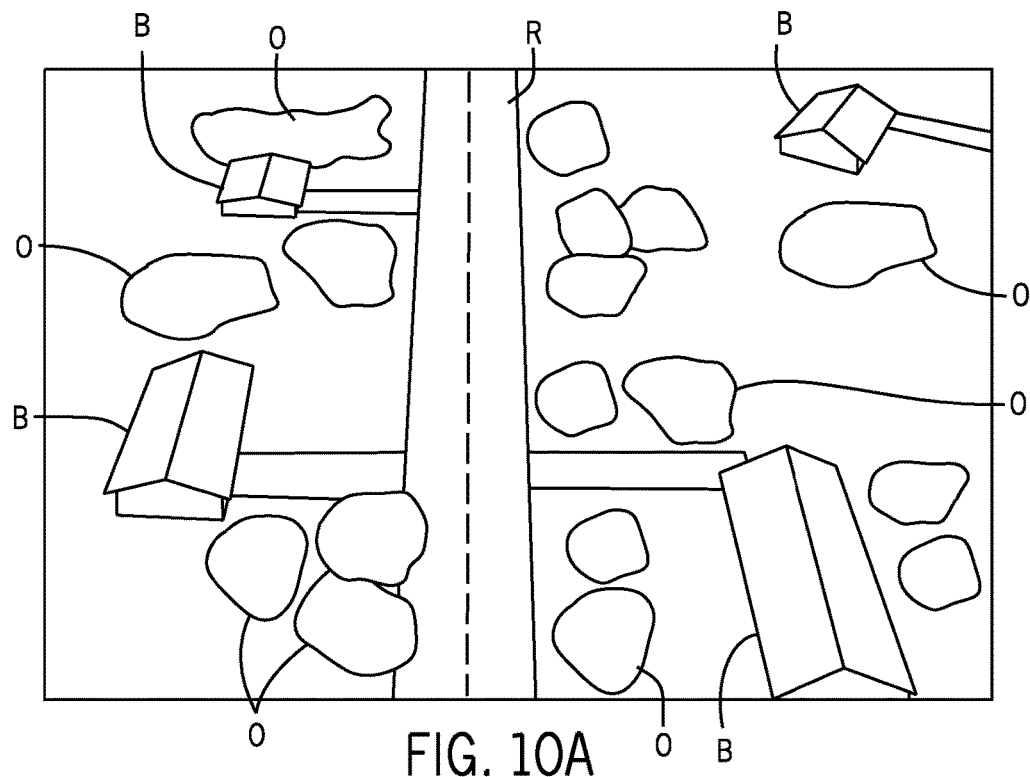
FIG. 10A is a schematic perspective view of an airspace according to an exemplary embodiment.
Figure 10B:
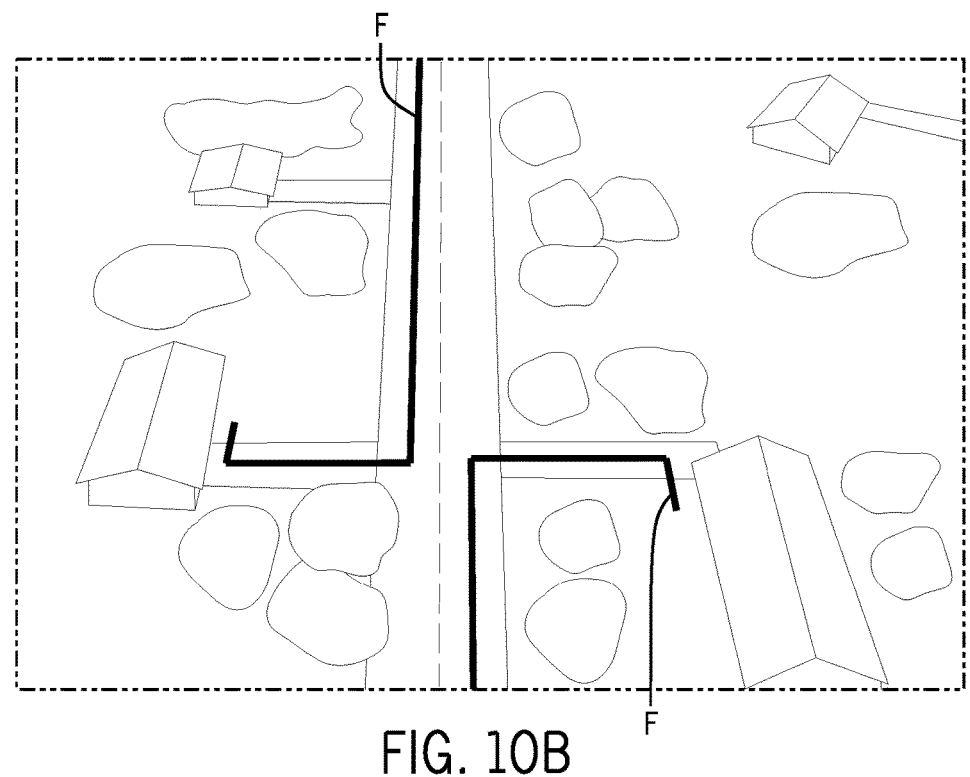
FIG. 10B is a schematic perspective view of the airspace of FIG. 10A showing flyway/route segments for aircraft according to an exemplary embodiment.

Referring to FIGS. 10A and 10B, an airspace in a suburban/residential zone/community or region is shown schematically and representationally with features such as residential homes, multi-family housing buildings, other structures, streets/roads, lots, driveways and trees. Designated flyways are indicated including routes for delivery shown schematically and representationally over streets and driveways in FIG. 10B. Obstacles O shown as trees are shown schematically in the zone and adjacent the flyway network.

Figure 11A:
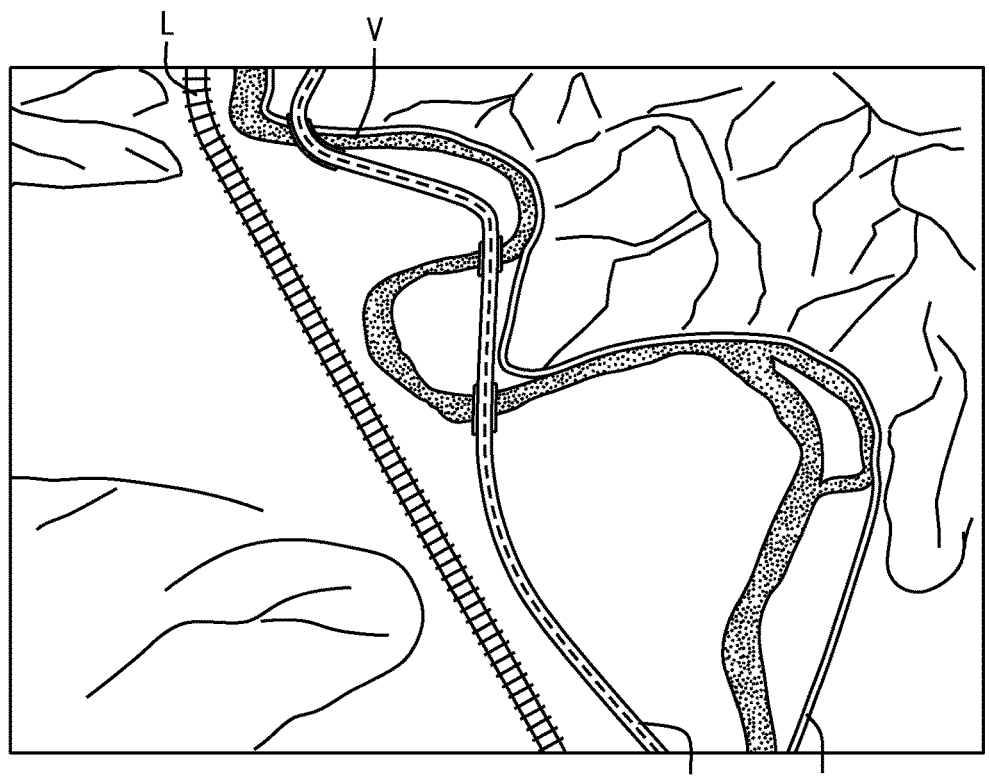
FIG. 11A is a schematic perspective view of an airspace according to an exemplary embodiment.
Figure 11B:
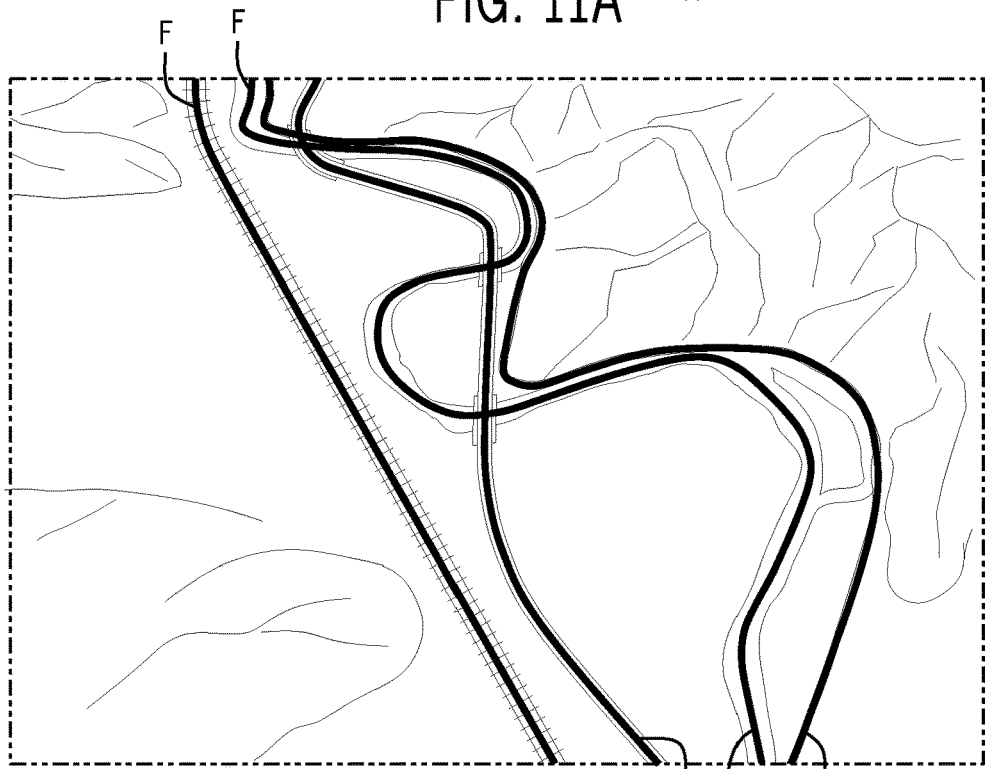
FIG. 11B is a schematic perspective view of the airspace of FIG. 11A showing flyway/route segments for aircraft according to an exemplary embodiment.

Referring to FIGS. 11A and 11B, an airspace in a rural zone/terrain or region is shown schematically and representationally with features such as a river, mountainous terrain, hills/valleys, rail/transit lines, roads, highway/expressway, river/waterway, etc. Designated flyways F for UAV/drone traffic are indicated schematically and representationally over rail/transit line, road, expressway and river/waterway in FIG. 11B. As further indicated, flyway segments in the zone/airspace may have different lengths/configurations/shapes and distances depending upon the corresponding reference features in the airspace used to designate the flyway segment. As indicated, the flyway segment over the expressway/highway and the flyway segment over the rail line have a generally more linear and direct configuration/shape; the flyway segment over the river has a multi-curve and meandering configuration/shape. (All flyway segments avoid obstacles such as mountainous terrain in the zone.)

Figure 12A:
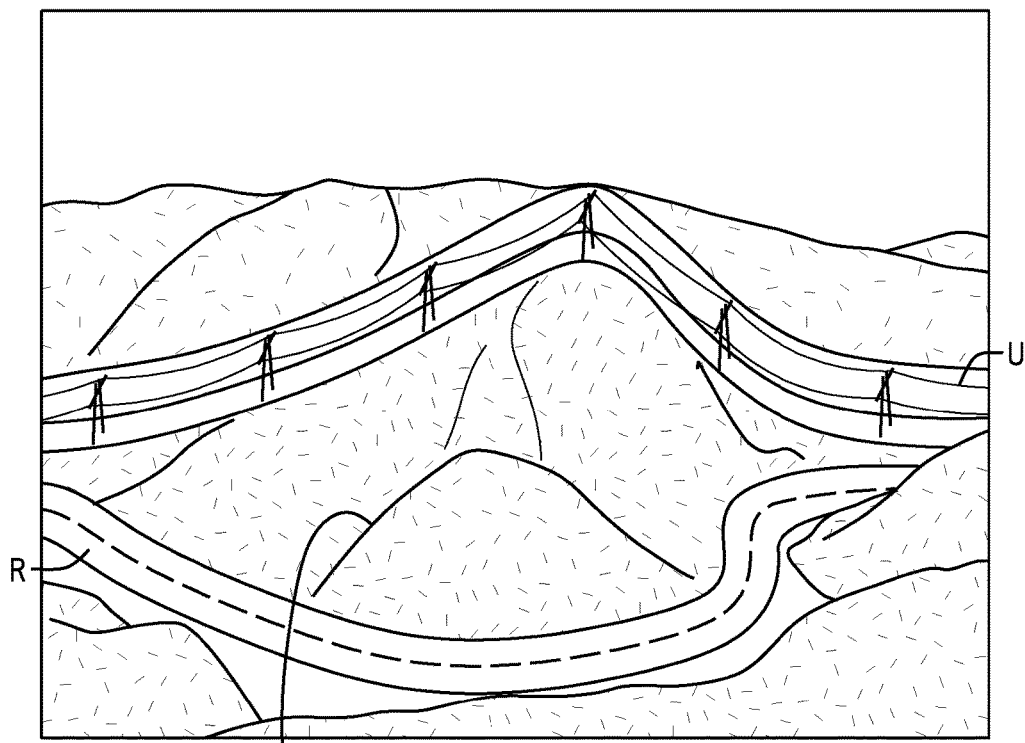
FIG. 12A is a schematic perspective view of an airspace according to an exemplary embodiment.
Figure 12B:
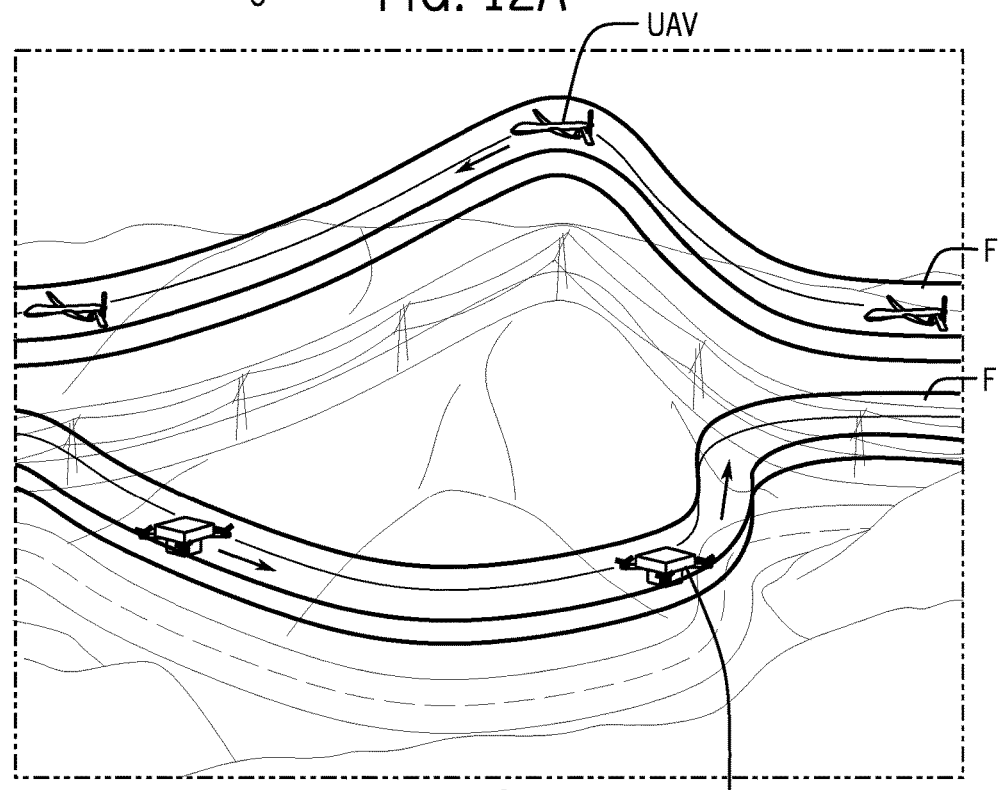
FIG. 12B is a schematic perspective view of the airspace of FIG. 12A showing flyway/route segments for aircraft according to an exemplary embodiment.

Referring to FIGS. 12A and 12B, an airspace in a rural zone/terrain or region is shown schematically and representationally with features such as a mountain/valley, road, trees, hills and a utility line/power cut over the mountain. Designated flyways F for UAV/drone traffic are shown schematically and representationally over the road and over the utility cut in FIG. 12B; UAV/drone traffic is also indicated schematically and representationally in FIG. 12B. As indicated in FIG. 12B flyway segments in the zone/airspace may have different lengths or distances depending upon the corresponding reference feature; UAV traffic has a more direct route of shorter distance on the flyway designated over the utility cut; UAV traffic has a less direct route of longer distance on the flyway designated over the road.

Figure 13A:
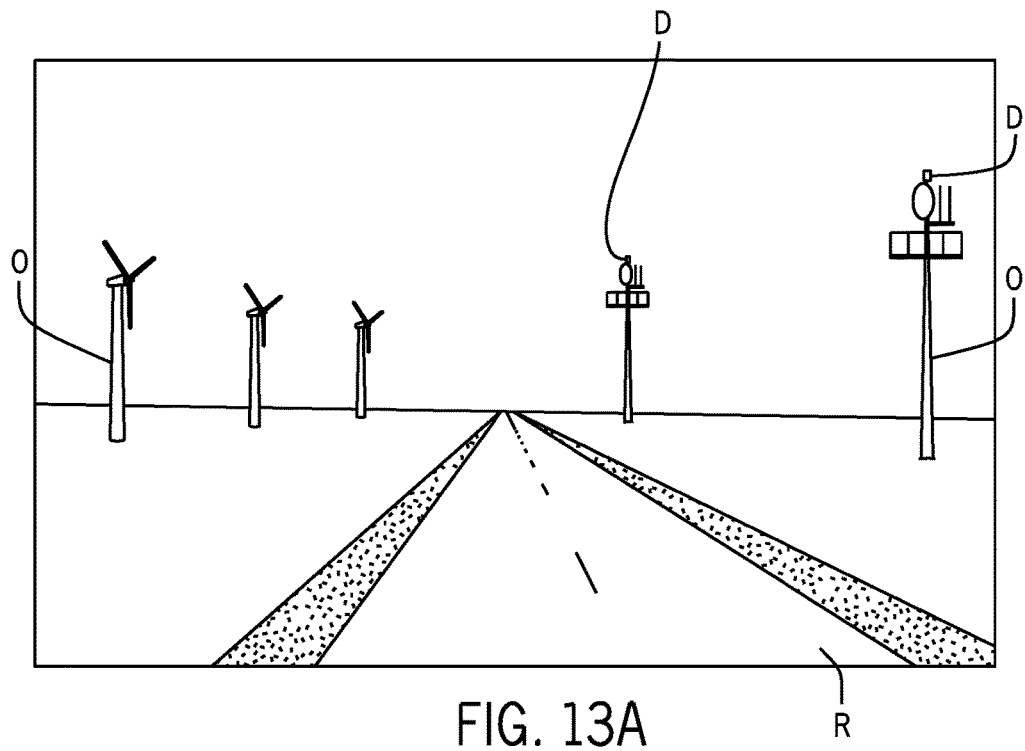
FIG. 13A is a schematic perspective view of an airspace according to an exemplary embodiment.
Figure 13B:
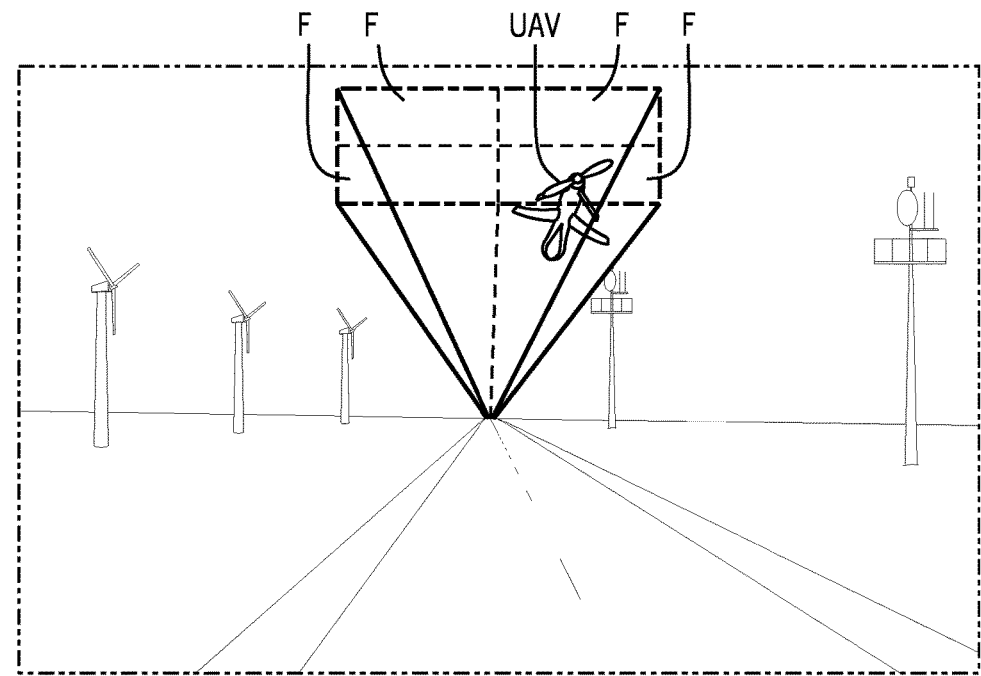
FIG. 13B is a schematic perspective view of the airspace of FIG. 13A showing flyway/route segments for aircraft according to an exemplary embodiment.

Referring to FIGS. 13A and 13B, an airspace in a rural zone or region is shown schematically and representationally with features such as a generally flat terrain with a highway and obstacles O shown as wind power turbines and cellular/radio communications towers. Designated flyway F for UAV/drone traffic is shown schematically over the highway between the wind power turbines and cellular communication towers in FIG. 13B. As indicated schematically in FIGS. 13A and 13B, detectors D for a monitoring system for the airspace may be installed on structures such as towers in the airspace.

Figure 14A:
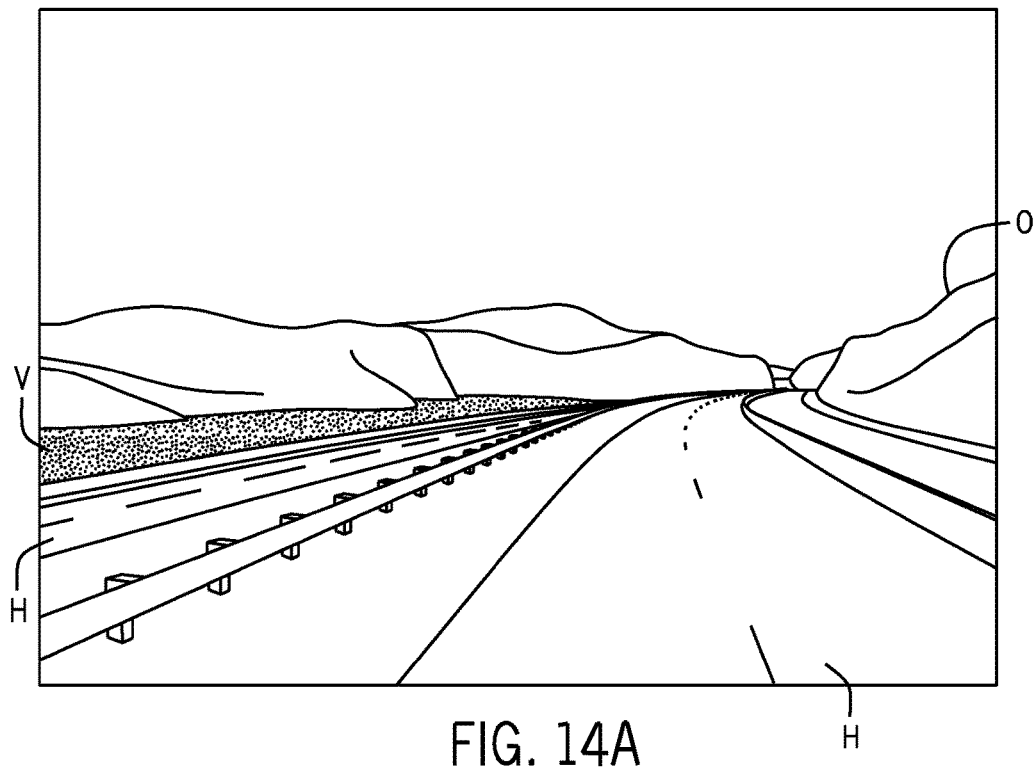
FIG. 14A is a schematic perspective view of an airspace according to an exemplary embodiment.
Figure 14B:
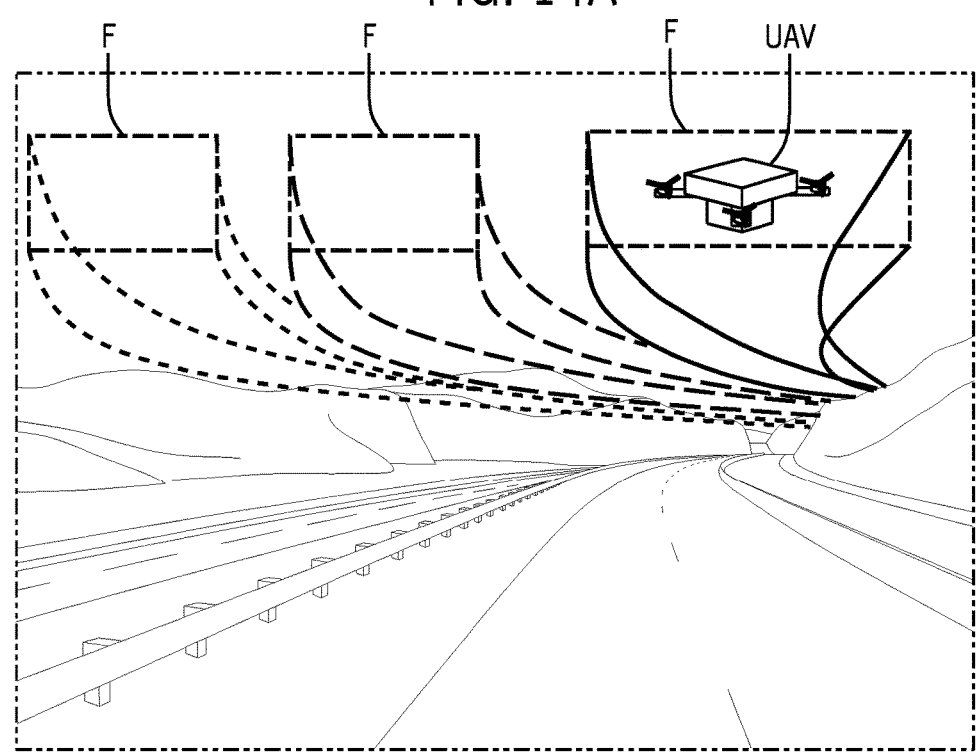
FIG. 14B is a schematic perspective view of the airspace of FIG. 14A showing flyway/route segments for aircraft according to an exemplary embodiment.

Referring to FIGS. 14A and 14B, an airspace in a rural/mountainous terrain or region is shown schematically and representationally with features such as a river, mountains, and an expressway/highway. Designated flyways F for UAV/drone traffic are shown schematically over the river and over each lane of the expressway (between the obstruction of mountains) in FIG. 14B. As indicated, flyway segments in the zone/airspace may be designated different routing to permit different UAV/drone traffic of different priorities, at different speeds, of different types, etc. See also FIGS. 11A and 11B.

Figure 15A:
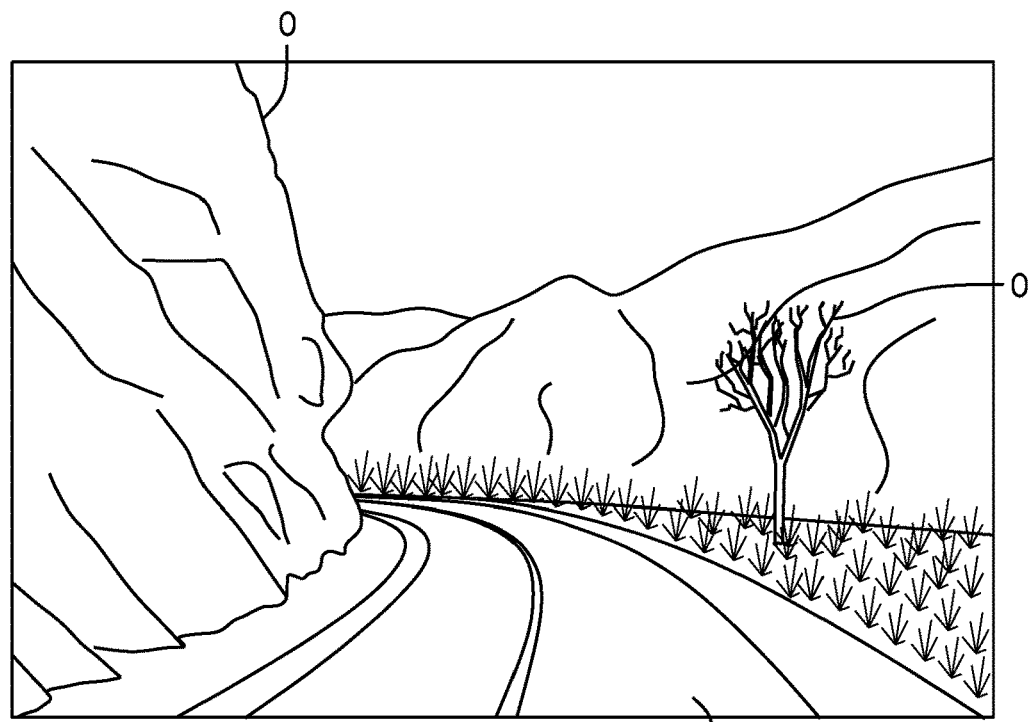
FIG. 15A is a schematic perspective view of an airspace according to an exemplary embodiment.
Figure 15B:
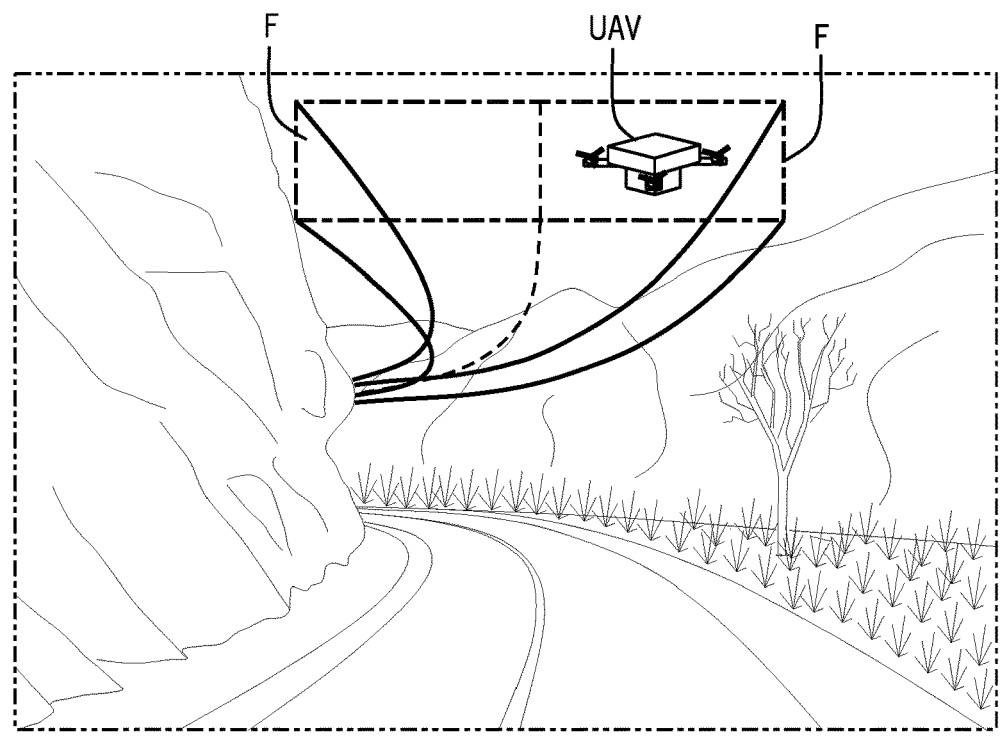
FIG. 15B is a schematic perspective view of the airspace of FIG. 15A showing flyway/route segments for aircraft according to an exemplary embodiment.

Referring to FIGS. 15A and 15B, an airspace in a rural/mountain zone or region is shown schematically and representationally with features such as a mountain/valley, road, trees/plants, hills, etc. Designated flyway F for UAV/drone traffic is shown schematically over the road winding (with the road) around a cut for the highway (in avoidance of obstacles O) in FIG. 15B. See also FIGS. 12A and 12B.

Figure 16A:
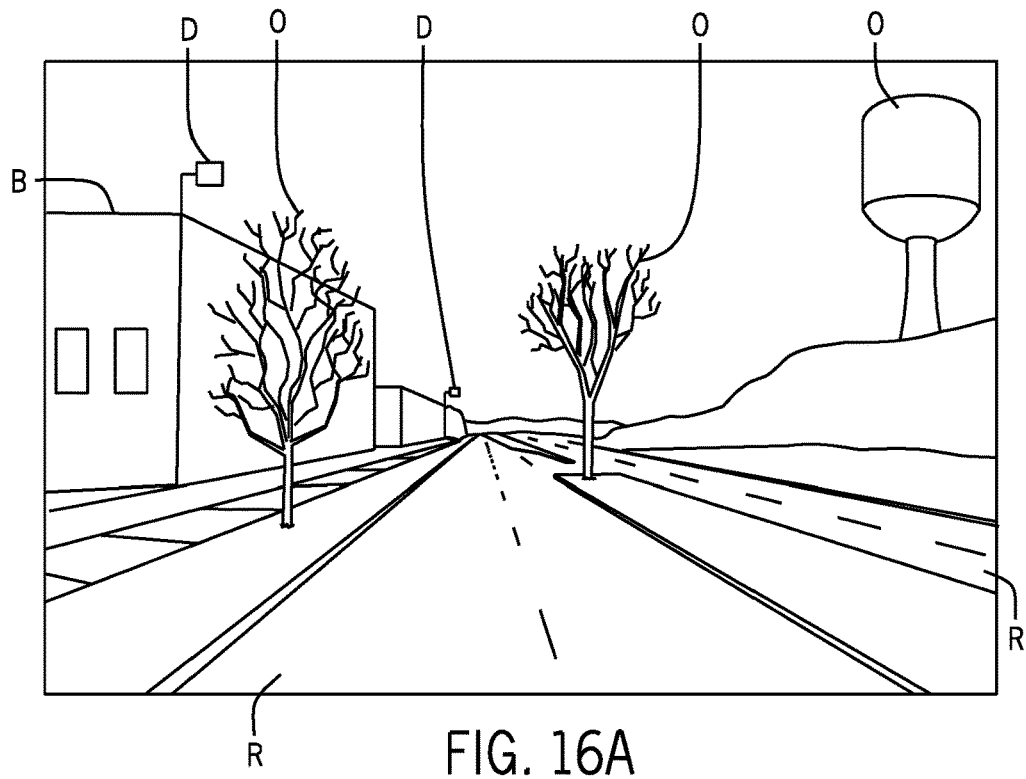
FIG. 16A is a schematic perspective view of an airspace according to an exemplary embodiment.
Figure 16B:
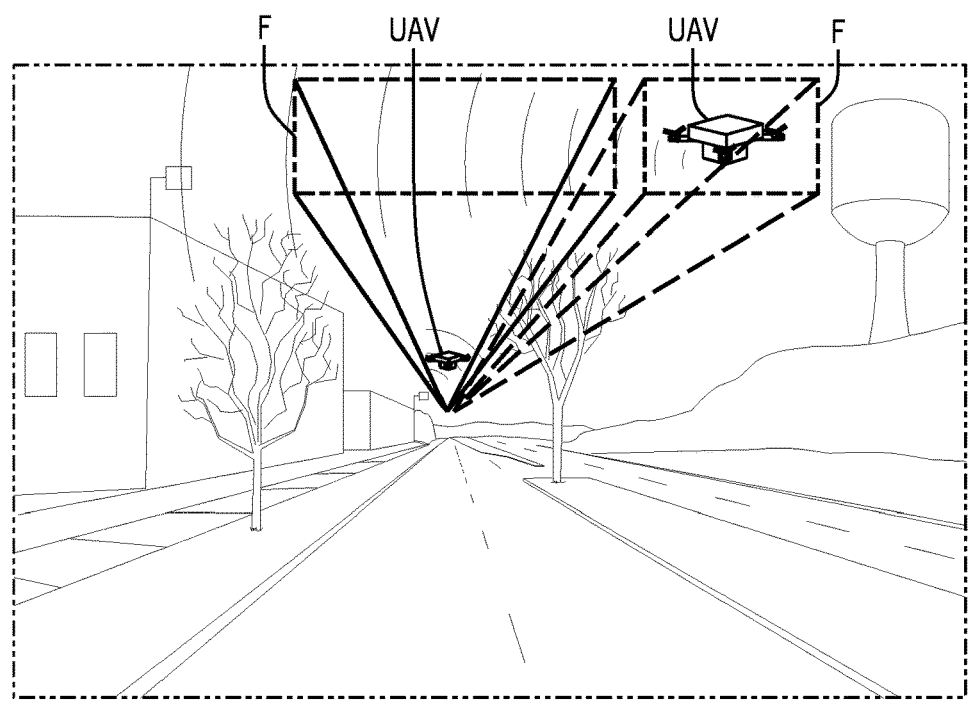
FIG. 16B is a schematic perspective view of the airspace of FIG. 16A showing flyway/route segments for aircraft according to an exemplary embodiment.

Referring to FIGS. 16A and 16B, an airspace in an urban/suburban zone or region is shown schematically and representationally with features such as a boulevard/street with multiple lanes, buildings, sidewalks, median strips (between lanes on the street/boulevard), a water tower, hills, trees, etc. Designated flyways F for UAV/drone traffic are shown schematically over each lane of the boulevard/street in FIG. 16B (e.g. in avoidance of obstacles O shown as tower and trees). As indicated schematically, each lane of flyway may be designated for unidirectional travel of UAV/drone traffic (e.g. with reference to the direction of travel of vehicles on the corresponding lane on the street/boulevard). UAV/drone traffic in a flyway lane may be routed with or counter to vehicle traffic in the corresponding street lane (below the flyway lane). Also indicated schematically in FIGS. 16A and 16B is a set of detectors D (e.g. sensor, transponder, camera, antenna, node, wireless access point, etc.) for UAV/drone craft atop buildings along the flyway; as indicated UAV/drone traffic in the flyway/zone may be tracked/monitored and/or in data communication with the system during operation in the airspace through the monitoring system and data/network connections. As shown schematically, according to an exemplary embodiment the detector/antenna/etc. of the monitoring system can be configured to obtain data/information from the craft (e.g. such as identifier I shown schematically on craft UAV in FIG. 3F) in a one-way and/or two-way data transmission (e.g. RFID track, data link, network link, imaging, etc.).

Figure 17A:
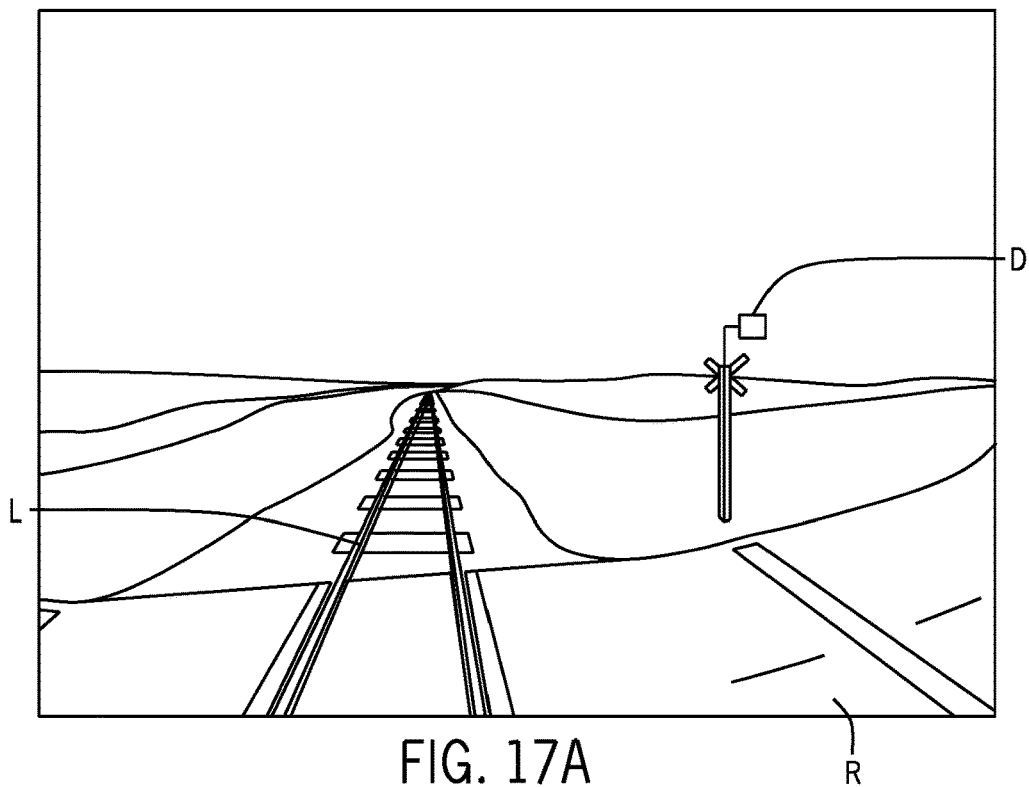
FIG. 17A is a schematic perspective view of an airspace according to an exemplary embodiment.
Figure 17B:
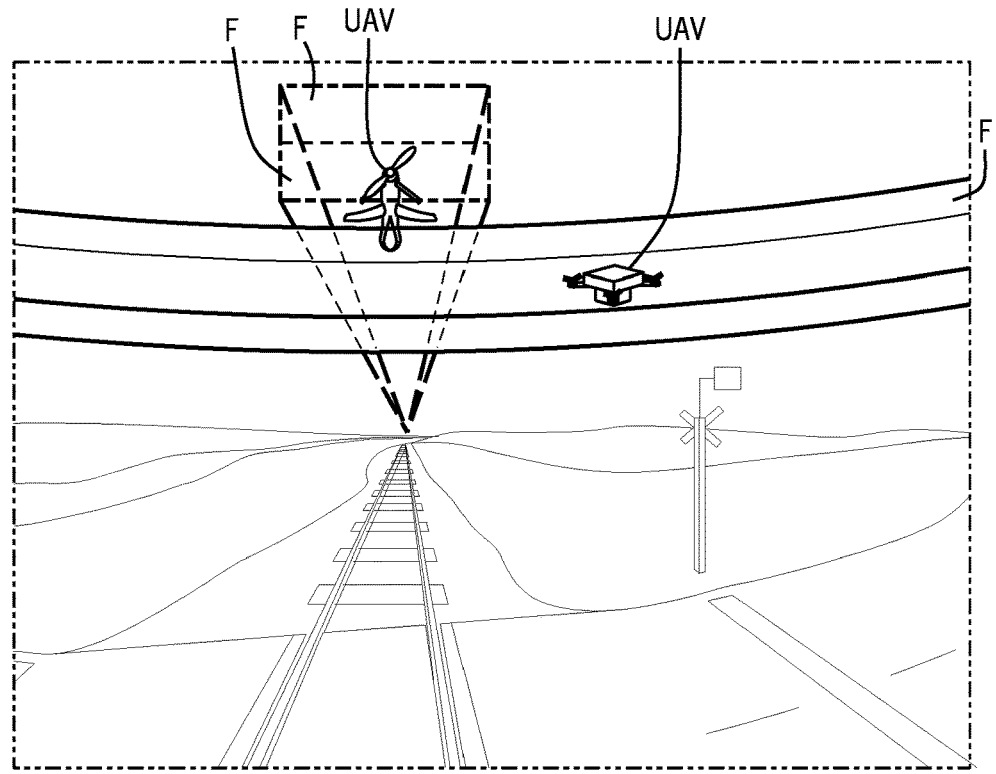
FIG. 17B is a schematic perspective view of the airspace of FIG. 17A showing flyway/route segments for aircraft according to an exemplary embodiment.

Referring to FIGS. 17A and 17B, an airspace in a rural/outlying zone or region is shown schematically and representationally with features such as farm fields, a rail/transit line, a rail/road crossing with signal, a road/highway, etc. Designated flyways F for UAV/drone traffic are shown schematically over the rail/transit line and over the road/highway in FIG. 17B; as indicated in FIG. 17B the flyway over the rail/transit line is positioned above the flyway designated over the road/highway. As also indicated schematically, a detector D (e.g. sensor, transponder, camera etc.) is provided at the rail crossing so as to be able to detect UAV/drone traffic in each flyway. UAV/drone traffic is also indicated schematically in each of the flyway segments shown in FIG. 17B.

Figure 18A:
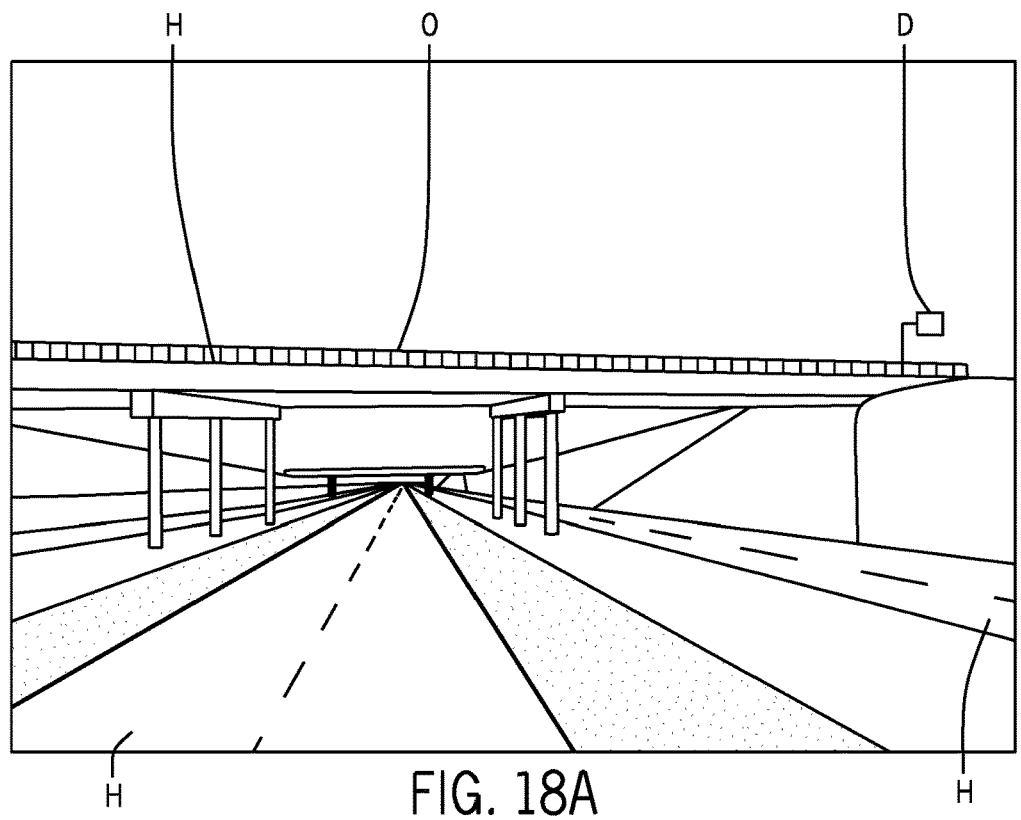
FIG. 18A is a schematic perspective view of an airspace according to an exemplary embodiment.
Figure 18B:
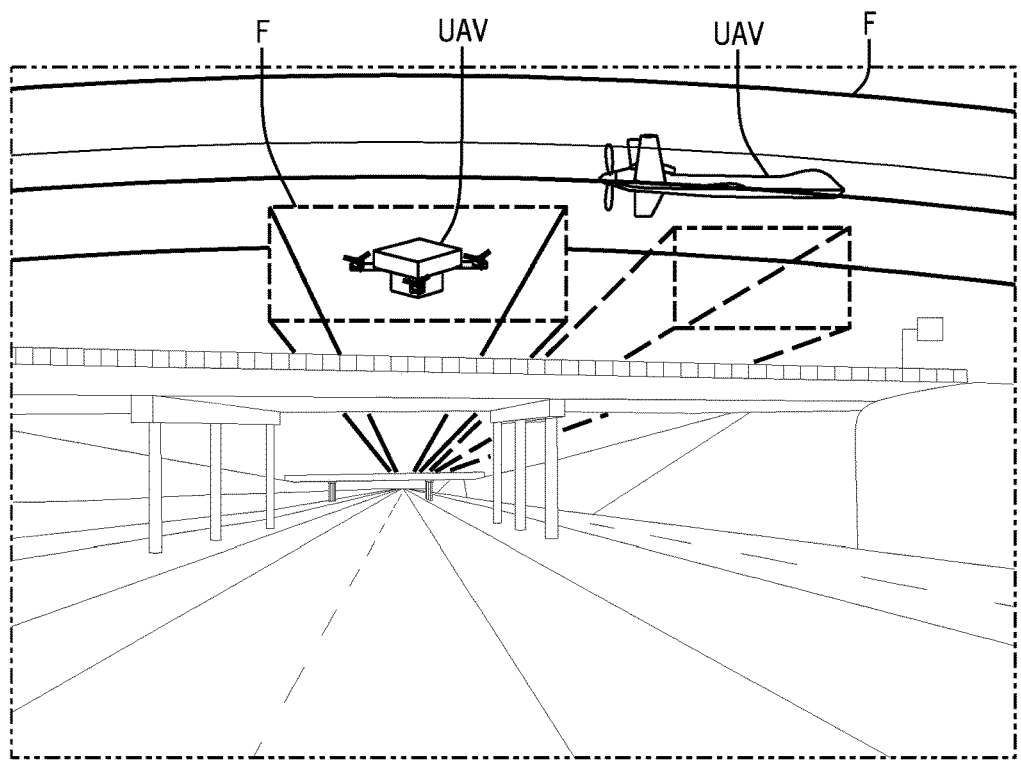
FIG. 18B is a schematic perspective view of the airspace of FIG. 18A showing flyway/route segments for aircraft according to an exemplary embodiment.

Referring to FIGS. 18A and 18B, an airspace in a suburban/rural/outlying zone or region is shown schematically and representationally with features such as an expressway (with bidirectional lanes for road traffic), an overpass for a crossing road/highway, etc. Designated flyways F for UAV/drone traffic are shown schematically over the expressway and over the road/overpass in FIG. 18B. As indicated schematically, a detector D (e.g. sensor, transponder, imaging camera, etc.) is provided at the overpass so as to be positioned to detect UAV/drone traffic in each of the flyways.

Figure 19A:
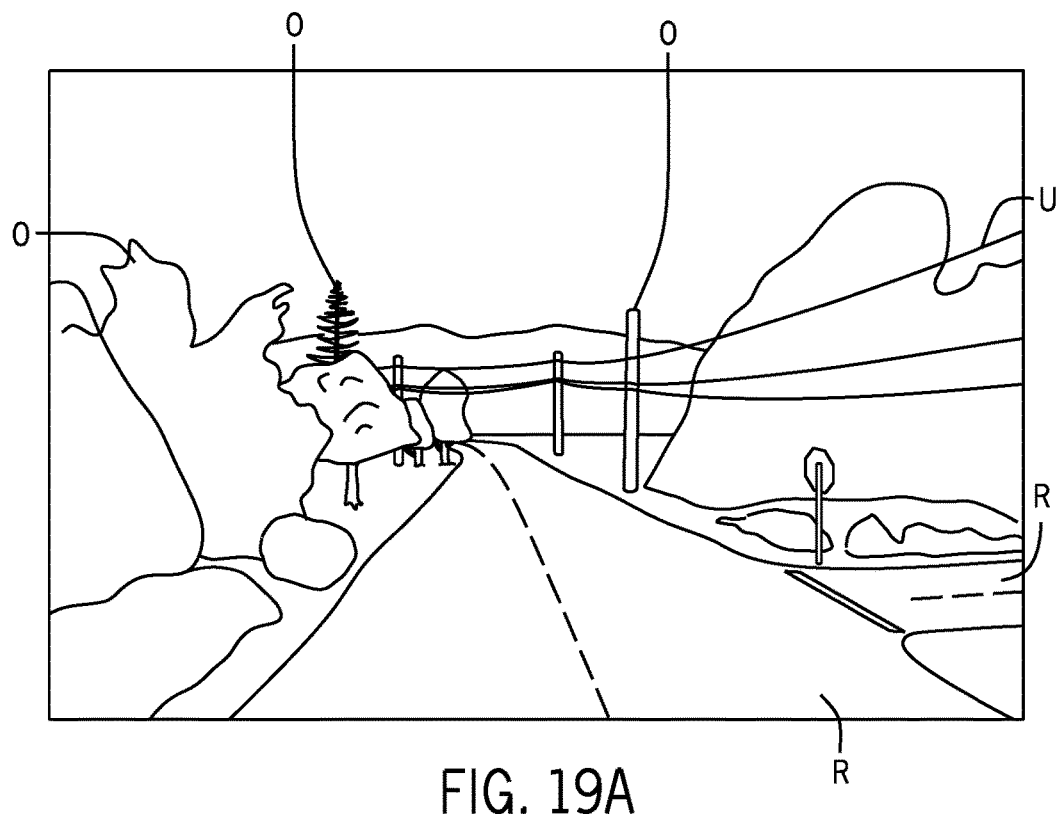
FIG. 19A is a schematic perspective view of an airspace according to an exemplary embodiment.
Figure 19B:
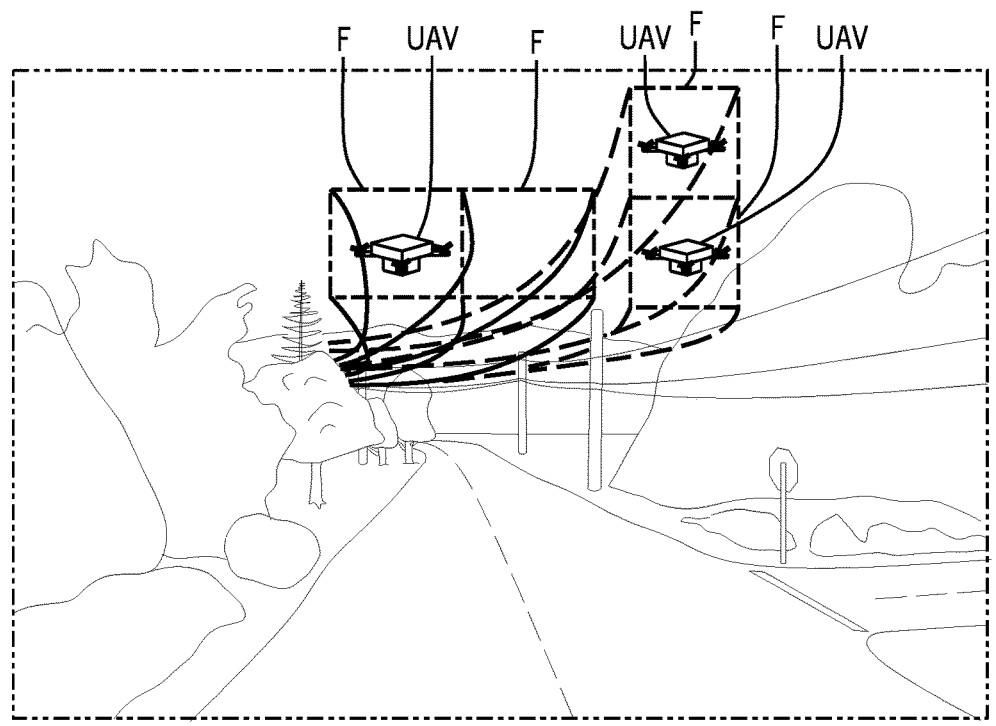
FIG. 19B is a schematic perspective view of the airspace of FIG. 19A showing flyway/route segments for aircraft according to an exemplary embodiment.

Referring to FIGS. 19A and 19B, an airspace in a rural/suburban zone or region is shown schematically and representationally with features such as a road, utility lines, access road, trees and other terrain, etc. Designated flyways F for UAV/drone traffic are shown schematically over the road and over the utility lines/wires or posts/poles in FIG. 19B. As indicated schematically, each of the flyways may be arranged with lanes for bidirectional UAV/drone traffic in a different manner or arrangement; the flyway over the road shows a bidirectional set of two lanes oriented in a horizontally parallel (side-by-side) arrangement; the flyway over the utility lines/wires shows a bidirectional set of two lanes oriented in a vertically parallel (stacked) arrangement.

Figure 20A:
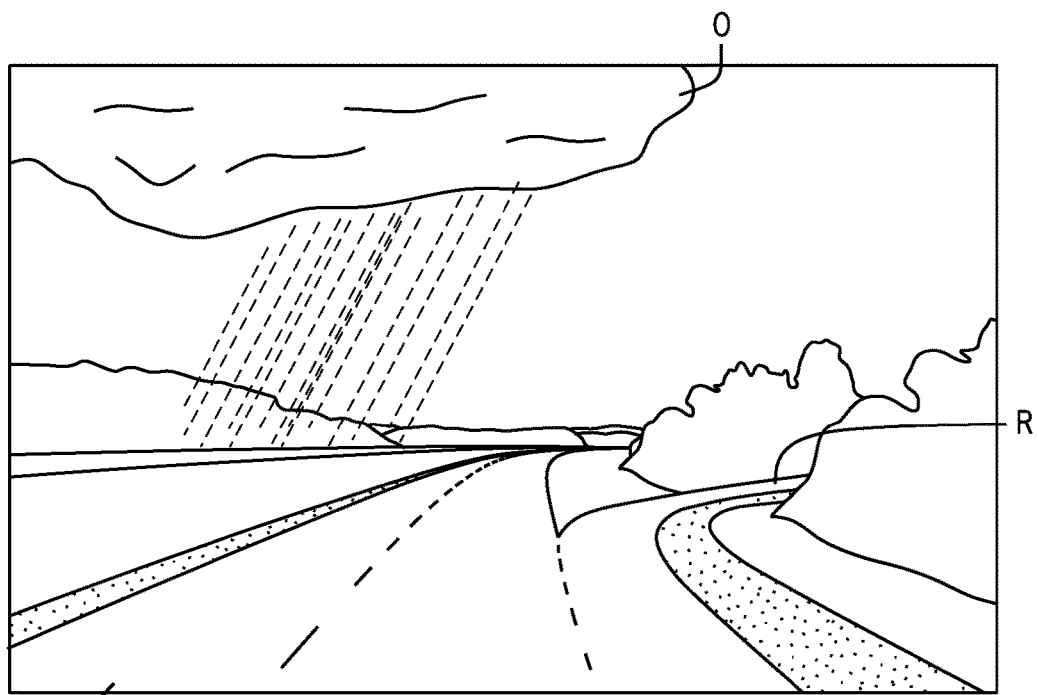
FIG. 20A is a schematic perspective view of an airspace according to an exemplary embodiment.
Figure 20B:
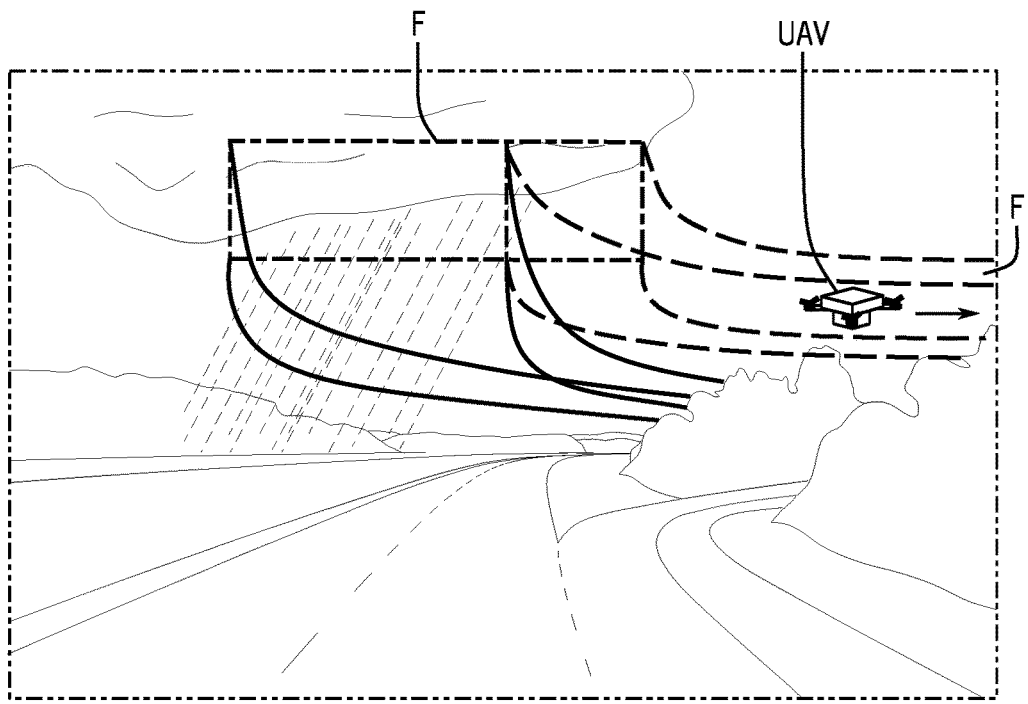
FIG. 20B is a schematic perspective view of the airspace of FIG. 20A showing flyway/route segments for aircraft according to an exemplary embodiment.
Figure 21A:
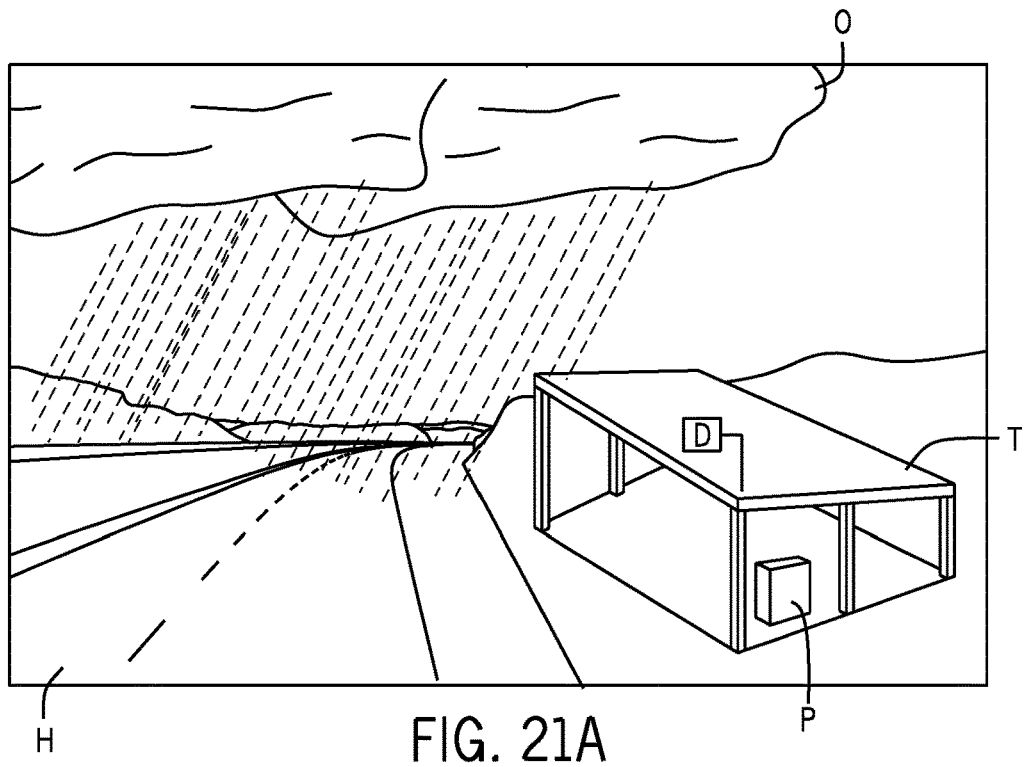
FIG. 21A is a schematic perspective view of an airspace according to an exemplary embodiment.
Figure 21B:
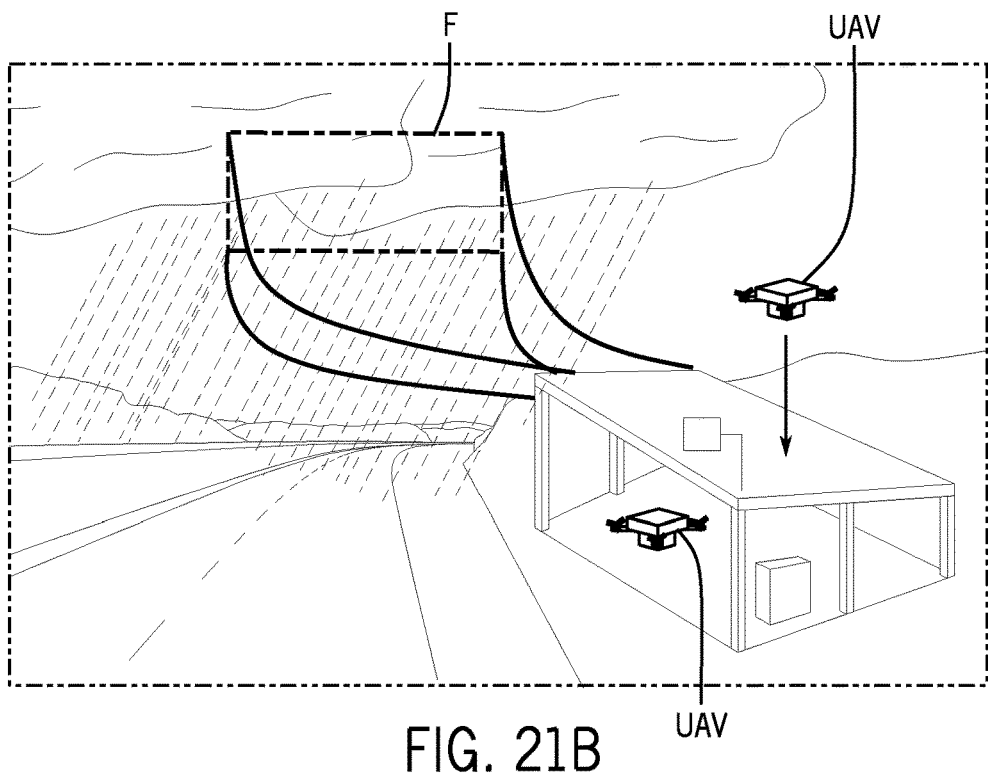
FIG. 21B is a schematic perspective view of the airspace of FIG. 21A showing flyway/route segments for aircraft according to an exemplary embodiment.

Referring to FIGS. 20A and 20B, an airspace in a rural/suburban zone or region is shown schematically and representationally with features such as a highway with exit ramp, hills/terrain, trees, and an approaching weather condition shown as a rainstorm (indicated as obstacle 0) among other features. Designated flyway F for UAV/drone traffic is provided over the highway with an exit flyway provided over the exit ramp in FIG. 20B. As indicated schematically in FIG. 20B, with the approach of a threatening weather condition (such as a rainstorm) UAV/drone traffic (shown schematically by a UAV/drone craft as indicated) is able to exit from the main flyway and threatening condition and proceed to an alternative route or shelter in an effort to avoid the condition (indicated as obstacle 0). Referring to FIGS. 21A and 21B, the rural/suburban zone or region is shown to provide a structure/building providing a station/shelter T for UAV/drone craft. As indicated schematically in FIG. 21B, one UAV/drone craft has entered the shelter as another UAV/drone craft is approaching the shelter to land to avoid the approaching weather condition (e.g. rainstorm). As indicated schematically, utilities and services may be provided to UAV/drone craft at the station/shelter, for example, at a refueling/recharging system P.

According to any preferred embodiment, the flyway and flyway segments/lanes for UAV/drone traffic will be designated in a place that facilitates safe and efficient travel of UAV/drone craft, including elevation/distance and separation from features, vehicles, obstacles, etc. at or near/adjacent to the flyway segment/lane.

Flyway/Route/Segments/Zones

Figure 22A:
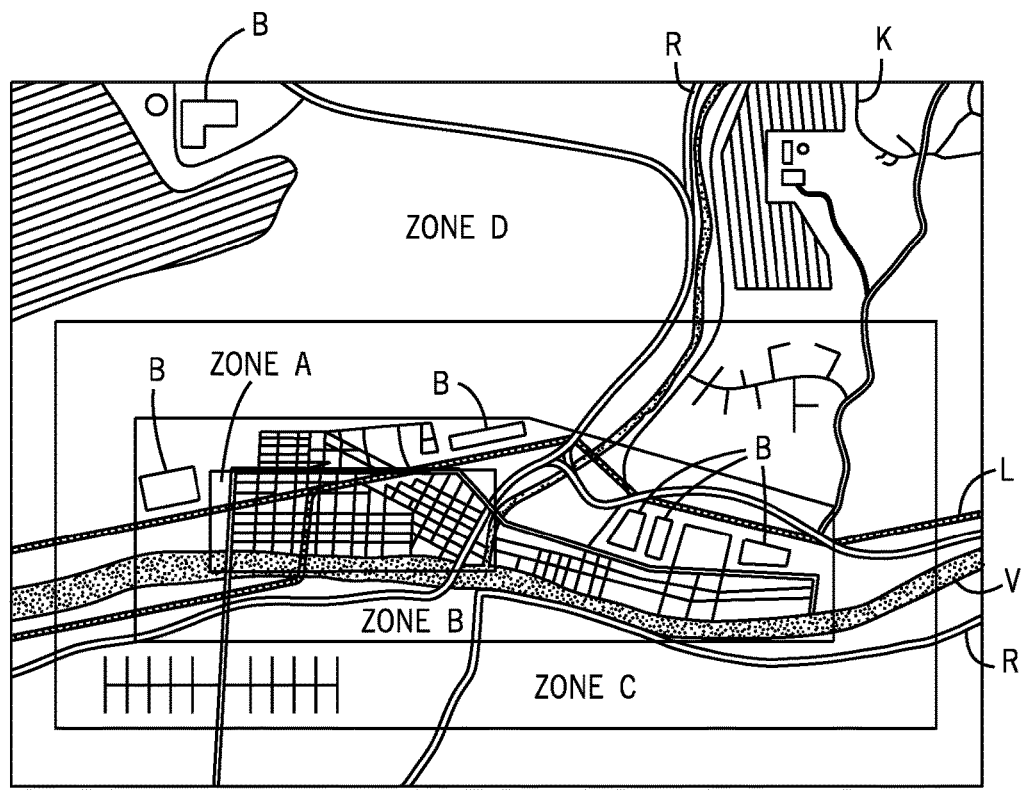
FIGS. 22A and 22B are schematic plan diagrams of a multi-zone airspace for flyways/routes for aircraft according to an exemplary embodiment.
Figure 22B:
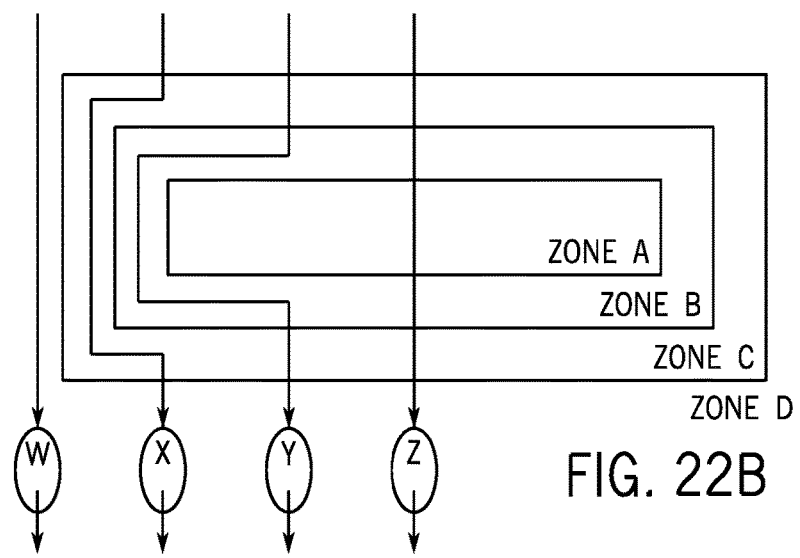

As indicated schematically in FIGS. 4B to 21A/B and shown schematically in FIG. 22A/B, according to an exemplary embodiment, flyways/routes in and to or through an airspace can be configured or arranged into zones/regions. According to an exemplary embodiment, flyway/flyway segments and zones/regions can be designated in the airspace and configured for use for routes/routing with reference to features in the region under the airspace; in the designation of flyways/routes, zones/regions may be differentiated based upon various considerations; such conditions may include features in the zone, conditions in the zone, traffic in the zone, events occurring in the zone, occupancy in the zone, etc. As indicated generally in FIGS. 4A to 21A/B and 22A/B, routes for a UAV/drone craft using flyways/flyway segments in an airspace may comprise multiple route segments using multiple flyway segments that may enter and exit multiple zones.

According to an exemplary embodiment, a mission for a UAV/drone craft may comprise route comprising a series of segments that may have different designations. For example, a UAV/drone craft on a mission to deliver a parcel to an industrial facility may take a route having a segment designated over a rail/transit line to the municipality and then having a segment over an expressway and then a segment over a highway and then a segment over municipal streets including to the street address/delivery location at the industrial facility. See e.g. FIG. 9B.

UAV/drone traffic within airspace may be managed and administrated by allocating zones to each UAV/drone craft in routing a UAV/drone traffic in and through flyways in the airspace. Allocating zones for passage in the routing of each UAV/drone craft may comprise routing different UAV/drone craft on different/separate flyway segments or routing different UAV/drone craft on different lanes with a flyway segment. For example, as indicated schematically in FIG. 22A/B, different flyway segments (e.g. with different routing over different features) may each comprise a separate zone with separate rights and restrictions (e.g. elevation, speed limit, access/entry/exit restrictions, etc.); as indicated schematically in FIGS. 23A through 49B (in various embodiments) different unidirectional lanes of a flyway segment may (with similar/identical routing over similar/identical features) each comprise a separate zone with separate rights and restrictions (e.g. speed limits, access restrictions, etc.).

Rates for travel by a UAV/drone craft may vary dependent upon the zones of travel and the time of the UAV/drone craft in each zone, as well as other considerations (e.g. as a product of multiple factors). See generally FIGS. 4A-8B, 9A to 21B and 22A/B.

Referring to FIGS. 22A/B, an airspace divided into zones is shown schematically and representationally; the airspace comprises zone A, zone B, zone C and zone D. As indicated schematically, zone A may be representative of a dense urban area (see e.g. FIGS. 6B, 7B, 9B and 16B); zone B may be representative of a less dense transitional or residential area (see e.g. FIGS. 7B and 10B); zone C may be representative of a less dense/bypass transitional area (see e.g. FIGS. 4B, 18B and 19B); zone D may be representative of an outlying or rural area (see e.g. FIGS. 8B, 13B, 14B and 15B). UAV/drone craft W travels only in zone D; UAV/drone craft X travels in zone C and zone D in a more direct passage; UAV/drone craft Y travels in zone B and zone C and zone D in a more direct passage; UAV/drone craft Z travels in zone A and zone B and zone C and zone D in a direct route.

As indicated in the administration of use/access of the airspace (e.g. rate-setting, licensing, billing, etc.), rates for passage of a UAV/drone craft through a zone may be differentiated based on a variety of factors such as zone density, zone traffic, etc., as well as based on the type of craft, time of day, etc. For example, the rate for passage through zone A may be greater than the rate for passage through zone B which may be greater than the rate for passage through zone C; zone D may have the lowest rate for passage. UAV/drone craft traveling through an airspace comprising multiple zones with differentiated rates for passage may make route determinations that include consideration of the rates for passage (as well as other need/requirements and preference relating to the mission or duty of the craft). For example, UAV/drone craft W may have determined to pass through the airspace in a less direct but lower cost route; UAV/drone craft Z may have determined to pass through the airspace in the most direct and higher cost route. UAV/drone craft X and UAV/drone craft Y may have balanced considerations of time/distance and cost in a route determination.

According to an exemplary embodiment, flyway lanes and zones within a flyway in an airspace may be designated not only with reference to features but also with reference to elevation or arrangement (e.g. horizontal or vertical or separation/spacing) or time.

According to an exemplary embodiment, flyways and zones may be designated at particular elevations with reference to features in the airspace. As indicated schematically, for example, in FIGS. 19B and 26-27, 29-30 and 33A/B-34A/B (among other FIGURES), a flyway may comprise multiple lanes for UAV/drone traffic; in a flyway, lanes for bidirectional travel of UAV/drone craft may be orientated in a horizontal arrangement (see FIGS. 19B and 27) or in a vertical arrangement (compare FIGS. 33A/B and 34A/B). Within a region of the airspace, different flyway segments may be considered to be different zones for purposes of administrating rates/priority, access/speed, etc. (e.g. at various times of day or days of the week, peak periods or non-peak periods). For example, in FIG. 19B two parallel flyway segments are shown; in a peak period, the flyway segment above street R may be treated as a priority zone (e.g. with higher speed/rate and restricted access) and the flyway segment above utility lines U may be treated as a standard/regular zone (e.g. at standard rate and access). According to an exemplary embodiment, flyway lanes and zones within a flyway in an airspace may be designated not only with reference to features but also with reference to elevation or arrangement (e.g. horizontal or vertical or separation/spacing) or time.

Registration/Licensing of Craft

According to an exemplary embodiment, the system is configured to transact with UAV/drone craft to register and license UAV/drone craft that will operate in the airspace.

According to an exemplary embodiment, registration of UAV/drone craft will include collection and/or verification of information from and about the UAV/drone craft and operator of the UAV/drone craft (e.g. creation or registration of a profile).

According to an exemplary embodiment, licensing of craft will include a transaction with the craft and operator of the craft to assign and approve rights and privileges of the craft in operation in the airspace. Rights and privileges of a craft may include items as indicated, such as priority, status, access, restrictions, etc. According to an exemplary embodiment, different individual craft in the airspace may be operating with different individual rights and privileges (e.g. that may have been acquired by different types of transactions and at different times and in different manners).

For example, in the airspace a first craft may register and be licensed to operate at a high-level priority status, a second craft may register and be licensed to operate at a mid-level priority status; a third craft may register and be licensed to operate at a low-level priority status. The craft operating at high-level status may be given priority over craft operating at low-level status or mid-level status, including the right to operate in preferred flyways (e.g. to use the fastest or most direct route), the right to travel at a higher speed, the right to enter congested flyways (e.g. to displace or ground lower-priority craft in the flyway), etc.; all craft in the airspace will be obligated to comply with protocol policy and rules/regulations for operation in the airspace (subject to fines, sanctions, restriction, exclusion, etc. for non-compliance).

According to an exemplary embodiment, registration of the craft is a transaction with the system; upon registration the craft is provided with a profile (or updated profile if the craft had an existing profile) to allow communications and billing/payment for operation in the airspace. According to an exemplary embodiment, licensing of a craft (e.g. granting by system of a license) is a transaction that can be conducted with the system before a mission (e.g. at time of registration of a mission).

According to an exemplary embodiment, UAV/drone craft may be configured to participate in a market for use/access of the airspace and/or to particular flyway segments and zones/regions in the airspace at a particular level of access/priority. UAV/drone craft may operate at standard rates for standard access/priority and routing. According to an exemplary embodiment, transit by a UAV/drone craft in a particular zone/region/flyway of the airspace at a particular time of day/day of week or under certain conditions (e.g. during a special event) may require enhanced (non-standard) access; a transaction and/or acquisition by the UAV/drone craft of enhanced or upgraded rights/privilege (e.g. at a higher rate/fee may be required to upgrade/enhance access); after the transaction, the UAV/drone craft will have a priority for transit in the zone/region. Other UAV/drone craft that may be potential obstructions may be directed by the system to leave the zone/region and re-route (or land) to yield priority to a UAV/drone craft that has obtained higher priority on a route. A UAV/drone craft identified as a potential obstruction may instead transact (e.g. bid, offer, purchase) to acquire enhanced rights/privileges in the market to remain in transit in the zone/region.

As indicated, according to an exemplary embodiment, the system and UAV/drone craft may be configured to conduct "dynamic" transactions (e.g. transactions made with the system during operation in the airspace); a dynamic market may exist (e.g. including third-party vendors) where dynamic transactions can be conducted for UAV/drone craft. Dynamic transactions may comprise licenses and/or re-routing, etc.

Rates/Fees for Registration/Licensing

According to an exemplary embodiment, UAV/drone craft operating in the airspace may be assessed a base/standard registration fee and then an additional license fee (at a rate based on terms such as status e.g. rights/priority and privileges). According to an exemplary embodiment, a UAV/drone craft may adjust the status in the airspace by adjusting the license/terms. According to an exemplary embodiment, the rates for license fees for a UAV/drone craft may be set according to priority status, rights and privileges (e.g. speed limit, separation/spacing, occupancy, size, shape, restrictions, flyway access) and subject to conditions in the airspace (e.g. weather, traffic, etc.) the attributes of the UAV/drone craft, time of day/day of week, other factors, etc. For example, if a UAV/drone craft requires or desires to have higher priority status in the airspace, (e.g. for a particular mission) the license may be adjusted so that the UAV/drone craft obtains higher priority status. According to an exemplary embodiment, rates for license fees in the airspace may be higher for higher priority status and/or greater rights and privileges.

According to an exemplary embodiment, rates/fees for use/access of the airspace may be based (in part) on the configuration of flyways and zones/regions in the airspace. Zones/regions in the airspace may be designated with reference to an area (e.g. two dimensional), with reference to a volume/space (e.g. three dimensional), and with reference to time (e.g. four dimensional). For example, according to an exemplary embodiment, a zone/region may change in shape as a function of time; as indicated schematically in FIGS. 22A/B, four zones may be designated in operation for a high-traffic/peak time of a weekday (e.g. zones A, B, C, D each function at separate rates/access costs); two zones may be designated in operation in a low-traffic/off-peak time of a weekday or on a weekend (e.g. zones AB function as a single zone at one rate and zones C/D function as a single zone at one rate).

According to an exemplary embodiment, rates/fees for use/access of the airspace may be based (in part) on the occupancy of the flyway and zones/regions in the airspace (e.g. rates increase in periods of high occupancy/traffic). According to other exemplary embodiments, a UAV/drone craft can (for a sufficiently high rate) acquire exclusive rights to occupy a designated zone or flyway segment during a specified time period. In some embodiments, the exclusive rights may be limited to specified activities, e.g., while other UAV/drone crafts may be allowed to occupy the zone or flyway segment, only a given UAV/drone craft is permitted to take photographs within it, or the given UAV/drone craft is the only one permitted to deliver/pickup parcels, etc.

According to an exemplary embodiment, rates/fees for use/access of the airspace may be based (in part) on the type of UAV/drone craft and/or the manner of control/operation and/or the manner of data communications and/or other factors. For example, UAV/drone craft that can or wish to operate at a high speed may be charged a different rate/fee (e.g. higher rate for use of a higher speed flyway segment or lane); UAV/drone craft that are under real-time control may be charged a different rate to operate in the airspace (e.g. a discounted rate may be available for UAV/drone craft that are able to respond to directives and alerts from the system during operation in the airspace, for example, to relinquish a lane place/occupancy or move to another lane or re-route, etc.) (see e.g. FIGS. 33A/B-34A/B and 48A/B-49A/B); UAV/drone craft that are in real-time data communication and/or that will provide post-mission data may be charged a different rate (e.g. a discounted rate may be available for craft that provide status/condition/location data to the system at regular/specified intervals during transit in the airspace or that carry a transponder/tag or other detection device or system that facilities monitoring by detectors in the system along the flyway or that transmit data such as GPS tracks/coordinates during transit in the airspace and/or at the conclusion of the mission).

According to an exemplary embodiment, the total rate charged to the UAV/drone craft is a product of the rate for each flyway segment/zone used by the UAV/drone craft and the time the UAV/drone craft was in the flyway segment/zone. Referring to FIG. 22 according to an exemplary embodiment, UAV/drone craft W would be charged a total rate comprising the standard (base) rate for its time in zone D plus the incrementally higher rate for its time in zone C plus the next incrementally higher rate for its time in zone B plus the premium rate for its time in zone A; UAV/drone craft Z would be charged a total rate comprising the standard (base) rate for its total time (all) in zone D. (As indicated schematically in FIG. 22, UAV/drone craft Z had a longer (e.g. slower) route taking more time than UAV/drone craft W on a shorter (e.g. faster) route through the airspace; operators are able to use rate/time projections to estimate/budget for total cost and/or total time when planning a mission in the airspace.) According to an exemplary embodiment, UAV/drone craft may plan a mission in the airspace in consideration of cost/budget factors and/or time factors among other factors.

Figure 33A:
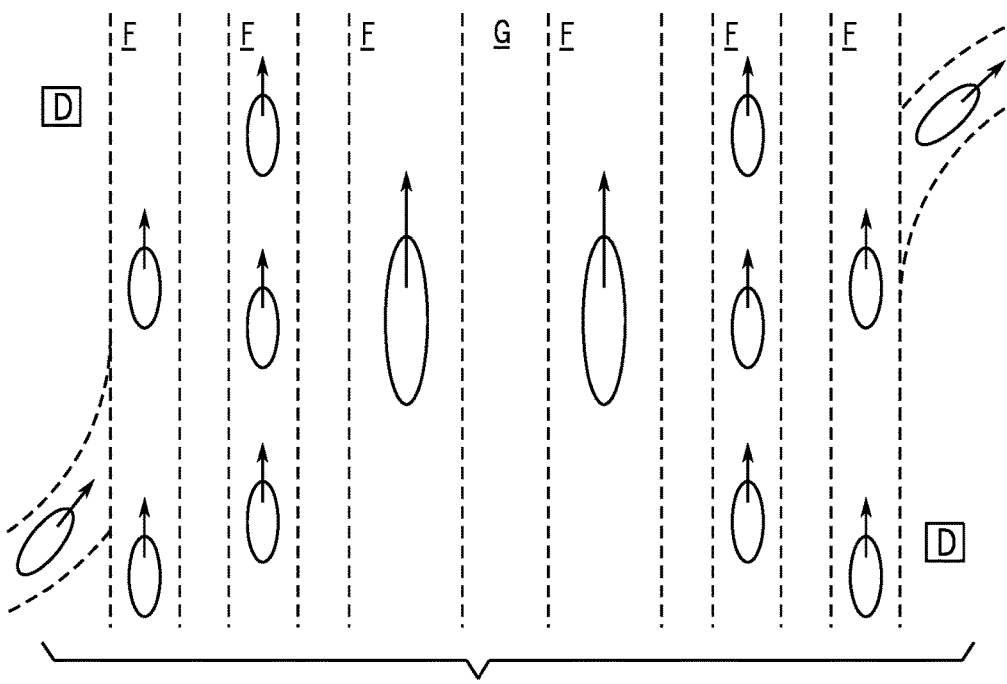
FIG. 33A is a schematic plan diagram of a flyway segment set in an airspace according to an exemplary embodiment.
Figure 33B:
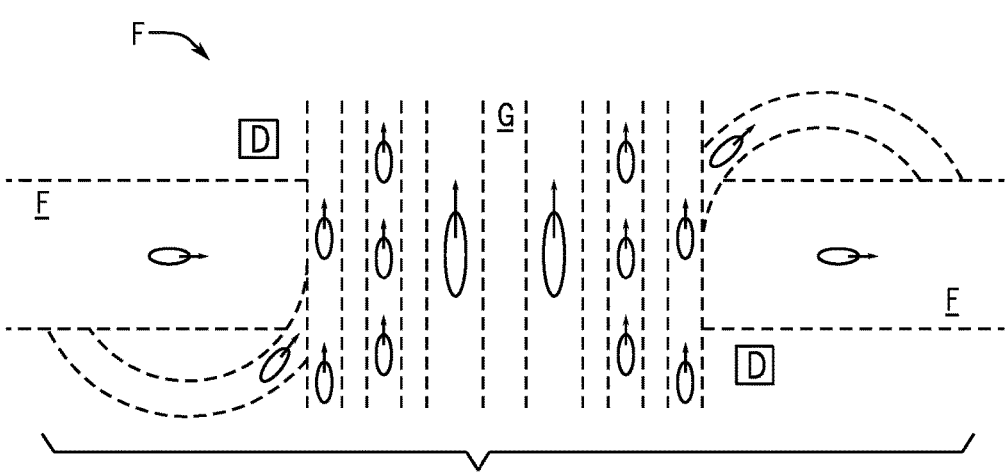
FIG. 33B is a schematic plan diagram of a flyway segment set in an airspace according to an exemplary embodiment.
Figure 34A:
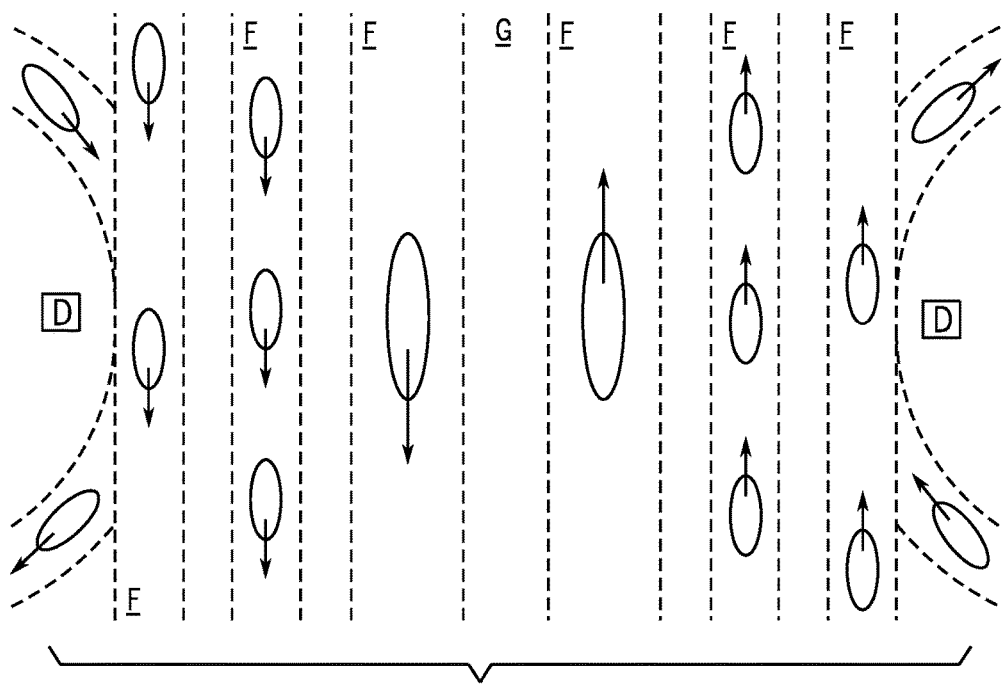
FIG. 34A is a schematic plan diagram of a flyway segment set in an airspace according to an exemplary embodiment.
Figure 34B:
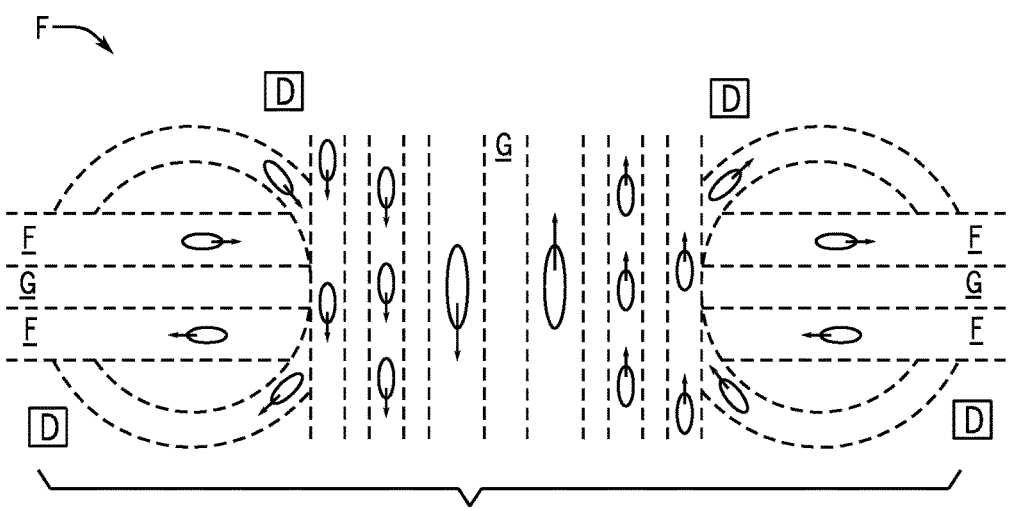
FIG. 34B is a schematic plan diagram of a flyway segment set in an airspace according to an exemplary embodiment.
Figure 48A:
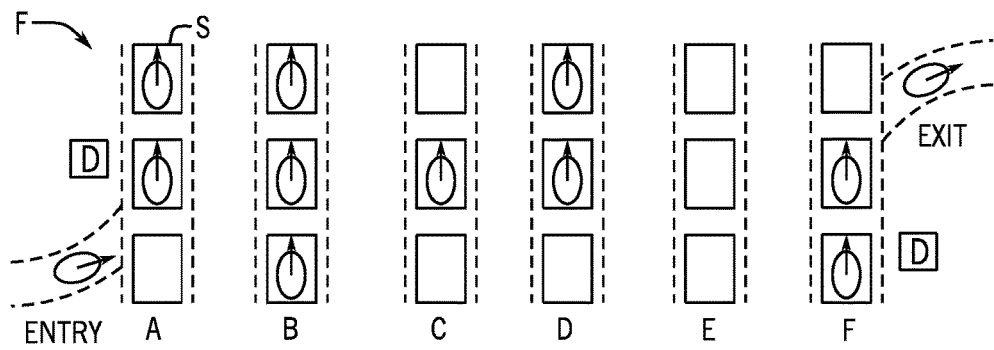
FIG. 48A is a schematic plan diagram of a flyway segment set in an airspace according to an exemplary embodiment.
Figure 48B:
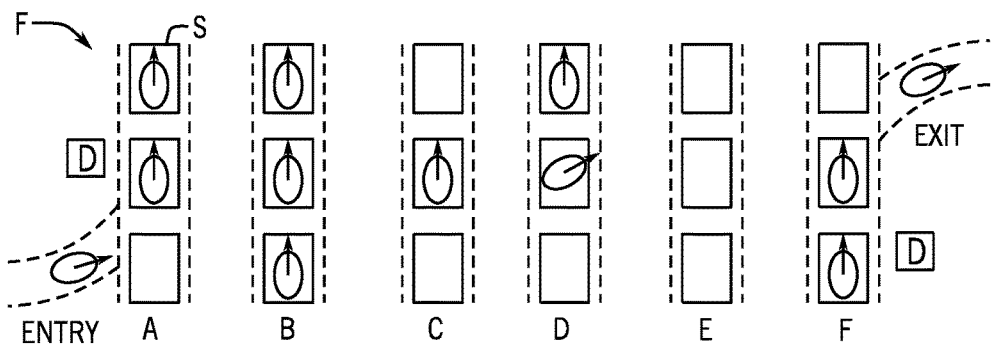
FIG. 48B is a schematic plan diagram of a flyway segment set in an airspace according to an exemplary embodiment.
Figure 49A:
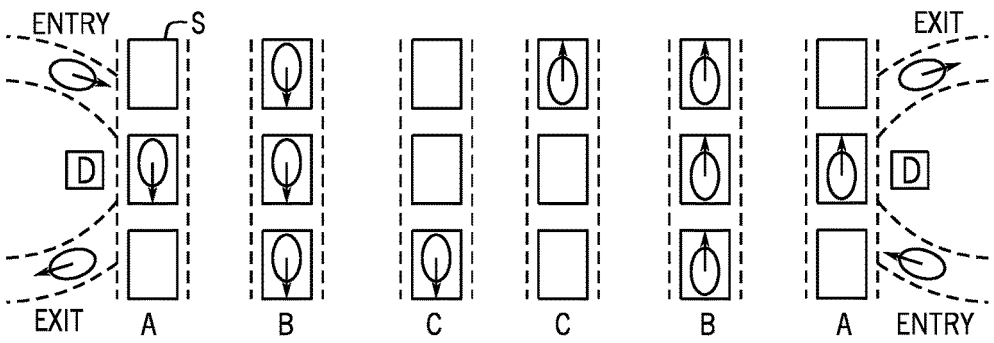
FIG. 49A is a schematic plan diagram of a flyway segment set in an airspace according to an exemplary embodiment.
Figure 49B:
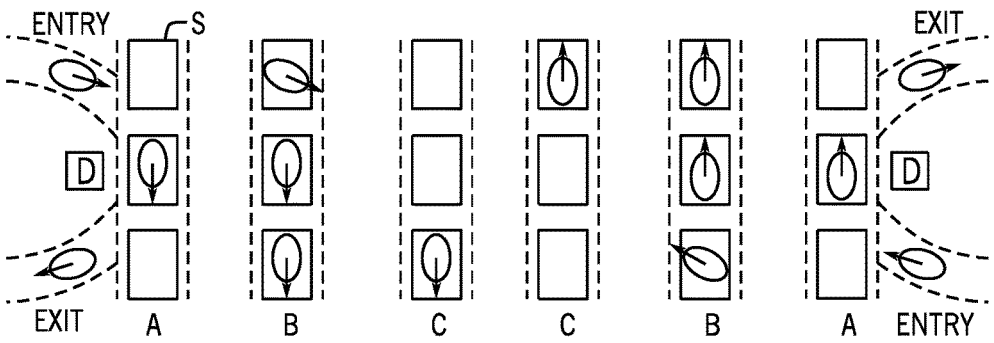
FIG. 49B is a schematic plan diagram of a flyway segment set in an airspace according to an exemplary embodiment.

According to an exemplary embodiment, the rate for a flyway segment/zone may be a product of the number of UAV/drone craft in the flyway segment/zone (e.g. occupancy); referring to FIGS. 33A/B-34A/B and 48A/B-49A/B, the system may charge a higher rate for transit in a lower-occupancy lane (e.g. lane E in FIGS. 48A/B) than for transit in a higher-occupancy lane (e.g. lane B in FIGS. 48A/B). (According to an exemplary embodiment, rates may change dynamically under market forces, e.g. as demand, occupancy/traffic changes during the time of use/access by a UAV/drone craft to zones/flyway segments in the airspace.)

According to an exemplary embodiment, the size/shape of a zone at a rate may vary during a time period (e.g. time of day, day of week, etc.); referring to FIGS. 33A/B-34A/B and 48A/B-49A/B, the flyway has multiple flyway segments (e.g. lanes) and at a peak time period (e.g. 8 AM to 5 PM on a weekday or etc.) one set of lanes may be reserved for premium rates (and UAV/drone craft licensed for priority at the premium rate) and one set of lanes open for standard UAV/drone craft traffic; in the off-peak time period all sets of lanes may be open to UAV/drone craft at a standard rate (e.g. standard license/priority rights). According to an exemplary embodiment, a UAV/drone craft may obtain (e.g. purchase by license, bid/auction, etc.) a "good to go" priority status in the airspace entitling it to operate with a priority over any other UAV/drone craft (at lower priority status/license rights) on any flyway segment in any zone at any time; such UAV/drone craft would have flyway segments/zones on its route cleared of any obstructing UAV/drone craft (if any) by the system.

According to an exemplary embodiment, in a dynamic transaction, a craft could obtain such priority status (e.g. by purchase, bid/auction, etc.) to execute an urgent mission in the airspace (e.g. special/expedited delivery), a UAV/drone craft operator could resell such priority status in a secondary market. According to an exemplary embodiment, the system could conduct periodic (e.g. daily, weekly, etc.) sales or auctions for such priority status and/or other license rights as to allow UAV/drone craft to reserve status or bid for enhanced/necessary status in real-time and/or near the time of a mission to facilitate by market forces efficient use/operation of the airspace. According to an exemplary embodiment, license rights may be obtained by UAV/drone craft for short or longer term periods of time (e.g. single mission, period of a minute or minutes, period of an hour or hours, part of a day, full day, multi-day, week, month, year, time of year, season, conditions, events, etc.); UAV/drone craft in regular or routine/scheduled operation in the airspace may obtain rights/license fit to the regular/routine duty or operation of the UAV/drone craft. According to other exemplary embodiments, a UAV/drone craft can transact for an option for future rights for operation within an airspace; such an option can tentatively reserve rights for a future date; such optional rights can then be upgraded to a firm reservation at a designated future date; can allow the option holder to match any future offer for the rights from another UAV/drone craft, etc.

According to an exemplary embodiment, the system may provide communications as to license/rights and route/zone/flyway segment availability for UAV/drone craft to use in flight/mission planning; using data analytics the system may provide or facilitate predictive methods of estimating availability of priority rights/license status and/or to set rates for use/access of zones/flyway segments in the airspace based on estimate of occupancy/traffic or demand and supply of priority rights/license status by UAV/drone craft.

According to an exemplary embodiment, the rate charged to a UAV/drone craft will be based on the use of the airspace by the UAV/drone craft in the conditions (e.g. environmental conditions, traffic, etc.) in view of the status of the UAV/drone craft (e.g. as the forms of the transaction and/or license of the UAV/drone craft). Use of the airspace will comprise the time the UAV/drone craft is in the airspace as well as the zones and/or flyway segments in which the UAV/drone craft has traveled in the airspace; as indicated, determination of use may be time-weighted as a product of the time in each zone/flyway segment and a rate applied for each zone/flyway segment. Data sources (e.g. data from the monitoring system, from the UAV/drone craft, from external sources, etc.) may provide data as to the location and/or path of travel of a UAV/drone craft in the airspace with varying degrees of accuracy. According to an exemplary embodiment, rates charged to aircraft may be a product of function and/or purpose or equipment of or on the aircraft during the mission (see, e.g. equipment D on UAV/drone craft in FIG. 3F) (e.g. data relay/transmission, photo/video/imaging, surveillance, radio frequency (rF) signaling, etc.).

According to an exemplary embodiment, the monitoring system will employ technology as indicated to detect the position of aircraft in the airspace; the monitoring system may employ multiple and/or redundant systems/devices and data sources intended to provide enhanced accuracy and efficiency in monitoring of aircraft in the airspace (e.g. transponder data verified by GPS tracking data, photographic data verified by tracking code/checkpoint detectors, video monitoring verified by wireless data transmission, radar, lidar, etc.). According to an alternative embodiment, the monitoring system may employ numerical methods (e.g. probabilistic/estimates) in an effort to improve accuracy and efficiency in monitoring of aircraft; for example, the system may use tracking data and numerical methods to make determinations of zone or lane positioning of craft using proximity to perimeter (or centerline) data correlated to zone or lane positions (e.g. calibrated positions) in the airspace (e.g. basing the determination of location and rate for aircraft on percent variation from calibrated perimeter/position data for zones or lanes in the airspace.

According to an exemplary embodiment, the system/method may employ any of a wide variety of methods to determine the rate to be charged an aircraft for use of the airspace (e.g. regions, zones, flyway segments, priority, status, etc.) including methods based on data from data sources and computation methods (e.g. monitoring systems, data sources internal/external to the system/airspace, etc.). For example, the system may use a deterministic method based on determination of the route/location of the aircraft (e.g. zones and flyway segments used) from the monitoring system notwithstanding the margin for error (e.g. possibility/probability that an aircraft was not in the zone/flyway segment indicated by the monitoring system for some portion of the route); the system may use a probabilistic method based on a probability-weighted computation of the route/location of the aircraft (e.g. zones and flyway segments used) in view of data from the monitoring system and assessment of the probabilities of error based on the detected location and the location/perimeter of zones and flyway segments (e.g. aircraft detected at or near a perimeter of a zone may be considered to be in one zone or another zone based on consideration of probabilities and potential error while aircraft detected in or near the center of a zone may with greater certainty be considered to be in the zone).

According to an exemplary embodiment, rates charged for an occupancy space (see generally FIGS. 35 to 49B) may be based on the size of the occupancy space; for example, a relatively large occupancy space (e.g. with lateral spacing/separation of 0.5 to 1 kilometer or more) will be provided at a larger relative cost while a relatively small occupancy space (e.g. with less lateral spacing/separation of several meters or tens of meters up to hundreds of meters) will be provided at a smaller relative cost. According to an exemplary embodiment, the size/speed and mission/route as well as conditions (e.g. traffic, weather, etc.) for the UAV/drone craft and other considerations may be used to determine the proper requested size of the occupancy space.

Monitoring System—Conditions

According to an exemplary embodiment, the system comprises a monitoring system that comprises data sources, detectors, etc. to obtain data/information relating to conditions in the airspace. See FIGS. 50-52. As indicated, conditions may comprise environmental conditions (e.g. weather, wind, etc.), events/incidents affecting the airspace, UAV/drone traffic and traffic patterns, etc.; according to any exemplary embodiment, the system may be configured to monitor any of a wide variety conditions that may exist in the airspace.

According to an exemplary embodiment, the system will use data/information from the monitoring system and from network-connected/other data sources (e.g. internal to the system and/or external to the system) in the management of the airspace. According to an exemplary embodiment, the monitoring system may use any of a wide variety and/or combination of systems/devices and methods such as detectors, sensors, antenna, sound/audio monitors/microphones, transponders/transceivers, imaging systems, motion detectors, video cameras/recorders, photo cameras, wireless data links, global positioning system (GPS) data, satellite/cellular communication, radar, lidar, data/network communication, instrumentation, recorders, etc.; such systems/device may be installed at or along flyway segments (e.g. including on new/existing structures, buildings, towers, posts/poles, etc.); data sources may comprise UAV/drone craft or systems.

According to an exemplary embodiment, the system will use data from data sources for corroboration, for example, corroborating observed and monitored weather conditions (e.g. from instrumentation) with network-obtained weather reports (e.g. radar, etc.) for enhanced accuracy in evaluation/application; for example, observed and monitored tracking data of a UAV/drone craft (e.g. from digital photographs of an identifier) may be corroborated by other sensor/detector data (e.g. from transponder transmissions from the identifier) and/or with post-mission data (e.g. network-transmitted GPS data from the craft operator).

According to an exemplary embodiment, the monitoring system will provide data/information as to conditions in the airspace in or near real-time to be used for continuous and reliable management of the airspace by the management system.

Tracking/Monitoring UAV/Drone Craft

According to an exemplary embodiment, the system will be configured to track and monitor UAV/drone craft in the airspace. As indicated, the monitoring system may be configured to track/monitor UAV/drone craft according to any of a wide variety of systems and methods (including various known/conventional methods/systems). See FIGS. 50-52. UAV/drone craft can be tracked and monitored in the airspace by one or more methods including sensors, transponders/transmitters, detectors, instrumentation, recorders, imaging, photography, videography, GPS, cellular communications, radar, lidar, motion detectors, sound/audio capture, wireless data links, data/network communication, etc. See e.g. FIGS. 50-52.

According to an exemplary embodiment, the detector for the system may comprise any of a wide variety of detector/sensor technologies such as RFID, radar, lidar, imaging, photo, video, motion detection, etc. and/or may comprise a transponder, transmitter, transceiver, antenna, data link, etc. As indicated, according to an exemplary embodiment shown schematically in FIGS. 13A/B, 16A/B, 17A/B, 18A/B, 23A/B, 24A/B, 33A/B, 34A/B, 35-36, 39-41, 48A/B and 49A, a set or array of detectors D may be installed/configured in the airspace to monitor UAV/drone craft in the airspace; as indicated schematically, the monitoring system may employ a combination of systems/devices/detectors of a variety of types in an airspace.

According to an exemplary embodiment, the system may employ a data reporting and collection/analysis system. For example, UAV/drone craft may upon completion of a mission, upload data from the mission to the system for analysis; such data may be used to verify or corroborate other data that the system has collected by other methods (e.g. flight plans and assigned routes in the airspace may also be used by the system to verify or corroborate other system data for a craft). According to an exemplary embodiment, UAV/drone craft that are equipped to provide (and/or the regularly do provide) accurate data to the system may be given a discounted rate for registration/licensing. According to an exemplary embodiment, UAV/drone craft and operators that are not authorized to operate or that operate in non-compliance with applicable protocol/policies and rules/regulations for the airspace may be identified by the monitoring system and subject to proper enforcement action.

According to an exemplary embodiment, the system may employ aircraft such as a UAV/drone craft or a balloon (tethered or mobile) that are equipped to travel and track/monitor other UAV/drone craft in the airspace. See e.g. FIGS. 40-41 (monitor UAV/drone craft M patrolling a flyway using monitoring systems such as video recording, etc.).

Figure 41:
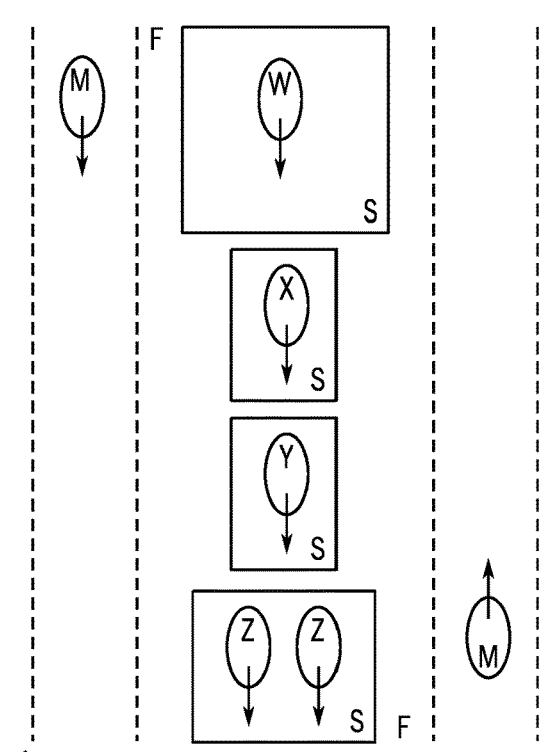
FIG. 41 is a schematic plan diagram of a flyway segment set in an airspace according to an exemplary embodiment.
Figure 40:
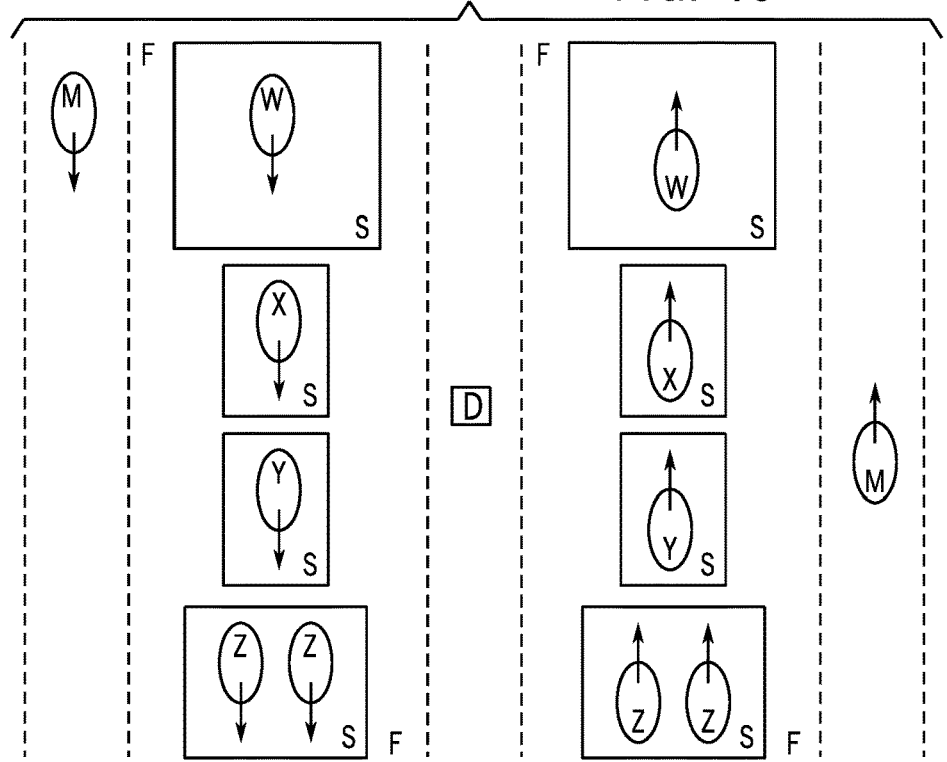
FIG. 40 is a schematic plan diagram of a flyway segment set in an airspace according to an exemplary embodiment.
Figure 42:
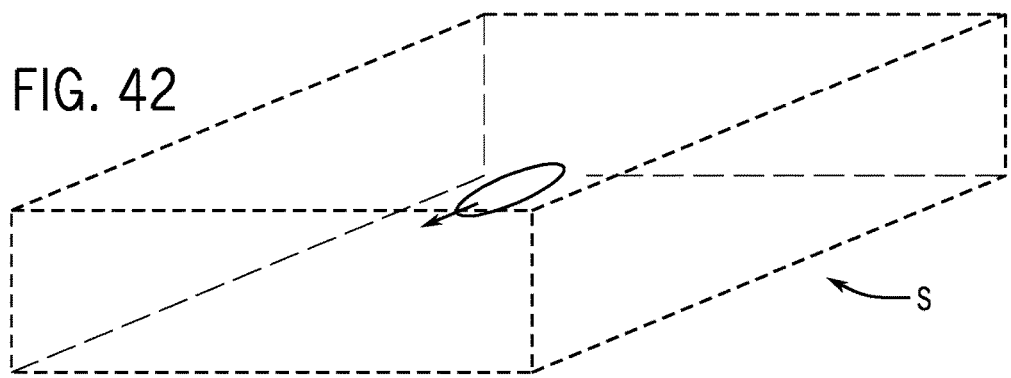
FIG. 42 is a schematic perspective view of a flyway segment set in an airspace according to an exemplary embodiment.
Figure 43:
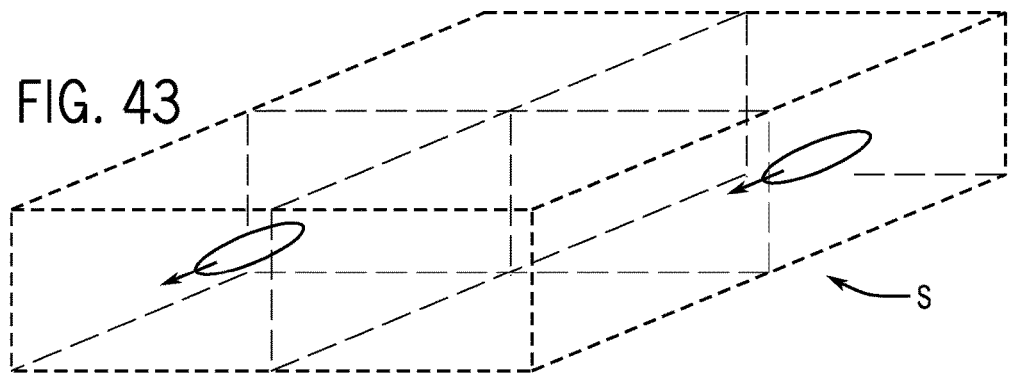
FIG. 43 is a schematic perspective view of a flyway segment set in an airspace according to an exemplary embodiment.

As indicated schematically in FIGS. 40-41, according to an exemplary embodiment, a UAV/drone craft M employed for monitoring/tracking (as part of the monitoring system); UAV/drone craft M may comprise detectors (e.g. such as detectors D at stationary positions along the flyway) and other systems to facilitate data communications and interchange with the system. According to an alternative embodiment, UAV/drone craft M may operate under the control of an operator affiliated with the system (e.g. able to be dispatched in real time to monitor particular situations or places in the airspace); UAV/drone craft M may operate in a prescribed/programmed route (e.g. in a specified pattern or "loop"). As indicated, UAV/drone craft M may operate in coordination with detectors D at stationary positions along the flyway and may be used to confirm or supplement data from such detectors (e.g. by sensors, or photo/video camera imaging) and/or may provide a data/communications link if needed to UAV/drone craft operating in the airspace (e.g. functioning as a communication relay, wireless access point, etc.).

According to an exemplary embodiment, data and information from monitoring by detectors and/or UAV/drone craft employed for monitoring can be used by the system to manage and administrate the airspace/flyways, including to evaluate conditions/traffic and to route/re-route UAV/drone craft.

According to an exemplary embodiment, the system is able to obtain, corroborate, evaluate and use/apply reliable data/information to track/monitor the use/access of the airspace in comparison to transacted terms/license and assigned routes/rights and invoice/bill and receive payment from UAV/drone craft based on actual/accurate data/information.

UAV/Drone Traffic Direction/Control

According to an exemplary embodiment, as indicated schematically in FIGS. 4A through 21B, UAV/drone traffic in an airspace can be routed through and along designated flyways and flyway segments in zones/regions in an airspace. According to an exemplary embodiment, as indicated schematically in FIG. 22B, UAV/drone traffic on flyways in an airspace can be routed through and across designated zones in the airspace. As also indicated, flyway segments/zones may comprise designated lanes of travel for UAV/drone craft. See, e.g. FIG. 19B.

According to an exemplary embodiment, UAV/drone traffic can be directed in flyways and flyway segments by providing lanes for UAV/drone craft (see e.g. FIGS. 23A/B, 24A to 24C, 27-32, 41A/B, 42A/B and 43) and/or by providing designated occupancy spaces (or blocks) for UAV/drone craft in flyway segments/lanes (see e.g. FIGS. 33-40, 44-47, 48A/B and 49A/B) (e.g. permitting use of a flyway segment/lane by multiple UAV/drone crafts with defined spacings). Detectors D (of various types) for the monitoring system may be positioned at various points in the airspace. See e.g. FIGS. 13A/B, 16A/B, 17A/B, 18A/B, 21A/B, 23A/B, 24A/B, 33A/B, 34A/B, 35, 36, 39, 41, 48A/B and 49A/B (in airspace) and FIG. 3F (on a craft).

According to an exemplary embodiment, in implementation of the system, each UAV/drone craft will be able to travel through an airspace with minimal delay or disruption according to the rights and restrictions of the UAV/drone craft (e.g. relative to other UAV/drone craft). According to an exemplary embodiment, in implementation the system will use planning and routing to direct UAV/drone traffic in a safe and efficient manner through and along flyway segments. According to an exemplary embodiment, the system comprises assignment of routes for UAV/drone craft in consideration not only of the mission but also of capability/type of the UAV/drone craft as well as monitoring of conditions in the airspace as well as UAV/drone traffic. According to an exemplary embodiment, the designation and establishment of flyways and flyway segments with lanes facilitates the administration and management of UAV/drone traffic in the airspace by providing corresponding traffic conventions and guidance for operators of UAV/drone craft.

As indicated, the management system in the administration of the airspace may establish maximum and minimum speed/regulated speed limits for UAV/drone craft in flyway segments/lanes to ensure efficient traffic flow through the airspace; rates for use of a flyway segment/lane may be established with reference to speed limits and other factors such as occupancy as well as the rights/priority and route assigned to the UAV/drone craft. According to an exemplary embodiment, UAV/drone craft would be routed by the management system to travel in flyway segments/lanes according to capability such as speed of travel of the UAV/drone craft.

Figure 23A:
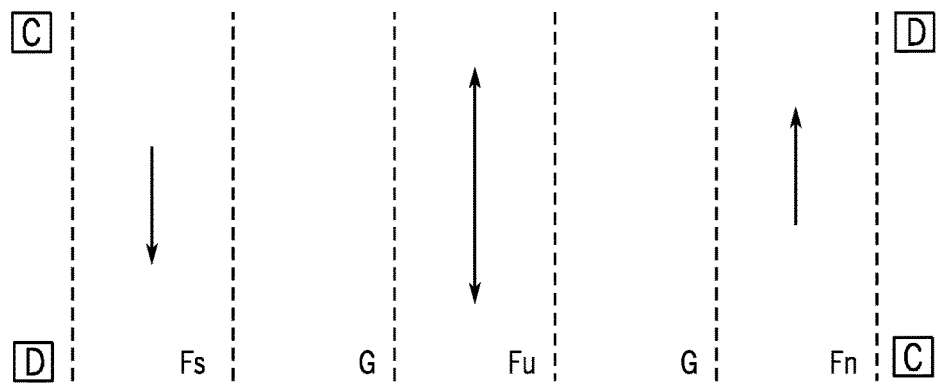
FIG. 23A is a schematic plan diagram of a flyway segment set in an airspace according to an exemplary embodiment.
Figure 23B:
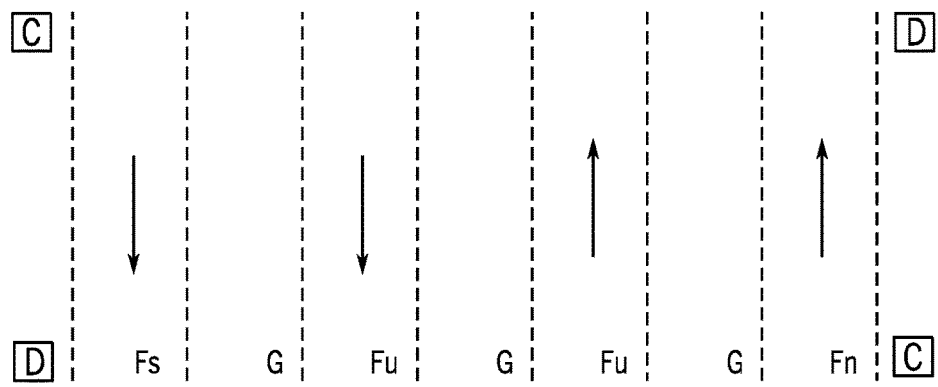
FIG. 23B is a schematic plan diagram of a flyway segment set in an airspace according to an exemplary embodiment.

Referring to FIGS. 23A and 23B, flyway segments with multiple lanes for UAV/drone craft are shown schematically. The flyway segment of FIG. 23A provides three lanes each separated by a gap G monitored by a set of detectors D; separate outward lanes FS and FN are for transit each in a single direction; a central undesignated lane FU is available to operate with transit in either direction as may be decided by the system in view of conditions (including UAV/drone traffic congestion, event requirements, time of day, special reservation, etc.). For example, if lane FN is congested, travel in the undesignated lane FU may be directed to flow in the same direction as travel in lane FN for a time period; UAV/drone craft in lane FN may be directed into lane FU for the time period to relieve congestion in lane FN; travel in lane FS is unaffected. As indicated, if lane FS is congested the same method can be followed for a time period to use lane FU to relieve congestion in lane FS. See also FIGS. 28 and 29. FIG. 23B shows a flyway segment operating on the similar principle but comprising additional lanes (e.g. to accommodate different UAV/drone crafts; for example of different type, control, size, capability, speed, etc.). High speed/capability UAV/drone craft may travel in one lane or set of lanes; low speed/capability UAV/drone craft may travel in a separate lane or set of lanes.

Figure 24A:
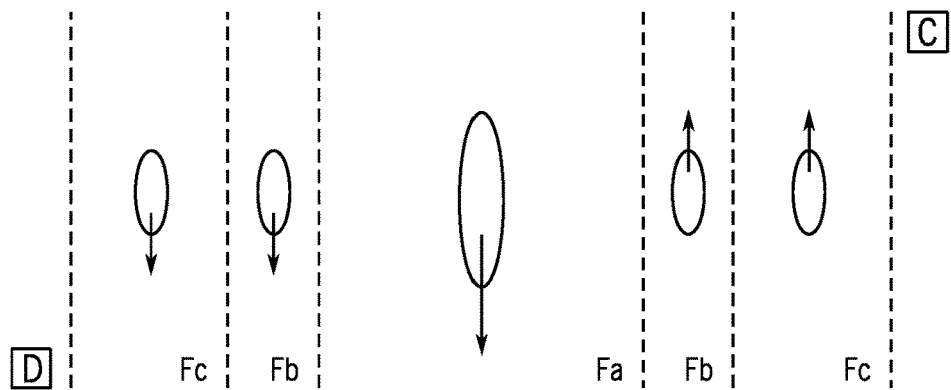
FIG. 24A is a schematic plan diagram of a flyway segment set in an airspace according to an exemplary embodiment.
Figure 24B:
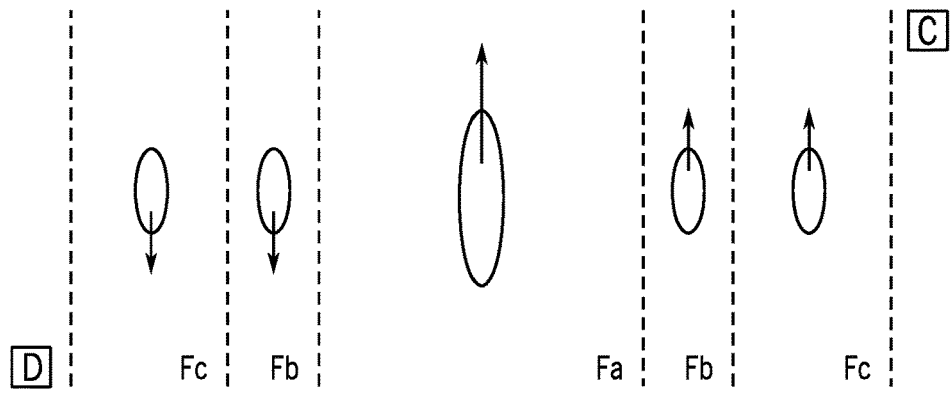
FIG. 24B is a schematic plan diagram of a flyway segment set in an airspace according to an exemplary embodiment.
Figure 24C:
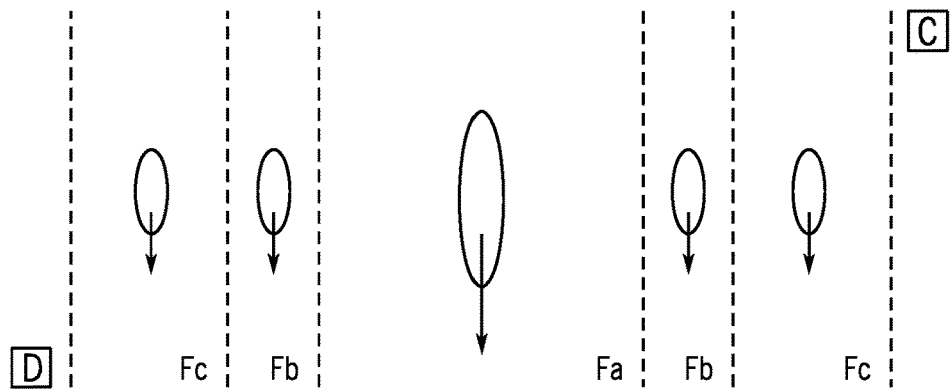
FIG. 24C is a schematic plan diagram of a flyway segment set in an airspace according to an exemplary embodiment.

FIGS. 24A, 24B and 24C show schematically other arrangements of a flyway segment as can be configured. For example, a flyway segment is shown in FIG. 24A with multiple lanes that are established for unidirectional travel (e.g. lanes FB and FC) and a lane that can be configured for travel in each direction for a period of time (e.g. lane FA) (compare FIG. 24C); a flyway segment is shown in FIG. 24B with all lanes providing travel in the same direction.

The safe and efficient operation of multiple aircraft in an airspace requires that the possibility or risk of collisions between aircraft be minimized if not eliminated. Systems and methods for avoiding collisions in an "open" airspace between manned aircraft are known and implemented by air traffic control systems around the world on a daily basis for manned aircraft. Known systems for facilitating collision, detection and avoidance for aircraft employ intervention measures, communications between aircraft operators, evaluation of flight plans/trajectories, etc. and other methods (that tend to be more suitable for aircraft that comprise control systems/communication systems with sufficient capability). See e.g. U.S. Pat. No. 8,082,102 and WIPO Publication No. 2013/014646 A1. See also U.S. Pat. No. 8,368,584 and FIG. 25.

According to an exemplary embodiment, the system and method of managing an airspace by systematically establishing designated flyways with lanes and/or spaces for UAV/drone traffic by reference over features in the zone/region (as indicated schematically in FIGS. 4A through 21B) is able to reduce the risk of collision of UAV/drone craft in the airspace notwithstanding that the airspace may be occupied with a wide range of different UAV/drone craft having a wide range of control systems and capabilities (e.g. from superior to marginal in performance). According to an exemplary embodiment, as indicated in FIGS. 23A-24C and 26 to 35, by designating lanes for travel/transit of UAV/drone craft the system and method is configured to establish standards including protocols/policies rules/regulations, conventions and practices for safe and efficient operation of UAV/drone craft in the airspace.

Figure 27:
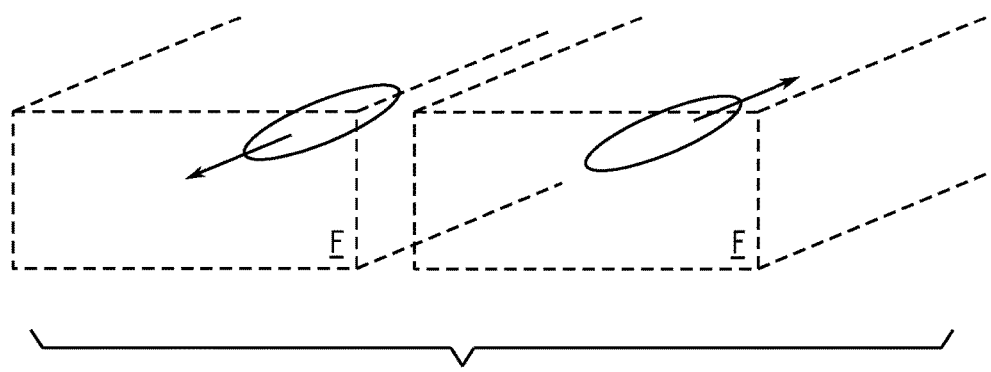
FIG. 27 is a schematic perspective view of a flyway segment set in an airspace according to an exemplary embodiment.
Figures 28, 29:
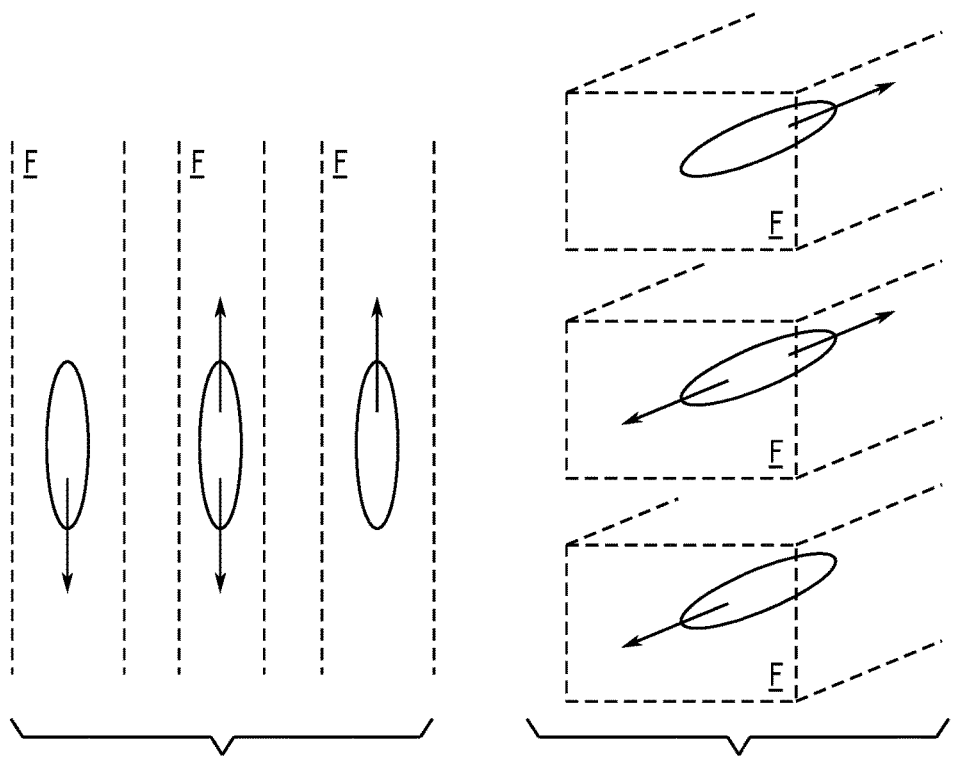
FIG. 28 is a schematic plan diagram of a flyway segment set in an airspace according to an exemplary embodiment.
FIG. 29 is a schematic perspective view of a flyway segment set in an airspace according to an exemplary embodiment.

As indicated schematically in FIG. 26 (and in contrast to FIG. 25), the establishment of designated lanes for UAV/drone craft operating in a flyway permits separation of the lanes (including for UAV/drone craft traveling in opposite directions) by a horizontal offset X and a vertical offset Y; offsets X and Y (e.g. forming a gap between lanes) may be specified and implemented according to factors relevant to operator of the airspace (e.g. including but not limited to the type and capability of the UAV/drone craft, the control/communication systems, the monitoring systems, etc.). Referring to FIGS. 27 and 30, lanes in a flyway segment may be positioned so that opposing direction UAV/drone traffic is separated in a horizontal (side-by-side) arrangement; referring to FIGS. 29 and 31-32, lanes in a flyway segment may be positioned so that opposing-direction UAV/drone traffic is separated in a vertical (above-the-other) arrangement. As indicated schematically in FIG. 28, the flyway may comprise a passing lane in which UAV/craft in operation in either direction may temporarily enter to overtake a slower/disabled/obstructing UAV/drone craft.

According to an exemplary embodiment, designation of lanes and interchanges is configured so that there is reduced risk of unintended interaction between UAV/drone craft and reduced risk of collisions by UAV/drone craft. See FIGS. 33-34. Protocol and convention for UAV/drone craft operation would prescribe spacing/separation between UAV/drone craft operating in the same flyway lane (as indicated in the FIGURES); offset and gaps between lanes would prescribe spacing/separation between UAV/drone craft in different flyway lanes (e.g. regardless of the direction of travel). According to an exemplary embodiment, flyway configurations with landing/waiting areas and high-speed lanes and/or multiple/passing lanes for UAV/drone craft may be provided. See e.g. FIGS. 23A-24C, 28 and 33A-35.

Referring to FIGS. 33A/B and 34A/B, configurations for lane arrangements and interchanges between flyway segments of an airspace are shown according to exemplary embodiments (e.g. such as to allow UAV/drone craft to change from one flyway segment to another during transit in the airspace); according to an exemplary embodiment, protocol/rules for interchanges may be established by the management system within the administration function. See also FIGS. 4B, 5B and 48A/B and 49A/B.

As indicated schematically in FIGS. 27 through 35, each UAV/drone craft would be traveling in a designated lane in the flyway as assigned by the system with the UAV/drone craft registered to enter the airspace. According to an exemplary embodiment, the travel of each UAV/drone craft in each lane would be regulated and tracked/monitored. Management and control of the flyway according to an exemplary embodiment would also comprise the direction and diverting or grounding of UAV/drone craft that become disabled or do not comply with regulations/rules for transit or operator in the flyway/airspace. As UAV/drone craft exit flyway segments/lanes openings are created for other UAV/drone craft to enter. See FIGS. 33A/B, 34A/B and 35 (also indicating a parking landing lot or station T with system P to provide services).

Referring to FIGS. 36 to 42, according to an exemplary embodiment, each UAV/drone craft may be assigned by the system to operate in a designated occupancy space (e.g. block or volume) within a flyway segment or lane. As indicated schematically, the size and shape of the occupancy space for a UAV/drone craft can be configured in consideration of the type, control, size, capability, speed, etc. of the UAV/drone craft as well as other factors. See e.g. FIGS. 37, 40-41. In operation, each UAV/drone craft would be expected to maintain position within the occupancy space through the flyway and airspace; no other UAV/drone craft would be permitted to enter the occupancy space of another UAV/drone craft; as one UAV/drone craft exits an occupancy space in the flyway/lane, an opening is created for another UAV/drone craft to enter. See FIG. 36 (also indicating a parking/landing lot or station T with system P to provide services). Referring to FIGS. 48A/B and 49A/B, configurations for lane arrangements and interchanges between flyway segments of an airspace are shown according to exemplary embodiments.

Rates for an occupancy space could be determined by the size/shape and speed/route of the occupancy space through the airspace according to an exemplary embodiment; maximum and minimum speed/regulated speed for UAV/drone craft may be established in lanes with occupancy spaces to ensure efficient traffic flow through the airspace.

Figure 37:
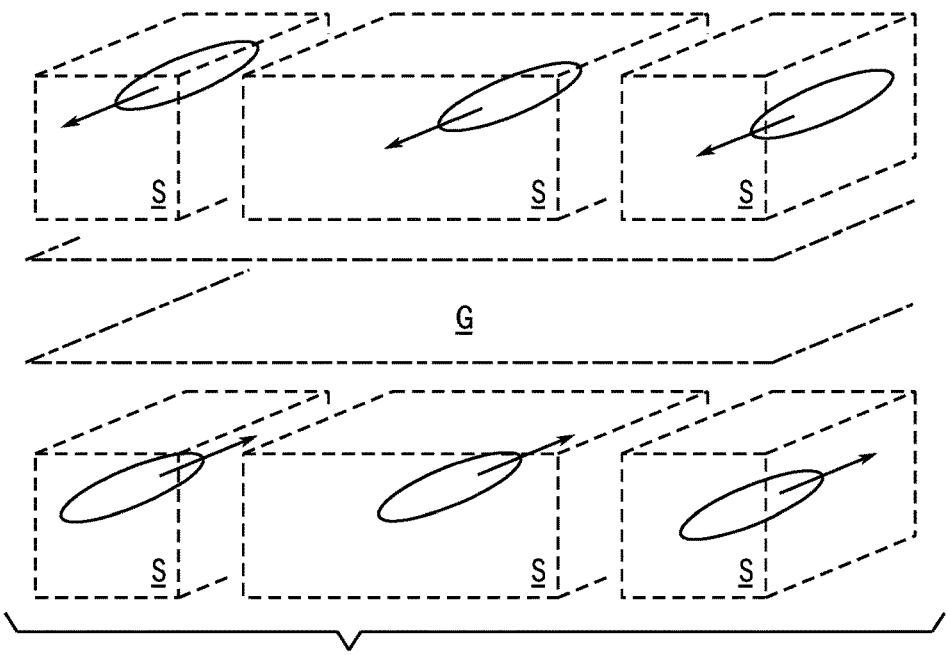
FIG. 37 is a schematic perspective view of a flyway segment set in an airspace according to an exemplary embodiment.
Figure 38:
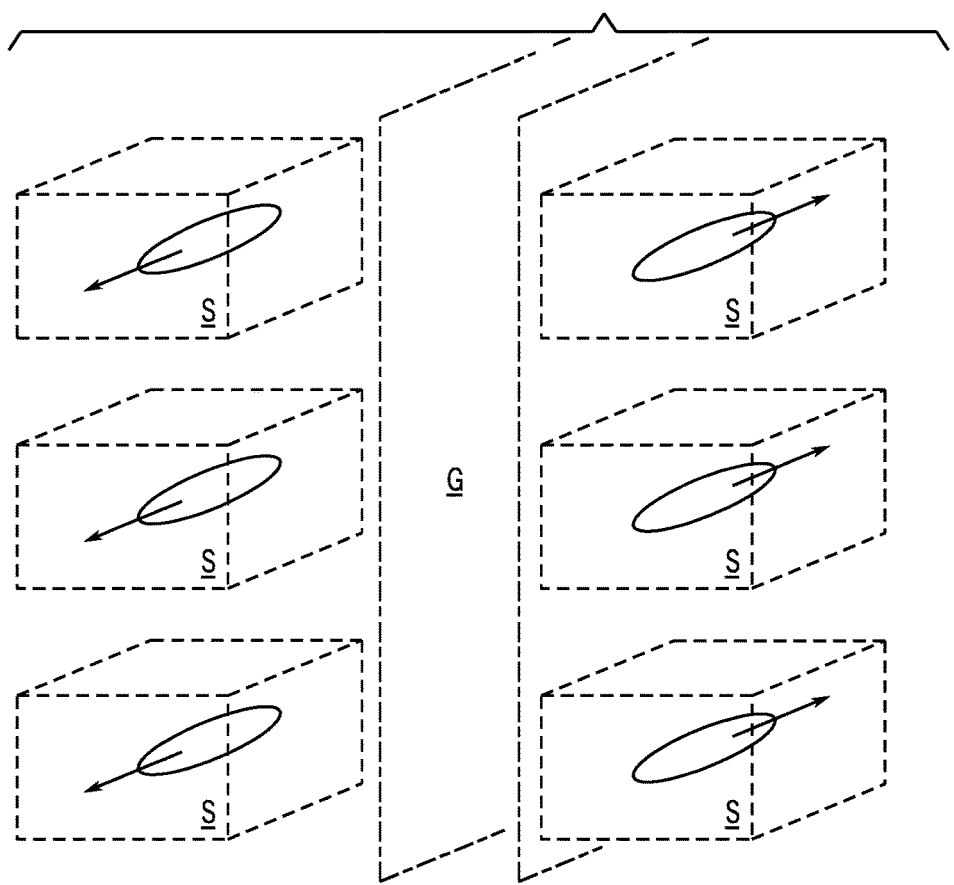
FIG. 38 is a schematic perspective view of a flyway segment set in an airspace according to an exemplary embodiment.
Figure 39:
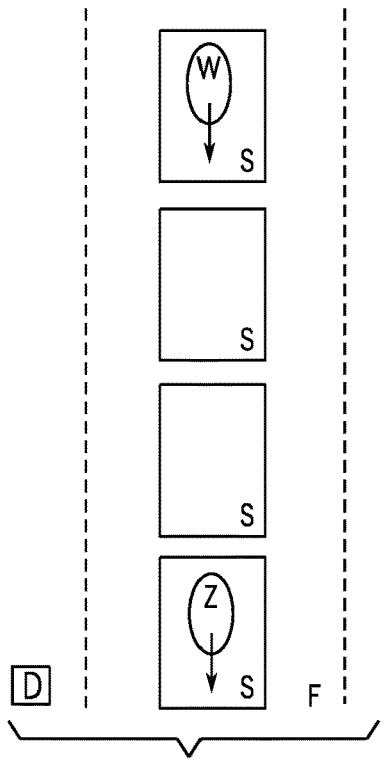
FIG. 39 is a schematic plan diagram of a flyway segment set in an airspace according to an exemplary embodiment.

As shown schematically according to an exemplary embodiment in FIGS. 37 and 40-41 occupancy spaces may be configured in a variety of shapes and sizes and to accommodate UAV/drone craft of a variety of types and sizes and/or routes and missions on flyway segments in or through an airspace. As indicated in FIGS. 39, 40-41, occupancy spaces in a flyway lane F may include a single UAV/drone craft such as UAV/drone craft W and UAV/drone craft Z in spaces S in FIG. 39 or multiple craft such as two UAV/drone craft Z in space S in FIG. 40. Spaces S may be sized to a standard size and/or with progressively larger sizes as indicated in FIG. 40. Occupancy spaces may be provided in multiple (opposing direction) lanes as shown schematically in FIG. 41.

According to an alternative embodiment, an occupancy space that was assigned to an operator may be used for multiple UAV/drone craft at the direction of the operator and/or subdivided for occupancy by multiple UAV/drone craft. See FIGS. 42-47. As shown schematically in FIGS. 42 to 45, an operator may divide an occupancy space for various arrangements of UAV/drone craft. See also FIGS. 46A-47. As shown schematically in FIGS. 46A/B and 47, an operator may use an occupancy space for squadron of UAV/drone craft operating in a formation (e.g. under the control/command of a lead UAV/drone craft or under another method of control).

Figure 44:
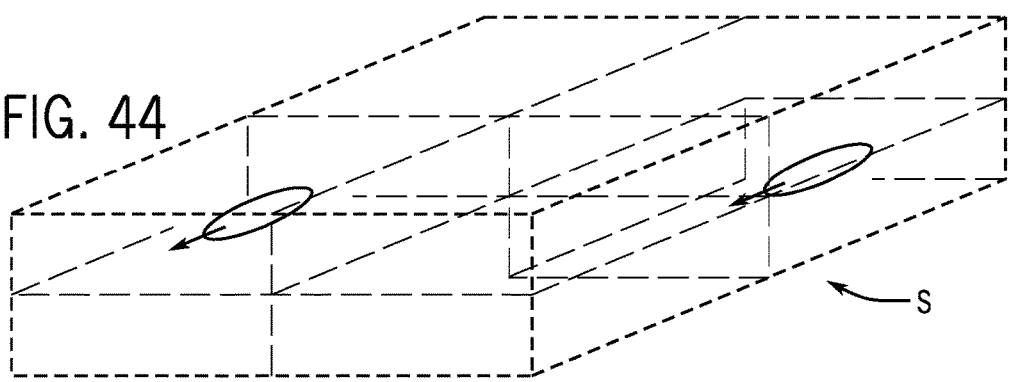
FIG. 44 is a schematic perspective view of a flyway segment set in an airspace according to an exemplary embodiment.
Figure 45:
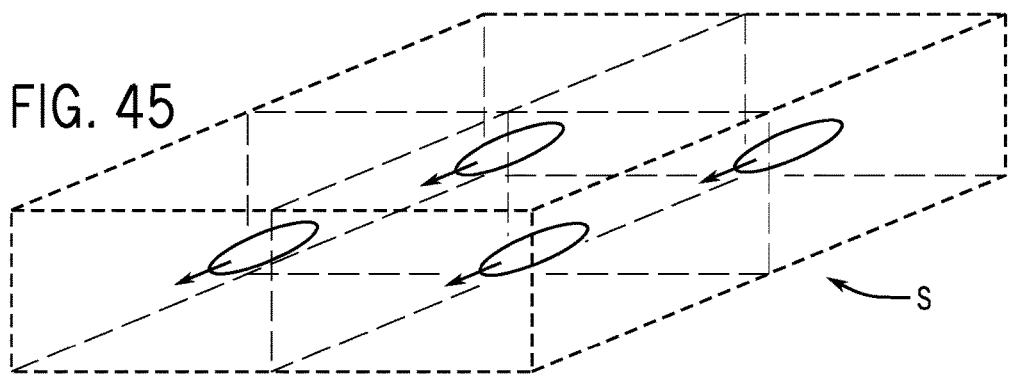
FIG. 45 is a schematic perspective view of a flyway segment set in an airspace according to an exemplary embodiment.
Figure 46A:
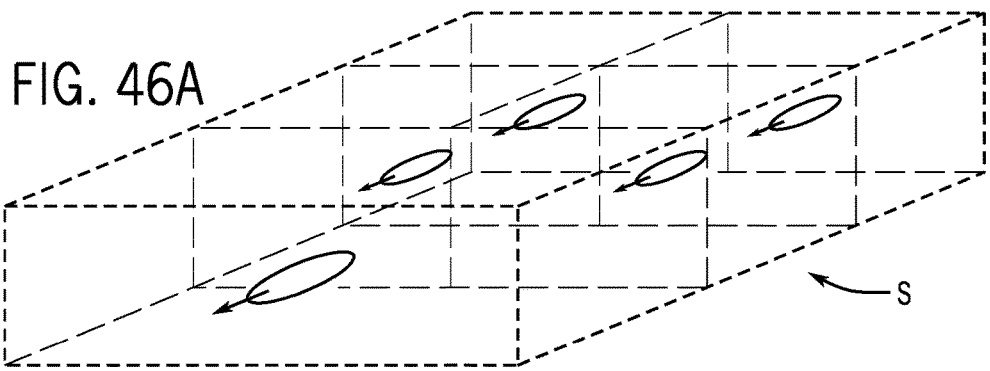
FIG. 46A is a schematic perspective view of a flyway segment set in an airspace according to an exemplary embodiment.
Figure 46B:
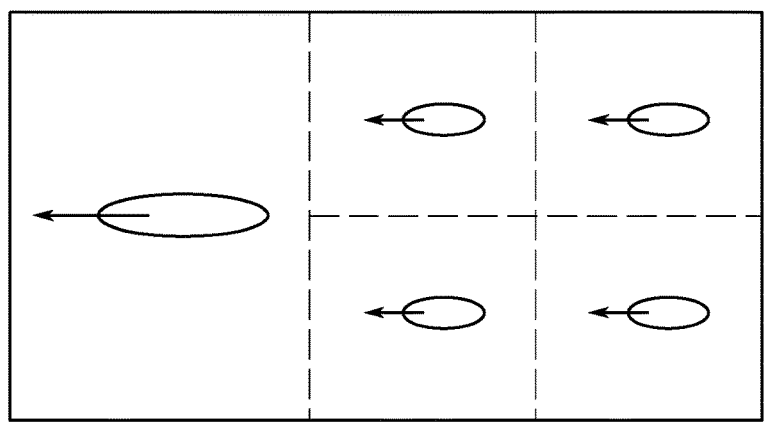
FIG. 46B is a schematic plan diagram of a flyway segment set in an airspace according to an exemplary embodiment.
Figure 47:
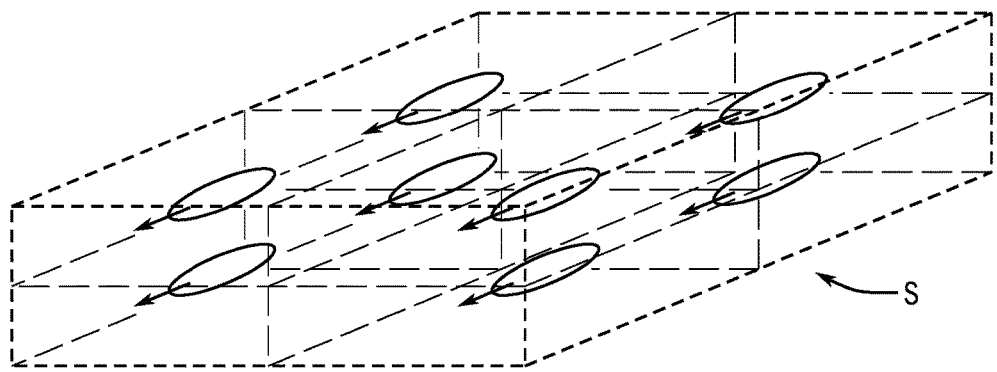
FIG. 47 is a schematic perspective view of a flyway segment set in an airspace according to an exemplary embodiment.

As indicated schematically in FIGS. 44-45 and 47, the flyway may comprise a utility lane that be used, for example, for UAV/drone craft M employed by the system to monitor UAV/drone traffic and conditions in the airspace (or for disabled UAV/drone craft to be moved out of primary traffic lanes for UAV/drone craft in operation).

Parking/Landing/Service Stations

As indicated schematically in FIGS. 4A/B, 9A/B, 21A/B and 35-36, the system may provide stations T along flyways in the airspace to be used by UAV/drone craft for parking/landing and/or for provision of services such as refueling/recharging or maintenance/inspection (or for landing of malfunctioning or disabled UAV/drone craft). As indicated in FIG. 21B, stations may be configured to provide shelter for UAV/drone craft from conditions (e.g. rainstorm 0 approaching the flyway). As indicated in FIGS. 35-36, stations may be configured to facilitate management of the airspace (e.g. by providing a landing/parking area for UAV/drone craft that are required to exit a flyway to give way to higher-priority UAV/drone craft).

Figure 35:
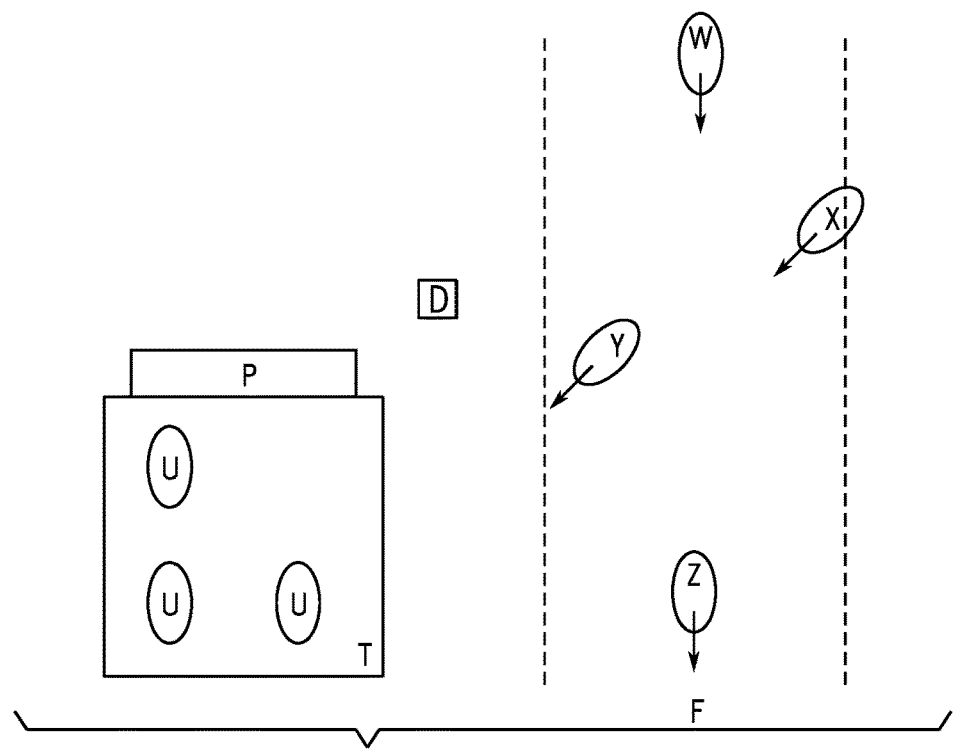
FIG. 35 is a schematic plan diagram of a flyway segment set in an airspace according to an exemplary embodiment.

According to an exemplary embodiment referring to FIG. 35, a lane of a flyway segment F is shown schematically along with station T shown as an adjacent waiting/parking lot or pad L for UAV/drone craft. As indicated schematically, UAV/drone craft are traveling in the flyway lane F; UAV/drone craft Y is exiting the flyway lane F to join UAV/drone craft in the lot L as UAV/drone craft X is entering the flyway lane F to join UAV/drone craft W and UAV/drone craft Z in transit.

Figure 36:
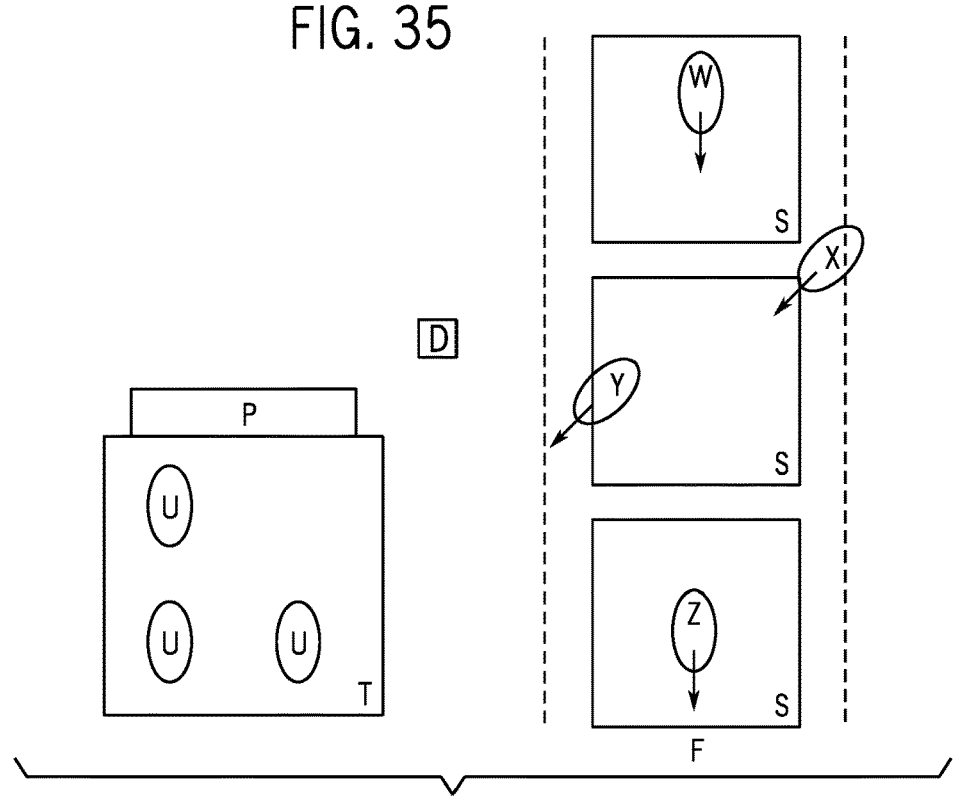
FIG. 36 is a schematic plan diagram of a flyway segment set in an airspace according to an exemplary embodiment.

According to an exemplary embodiment referring to FIG. 36, a lane of a flyway segment F is shown schematically with station T shown as an adjacent waiting/parking lot or pad L for UAV/drone craft. As indicated schematically, UAV/drone craft are traveling in occupancy spaces S in the flyway lane F; UAV/drone craft Y is exiting the occupancy space S in the flyway lane F to join UAV/drone craft P in the lot L as UAV/drone craft X is entering the occupancy space S in the flyway lane F to join UAV/drone craft W and UAV/drone craft Z in transit.

The station may be configured for one type or a variety of types of UAV/drone craft that may have a variety of requirements (e.g. for landing/take-off); for example, the station may provide runways for UAV/drone craft or may be configured in a more compact arrangement for vertical take-off/landing craft (see FIGS. 4A/B-5A/B and 9A/B).

As indicated schematically in FIGS. 21A/B and 35-36, the station may also provide a system P for providing services and utilities for UAV/drone craft that have landed at the station; for example, a UAV/drone craft that is disabled may obtain an inspection or service; a UAV/drone craft may exit to a station and use the system for refueling/recharging; a UAV/drone craft may exit and use the system at the station to establish a reliable data link to the management system and/or an operator; a UAV/drone craft may use the system/station to conduct a transaction with the management system (e.g. adjustment or route or rights/license, etc.).

According to a preferred embodiment, the management system may operate or contract with third parties to operate stations to provide services, parking, etc. for UAV/drone craft at stations in commercial transactions; according to an exemplary embodiment, UAV/drone craft may transact/license with the system to have access to stations in the airspace and/or for services, parking, etc. at transacted rates (e.g. billed/invoiced to the UAV/drone craft after completion of a mission in the airspace).

Management System/Subsystems and Functions

According to an exemplary embodiment, the system for management of an airspace will comprise subsystems such as a computing system, monitoring system, data/network systems, etc. See e.g. FIGS. 50-60. Referring to FIGS. 50-60, technical/computing and data/network functions comprising the system for managing an airspace for UAV/drone craft are shown schematically according to an exemplary embodiment.

Figure 50:
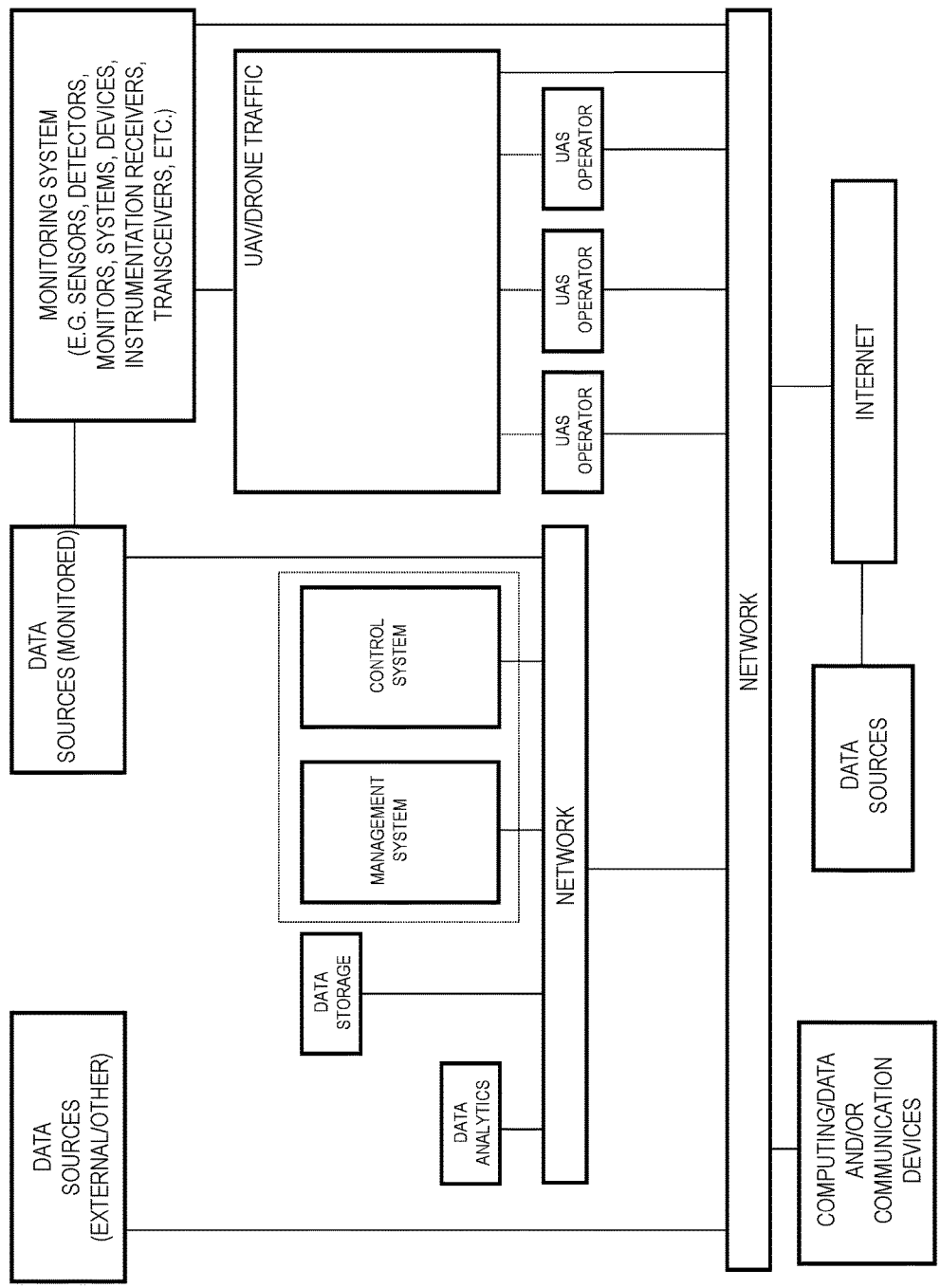
FIG. 50 is a schematic block diagram of management and administration of an airspace system according to an exemplary embodiment.

As shown in FIG. 50, according to an exemplary embodiment, the system comprises a set of subsystems that are connected by a network (or set of networks). According to an exemplary embodiment, the system is implemented using conventional computing and network technology, for example, as disclosed in U.S. Patent Application Publication No. 2008/0072284 (incorporated by reference). See also FIGS. 53 (schematic block diagram of representative computing system) and 54 (schematic block diagram of representative network system). As indicated in FIGS. 50 and 57-60, according to an exemplary embodiment, the system comprises a management system for the airspace and a control system for the airspace.

As also shown schematically in FIGS. 57-60, according to an exemplary embodiment, the management system (see FIG. 57) comprises an administration module/system (see FIG. 59) and a control module/system (see FIG. 60) in operation to perform a set of basic functions (e.g. planning/management, control/direction, administration, monitoring, communication/reporting, billing, etc.) (see FIG. 58). According to an exemplary embodiment, the management system comprises a computing system (see FIG. 54) configured by control programs/algorithms with a flyway/routing function and a license/rights administration function. According to an exemplary embodiment, the control system comprises a computing system (see FIG. 54) configured by control programs/algorithms with a real-time UAV/drone craft/conditions monitoring function and a real-time flyway management function. As indicated, when a UAV/drone craft (e.g. with a mission/plan) registers with the system to operate in the airspace the management system determines and assigns a route along flyway segments/zones in the airspace and determines license rights/rates for the UAV/drone craft to operate in the airspace; when the UAV/drone craft initiates the mission in the airspace the control system monitors (and directs) the operation of the UAV/drone craft (including real-time communication and/or control); when the mission is completed/terminated the management system collects/validates data from the UAV/drone craft and verifies the rate/billing for use of the airspace.

The system uses data from data sources (e.g. external and/or monitored in the airspace such as from detectors, monitor craft, etc.). Stored data and control programs/algorithms used by the system to perform functions (see FIG. 58) are available to the system by network/data connection. Data for the airspace such as designated flyways, flyway/route segments, flyway lanes, protocol and rules, maps, obstructions, hazards, etc., is maintained as stored data for the system (updated as needed). See also FIG. 61 (UAV/drone craft data sets). (As indicated, the system may also provide a data analytics function that can be used to modify operating/control programs and algorithms, to enhance functionality/efficiency, to share/commercialize data sets, etc.)

According to an exemplary embodiment, the system is able to operate using known/conventional and future/compatible subsystems of technology (e.g. computer systems, computing devices, network/data communications, etc., structured/integrated (see FIGS. 50-56) and configured/programmed (see FIGS. 57-60) to perform functions as shown/indicated to manage an airspace for UAV/drone craft. As indicated schematically in FIGS. 50 and 56, the system may be linked to other systems/networks including the internet (and thereby connected to additional data sources and other computing/data and communication devices).

Figure 51:
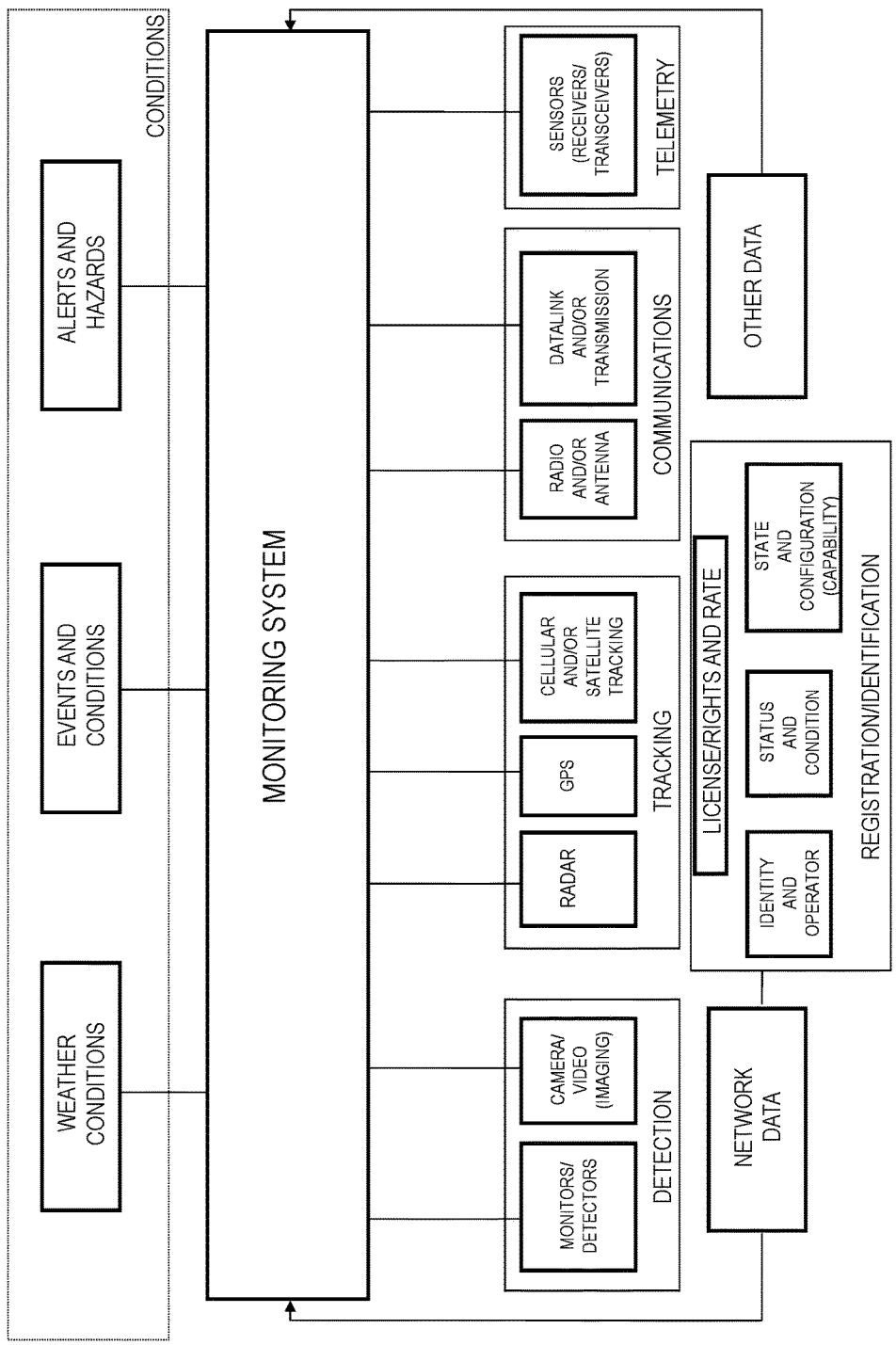
FIG. 51 is a schematic block diagram of a monitoring system for the system according to an exemplary embodiment.
Figure 58:
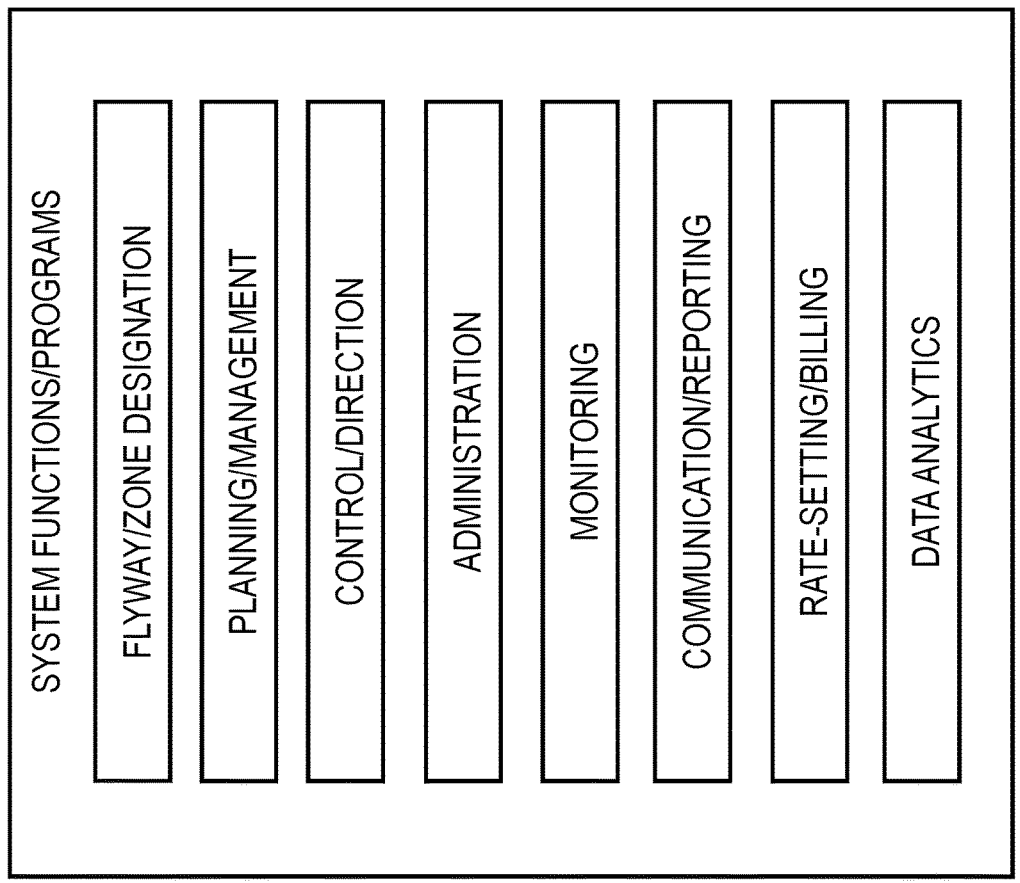
FIG. 58 is a schematic block diagram of functions of the system according to an exemplary embodiment.
Figure 59:
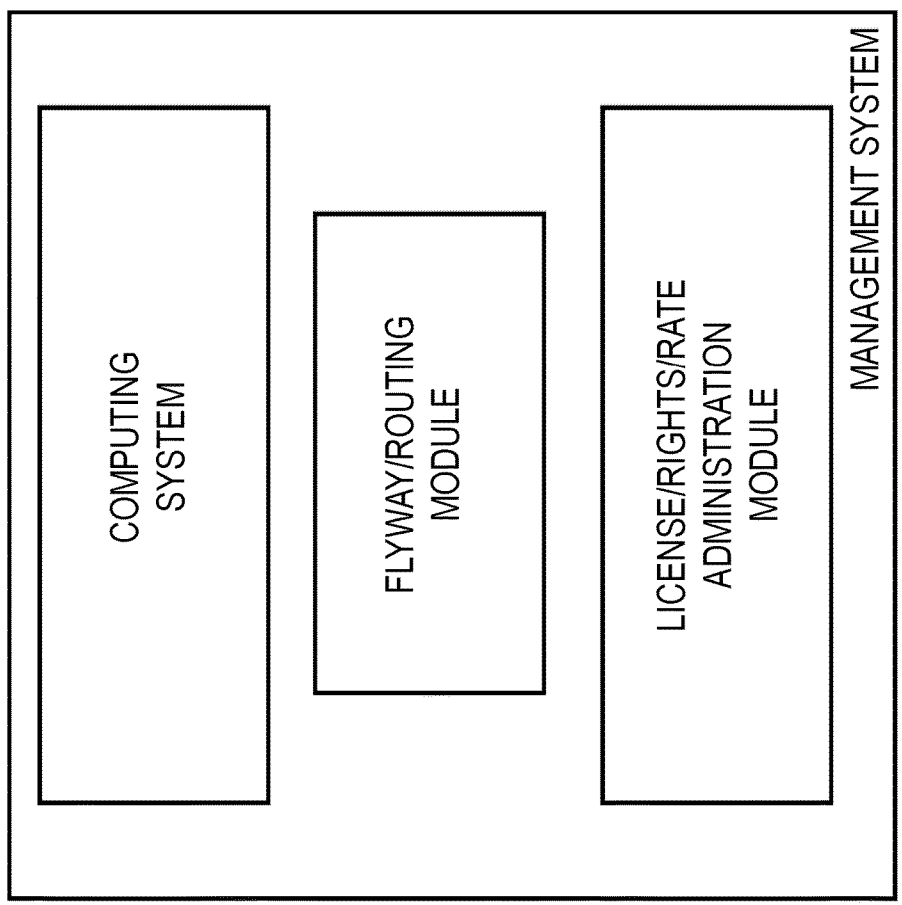
FIG. 59 is a schematic block diagram of a management system of the system according to an exemplary embodiment.
Figure 60:
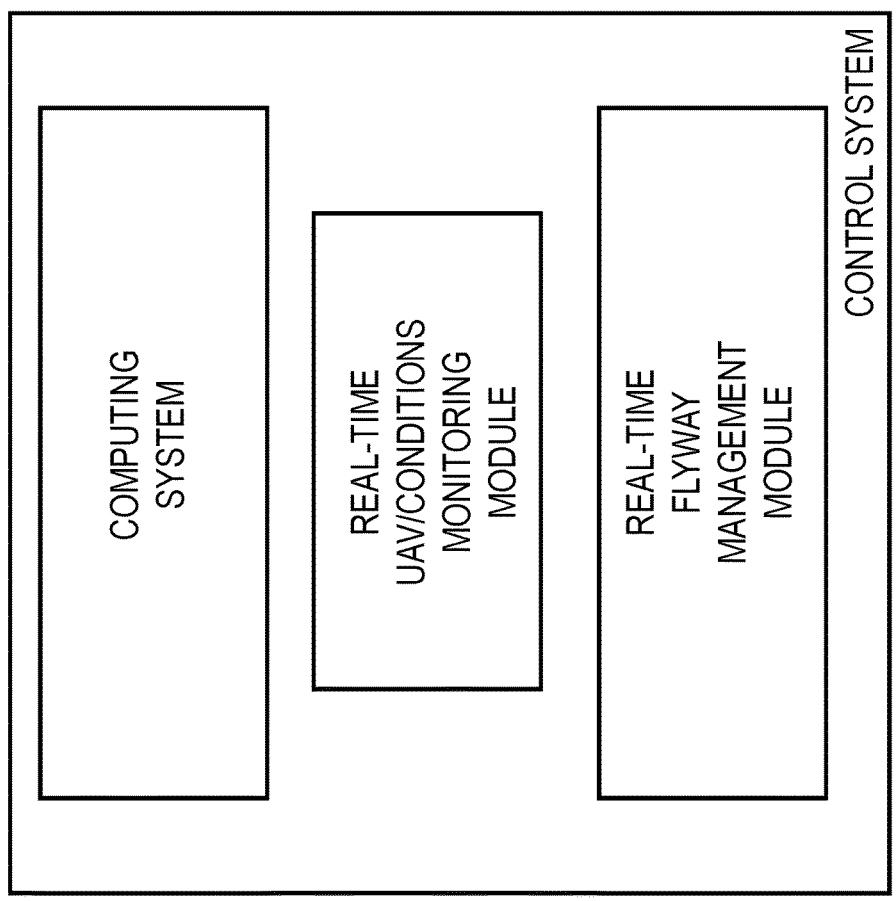
FIG. 60 is a schematic block diagram of a control system of the system according to an exemplary embodiment.

As shown schematically in FIGS. 50-51 and 58 the system is configured to manage/administrate the airspace and UAV/drone craft that comprises the UAV/drone traffic in the airspace and to perform associated functions (see FIGS. 57-60) including to monitor and evaluate conditions in the airspace. According to an exemplary embodiment, the system comprises a monitoring system (e.g. comprising a set of detectors such as sensors, monitors, systems, devices, instrumentation, receivers, transceivers, antenna, etc.) configured to provide data on conditions in the airspace including UAV/drone traffic, environmental conditions/weather, etc. See FIGS. 16A/B and 21A/B and 51. According to an exemplary embodiment, the system is in data communication with UAV/drone traffic (e.g. via UAS operators, network connection and/or monitoring system). According to an exemplary embodiment, data from other/external sources available to the system may provide information that can be used to confirm/verify or validate/corroborate conditions monitored in the airspace or to the supplement data from the monitoring system to facilitate operation of the system; data provided by UAS operators and/or other sources can be used to maintain records related to UAV/drone craft for purposes of registration (e.g. craft identity, type, rights, etc., operator identity, mission data, routes, rates, events, etc.); data reported by UAS operators and/or UAV/drone craft can be used by the system to monitor and/or to manage and administrate the airspace (e.g. data from operator of route/GPS data, etc. after a mission is completed by a craft). As indicated schematically, data may be shared and interchanged by the system with UAS operators and other authorized users/systems to facilitate management/administration and monitoring/operation of the systems. According to an exemplary embodiment, the monitoring system may be linked to other monitoring systems such as traffic cameras, etc.

Referring to FIG. 51, according to an exemplary embodiment, the monitoring system is shown schematically with connectivity to data sources/systems providing data as to UAV/drone craft (e.g. via the management/control system) and conditions (e.g. via detectors, etc.). The monitoring system is configured to provide the system with data/information on conditions in the airspace including, for example, environmental/weather conditions, events, alerts, hazards, etc. which may be used to manage and administrate UAV/drone traffic in the airspace. The monitoring system may receive data from detection (e.g. monitors/detectors, camera/video/imaging, sensors/RFID, etc.), tracking (e.g. radar, GPS/satellite, cellular tracking, etc.), communications (e.g. radio/radio frequency, antenna/broadcast, data link, data communications, etc.), telemetry (e.g. receivers/transceivers) or any other systems (presently known or future implemented). As indicated schematically in FIGS. 21A/B a detector D associated with a station T and/or installed with or adjacent to a service, system P may be configured to provide tracking/monitoring of craft UAV as well as tracking/monitoring of conditions such as weather/storm 0. According to an exemplary embodiment, the system comprises a monitoring system configured to facilitate the acquisition and evaluation of timely and accurate data/information from multiple types of data sources. The monitoring system may receive data from network-available sources (e.g. other network devices and data storage, internet-connected sources, LAN sources, intranet sources, etc.) and other data sources (e.g. of any kind); such data may include background data such as time/date, events, reports, etc. Also available to the monitoring system from the management/control system may be information/data from UAV/drone craft in operation in the airspace or registered/identified to the system; such data for a UAV/drone craft may include identity/operator, status and condition, state and configuration, capability, license rights/rate, etc. (Data may be communicated directly from UAV/drone craft or operators such as monitoring craft M shown schematically in FIGS. 40-41.)

Figure 52:
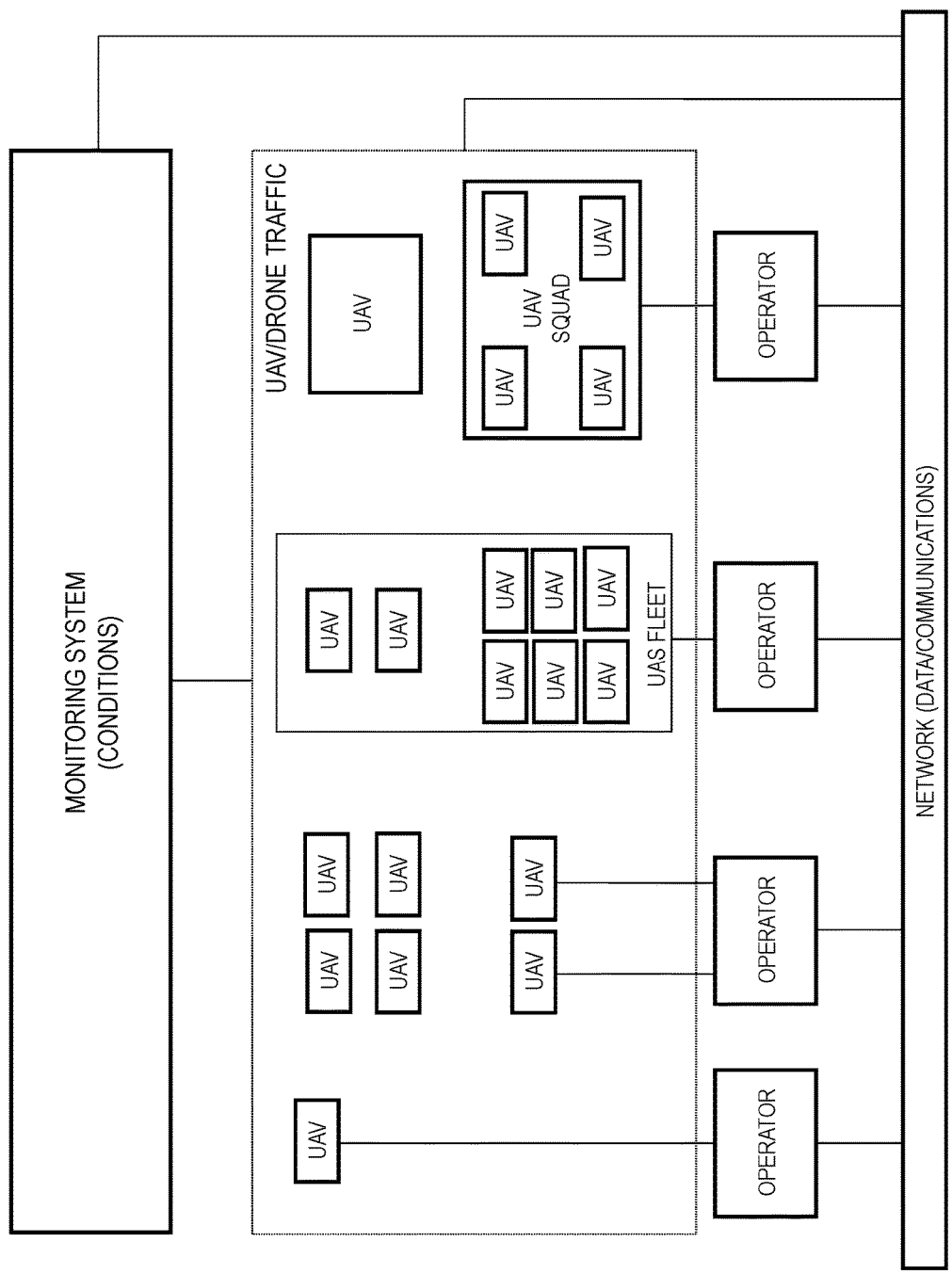
FIG. 52 is a schematic block diagram of a UAV/drone systems in the system according to an exemplary embodiment.
Figure 53:
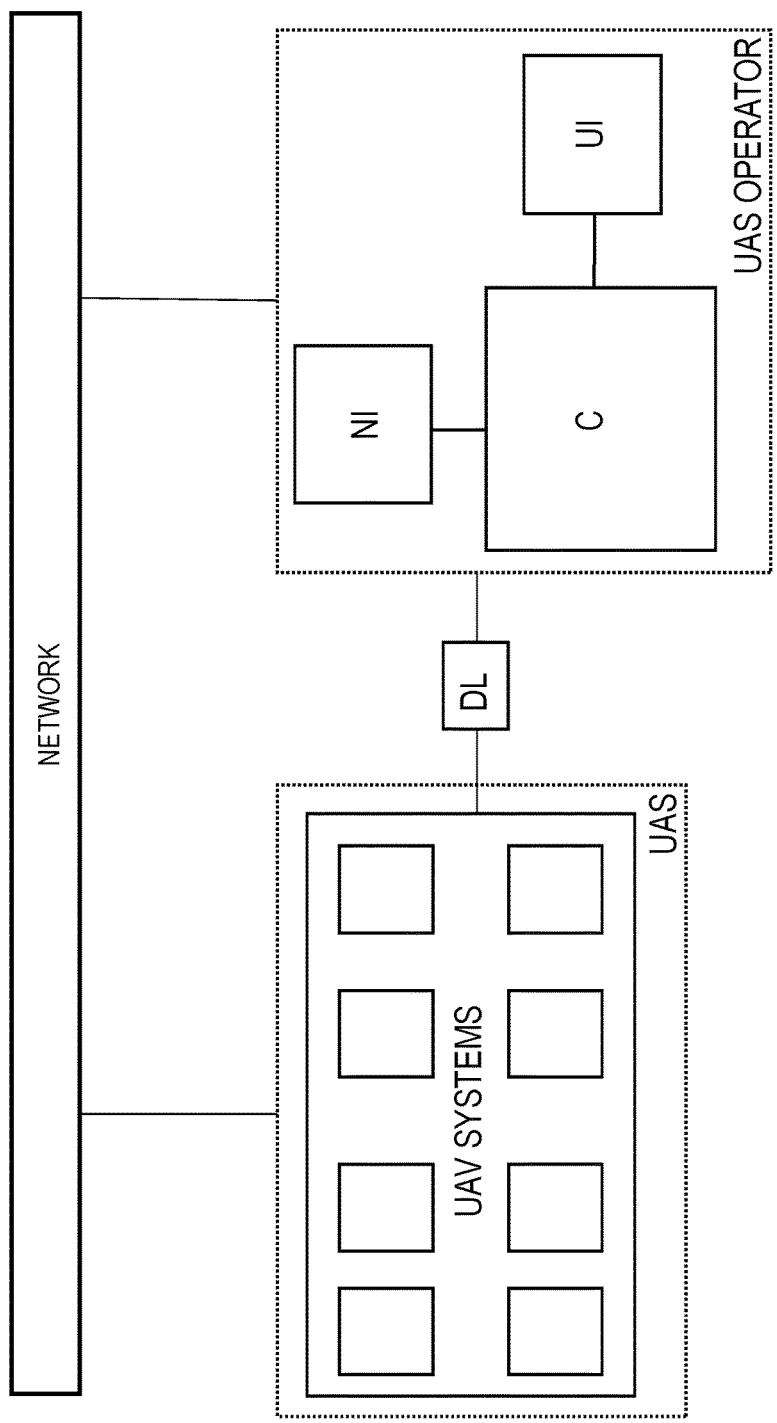
FIG. 53 is a schematic block diagram of a network for the system according to an exemplary embodiment.
Figure 54:
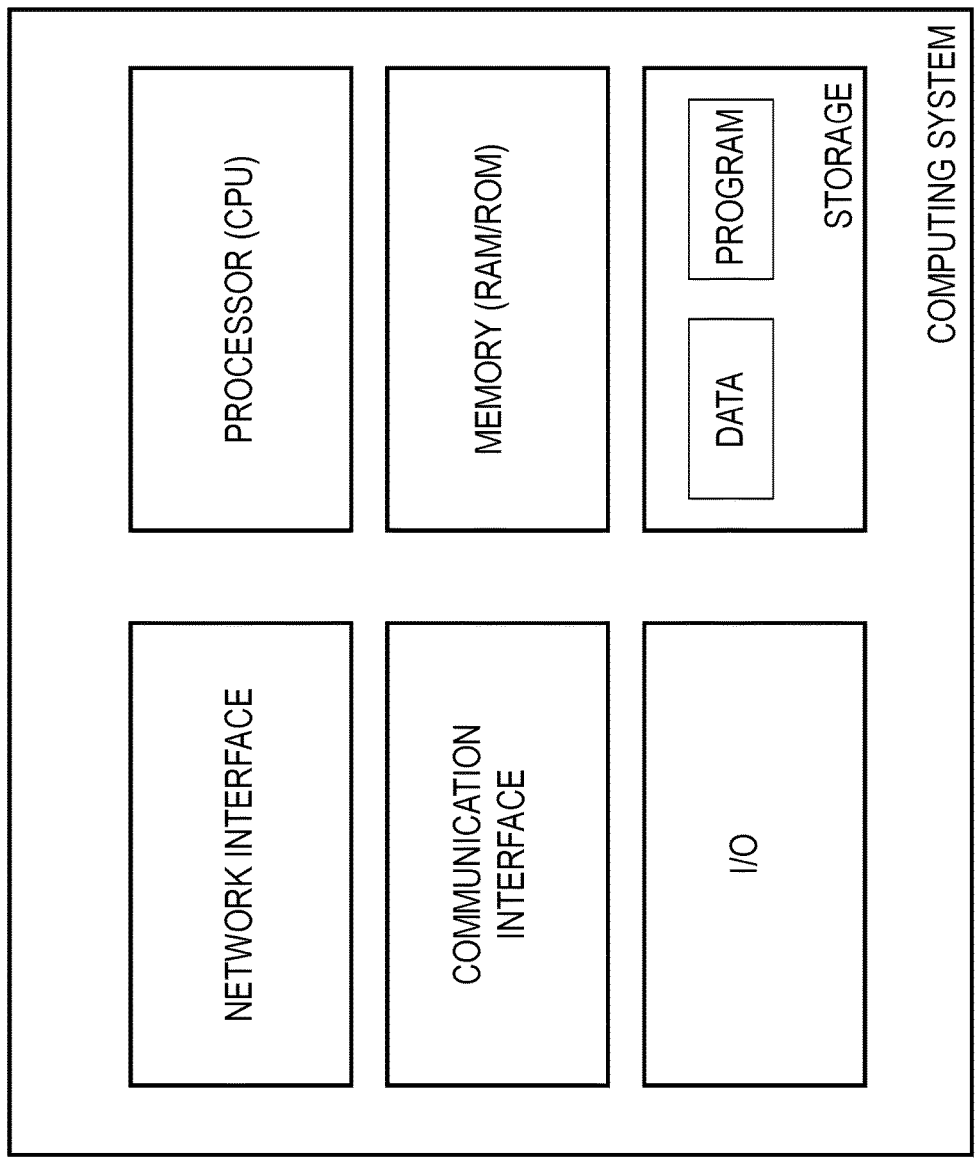
FIG. 54 is a schematic block diagram of a system/device networking for the system according to an exemplary embodiment.

Referring to FIG. 52, the monitoring system connected to UAV/drone traffic is shown schematically according to an exemplary embodiment. As indicated, a UAV/drone craft operating in the airspace may be under the direct control of an operator, may be deployed into the airspace with a flight plan/program, may be under the control of a squadron leader (see FIGS. 46A/B), may be part of a fleet, may be operating autonomously, etc. According to an exemplary embodiment, the system is configured to manage/administrate the airspace for any suitable type of UAV/drone craft (e.g. subject to controllability/airworthiness requirements). UAV/drone craft and/or operators of individual or multiple UAV/drone craft will interact by data communication with the system by network and/or by the monitoring system. As indicated, network-transmitted data (e.g. in real-time or post-mission) to the system from a UAV/drone craft or operator may be used to validate/correct/confirm data that has been obtained by the system from the monitoring system. For example, if a detector (such as a camera or transponder or toll/fare meter) indicates that a UAV/drone craft has been in a particular flyway segment in a particular zone at a particular day/time during a mission, a data upload (such as GPS track) from the UAV/drone craft or operator after the mission can be used to confirm that the UAV/drone craft was accurately detected in the airspace.

Figure 55:
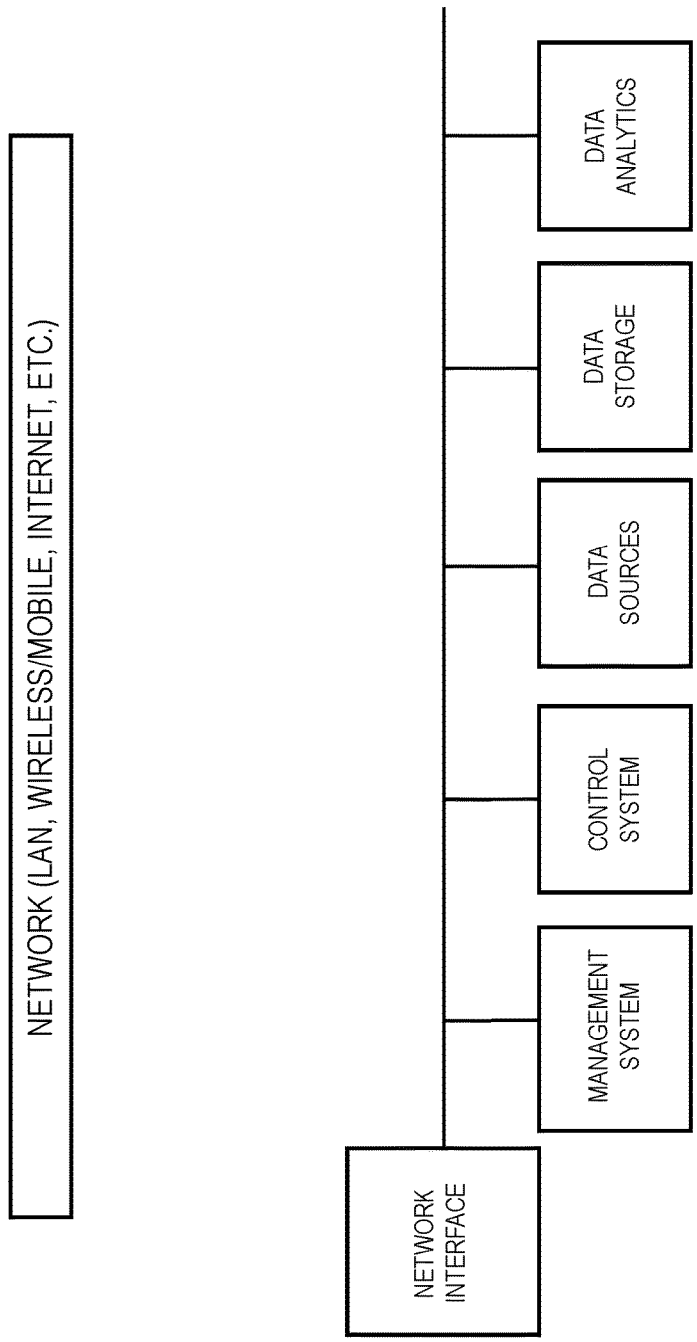
FIG. 55 is a schematic block diagram of a network for the system according to an exemplary embodiment.
Figure 56:
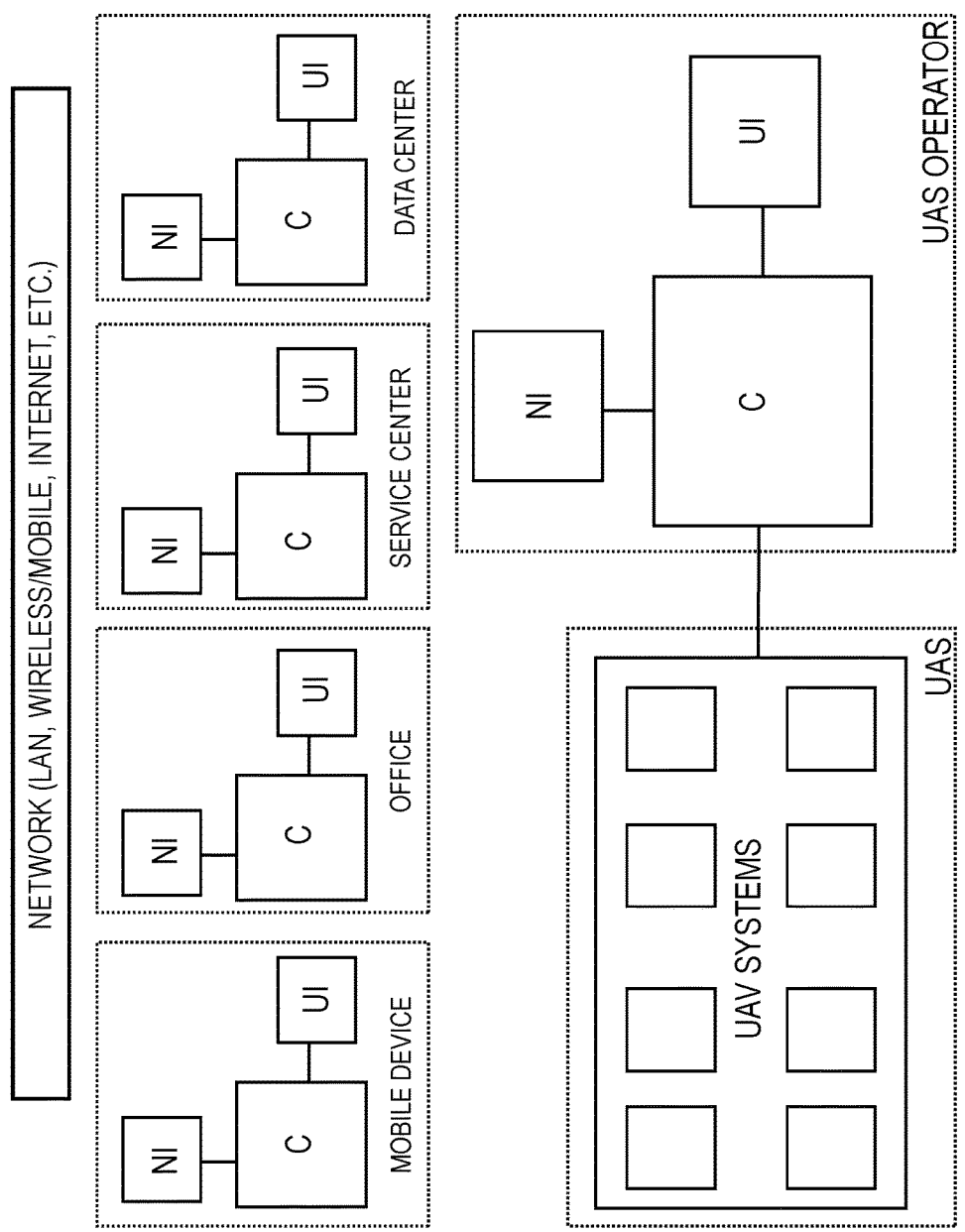
FIG. 56 is a schematic block diagram of a system/device networking for the system according to an exemplary embodiment.
Figure 57:
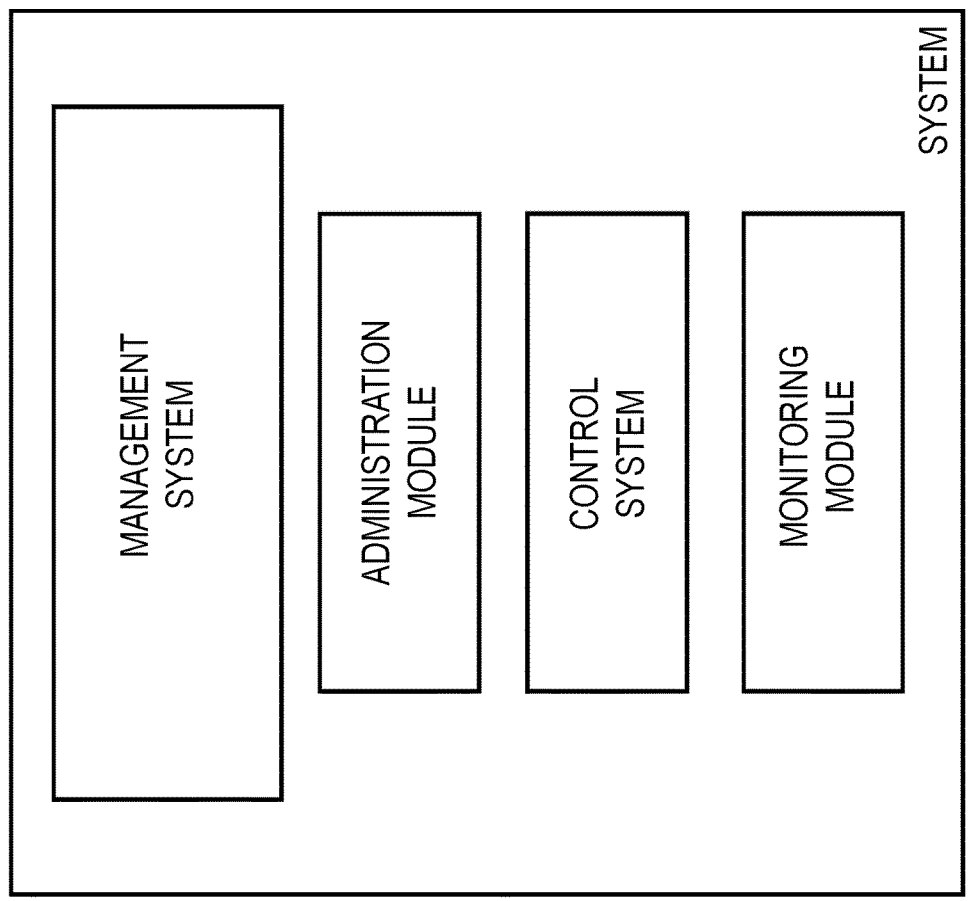
FIG. 57 is a schematic block diagram of a the system according to an exemplary embodiment.

As shown schematically in FIGS. 55 and 56, according to an exemplary embodiment, the system as well as various subsystems and (registered) UAV/drone craft, UAS operators/pilots, service centers, office staff, etc. may be connected by network and able to share/transmit data/information. As indicated schematically in FIGS. 53 and 56, UAV/drone craft may be configured to communicate directly with a network (and therefore to the system and or monitoring system) or via a UAS operator by data link (and by the operator/pilot to the system and/or monitoring system via the network). According to any preferred embodiment, the system is able to monitor UAV/drone craft and UAV/drone traffic in the airspace essentially in real-time in a reliable manner (as indicated).

As indicated in FIGS. 50, 55-57 and 60, according to an exemplary embodiment, certain UAV/drone craft by network and/or by operator may be in real-time communication with the system and able to be directed/controlled as to operation/routing in the airspace during a mission (other types of UAV/drone craft may operate with lessor or virtually no control once deployed in the airspace). A UAV/drone craft that is configured to be in communication/control with the system (directly or by operator) during a mission in or through the airspace may be provided with the capability to modify or adjust the route and/or rate for travel/passage through flyway segments/zones in the airspace (e.g. capability for dynamic transactions with the system during a mission).

As indicated in FIGS. 50, 55, 56 and 57 data communications may be established between the system by network with UAV/drone craft, operators and other authorized systems/persons/entities.

Figure 61:
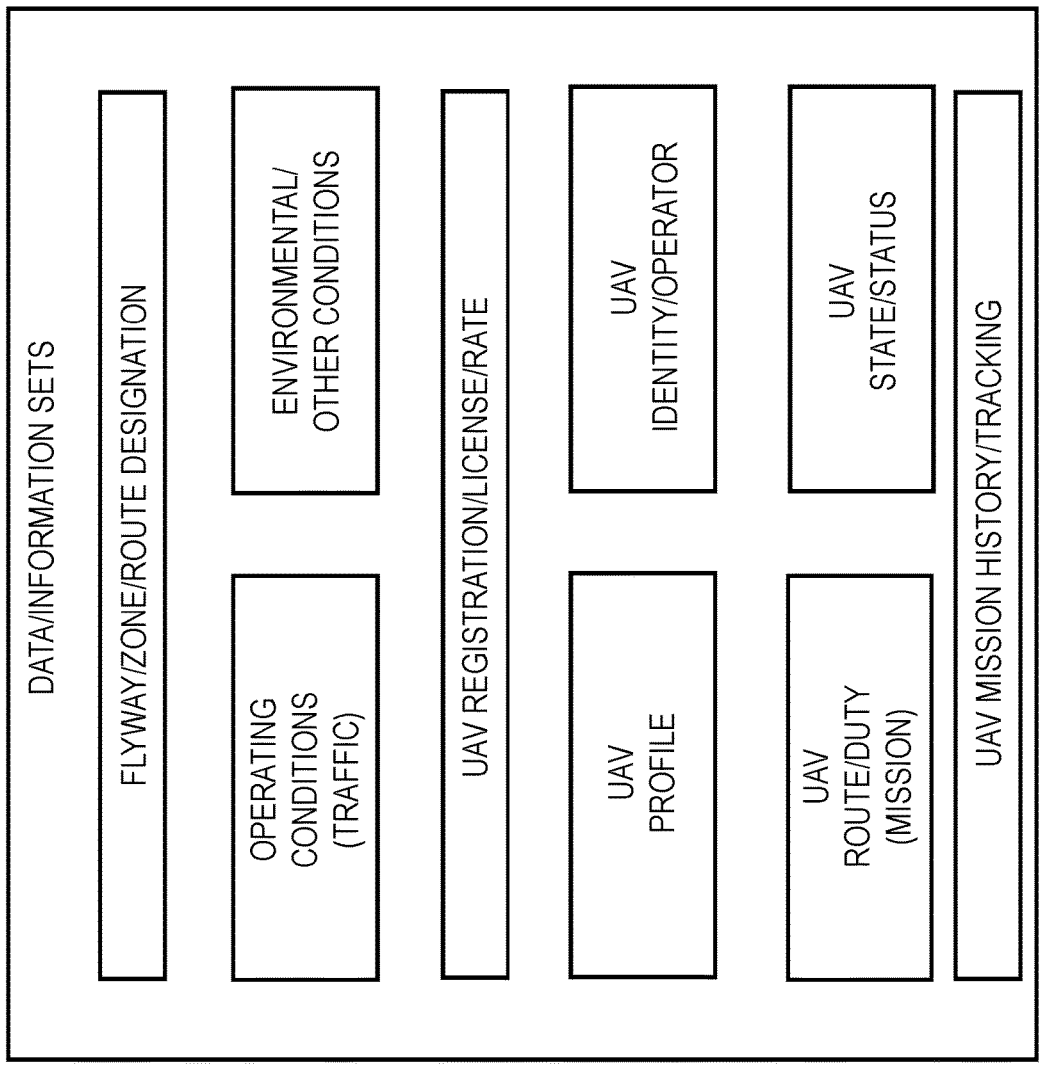
FIG. 61 is a schematic block diagram of a data sets for the system according to an exemplary embodiment.
Figure 62:
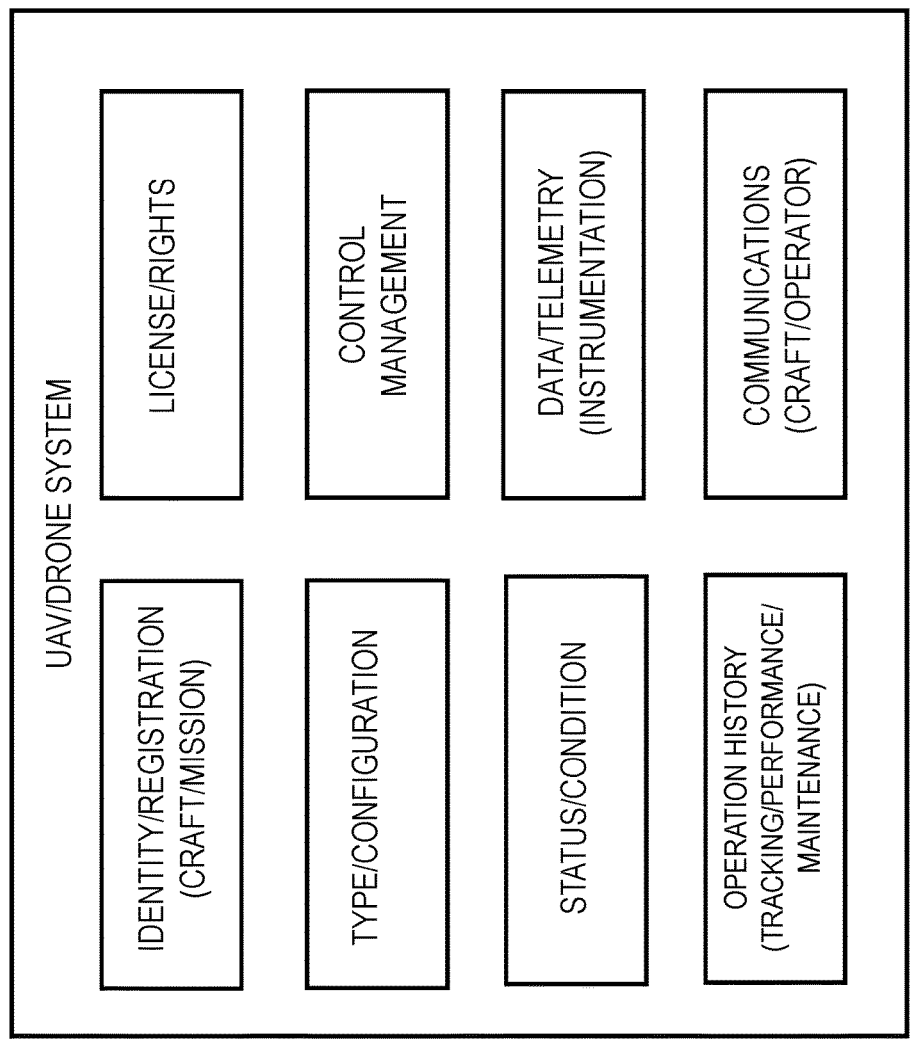
FIG. 62 is a schematic block diagram of a UAV/drone systems in the system according to an exemplary embodiment.
Figure 63:
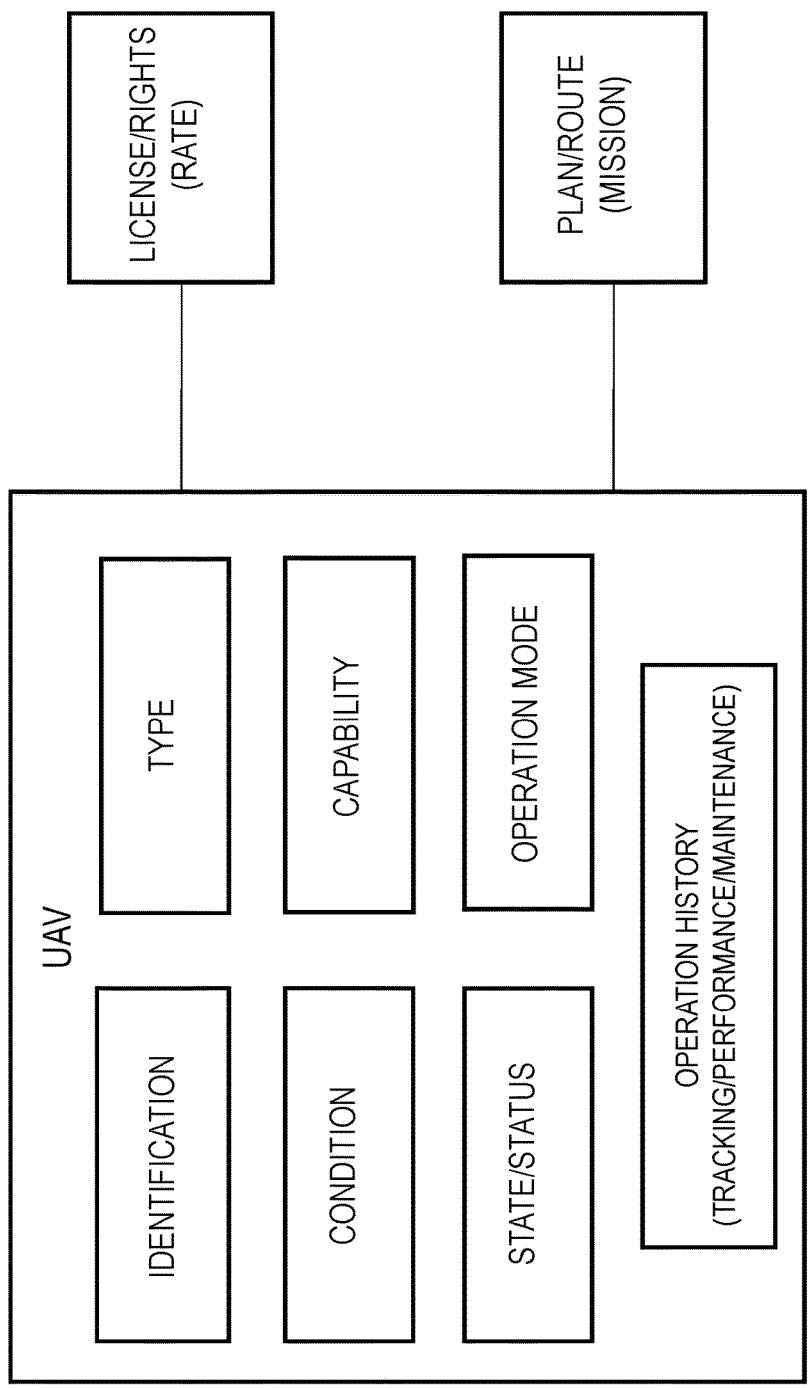
FIG. 63 is a schematic block diagram of a UAV/drone craft in the system according to an exemplary embodiment.

Referring to FIGS. 61, 62 and 63 data sets and functionality for registration and management of UAV/drone systems (UAS) and UAV/drone craft for operation in the airspace are shown schematically according to an exemplary embodiment. As indicated in FIG. 61, at the time of registration, a UAV/drone craft will be identified and given a profile (data file with identity, billing information, etc.); conditions (flyways/traffic, operating, environmental, etc.) in the airspace and state/status of the UAV/drone craft will be assessed; license rate/priority of the UAV/drone craft will be determined and registered; the duty (mission) will be registered and a route available on flyway segments/zones for the mission in the airspace will be assigned by the management system.

As indicated in FIG. 62, the UAS/operator will provide information for the system as to identity/registration of craft/mission, license rights/rate, craft type/configuration, control/management system for craft/operator, status/condition of craft, telemetry/data from the craft, operator history, other data communications.

As indicated in FIG. 63, each UAV/drone craft in operation in the airspace registered with the system will provide craft information (e.g. identification, type, condition, capability, state/status, operation mode, operation history) as well as license rights (rate) information and flight plan/route (mission) information to the system by data communication (e.g. before and/or during and/or after missions).

Dynamic Transactions—System/Craft

According to an exemplary embodiment, the system and UAV/drone craft will be configured to conduct transactions of various types such as registration and billing/payment; according to another exemplary embodiment the system and UAV/drone craft may be configured to conduct "dynamic" transactions (e.g. transactions occurring during the mission of the UAV/drone craft in the airspace or otherwise while the UAV/drone craft is in active operation in the airspace). (A "static" transaction would be a transaction occurring before the UAV/drone craft has initiated the mission in the airspace, e.g. when the UAV/drone craft is not in active operation in the airspace on the mission.)

According to an exemplary embodiment, the UAV/drone craft may be provided with the capability of conducting a dynamic transaction with the management system by any of a variety of communications including by data/network connection, by direct communication (e.g. through a direct data connection with the management system and/or through the monitoring system/detectors, through the pilot/operator of the UAV/drone craft) and by messaging/communication over other networks (e.g. direct connection, network connection, messaging/cellular link, etc.). See FIGS. 3F, 19B and 50-63.

A dynamic transaction may comprise any of a variety of transactions between a UAV craft/operator and the system, including for example modification of/modifying a route, considering modification of/modifying a route (e.g. upgrading or downgrading rights/privileges), obtaining different license rights/privileges, etc. According to an exemplary embodiment, a dynamic transaction may comprise participation in an auction or bid process, supplemental payment (e.g. to pay for an upgrade of rights/priority), refund of fee/rate (e.g. after a downgrade of rights/priority).

Process/Operation of Management System

Referring to FIGS. 64-75, processes for management of the airspace are shown schematically according to exemplary and alternative embodiments. According to an exemplary embodiment, the processes for management (e.g. administrator and control) may be operated on a computing system of the type shown in FIG. 54 (among other systems) and/or by a system of the types shown in FIGS. 50-60 (among other systems) in an airspace of the types shown in FIGS. 4A to 22B (among other airspaces) with UAV/drone craft of the type shown in FIGS. 1-3F (among other craft). According to an exemplary embodiment, the process is configured to implement some combination of functions and features of the system for management/administrator and control as indicated schematically in FIGS. 57-60 for UAV/drone craft and UAV/drone craft providing some combination of sets of data/information as indicated schematically in FIGS. 61-63. According to an exemplary embodiment, the process is configured so that UAV/drone craft can operate in flyways/zones of an airspace as indicated schematically in FIGS. 4A through 49B.

According to an exemplary embodiment, UAV/drone craft will register with the system by providing certain information (e.g. to establish identity and a profile, see FIG. 61); UAV/drone craft will also register a mission (e.g. flight plan, destination/purpose, etc.) with the system. According to an exemplary embodiment, registration with the system will require data interchange between the system and the UAV/drone craft and/or operator.

As indicated schematically in FIGS. 50-52, according to an exemplary embodiment, the system will obtain data from various data sources (e.g. data storage/history, UAV/operator profiles, detectors, network/data connections to UAV craft/operators, commercial/public databases, GPS tracking, network/data connectors to other sources, internet resources, etc.) to be used in the management/administration and control of the airspace/flyway and otherwise in the operation of the system.

As indicated, data including UAV/drone craft profile, mission/plan/route data, conditions, traffic, etc. will be used by the system to determine rates for use/access, priority, etc. for UAV/drone craft in transit in the airspace. See FIGS. 61-63. According to an exemplary embodiment, a transaction with the system (e.g. registration, licensing, payment, etc.) will occur as a precondition to the UAV/drone craft having authorized use/access to the airspace.

As indicated in FIGS. 64 to 75, the process of management (e.g. administration and/or control) of an airspace for operation of UAV/drone craft in the airspace is shown schematically and representationally according to an exemplary embodiment and alternative embodiments. (The processes are representative examples that indicate generally and specifically functions and features of the system; as indicated, according to other exemplary embodiments and alternative embodiments, the system may implement and use other processes that follow other steps or sequences of steps.)

As shown schematically in FIGS. 64-81C, a process of administrating and managing the transit/passage of a UAV/drone craft through the airspace under administration and management of the system will comprise an initial transaction with registration and evaluation of the craft and the mission of the craft (e.g. a transaction between the craft/operator and the system). According to a preferred embodiment, the craft/operator will establish an account with the system to facilitate transactions such as financial transactions and a data/network connection with the system to facilitate data communications/commands during use/access by the craft to the airspace managed by the system. For example, the craft/operator may use a financial account (e.g. credit/debit card account, bank account, etc.) for financial transactions with the system. (According to any preferred embodiment, financial transactions with the system may be conducted using known/present conventional and/or any future methods of conducting such transactions.) As indicated, according to any preferred embodiment, any invoicing/billing discrepancies in transactions with the system relating to a mission by a craft in the airspace may be addressed and resolved after the mission between the craft/operator and system using data that has been obtained/recorded during the mission.

Figure 64:
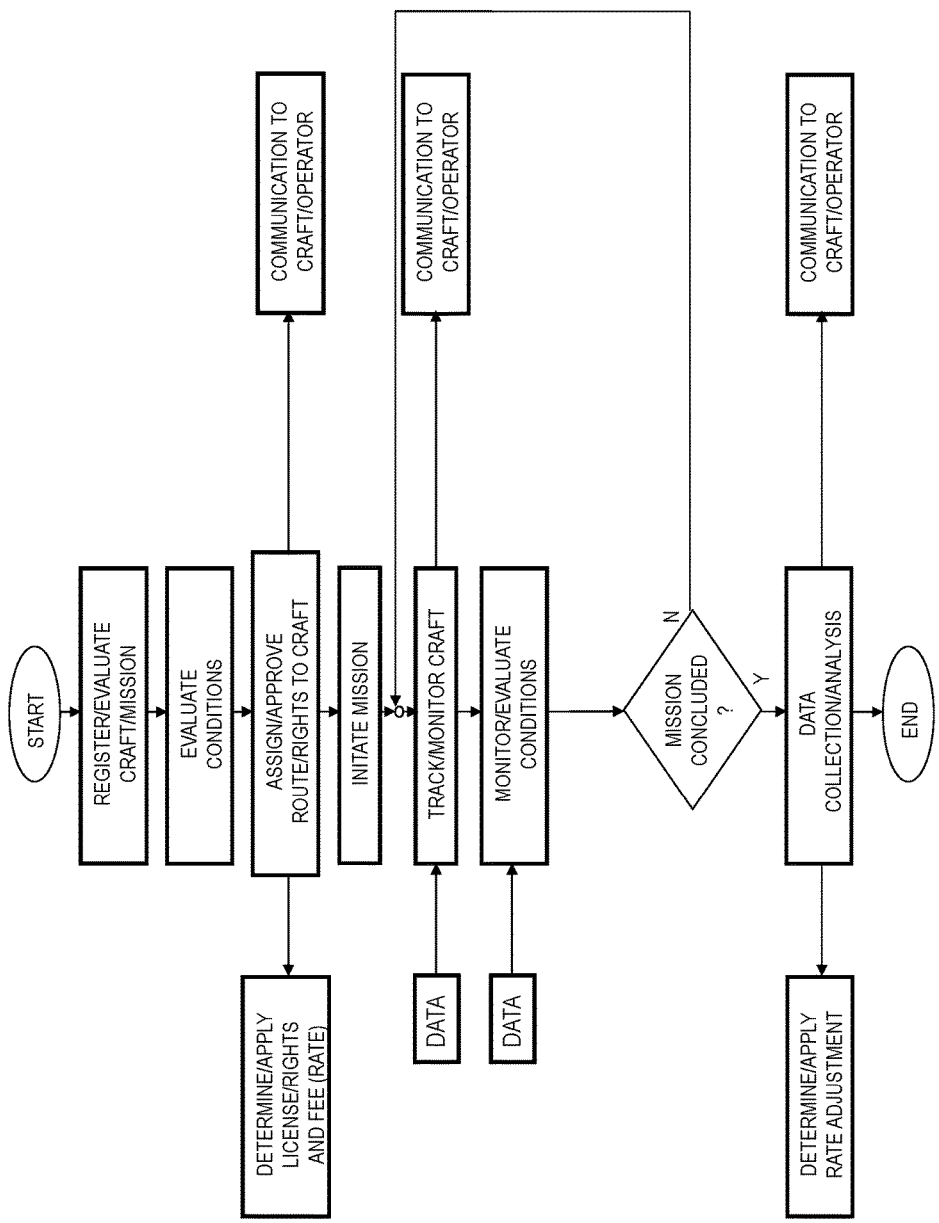
FIG. 64 is a schematic process flow diagram showing use/operation of the system/airspace according to an exemplary embodiment.

General System Operation (FIG. 64)

Referring to FIG. 64 according to an exemplary embodiment, a process for management/administration of airspace and UAV/drone craft by a system using data/data communications is shown schematically. The process indicated schematically in FIG. 64 may be used for a UAV/drone craft under the direction of an operator/remote pilot provided with the capability to monitor/control the craft in real-time and/or with and autonomous/on-board control function (e.g. with appropriate telemetry/data communications) intending to perform a proposed mission in the managed airspace, such as delivery of a parcel/payload to a location in the airspace and/or passage through the airspace.

The craft (e.g. identity, profile/type, capability, account information, etc.) and the mission (e.g. destination/purpose, flight plan, time/priority, etc.) of the craft in the airspace each are registered/evaluated by the system; a route (e.g. proposed flyway segments and zone/region access/use timing) is assigned by the system to the craft for the mission and communicated to the craft/operator.

Registration of the craft and mission by the system informs the system of relevant conditions in the airspace (e.g. traffic/status, environmental conditions/weather, events/situations, potential obstructions/alerts, etc.) to be evaluated to facilitate assignment and approval of an appropriate route and rights to the craft for the mission including a determination and application of appropriate license/rights and the proper fee/rate to be assessed to the craft/operator to perform the mission in the airspace; communication to the craft/operator facilitates initiation by the craft/operator of the mission in the airspace.

During the mission the craft is tracked and monitored (e.g. location/tracking, status, etc. by detectors and/or other data communication) as the craft is in transit/passage along the assigned/approved route with corresponding flyway segments and zones/regions in performance of the mission in the airspace; conditions in the airspace (e.g. traffic/status, environmental conditions/weather, events/situations, potential obstructions/alerts, etc.) are monitored and evaluated as the craft performs the mission in the airspace.

Tracking/monitoring by the system of the craft along the route and monitoring/evaluation by the system of conditions in the airspace will continue until the mission to be performed by the craft in the airspace is concluded; communication by the system (e.g. of data/information such as traffic, conditions, alerts, etc.) with the craft/operator during the mission facilitates performance of the mission by the craft in the airspace.

During the mission, data from tracking/monitoring (e.g. from detectors and/or obtained from the craft/operator and/or from other sources) may be used by the system for determination of adjustments of fee/rate to be assessed to the craft (e.g. based on detected/actual use of flyway segments, time-weighted use of zones/regions, etc. by the craft in the airspace); data from tracking/monitoring may also be communicated to the craft/operator for other purposes.

Upon completion by the craft of the mission in the airspace, data collection and analysis (e.g. analysis of data collected during the mission and/or of data obtained from the craft/operator and/or other sources during and/or after the mission) is conducted and completed by the system to facilitate a post-mission corroboration/determination (e.g. based on detected/actual use of flyway segments, time-weighted use of zones/regions, etc. by the craft in the airspace) and application of the fee/rate to be assessed to the craft for the detected/actual use/access to the airspace by the craft during the mission; communication/notice to the craft/operator may comprise a post-mission/final accounting and completion of the transaction between the system and the craft/operator (e.g. with final/adjusted invoicing/billing of the appropriate amount due to the appropriate account for the craft/operator for payment to the system).

Figure 65:
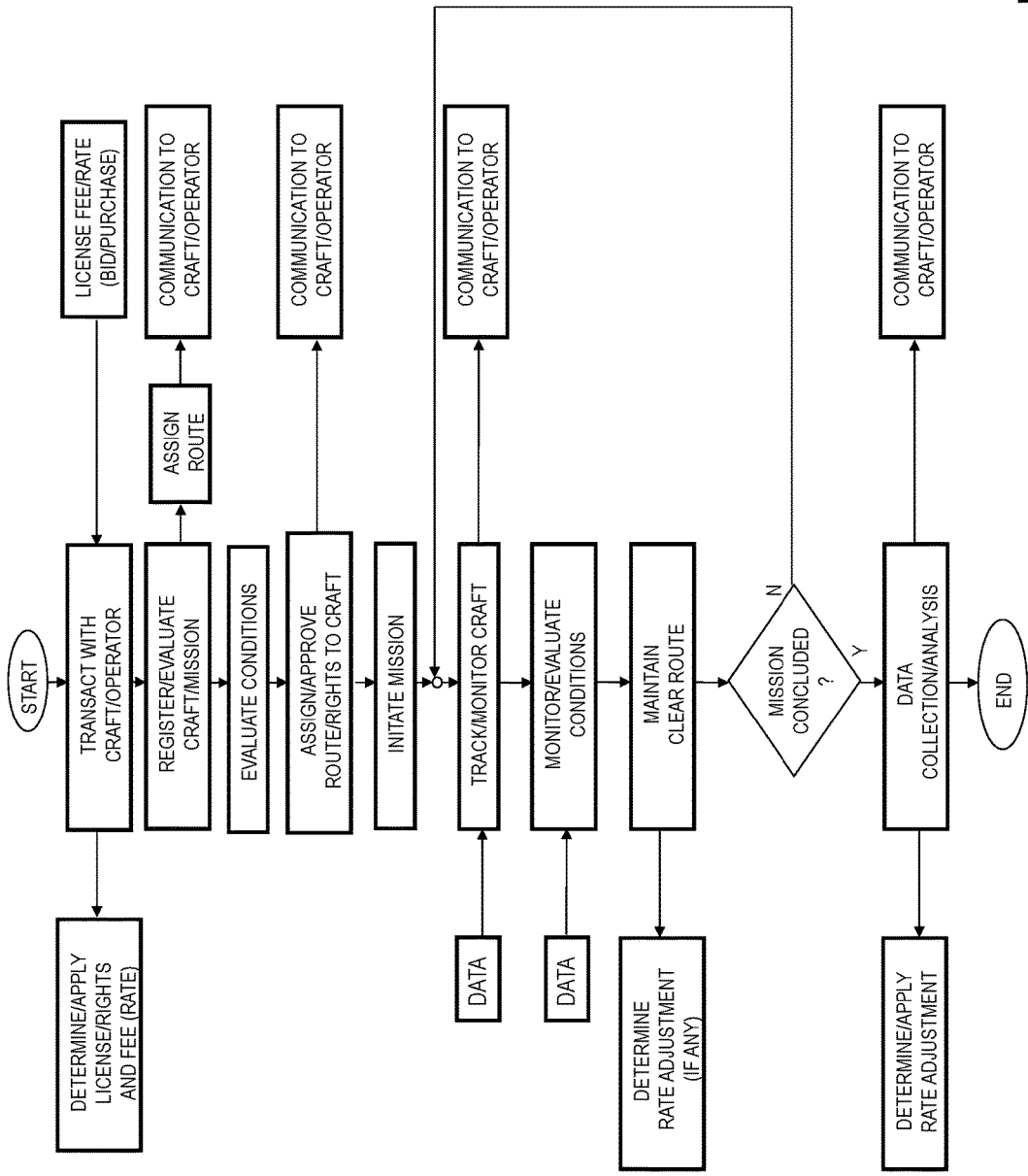
FIG. 65 is a schematic process flow diagram showing use/operation of the system/airspace according to an exemplary embodiment.

System Operation—Maintain Clear Route (FIG. 65)

Referring to FIG. 65 according to an exemplary embodiment, a process for management/administration of airspace and UAV/drone craft by a system using data/data communications is shown schematically. The process indicated schematically in FIG. 65 may be used for a UAV/drone craft under the direction of an operator/remote pilot provided with the capability to monitor/control the craft in real-time and/or with and autonomous/on-board control function (e.g. with appropriate telemetry/data communications) intending to perform a proposed mission in the managed airspace, such as delivery of a parcel/payload to a location in the airspace and/or passage through the airspace.

According to an exemplary embodiment, the system and craft/operator may initially transact (e.g. by purchase/sale, auction/bid, etc.) to determine the license/rights and fee/rate to be applied for use/access by the craft to the airspace to perform a planned mission in the airspace (e.g. transit through the airspace and/or on a delivery or route to a destination in the airspace).

The craft (e.g. identity, profile/type, capability, account information, etc.) and the mission (e.g. destination/purpose, flight plan, time/priority, etc.) of the craft in the airspace each are registered/evaluated by the system; a route (e.g. proposed flyway segments and zone/region access/use timing) is assigned by the system to the craft for the mission and communicated to the craft/operator.

Registration of the craft and mission by the system informs the system of relevant conditions in the airspace (e.g. traffic/status, environmental conditions/weather, events/situations, potential obstructions/alerts, etc.) to be evaluated to facilitate assignment and approval of an appropriate route and rights to the craft for the mission including a determination and application of appropriate license/rights and the proper fee/rate to be assessed to the craft/operator to perform the mission in the airspace; communication to the craft/operator facilitates initiation by the craft/operator of the mission in the airspace.

During the mission the craft is tracked and monitored (e.g. location/tracking, status, etc. by detectors and/or other data communication) as the craft is in transit/passage along the assigned/approved route with corresponding flyway segments and zones/regions in performance of the mission in the airspace; conditions in the airspace (e.g. traffic/status, environmental conditions/weather, events/situations, potential obstructions/alerts, etc.) are monitored and evaluated as the craft performs the mission in the airspace.

Tracking/monitoring by the system of the craft along the route and monitoring/evaluation by the system of conditions in the airspace will continue until the mission, to be performed by the craft in the airspace, is concluded; communication by the system (e.g. of data/information such as traffic, conditions, alerts, etc.) with the craft/operator during the mission facilitates performance of the mission by the craft in the airspace.

During the mission, data from tracking/monitoring (e.g. from detectors and/or obtained from the craft/operator and/or from other sources) may be used by the system for determination of adjustments of fee/rate to be assessed to the craft (e.g. based on detected/actual use of flyway segments, time-weighted use of zones/regions, etc. by the craft in the airspace); data from tracking/monitoring may also be communicated to the craft/operator for other purposes. For example, as indicated, to maintain a clear route for the craft to complete the mission in the airspace (e.g. by routing/re-routing other craft of lower priority in accordance with the priority/rights obtained and assigned for the craft). As indicated schematically in FIGS. 33A/B-34A/B, 35-36, 48A/B-49A/B, a lower-priority craft that may be a potential obstruction to a higher-priority craft may be directed to move to another flyway lane or to reroute to another flyway segment or to exit the flyway to give clearance to the higher-priority craft.

Upon completion by the craft of the mission in the airspace, data collection and analysis (e.g. analysis of data collected during the mission and/or of data obtained from the craft/operator and/or other sources during and/or after the mission) is conducted and completed by the system to facilitate a post-mission corroboration/determination (e.g. based on detected/actual use of flyway segments, time-weighted use of zones/regions, etc. by the craft in the airspace) and application of the fee/rate to be assessed to the craft for the detected/actual use/access to the airspace by the craft during the mission; communication/notice to the craft/operator may comprise a post-mission/final accounting and completion of the transaction between the system and the craft/operator (e.g. with final/adjusted invoicing/billing of the appropriate amount due to the appropriate account for the craft/operator for payment to the system).

Figure 66:
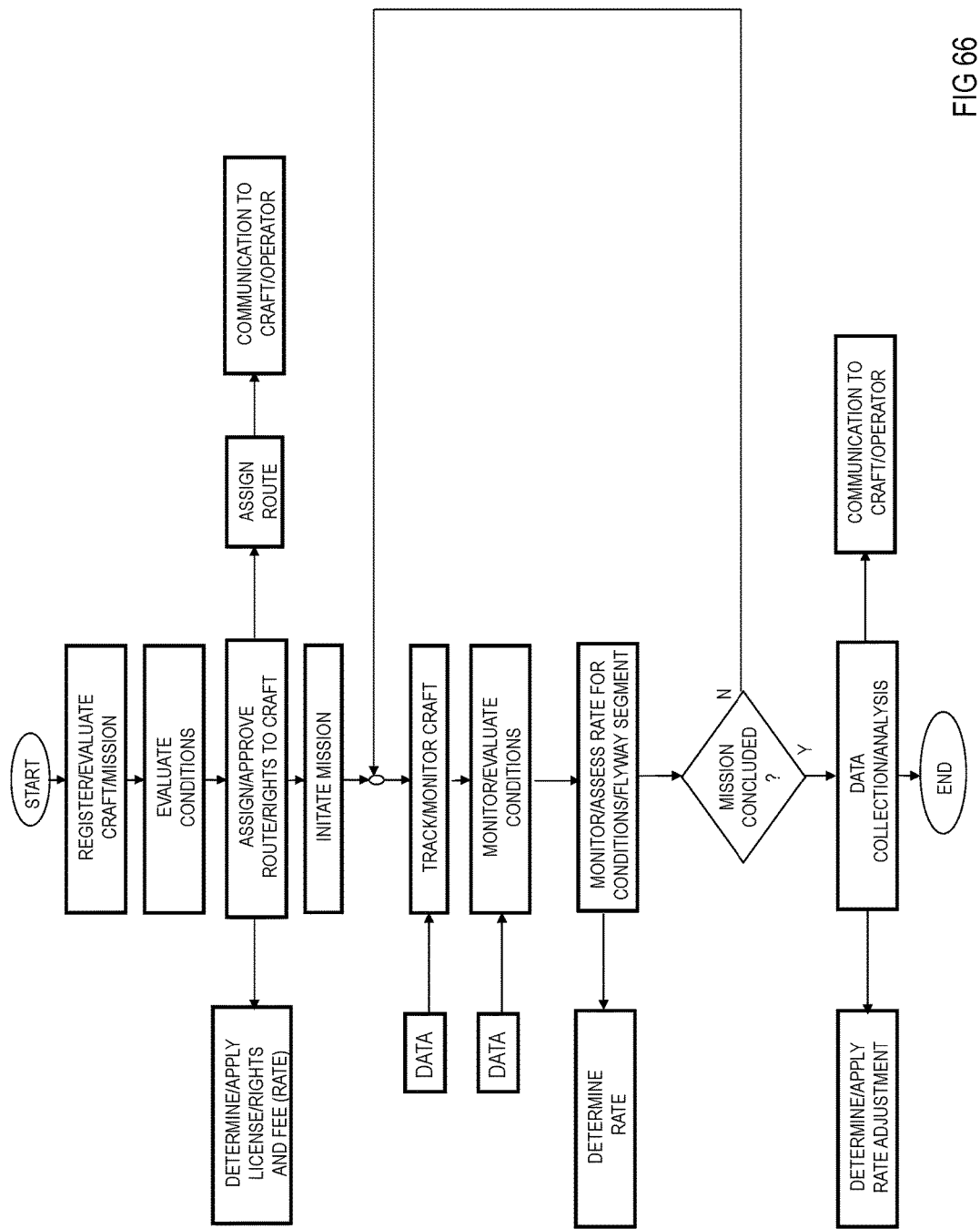
FIG. 66 is a schematic process flow diagram showing use/operation of the system/airspace according to an exemplary embodiment.

System Operation—Dynamic Rate Adjustment
(FIG. 66)

Referring to FIG. 66 according to an exemplary embodiment, a process for management/administration of airspace and UAV/drone craft by a system using data/data communications is shown schematically. The process indicated schematically in FIG. 66 may be used for a UAV/drone craft under the direction of an operator/remote pilot provided with the capability to monitor/control the craft in real-time and for dynamic transaction with the system and/or with and autonomous/on-board control function (e.g. with appropriate telemetry/data communications) intending to perform a proposed mission in the managed airspace, such as delivery of a parcel/payload to a location in the airspace and/or passage through the airspace.

According to an exemplary embodiment, the system and craft/operator may initially transact (e.g. by purchase/sale, auction/bid, etc.) to determine the license/rights and fee/rate to be applied for use/access by the craft to the airspace to perform a planned mission in the airspace (e.g. transit through the airspace and/or on a delivery or route to a destination in the airspace). As indicated, the transaction may permit dynamic transaction (pricing) of the rate to be paid by the craft for use/access to the airspace (e.g. rates that may increase or decrease as a function of time, traffic, other conditions).

The craft (e.g. identity, profile/type, capability, account information, etc.) and the mission (e.g. destination/purpose, flight plan, time/priority, etc.) of the craft in the airspace each are registered/evaluated by the system; a route (e.g. proposed flyway segments and zone/region access/use timing) is assigned by the system to the craft for the mission and communicated to the craft/operator.

Registration of the craft and mission by the system informs the system of relevant conditions in the airspace (e.g. traffic/status, environmental conditions/weather, events/situations, potential obstructions/alerts, etc.) to be evaluated to facilitate assignment and approval of an appropriate route and rights to the craft for the mission including a determination and application of appropriate license/rights and the proper fee/rate to be assessed to the craft/operator to perform the mission in the airspace; communication to the craft/operator facilitates initiation by the craft/operator of the mission in the airspace.

During the mission the craft is tracked and monitored (e.g. location/tracking, status, etc. by detectors and/or other data communication) as the craft is in transit/passage along the assigned/approved route with corresponding flyway segments and zones/regions in performance of the mission in the airspace; conditions in the airspace (e.g. traffic/status, environmental conditions/weather, events/situations, potential obstructions/alerts, etc.) are monitored and evaluated as the craft performs the mission in the airspace.

Tracking/monitoring by the system of the craft along the route and monitoring/evaluation by the system of conditions in the airspace will continue until the mission to be performed by the craft in the airspace is concluded; communication by the system (e.g. of data/information such as traffic, conditions, alerts, etc.) with the craft/operator during the mission facilitates performance of the mission by the craft in the airspace.

During the mission, data from tracking/monitoring (e.g. from detectors and/or obtained from the craft/operator and/or from other sources) may be used by the system for determination of adjustments of fee/rate to be assessed to the craft (e.g. based on detected/actual use of flyway segments, time-weighted use of zones/regions, etc. by the craft in the airspace); data from tracking/monitoring may also be communicated to the craft/operator for other purposes. For example, as indicated, where the system and craft are configured for dynamic transaction (e.g. pricing) the monitored conditions in the flyway (e.g. a flyway segment or zone/region) may result in corresponding monitored adjustment of the rate applicable to the craft under the conditions in the airspace (e.g. rates increase for transit in peak time periods or high traffic volume conditions and rate decreases in off-peak time periods).

Upon completion by the craft of the mission in the airspace, data collection and analysis (e.g. analysis of data collected during the mission and/or of data obtained from the craft/operator and/or other sources during and/or after the mission) is conducted and completed by the system to facilitate a post-mission corroboration/determination (e.g. based on detected/actual use of flyway segments, time-weighted use of zones/regions, etc. by the craft in the airspace) and application of the fee/rate to be assessed to the craft for the detected/actual use/access to the airspace by the craft during the mission; communication/notice to the craft/operator may comprise a post-mission/final accounting and completion of the transaction between the system and the craft/operator (e.g. with final/adjusted invoicing/billing of the appropriate amount due to the appropriate account for the craft/operator).

Figure 67:
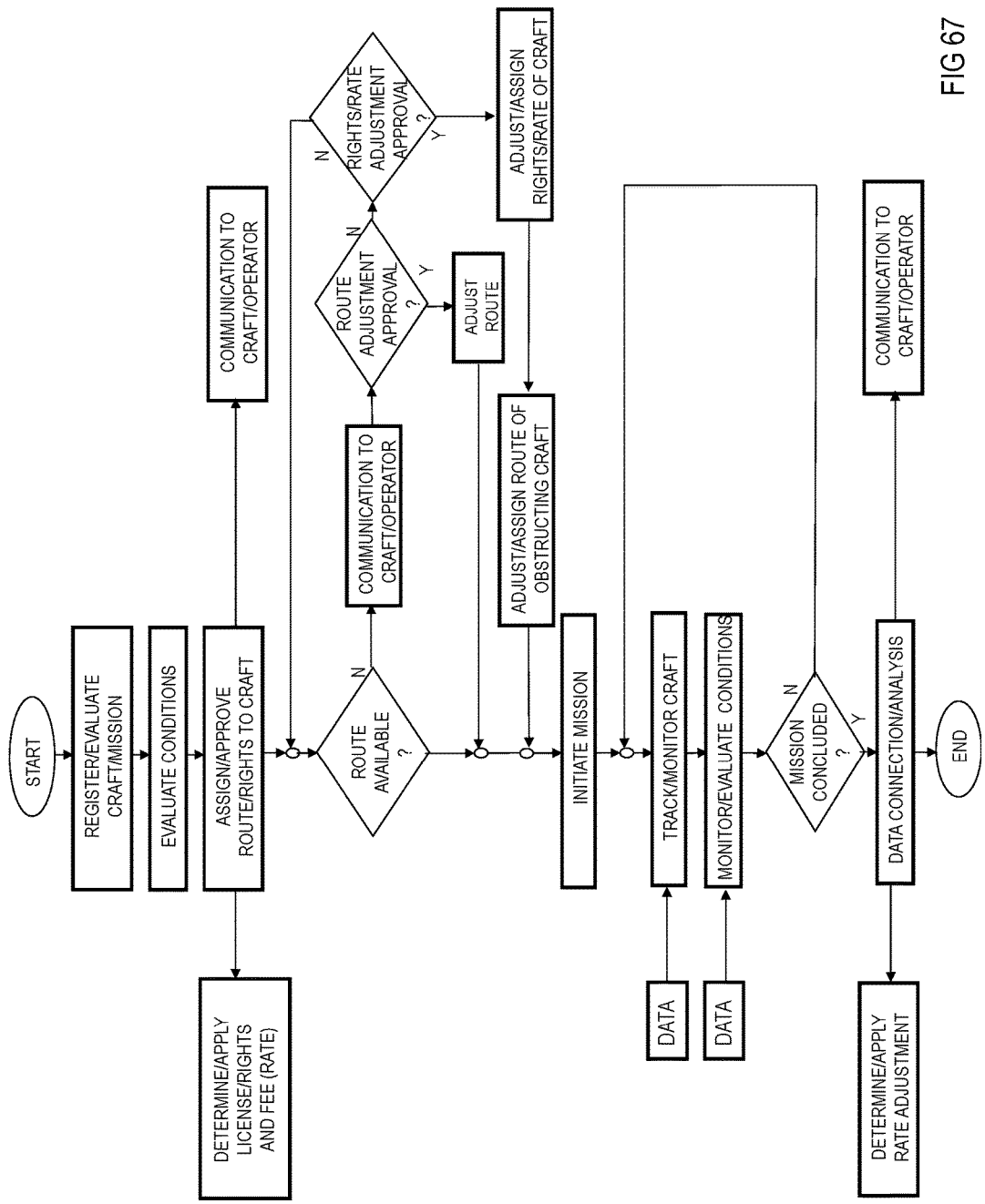
FIG. 67 is a schematic process flow diagram showing use/operation of the system/airspace according to an exemplary embodiment.

System Operation—Route Availability (FIG. 67)

Referring to FIG. 67 according to an exemplary embodiment, a process for management/administration of an airspace and UAV/drone craft by a system using data/data communications is shown schematically. The process indicated schematically in FIG. 67 may be used for a UAV/drone craft under the direction of an operator/remote pilot provided with the capability to monitor/control the craft in real-time and/or with and autonomous/on-board control function (e.g. with appropriate telemetry/data communications) intending to perform a proposed mission in the managed airspace, such as delivery of a parcel/payload to a location in the airspace and/or passage through the airspace.

According to an exemplary embodiment, the system and craft/operator may initially transact (e.g. by purchase/sale, auction/bid, etc.) to determine the license/rights and fee/rate to be applied for use/access by the craft to the airspace to perform a planned mission in the airspace (e.g. transit through the airspace and/or on a delivery or route to a destination in the airspace).

The craft (e.g. identity, profile/type, capability, account information, etc.) and the mission (e.g. destination/purpose, flight plan, time/priority, etc.) of the craft in the airspace each are registered/evaluated by the system; a route (e.g. proposed flyway segments and zone/region access/use timing) is assigned by the system to the craft for the mission and communicated to the craft/operator.

Registration of the craft and mission by the system informs the system of relevant conditions in the airspace (e.g. traffic/status, environmental conditions/weather, events/situations, potential obstructions/alerts, etc.) to be evaluated to facilitate assignment and approval of an appropriate route and rights to the craft for the mission including a determination and application of appropriate license/rights and the proper fee/rate to be assessed to the craft/operator to perform the mission in the airspace; communication to the craft/operator facilitates initiation by the craft/operator of the mission in the airspace if a proposed route is available for the craft. As indicated, if the proposed route is unavailable for the craft the craft/operator will be informed and may be able to approve/adjust the route and to make any required adjustment of route/flights so that any potentially obstructing craft on the route is rerouted.

During the mission the craft is tracked and monitored (e.g. location/tracking, status, etc. by detectors and/or other data communication) as the craft is in transit/passage along the assigned/approved route with corresponding flyway segments and zones/regions in performance of the mission in the airspace; conditions in the airspace (e.g. traffic/status, environmental conditions/weather, events/situations, potential obstructions/alerts, etc.) are monitored and evaluated as the craft performs the mission in the airspace.

Tracking/monitoring by the system of the craft along the route and monitoring/evaluation by the system of conditions in the airspace will continue until the mission to be performed by the craft in the airspace is concluded; communication by the system (e.g. of data/information such as traffic, conditions, alerts, etc.) with the craft/operator during the mission facilitates performance of the mission by the craft in the airspace.

During the mission, data from tracking/monitoring (e.g. from detectors and/or obtained from the craft/operator and/or from other sources) may be used by the system for determination of adjustments of fee/rate to be assessed to the craft (e.g. based on detected/actual use of flyway segments, time-weighted use of zones/regions, etc. by the craft in the airspace); data from tracking/monitoring may also be communicated to the craft/operator for other purposes. (As indicated, if the craft has obtained appropriate priority rights potentially obstructing craft will have been routed/re-routed to clear the route for the craft.)

Upon completion by the craft of the mission in the airspace, data collection and analysis (e.g. analysis of data collected during the mission and/or of data obtained from the craft/operator and/or other sources during and/or after the mission) is conducted and completed by the system to facilitate a post-mission corroboration/determination (e.g. based on detected/actual use of flyway segments, time-weighted use of zones/regions, etc. by the craft in the airspace) and application of the fee/rate to be assessed to the craft for the detected/actual use/access to the airspace by the craft during the mission; communication/notice to the craft/operator may comprise a post-mission/final accounting and completion of the transaction between the system and the craft/operator (e.g. with final/adjusted invoicing/billing of the appropriate amount due to the appropriate account for the craft/operator for payment to the system).

Figure 68:
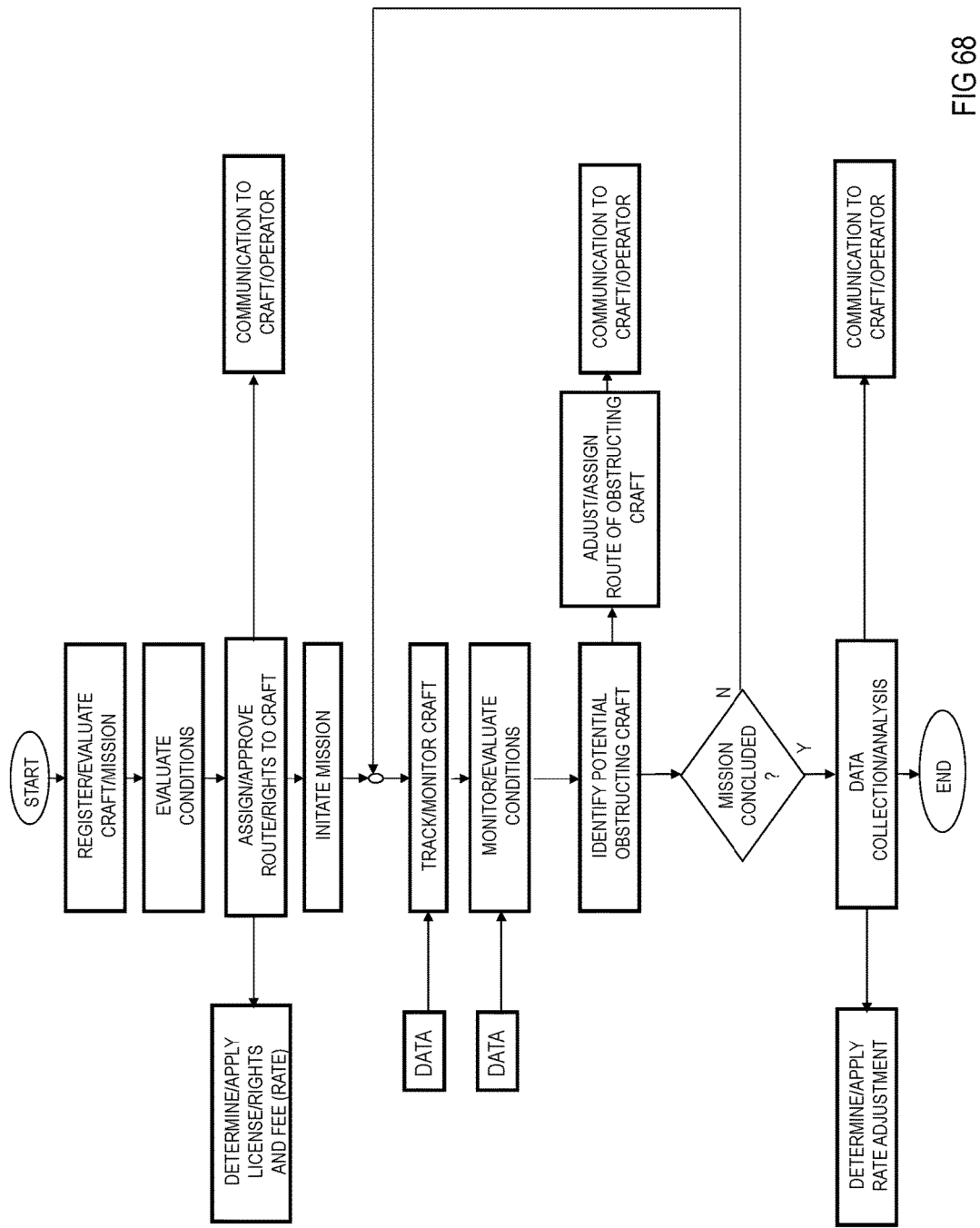
FIG. 68 is a schematic process flow diagram showing use/operation of the system/airspace according to an exemplary embodiment.

System Operation—Re-Route Obstructing Craft
(FIG. 68)

Referring to FIG. 68 according to an exemplary embodiment, a process for management/administration of airspace and UAV/drone craft by a system using data/data communications is shown schematically. The process indicated schematically in FIG. 68 may be used for a UAV/drone craft under the direction of an operator/remote pilot provided with the capability to monitor/control the craft in real-time and/or with and autonomous/on-board control function (e.g. with appropriate telemetry/data communications) intending to perform a proposed mission in the managed airspace, such as delivery of a parcel/payload to a location in the airspace and/or passage through the airspace.

According to an exemplary embodiment, the system and craft/operator may initially transact (e.g. by purchase/sale, auction/bid, etc.) to determine the license/rights and fee/rate to be applied for use/access by the craft to the airspace to perform a planned mission in the airspace (e.g. transit through the airspace and/or on a delivery or route to a destination in the airspace). As indicated, the craft has obtained a license/rate that provides priority over potentially obstructing craft along the route.

The craft (e.g. identity, profile/type, capability, account information, etc.) and the mission (e.g. destination/purpose, flight plan, time/priority, etc.) of the craft in the airspace each are registered/evaluated by the system; a route (e.g. proposed flyway segments and zone/region access/use timing) is assigned by the system to the craft for the mission and communicated to the craft/operator.

Registration of the craft and mission by the system informs the system of relevant conditions in the airspace (e.g. traffic/status, environmental conditions/weather, events/situations, potential obstructions/alerts, etc.) to be evaluated to facilitate assignment and approval of an appropriate route and rights to the craft for the mission including a determination and application of appropriate license/rights and the proper fee/rate to be assessed to the craft/operator to perform the mission in the airspace; communication to the craft/operator facilitates initiation by the craft/operator of the mission in the airspace.

During the mission the craft is tracked and monitored (e.g. location/tracking, status, etc. by detectors and/or other data communication) as the craft is in transit/passage along the assigned/approved route with corresponding flyway segments and zones/regions in performance of the mission in the airspace; conditions in the airspace (e.g. traffic/status, environmental conditions/weather, events/situations, potential obstructions/alerts, etc.) are monitored and evaluated as the craft performs the mission in the airspace.

Tracking/monitoring by the system of the craft along the route and monitoring/evaluation by the system of conditions in the airspace will continue until the mission to be performed by the craft in the airspace is concluded; communication by the system (e.g. of data/information such as traffic, conditions, alerts, etc.) with the craft/operator during the mission facilitates performance of the mission by the craft in the airspace.

During the mission, data from tracking/monitoring (e.g. from detectors and/or obtained from the craft/operator and/or from other sources) may be used by the system for determination of adjustments of fee/rate to be assessed to the craft (e.g. based on detected/actual use of flyway segments, time-weighted use of zones/regions, etc. by the craft in the airspace); data from tracking/monitoring may also be communicated to the craft/operator for other purposes. For example, as indicated, any potentially obstructing craft on the route of the craft will be rerouted.

Upon completion by the craft of the mission in the airspace, data collection and analysis (e.g. analysis of data collected during the mission and/or of data obtained from the craft/operator and/or other sources during and/or after the mission) is conducted and completed by the system to facilitate a post-mission corroboration/determination (e.g. based on detected/actual use of flyway segments, time-weighted use of zones/regions, etc. by the craft in the airspace) and application of the fee/rate to be assessed to the craft for the detected/actual use/access to the airspace by the craft during the mission; communication/notice to the craft/operator may comprise a post-mission/final accounting and completion of the transaction between the system and the craft/operator (e.g. with final/adjusted invoicing/billing of the appropriate amount due to the appropriate account for the craft/operator for payment to the system).

Figure 69:
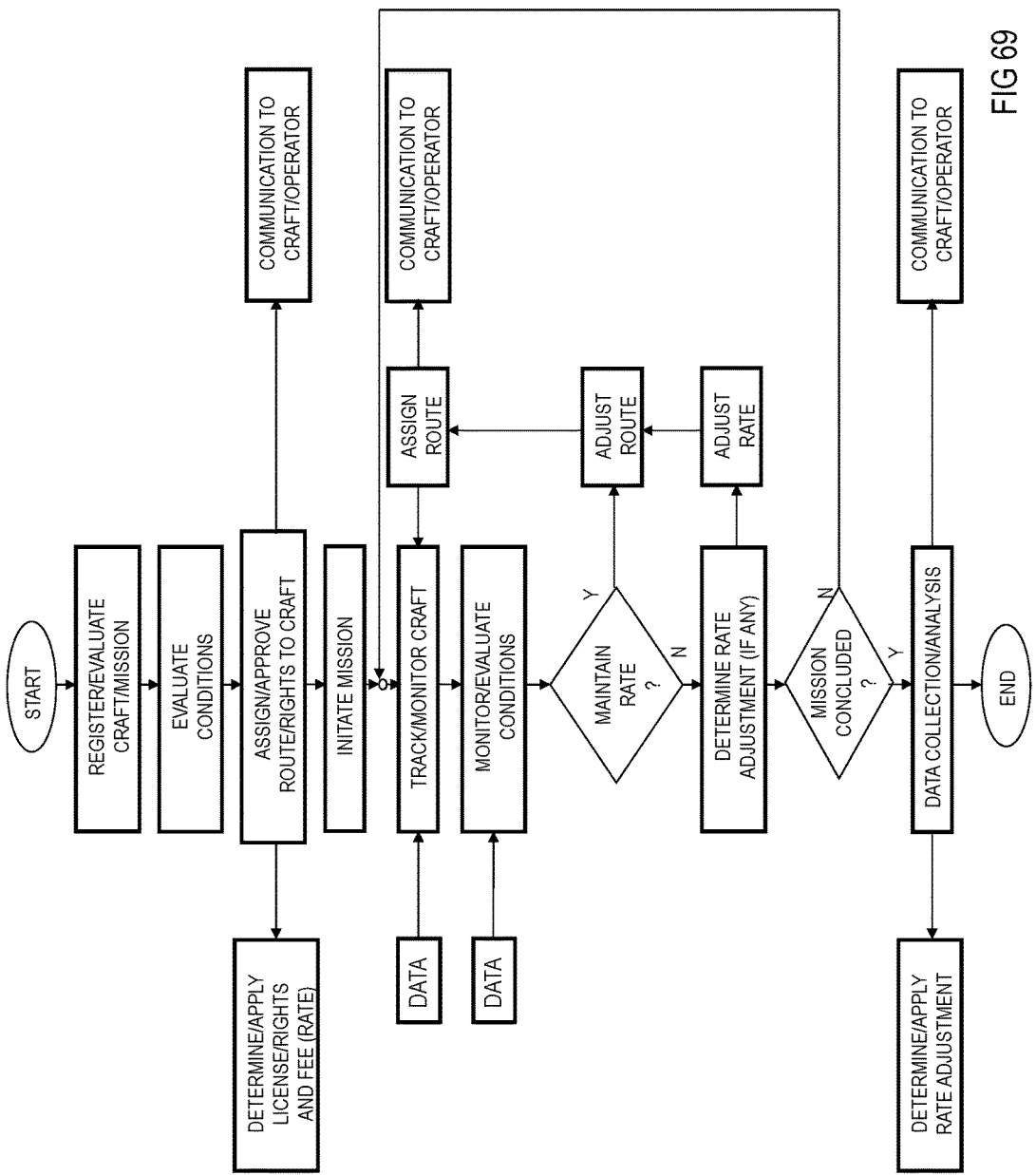
FIG. 69 is a schematic process flow diagram showing use/operation of the system/airspace according to an exemplary embodiment.

System Operation—Maintain Rate/Dynamic (FIG. 69)

Referring to FIG. 69 according to an exemplary embodiment, a process for management/administration of airspace and UAV/drone craft by a system using data/data communications is shown schematically. The process indicated schematically in FIG. 69 may be used for a UAV/drone craft under the direction of an operator/remote pilot provided with the capability to monitor/control the craft in real-time and/or with and autonomous/on-board control function (e.g. with appropriate telemetry/data communications) intending to perform a proposed mission in the managed airspace, such as delivery of a parcel/payload to a location in the airspace and/or passage through the airspace.

According to an exemplary embodiment, the system and craft/operator may initially transact (e.g. by purchase/sale, auction/bid, etc.) to determine the license/rights and fee/rate to be applied for use/access by the craft to the airspace to perform a planned mission in the airspace (e.g. transit through the airspace and/or on a delivery or route to a destination in the airspace).

The craft (e.g. identity, profile/type, capability, account information, etc.) and the mission (e.g. destination/purpose, flight plan, time/priority, etc.) of the craft in the airspace each are registered/evaluated by the system; a route (e.g. proposed flyway segments and zone/region access/use timing) is assigned by the system to the craft for the mission and communicated to the craft/operator.

Registration of the craft and mission by the system informs the system of relevant conditions in the airspace (e.g. traffic/status, environmental conditions/weather, events/situations, potential obstructions/alerts, etc.) to be evaluated to facilitate assignment and approval of an appropriate route and rights to the craft for the mission including a determination and application of appropriate license/rights and the proper fee/rate to be assessed to the craft/operator to perform the mission in the airspace; communication to the craft/operator facilitates initiation by the craft/operator of the mission in the airspace.

During the mission the craft is tracked and monitored (e.g. location/tracking, status, etc. by detectors and/or other data communication) as the craft is in transit/passage along the assigned/approved route with corresponding flyway segments and zones/regions in performance of the mission in the airspace; conditions in the airspace (e.g. traffic/status, environmental conditions/weather, events/situations, potential obstructions/alerts, etc.) are monitored and evaluated as the craft performs the mission in the airspace.

Tracking/monitoring by the system of the craft along the route and monitoring/evaluation by the system of conditions in the airspace will continue until the mission to be performed by the craft in the airspace is concluded; communication by the system (e.g. of data/information such as traffic, conditions, alerts, etc.) with the craft/operator during the mission facilitates performance of the mission by the craft in the airspace.

During the mission, data from tracking/monitoring (e.g. from detectors and/or obtained from the craft/operator and/or from other sources) may be used by the system for determination of adjustments of fee/rate to be assessed to the craft (e.g. based on detected/actual use of flyway segments, time-weighted use of zones/regions, etc. by the craft in the airspace); data from tracking/monitoring may also be communicated to the craft/operator for other purposes. For example, as indicated, if conditions develop in the airspace that require a dynamic transaction (e.g. rate adjustment or rerouting, priority conflict with other craft, etc.) the craft/operator will be given an opportunity to adjust/increase the rate and maintain the rate with rate adjustment or to maintain the rate and adjust the route (e.g. to a route where the rate is applicable or where the craft is not an obstruction to a higher-priority craft).

Upon completion by the craft of the mission in the airspace, data collection and analysis (e.g. analysis of data collected during the mission and/or of data obtained from the craft/operator and/or other sources during and/or after the mission) is conducted and completed by the system to facilitate a post-mission corroboration/determination (e.g. based on detected/actual use of flyway segments, time-weighted use of zones/regions, etc. by the craft in the airspace) and application of the fee/rate to be assessed to the craft for the detected/actual use/access to the airspace by the craft during the mission; communication/notice to the craft/operator may comprise a post-mission/final accounting and completion of the transaction between the system and the craft/operator (e.g. with final/adjusted invoicing/billing of the appropriate amount due to the appropriate account for the craft/operator for payment to the system).

Figure 70:
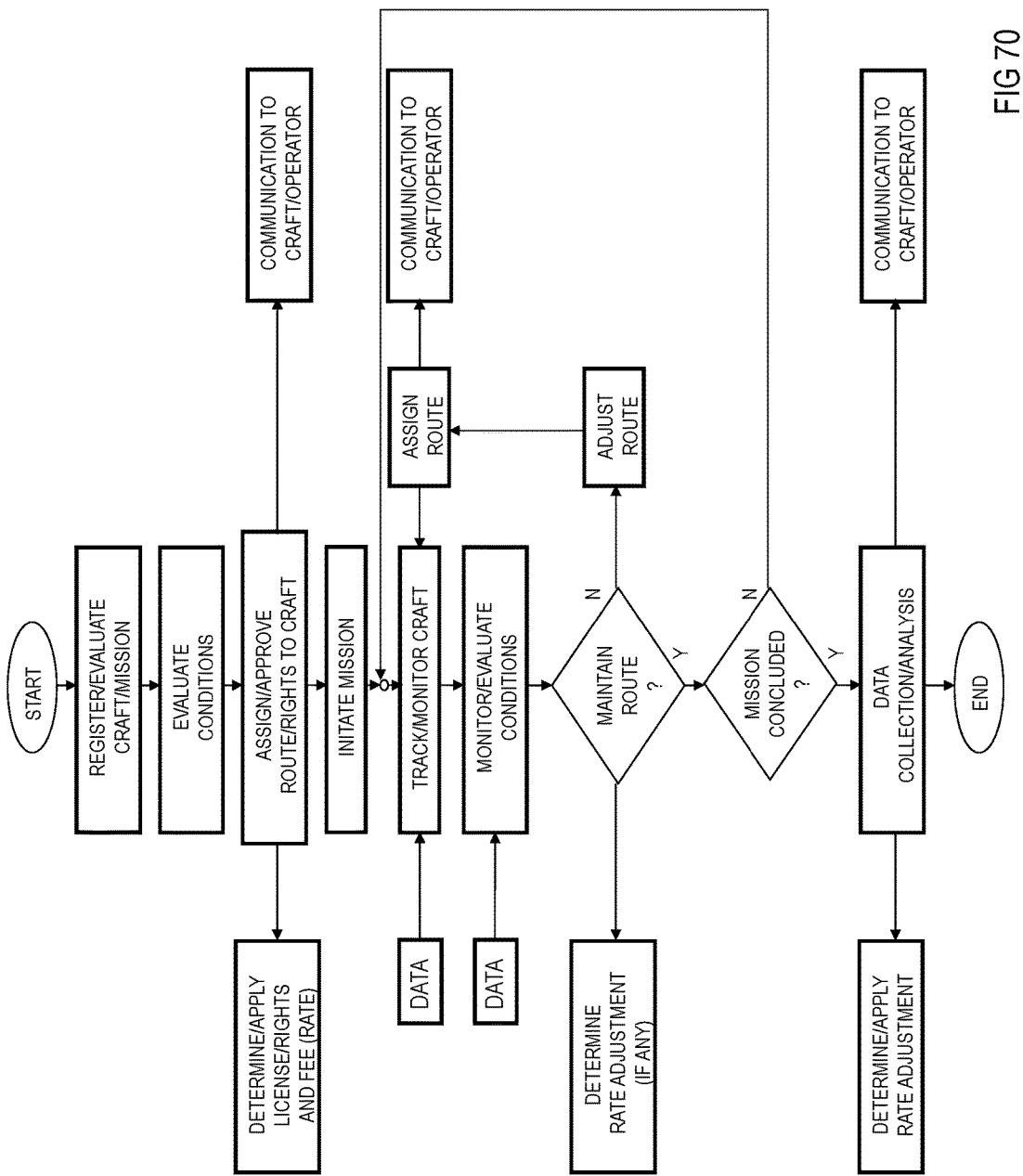
FIG. 70 is a schematic process flow diagram showing use/operation of the system/airspace according to an exemplary embodiment.

System Operation—Maintain Rate/Dynamic (FIG. 70)

Referring to FIG. 70 according to an exemplary embodiment a process for management/administration of airspace and UAV/drone craft by a system using data/data communications is shown schematically. The process indicated schematically in FIG. 70 may be used for a UAV/drone craft under the direction of an operator/remote pilot provided with the capability to monitor/control the craft in real-time and for dynamic transaction (e.g. pricing/rates) with the system and/or with and autonomous/on-board control function (e.g. with appropriate telemetry/data communications) intending to perform a proposed mission in the managed airspace, such as delivery of a parcel/payload to a location in the airspace and/or passage through the airspace.

According to an exemplary embodiment, the system and craft/operator may initially transact (e.g. by purchase/sale, auction/bid, etc.) to determine the license/rights and fee/rate to be applied for use/access by the craft to the airspace to perform a planned mission in the airspace (e.g. transit through the airspace and/or on a delivery or route to a destination in the airspace).

The craft (e.g. identity, profile/type, capability, account information, etc.) and the mission (e.g. destination/purpose, flight plan, time/priority, etc.) of the craft in the airspace each are registered/evaluated by the system; a route (e.g. proposed flyway segments and zone/region access/use timing) is assigned by the system to the craft for the mission and communicated to the craft/operator.

Registration of the craft and mission by the system informs the system of relevant conditions in the airspace (e.g. traffic/status, environmental conditions/weather, events/situations, potential obstructions/alerts, etc.) to be evaluated to facilitate assignment and approval of an appropriate route and rights to the craft for the mission including a determination and application of appropriate license/rights and the proper fee/rate to be assessed to the craft/operator to perform the mission in the airspace; communication to the craft/operator facilitates initiation by the craft/operator of the mission in the airspace.

During the mission the craft is tracked and monitored (e.g. location/tracking, status, etc. by detectors and/or other data communication) as the craft is in transit/passage along the assigned/approved route with corresponding flyway segments and zones/regions in performance of the mission in the airspace; conditions in the airspace (e.g. traffic/status, environmental conditions/weather, events/situations, potential obstructions/alerts, etc.) are monitored and evaluated as the craft performs the mission in the airspace.

Tracking/monitoring by the system of the craft along the route and monitoring/evaluation by the system of conditions in the airspace will continue until the mission to be performed by the craft in the airspace is concluded; communication by the system (e.g. of data/information such as traffic, conditions, alerts, etc.) with the craft/operator during the mission facilitates performance of the mission by the craft in the airspace.

During the mission, data from tracking/monitoring (e.g. from detectors and/or obtained from the craft/operator and/or from other sources) may be used by the system for determination of adjustments of fee/rate to be assessed to the craft (e.g. based on detected/actual use of flyway segments, time-weighted use of zones/regions, etc. by the craft in the airspace); data from tracking/monitoring may also be communicated to the craft/operator for other purposes. For example, as indicated, if conditions develop in the airspace that require a dynamic transaction (e.g. rate adjustment or rerouting, priority conflict with other craft, etc.) the craft/operator will be given an opportunity to maintain the route with rate adjustment or to maintain the rate and adjust the route (e.g. to a route where the rate is applicable or where the craft is not an obstruction to a higher priority craft).

Upon completion by the craft of the mission in the airspace, data collection and analysis (e.g. analysis of data collected during the mission and/or of data obtained from the craft/operator and/or other sources during and/or after the mission) is conducted and completed by the system to facilitate a post-mission corroboration/determination (e.g. based on detected/actual use of flyway segments, time-weighted use of zones/regions, etc. by the craft in the airspace) and application of the fee/rate to be assessed to the craft for the detected/actual use/access to the airspace by the craft during the mission; communication/notice to the craft/operator may comprise a post-mission/final accounting and completion of the transaction between the system and the craft/operator (e.g. with final/adjusted invoicing/billing of the appropriate amount due to the appropriate account for the craft/operator for payment to the system).

Figure 71:
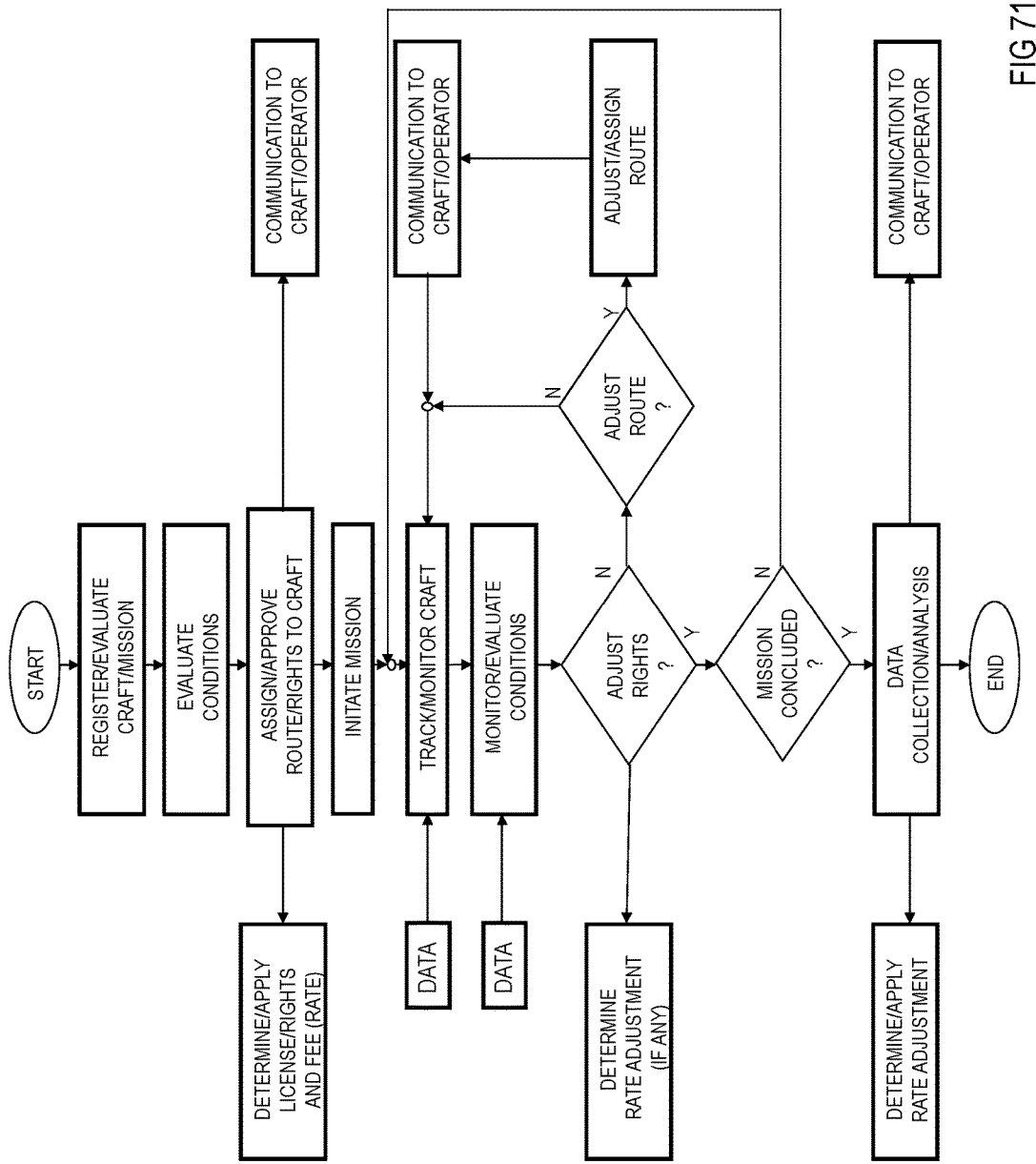
FIG. 71 is a schematic process flow diagram showing use/operation of the system/airspace according to an exemplary embodiment.

System Operation—Adjust Rights/Dynamic (FIG. 71)

Referring to FIG. 71 according to an exemplary embodiment, a process for management/administration of airspace and UAV/drone craft by a system using data/data communications is shown schematically. The process indicated schematically in FIG. 71 may be used for a UAV/drone craft under the direction of an operator/remote pilot provided with the capability to monitor/control the craft in real-time and for dynamic transaction with the system and/or with and autonomous/on-board control function (e.g. with appropriate telemetry/data communications) intending to perform a proposed mission in the managed airspace, such as delivery of a parcel/payload to a location in the airspace and/or passage through the airspace.

According to an exemplary embodiment, the system and craft/operator may initially transact (e.g. by purchase/sale, auction/bid, etc.) to determine the license/rights and fee/rate to be applied for use/access by the craft to the airspace to perform a planned mission in the airspace (e.g. transit through the airspace and/or on a delivery or route to a destination in the airspace).

The craft (e.g. identity, profile/type, capability, account information, etc.) and the mission (e.g. destination/purpose, flight plan, time/priority, etc.) of the craft in the airspace each are registered/evaluated by the system; a route (e.g. proposed flyway segments and zone/region access/use timing) is assigned by the system to the craft for the mission and communicated to the craft/operator.

Registration of the craft and mission by the system informs the system of relevant conditions in the airspace (e.g. traffic/status, environmental conditions/weather, events/situations, potential obstructions/alerts, etc.) to be evaluated to facilitate assignment and approval of an appropriate route and rights to the craft for the mission including a determination and application of appropriate license/rights and the proper fee/rate to be assessed to the craft/operator to perform the mission in the airspace; communication to the craft/operator facilitates initiation by the craft/operator of the mission in the airspace.

During the mission the craft is tracked and monitored (e.g. location/tracking, status, etc. by detectors and/or other data communication) as the craft is in transit/passage along the assigned/approved route with corresponding flyway segments and zones/regions in performance of the mission in the airspace; conditions in the airspace (e.g. traffic/status, environmental conditions/weather, events/situations, potential obstructions/alerts, etc.) are monitored and evaluated as the craft performs the mission in the airspace.

Tracking/monitoring by the system of the craft along the route and monitoring/evaluation by the system of conditions in the airspace will continue until the mission to be performed by the craft in the airspace is concluded; communication by the system (e.g. of data/information such as traffic, conditions, alerts, etc.) with the craft/operator during the mission facilitates performance of the mission by the craft in the airspace.

During the mission, data from tracking/monitoring (e.g. from detectors and/or obtained from the craft/operator and/or from other sources) may be used by the system for determination of adjustments of fee/rate to be assessed to the craft (e.g. based on detected/actual use of flyway segments, time-weighted use of zones/regions, etc. by the craft in the airspace); data from tracking/monitoring may also be communicated to the craft/operator for other purposes. For example, as indicated, conditions may develop in the airspace or otherwise for the craft/operator that cause the craft/operator to consider adjustment of rights/priority (e.g. upgrade for higher rate or downgrade for lower rate); the craft/operator may, as indicated, (e.g. an alternative) to make an adjustment of the route (e.g. to a route where the conditions allow suitable passage and/or the craft is free of obstruction as a higher priority craft) or to maintain the route with higher priority/rights (e.g. priority on the route over potentially obstructing craft).

Upon completion by the craft of the mission in the airspace, data collection and analysis (e.g. analysis of data collected during the mission and/or of data obtained from the craft/operator and/or other sources during and/or after the mission) is conducted and completed by the system to facilitate a post-mission corroboration/determination (e.g. based on detected/actual use of flyway segments, time-weighted use of zones/regions, etc. by the craft in the airspace) and application of the fee/rate to be assessed to the craft for the detected/actual use/access to the airspace by the craft during the mission; communication/notice to the craft/operator may comprise a post-mission/final accounting and completion of the transaction between the system and the craft/operator (e.g. with final/adjusted invoicing/billing of the appropriate amount due to the appropriate account for the craft/operator for payment to the system).

Figure 72:
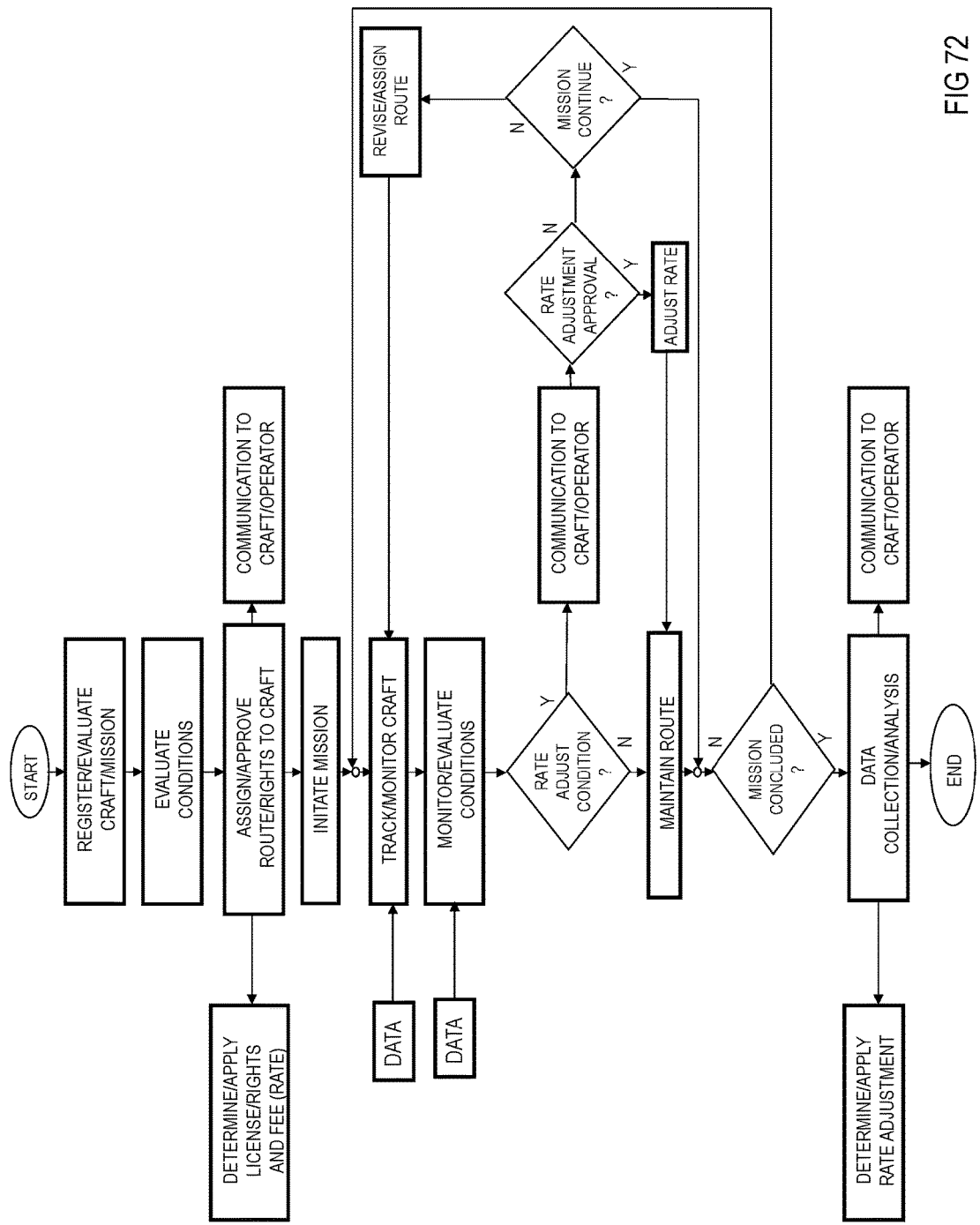
FIG. 72 is a schematic process flow diagram showing use/operation of the system/airspace according to an exemplary embodiment.

System Operation—Rate Adjust Condition (FIG. 72)

Referring to FIG. 72 according to an exemplary embodiment, a process for management/administration of airspace and UAV/drone craft by a system using data/data communications is shown schematically. The process indicated schematically in FIG. 72 may be used for a UAV/drone craft under the direction of an operator/remote pilot provided with the capability to monitor/control the craft in real-time and for dynamic transaction with the system and/or with and autonomous/on-board control function (e.g. with appropriate telemetry/data communications) intending to perform a proposed mission in the managed airspace, such as delivery of a parcel/payload to a location in the airspace and/or passage through the airspace.

According to an exemplary embodiment, the system and craft/operator may initially transact (e.g. by purchase/sale, auction/bid, etc.) to determine the license/rights and fee/rate to be applied for use/access by the craft to the airspace to perform a planned mission in the airspace (e.g. transit through the airspace and/or on a delivery or route to a destination in the airspace).

The craft (e.g. identity, profile/type, capability, account information, etc.) and the mission (e.g. destination/purpose, flight plan, time/priority, etc.) of the craft in the airspace each are registered/evaluated by the system; a route (e.g. proposed flyway segments and zone/region access/use timing) is assigned by the system to the craft for the mission and communicated to the craft/operator.

Registration of the craft and mission by the system informs the system of relevant conditions in the airspace (e.g. traffic/status, environmental conditions/weather, events/situations, potential obstructions/alerts, etc.) to be evaluated to facilitate assignment and approval of an appropriate route and rights to the craft for the mission including a determination and application of appropriate license/rights and the proper fee/rate to be assessed to the craft/operator to perform the mission in the airspace; communication to the craft/operator facilitates initiation by the craft/operator of the mission in the airspace.

During the mission the craft is tracked and monitored (e.g. location/tracking, status, etc. by detectors and/or other data communication) as the craft is in transit/passage along the assigned/approved route with corresponding flyway segments and zones/regions in performance of the mission in the airspace; conditions in the airspace (e.g. traffic/status, environmental conditions/weather, events/situations, potential obstructions/alerts, etc.) are monitored and evaluated as the craft performs the mission in the airspace.

Tracking/monitoring by the system of the craft along the route and monitoring/evaluation by the system of conditions in the airspace will continue until the mission to be performed by the craft in the airspace is concluded; communication by the system (e.g. of data/information such as traffic, conditions, alerts, etc.) with the craft/operator during the mission facilitates performance of the mission by the craft in the airspace.

During the mission, data from tracking/monitoring (e.g. from detectors and/or obtained from the craft/operator and/or from other sources) may be used by the system for determination of adjustments of fee/rate to be assessed to the craft (e.g. based on detected/actual use of flyway segments, time-weighted use of zones/regions, etc. by the craft in the airspace); data from tracking/monitoring may also be communicated to the craft/operator for other purposes. For example, as indicated, conditions may develop in the airspace that would cause a dynamic transaction in the form of a rate adjustment (e.g. increase) for the craft/operator. The craft/operator may approve adjustment of the rate and maintain the route. The craft may maintain the route at higher priority/rights (e.g. priority on the route over potentially obstructing craft). The craft/operator may as indicated, (e.g. an alternative) discontinue the mission or revise the route (e.g. to a route where the craft has appropriate rights/priorities for transit at the rate).

Upon completion by the craft of the mission in the airspace, data collection and analysis (e.g. analysis of data collected during the mission and/or of data obtained from the craft/operator and/or other sources during and/or after the mission) is conducted and completed by the system to facilitate a post-mission corroboration/determination (e.g. based on detected/actual use of flyway segments, time-weighted use of zones/regions, etc. by the craft in the airspace) and application of the fee/rate to be assessed to the craft for the detected/actual use/access to the airspace by the craft during the mission; communication/notice to the craft/operator may comprise a post-mission/final accounting and completion of the transaction between the system and the craft/operator (e.g. with final/adjusted invoicing/billing of the appropriate amount due to the appropriate account for the craft/operator for payment to the system).

Figure 73:
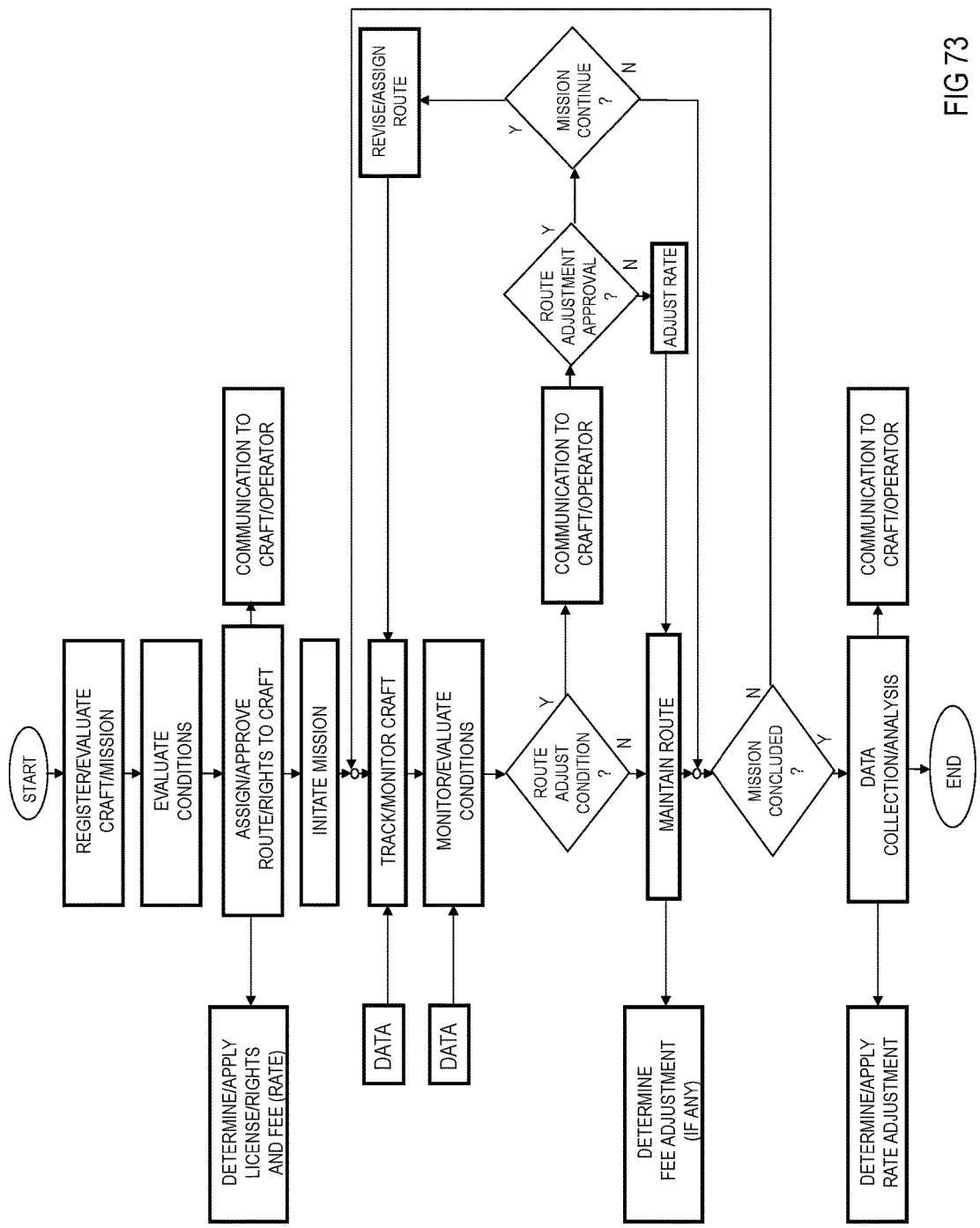
FIG. 73 is a schematic process flow diagram showing use/operation of the system/airspace according to an exemplary embodiment.

System Operation—Route Adjust Condition (FIG. 73)

Referring to FIG. 73 according to an exemplary embodiment, a process for management/administration of airspace and UAV/drone craft by a system using data/data communications is shown schematically. The process indicated schematically in FIG. 73 may be used for a UAV/drone craft under the direction of an operator/remote pilot provided with the capability to monitor/control the craft in real-time and for dynamic transaction with the system and/or with and autonomous/on-board control function (e.g. with appropriate telemetry/data communications) intending to perform a proposed mission in the managed airspace, such as delivery of a parcel/payload to a location in the airspace and/or passage through the airspace.

According to an exemplary embodiment, the system and craft/operator may initially transact (e.g. by purchase/sale, auction/bid, etc.) to determine the license/rights and fee/rate to be applied for use/access by the craft to the airspace to perform a planned mission in the airspace (e.g. transit through the airspace and/or on a delivery or route to a destination in the airspace).

The craft (e.g. identity, profile/type, capability, account information, etc.) and the mission (e.g. destination/purpose, flight plan, time/priority, etc.) of the craft in the airspace each are registered/evaluated by the system; a route (e.g. proposed flyway segments and zone/region access/use timing) is assigned by the system to the craft for the mission and communicated to the craft/operator.

Registration of the craft and mission by the system informs the system of relevant conditions in the airspace (e.g. traffic/status, environmental conditions/weather, events/situations, potential obstructions/alerts, etc.) to be evaluated to facilitate assignment and approval of an appropriate route and rights to the craft for the mission including a determination and application of appropriate license/rights and the proper fee/rate to be assessed to the craft/operator to perform the mission in the airspace; communication to the craft/operator facilitates initiation by the craft/operator of the mission in the airspace.

During the mission the craft is tracked and monitored (e.g. location/tracking, status, etc. by detectors and/or other data communication) as the craft is in transit/passage along the assigned/approved route with corresponding flyway segments and zones/regions in performance of the mission in the airspace; conditions in the airspace (e.g. traffic/status, environmental conditions/weather, events/situations, potential obstructions/alerts, etc.) are monitored and evaluated as the craft performs the mission in the airspace.

Tracking/monitoring by the system of the craft along the route and monitoring/evaluation by the system of conditions in the airspace will continue until the mission to be performed by the craft in the airspace is concluded; communication by the system (e.g. of data/information such as traffic, conditions, alerts, etc.) with the craft/operator during the mission facilitates performance of the mission by the craft in the airspace.

During the mission, data from tracking/monitoring (e.g. from detectors and/or obtained from the craft/operator and/or from other sources) may be used by the system for determination of adjustments of fee/rate to be assessed to the craft (e.g. based on detected/actual use of flyway segments, time-weighted use of zones/regions, etc. by the craft in the airspace); data from tracking/monitoring may also be communicated to the craft/operator for other purposes. For example, as indicated, conditions may develop in the airspace that would cause a dynamic transaction in the form of a route adjustment for the craft/operator. The craft/operator may approve adjustment of the route and maintain the route. The craft may maintain the route at higher rate (e.g. higher priority on the route over potentially obstructing craft). The craft/operator may as indicated, (e.g. an alternative) discontinue the mission; as indicated, if the route is adjusted/revised the mission will continue.

Upon completion by the craft of the mission in the airspace, data collection and analysis (e.g. analysis of data collected during the mission and/or of data obtained from the craft/operator and/or other sources during and/or after the mission) is conducted and completed by the system to facilitate a post-mission corroboration/determination (e.g. based on detected/actual use of flyway segments, time-weighted use of zones/regions, etc. by the craft in the airspace) and application of the fee/rate to be assessed to the craft for the detected/actual use/access to the airspace by the craft during the mission; communication/notice to the craft/operator may comprise a post-mission/final accounting and completion of the transaction between the system and the craft/operator (e.g. with final/adjusted invoicing/billing of the appropriate amount due to the appropriate account for the craft/operator for payment to the system).

Figure 74:
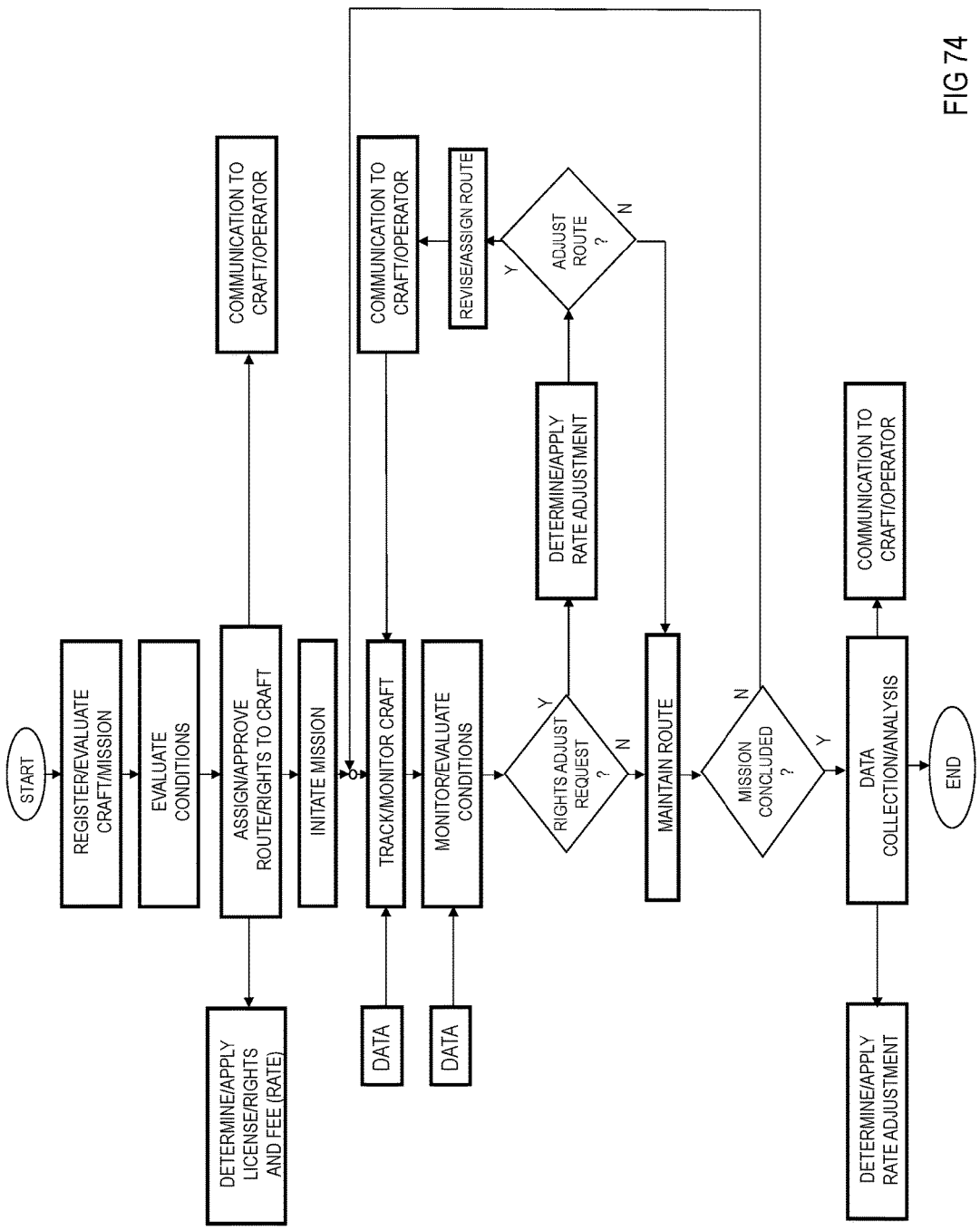
FIG. 74 is a schematic process flow diagram showing use/operation of the system/airspace according to an exemplary embodiment.

System Operation—Rights Adjust/Dynamic (FIG. 74)

Referring to FIG. 74 according to an exemplary embodiment, a process for management/administration of airspace and UAV/drone craft by a system using data/data communications is shown schematically. The process indicated schematically in FIG. 74 may be used for a UAV/drone craft under the direction of an operator/remote pilot provided with the capability to monitor/control the craft in real-time and dynamic transaction with the system and/or with and autonomous/on-board control function (e.g. with appropriate telemetry/data communications) intending to perform a proposed mission in the managed airspace, such as delivery of a parcel/payload to a location in the airspace and/or passage through the airspace.

According to an exemplary embodiment, the system and craft/operator may initially transact (e.g. by purchase/sale, auction/bid, etc.) to determine the license/rights and fee/rate to be applied for use/access by the craft to the airspace to perform a planned mission in the airspace (e.g. transit through the airspace and/or on a delivery or route to a destination in the airspace).

The craft (e.g. identity, profile/type, capability, account information, etc.) and the mission (e.g. destination/purpose, flight plan, time/priority, etc.) of the craft in the airspace each are registered/evaluated by the system; a route (e.g. proposed flyway segments and zone/region access/use timing) is assigned by the system to the craft for the mission and communicated to the craft/operator.

Registration of the craft and mission by the system informs the system of relevant conditions in the airspace (e.g. traffic/status, environmental conditions/weather, events/situations, potential obstructions/alerts, etc.) to be evaluated to facilitate assignment and approval of an appropriate route and rights to the craft for the mission including a determination and application of appropriate license/rights and the proper fee/rate to be assessed to the craft/operator to perform the mission in the airspace; communication to the craft/operator facilitates initiation by the craft/operator of the mission in the airspace.

During the mission the craft is tracked and monitored (e.g. location/tracking, status, etc. by detectors and/or other data communication) as the craft is in transit/passage along the assigned/approved route with corresponding flyway segments and zones/regions in performance of the mission in the airspace; conditions in the airspace (e.g. traffic/status, environmental conditions/weather, events/situations, potential obstructions/alerts, etc.) are monitored and evaluated as the craft performs the mission in the airspace.

Tracking/monitoring by the system of the craft along the route and monitoring/evaluation by the system of conditions in the airspace will continue until the mission to be performed by the craft in the airspace is concluded; communication by the system (e.g. of data/information such as traffic, conditions, alerts, etc.) with the craft/operator during the mission facilitates performance of the mission by the craft in the airspace.

During the mission, data from tracking/monitoring (e.g. from detectors and/or obtained from the craft/operator and/or from other sources) may be used by the system for determination of adjustments of fee/rate to be assessed to the craft (e.g. based on detected/actual use of flyway segments, time-weighted use of zones/regions, etc. by the craft in the airspace); data from tracking/monitoring may also be communicated to the craft/operator for other purposes. For example, as indicated, conditions may develop in the airspace or otherwise where the craft/operator considers an adjustment of rights. The craft/operator may approve adjustment of the rate and continue the route with higher rights/priority (e.g. priority on the route over potentially obstructing craft). The craft may consider an adjustment of the route (e.g. to a route where the craft is a higher priority craft). The craft may maintain the route without adjusting rights.

Upon completion by the craft of the mission in the airspace, data collection and analysis (e.g. analysis of data collected during the mission and/or of data obtained from the craft/operator and/or other sources during and/or after the mission) is conducted and completed by the system to facilitate a post-mission corroboration/determination (e.g. based on detected/actual use of flyway segments, time-weighted use of zones/regions, etc. by the craft in the airspace) and application of the fee/rate to be assessed to the craft for the detected/actual use/access to the airspace by the craft during the mission; communication/notice to the craft/operator may comprise a post-mission/final accounting and completion of the transaction between the system and the craft/operator (e.g. with final/adjusted invoicing/billing of the appropriate amount due to the appropriate account for the craft/operator for payment to the system).

Figure 75:
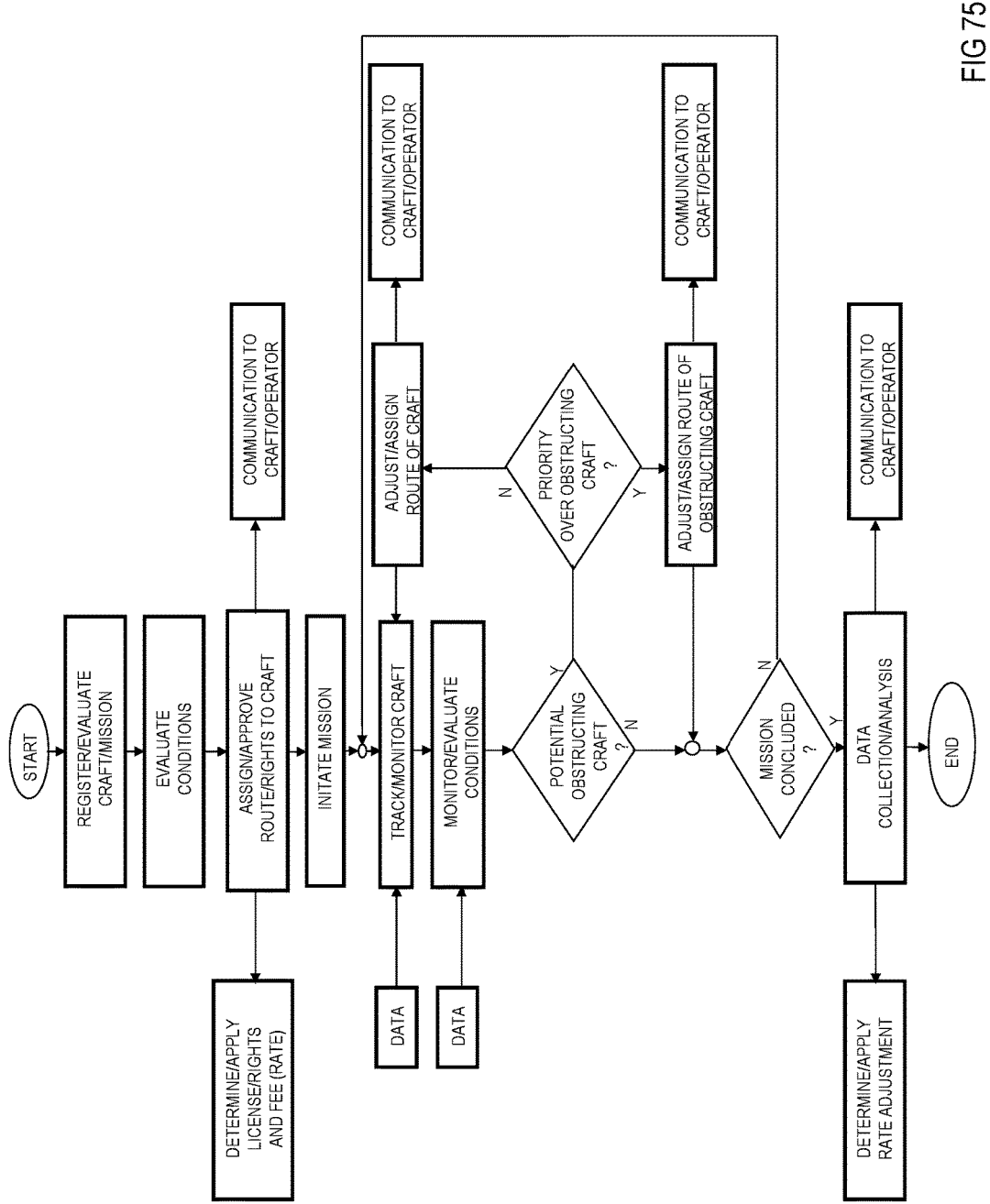
FIG. 75 is a schematic process flow diagram showing use/operation of the system/airspace according to an exemplary embodiment.

System Operation—Obstructing Craft/Priority (FIG. 75)

Referring to FIG. 75 according to an exemplary embodiment, a process for management/administration of airspace and UAV/drone craft by a system using data/data communications is shown schematically. The process indicated schematically in FIG. 75 may be used for a UAV/drone craft under the direction of an operator/remote pilot provided with the capability to monitor/control the craft in real-time and for dynamic transaction with the system and/or with and autonomous/on-board control function (e.g. with appropriate telemetry/data communications) intending to perform a proposed mission in the managed airspace, such as delivery of a parcel/payload to a location in the airspace and/or passage through the airspace.

According to an exemplary embodiment, the system and craft/operator may initially transact (e.g. by purchase/sale, auction/bid, etc.) to determine the license/rights and fee/rate to be applied for use/access by the craft to the airspace to perform a planned mission in the airspace (e.g. transit through the airspace and/or on a delivery or route to a destination in the airspace).

The craft (e.g. identity, profile/type, capability, account information, etc.) and the mission (e.g. destination/purpose, flight plan, time/priority, etc.) of the craft in the airspace each are registered/evaluated by the system; a route (e.g. proposed flyway segments and zone/region access/use timing) is assigned by the system to the craft for the mission and communicated to the craft/operator.

Registration of the craft and mission by the system informs the system of relevant conditions in the airspace (e.g. traffic/status, environmental conditions/weather, events/situations, potential obstructions/alerts, etc.) to be evaluated to facilitate assignment and approval of an appropriate route and rights to the craft for the mission including a determination and application of appropriate license/rights and the proper fee/rate to be assessed to the craft/operator to perform the mission in the airspace; communication to the craft/operator facilitates initiation by the craft/operator of the mission in the airspace.

During the mission the craft is tracked and monitored (e.g. location/tracking, status, etc. by detectors and/or other data communication) as the craft is in transit/passage along the assigned/approved route with corresponding flyway segments and zones/regions in performance of the mission in the airspace; conditions in the airspace (e.g. traffic/status, environmental conditions/weather, events/situations, potential obstructions/alerts, etc.) are monitored and evaluated as the craft performs the mission in the airspace.

Tracking/monitoring by the system of the craft along the route and monitoring/evaluation by the system of conditions in the airspace will continue until the mission to be performed by the craft in the airspace is concluded; communication by the system (e.g. of data/information such as traffic, conditions, alerts, etc.) with the craft/operator during the mission facilitates performance of the mission by the craft in the airspace.

During the mission, data from tracking/monitoring (e.g. from detectors and/or obtained from the craft/operator and/or from other sources) may be used by the system for determination of adjustments of fee/rate to be assessed to the craft (e.g. based on detected/actual use of flyway segments, time-weighted use of zones/regions, etc. by the craft in the airspace); data from tracking/monitoring may also be communicated to the craft/operator for other purposes. For example, as indicated, a potentially obstructing craft may be identified on the route; if the craft has priority/rights over the potentially obstructing craft, the potentially obstructing craft will be rerouted and the craft may continue on route. If the potentially obstructing craft has priority/rights over the craft, the craft will be rerouted and assigned an alternative route. Alternatively, the craft may purchase or bid on priority rights in a dynamic transaction. (As indicated, alternatively the route adjustment may comprise a temporary landing or delay; the craft may, after the delay, return to the flyway/route.)

Upon completion by the craft of the mission in the airspace, data collection and analysis (e.g. analysis of data collected during the mission and/or of data obtained from the craft/operator and/or other sources during and/or after the mission) is conducted and completed by the system to facilitate a post-mission corroboration/determination (e.g. based on detected/actual use of flyway segments, time-weighted use of zones/regions, etc. by the craft in the airspace) and application of the fee/rate to be assessed to the craft for the detected/actual use/access to the airspace by the craft during the mission; communication/notice to the craft/operator may comprise a post-mission/final accounting and completion of the transaction between the system and the craft/operator (e.g. with final/adjusted invoicing/billing of the appropriate amount due to the appropriate account for the craft/operator for payment to the system).

Operation of Craft/Interaction with Management System

Referring to FIGS. 76 to 81C, according to an exemplary embodiment, processes for interaction by UAV/drone craft with a system for management/administration of airspace using data/data communications is shown schematically. According to an exemplary embodiment, the system and craft/operator may in the initial interaction transact to register the craft to perform a planned mission in the airspace (e.g. transit through the airspace and/or on a delivery or route to a destination in the airspace).

Figure 76:
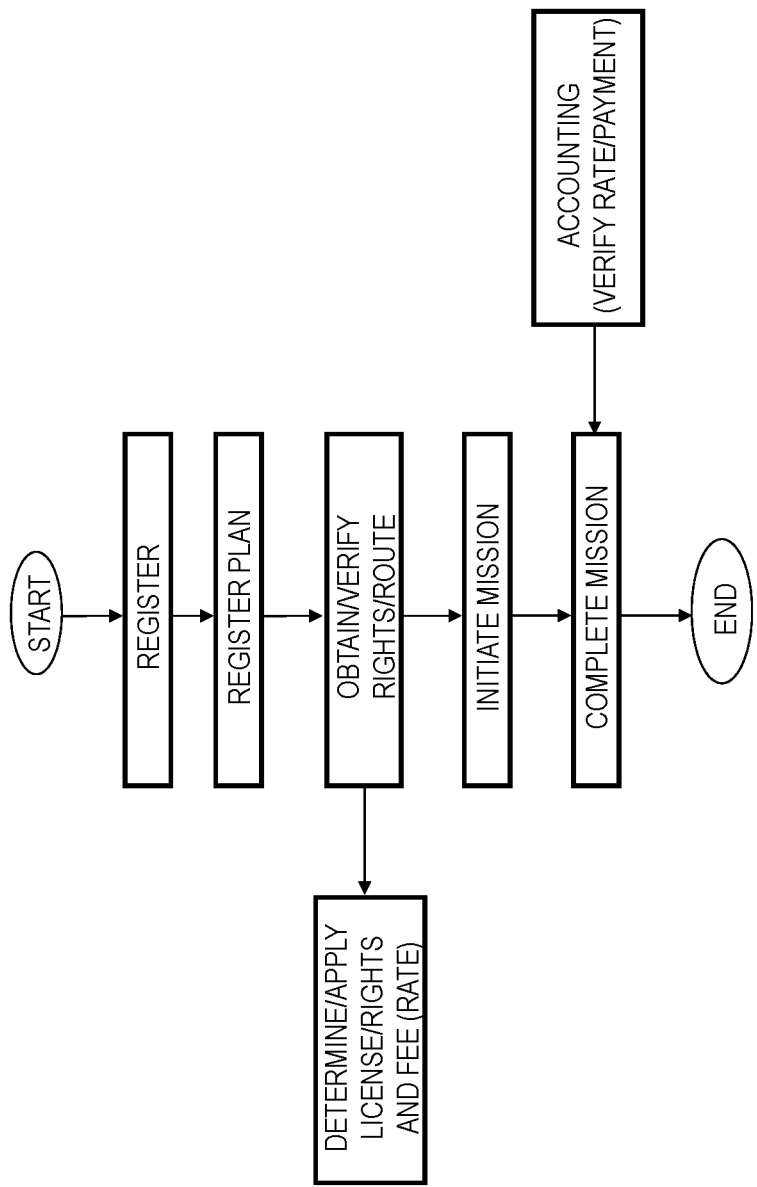
FIG. 76 is a schematic process flow diagram for use/operation of an unmanned aircraft system in the system/airspace according to an exemplary embodiment.

Operation of Craft—Feature (FIG. 76)

Referring to FIG. 76 according to an exemplary embodiment, a process for interaction by UAV/drone craft operating in an airspace with a system for management/administration of the airspace using data/data communications is shown schematically. The process indicated schematically in FIG. 76 may be used for a UAV/drone craft under the direction of an operator/remote pilot provided with the capability to monitor/control the craft in real-time (and for dynamic transactions with the system) and/or with and autonomous/on-board control function (e.g. with appropriate telemetry/data communications) intending to perform a proposed mission in the managed airspace, such as delivery of a parcel/payload to a location in the airspace and/or passage through the airspace.

According to an exemplary embodiment, the system and craft/operator may initially transact (e.g. by purchase/sale, auction/bid, etc.) to register the craft to the airspace to perform a planned mission in the airspace (e.g. transit through the airspace and/or on a delivery or route to a destination in the airspace).

The craft (e.g. identity, profile/type, capability, account information, etc.) and the mission (e.g. destination/purpose, flight plan, time/priority, etc.) of the craft in the airspace each are registered/evaluated by the system; rights (e.g. priority/status relative to other craft, for routing, etc.) a route (e.g. proposed flyway segments and zone/region access/use timing) and each are obtained by the craft from the system for the mission in the airspace.

Registration of the craft and mission by the system informs the craft and the system of relevant conditions in the airspace (e.g. traffic/status, environmental conditions/weather, events/situations, potential obstructions/alerts, etc.) and facilitates a determination and application of appropriate license/rights and the proper fee/rate to be assessed to the craft/operator to perform the mission on an appropriate route in the airspace; verification of the rights/route for the craft with the system facilitates initiation by the craft/operator of the mission in the airspace.

During the mission the craft is tracked and monitored (e.g. location/tracking, status, etc. by detectors and/or other data communication) as the craft is in transit/passage along the assigned/approved route with corresponding flyway segments and zones/regions in performance of the mission in the airspace; conditions in the airspace (e.g. traffic/status, environmental conditions/weather, events/situations, potential obstructions/alerts, etc.) are monitored and evaluated as the craft performs the mission in the airspace.

Tracking/monitoring by the system of the craft along the route and monitoring/evaluation by the system of conditions in the airspace will continue until the mission to be performed by the craft in the airspace is completed.

During the mission, data from tracking/monitoring (e.g. from detectors and/or obtained from the craft/operator and/or from other sources) may be used by the system for determination of adjustments of fee/rate to be assessed to the craft (e.g. based on detected/actual use of flyway segments, time-weighted use of zones/regions, etc. by the craft in the airspace).

Upon completion by the craft of the mission in the airspace the system completes data collection and conducts data analysis (e.g. analysis of data collected during the mission and/or of data obtained from the craft/operator and/or other sources during and/or after the mission) to provide a post-mission corroboration/determination of use/access of flyway segments and zones/regions in the airspace by the craft (e.g. based on detected/actual use of flyway segments, time-weighted use of zones/regions, etc. by the craft in the airspace as detected/monitored and reported) and application of the fee/rate to be assessed to the craft for the detected/actual use/access to the airspace by the craft during the mission. Communication/notice to the craft/operator may comprise a post-mission/final accounting provided by the system to the craft to complete the interaction/transaction between the system and the craft/operator (e.g. with final/adjusted invoicing/billing of the appropriate amount due to the appropriate account for the craft/operator for payment).

Figure 77:
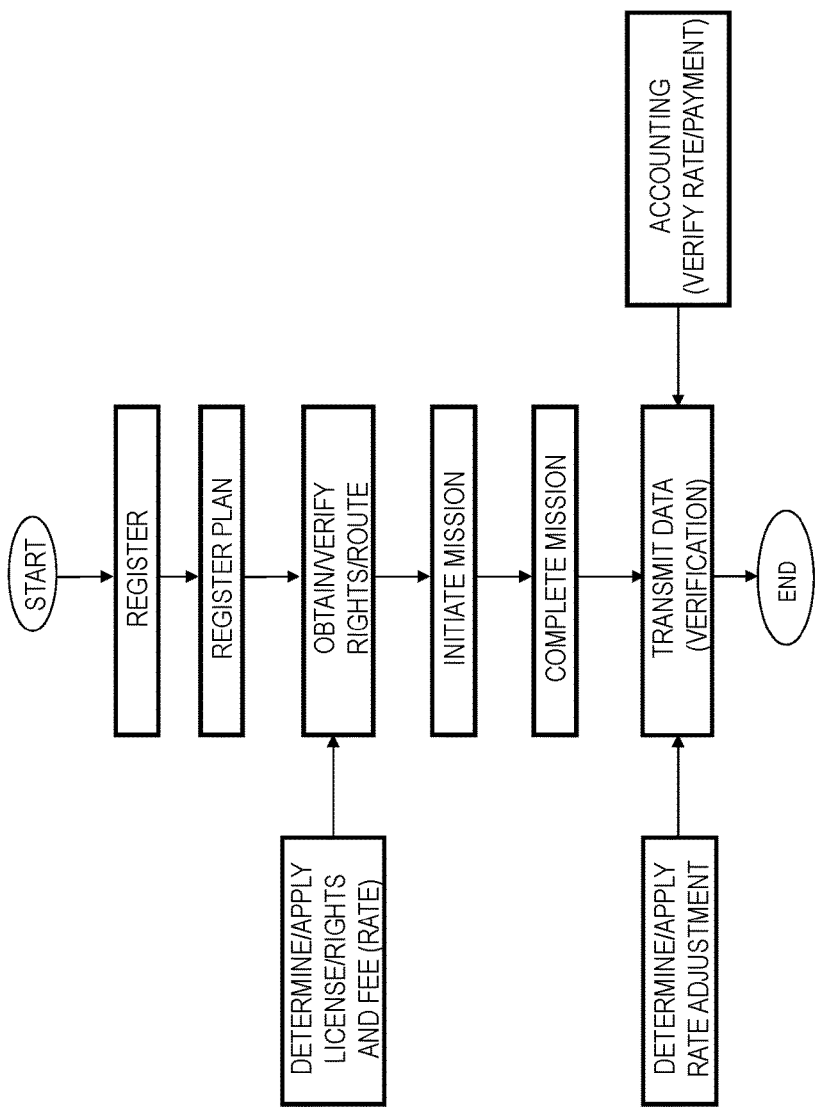
FIG. 77 is a schematic process flow diagram for use/operation of an unmanned aircraft system in the system/airspace according to an exemplary embodiment.

Operation of Craft—Transmit Data/Post-Mission (FIG. 77)

Referring to FIG. 77 according to an exemplary embodiment, a process for interaction by UAV/drone craft operating in an airspace with a system for management/administration of the airspace using data/data communications is shown schematically. The process indicated schematically in FIG. 77 may be used for a UAV/drone craft under the direction of an operator/remote pilot provided with the capability to monitor/control the craft in real-time (and for dynamic transactions with the system) and/or with and autonomous/on-board control function (e.g. with appropriate telemetry/data communications) intending to perform a proposed mission in the managed airspace, such as delivery of a parcel/payload to a location in the airspace and/or passage through the airspace.

According to an exemplary embodiment, the system and craft/operator may initially transact (e.g. by purchase/sale, auction/bid, etc.) to register the craft to the airspace to perform a planned mission in the airspace (e.g. transit through the airspace and/or on a delivery or route to a destination in the airspace).

The craft (e.g. identity, profile/type, capability, account information, etc.) and the mission (e.g. destination/purpose, flight plan, time/priority, etc.) of the craft in the airspace each are registered/evaluated by the system; rights (e.g.

priority/status relative to other craft, for routing, etc.) a route (e.g. proposed flyway segments and zone/region access/use timing) and each are obtained by the craft from the system for the mission in the airspace.

Registration of the craft and mission by the system informs the craft and the system of relevant conditions in the airspace (e.g. traffic/status, environmental conditions/weather, events/situations, potential obstructions/alerts, etc.) and facilitates a determination and application of appropriate license/rights and the proper fee/rate to be assessed to the craft/operator to perform the mission on an appropriate route in the airspace; verification of the rights/route for the craft with the system facilitates initiation by the craft/operator of the mission in the airspace.

During the mission the craft is tracked and monitored (e.g. location/tracking, status, etc. by detectors and/or other data communication) as the craft is in transit/passage along the assigned/approved route with corresponding flyway segments and zones/regions in performance of the mission in the airspace; conditions in the airspace (e.g. traffic/status, environmental conditions/weather, events/situations, potential obstructions/alerts, etc.) are monitored and evaluated as the craft performs the mission in the airspace.

Tracking/monitoring by the system of the craft along the route and monitoring/evaluation by the system of conditions in the airspace will continue until the mission to be performed by the craft in the airspace is completed.

During the mission, data from tracking/monitoring (e.g. from detectors and/or obtained from the craft/operator and/or from other sources) may be used by the system for determination of adjustments of fee/rate to be assessed to the craft (e.g. based on detected/actual use of flyway segments, time-weighted use of zones/regions, etc. by the craft in the airspace).

Upon completion by the craft of the mission in the airspace, data may be transmitted to the system from the craft/operator. The system completes data collection and conducts data analysis (e.g. analysis of data collected during the mission and/or of data obtained from the craft/operator and/or other sources during and/or after the mission) to provide a post-mission corroboration/determination of use/access of flyway segments and zones/regions in the airspace by the craft (e.g. based on detected/actual use of flyway segments, time-weighted use of zones/regions, etc. by the craft in the airspace as detected/monitored and reported) and application of the fee/rate to be assessed to the craft for the detected/actual use/access to the airspace by the craft during the mission. Communication/notice to the craft/operator may comprise a post-mission/final accounting provided by the system to the craft to complete the interaction/transaction between the system and the craft/operator (e.g. with final/adjusted invoicing/billing of the appropriate amount due to the appropriate account for the craft/operator for payment).

Figure 78A:
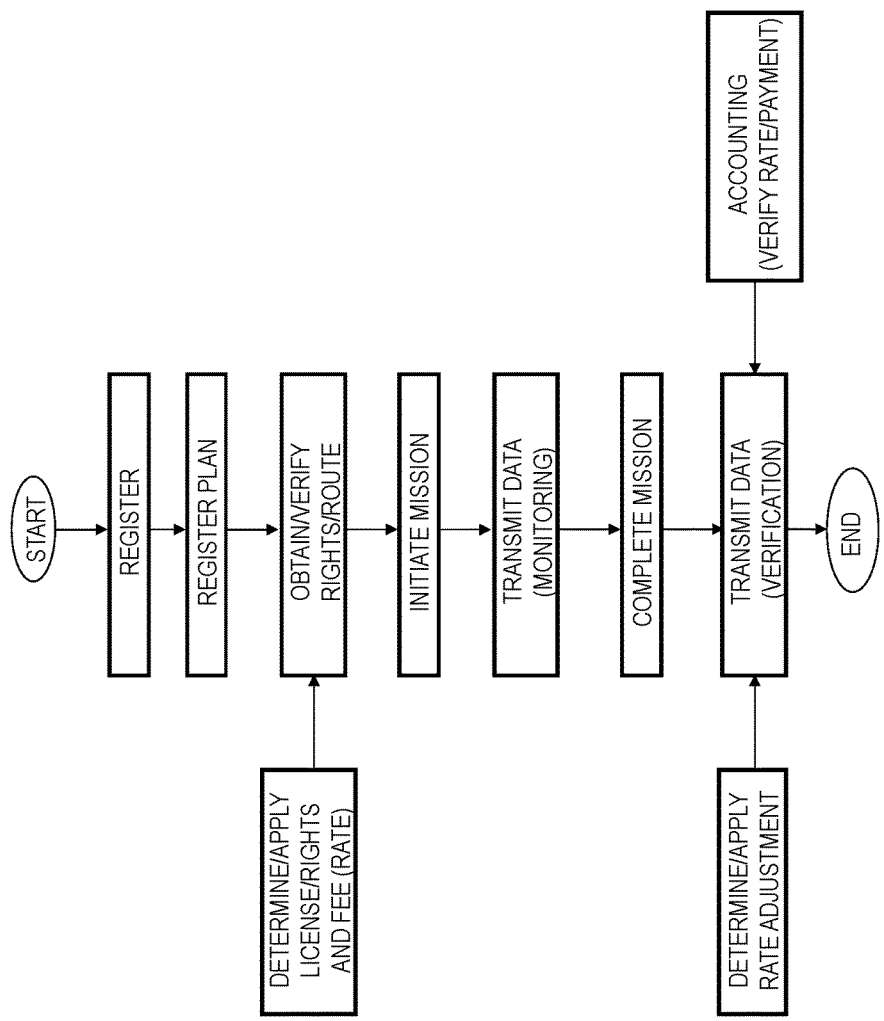
FIG. 78A is a schematic process flow diagram for use/operation of an unmanned aircraft system in the system/airspace according to an exemplary embodiment.
Figure 78B:
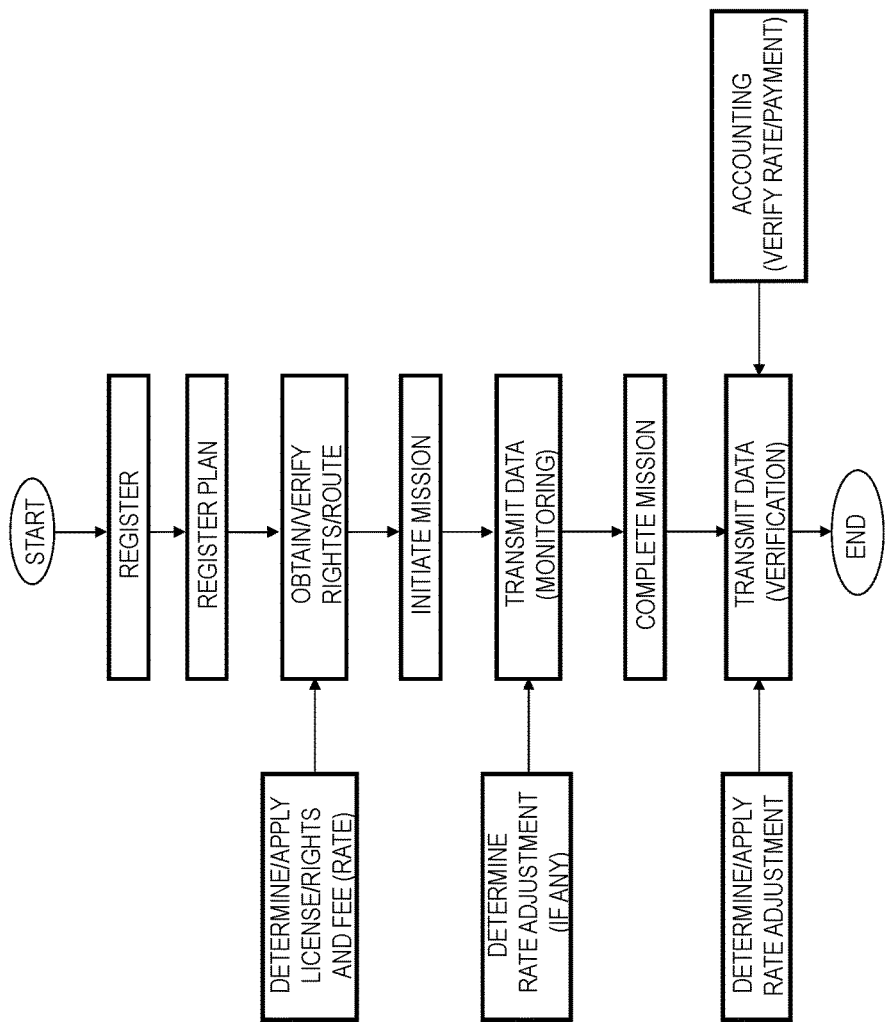
FIG. 78B is a schematic process flow diagram for use/operation of an unmanned aircraft system in the system/airspace according to an exemplary embodiment.

Operation of Craft—Transmit Data/Mission (FIGS. 78A and 78B)

Referring to FIGS. 78A and 78B according to an exemplary embodiment, a process for interaction by UAV/drone craft operating in an airspace with a system for management/administration of the airspace using data/data communications is shown schematically. The process indicated schematically in FIGS. 78A and 78B may be used for a UAV/drone craft under the direction of an operator/remote pilot provided with the capability to monitor/control the craft in real-time (and for dynamic transactions with the system) and/or with and autonomous/on-board control function (e.g. with appropriate telemetry/data communications) intending to perform a proposed mission in the managed airspace, such as delivery of a parcel/payload to a location in the airspace and/or passage through the airspace.

According to an exemplary embodiment, the system and craft/operator may initially transact (e.g. by purchase/sale, auction/bid, etc.) to register the craft to the airspace to perform a planned mission in the airspace (e.g. transit through the airspace and/or on a delivery or route to a destination in the airspace).

The craft (e.g. identity, profile/type, capability, account information, etc.) and the mission (e.g. destination/purpose, flight plan, time/priority, etc.) of the craft in the airspace each are registered/evaluated by the system; rights (e.g. priority/status relative to other craft, for routing, etc.) a route (e.g. proposed flyway segments and zone/region access/use timing) and each are obtained by the craft from the system for the mission in the airspace.

Registration of the craft and mission by the system informs the craft and the system of relevant conditions in the airspace (e.g. traffic/status, environmental conditions/weather, events/situations, potential obstructions/alerts, etc.) and facilitates a determination and application of appropriate license/rights and the proper fee/rate to be assessed to the craft/operator to perform the mission on an appropriate route in the airspace; verification of the rights/route for the craft with the system facilitates initiation by the craft/operator of the mission in the airspace.

During the mission the craft is tracked and monitored (e.g. location/tracking, status, etc. by detectors and/or other data communication) as the craft is in transit/passage along the assigned/approved route with corresponding flyway segments and zones/regions in performance of the mission in the airspace; conditions in the airspace (e.g. traffic/status, environmental conditions/weather, events/situations, potential obstructions/alerts, etc.) are monitored and evaluated as the craft performs the mission in the airspace.

Tracking/monitoring by the system of the craft along the route and monitoring/evaluation by the system of conditions in the airspace will continue until the mission to be performed by the craft in the airspace is completed; communication between the system and craft/operator of data/information (e.g. status, location, conditions, traffic, alerts, etc.) during the mission facilitates performance of the mission in the airspace by the craft and administration/management of the airspace by the system.

During the mission, data from tracking/monitoring during the mission may also be transmitted between the system and the craft/operator. As indicated, in FIG. 78B, during the mission, data from tracking/monitoring (e.g. from detectors and/or obtained from the craft/operator and/or from other sources) may be used by the system for determination of adjustments of fee/rate to be assessed to the craft (e.g. based on detected/actual use of flyway segments, time-weighted use of zones/regions, etc. by the craft in the airspace).

Upon completion by the craft of the mission in the airspace, data may be transmitted to the system from the craft/operator. The system completes data collection and conducts data analysis (e.g. analysis of data collected during the mission and/or of data obtained from the craft/operator and/or other sources during and/or after the mission) to provide a post-mission corroboration/determination of use/access of flyway segments and zones/regions in the airspace by the craft (e.g. based on detected/actual use of flyway segments, time-weighted use of zones/regions, etc. by the craft in the airspace as detected/monitored and reported) and application of the fee/rate to be assessed to the craft for the detected/actual use/access to the airspace by the craft during the mission. Communication/notice to the craft/operator may comprise a post-mission/final accounting provided by the system to the craft to complete the interaction/transaction between the system and the craft/operator (e.g. with final/adjusted invoicing/billing of the appropriate amount due to the appropriate account for the craft/operator for payment).

Figure 79:
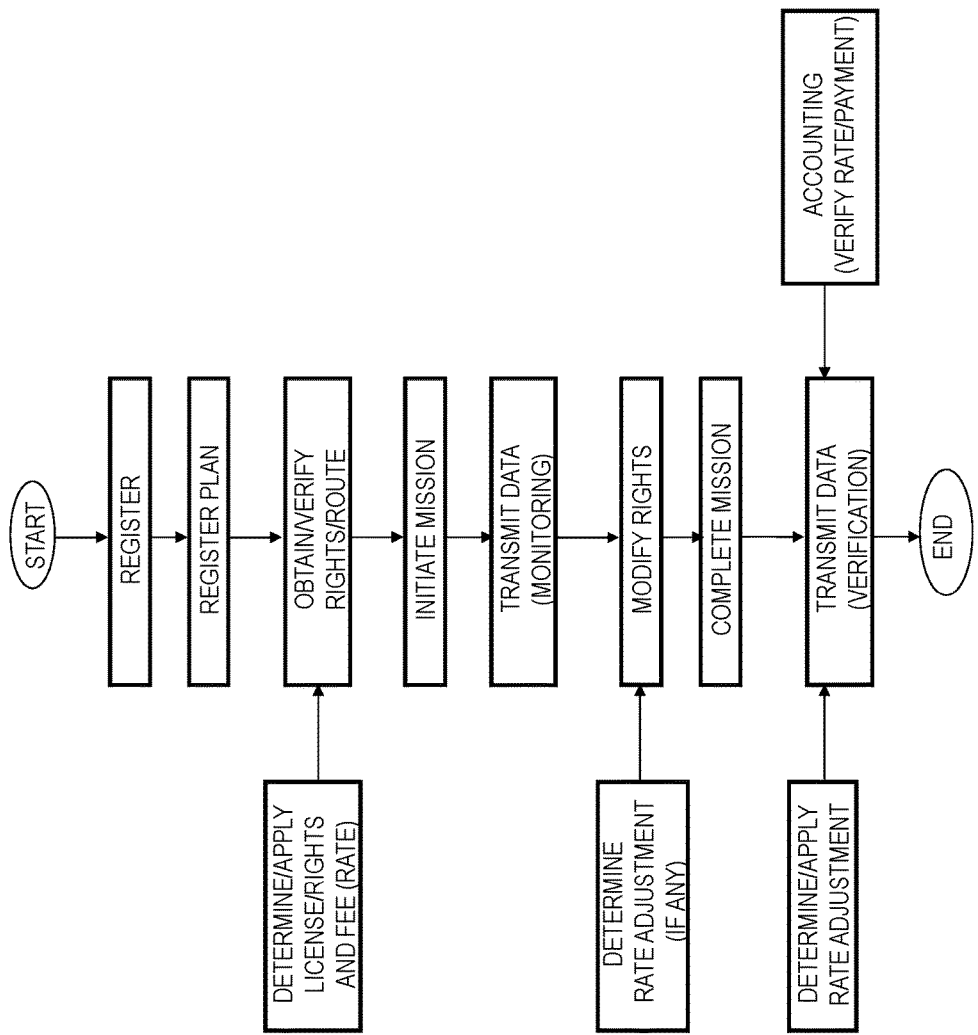
FIG. 79 is a schematic process flow diagram for use/operation of an unmanned aircraft system in the system/airspace according to an exemplary embodiment.

Operation of Craft—Modify Rights/Dynamic (FIG. 79)

Referring to FIG. 79 according to an exemplary embodiment, a process for interaction by UAV/drone craft operating in an airspace with a system for management/administration of the airspace using data/data communications is shown schematically. The process indicated schematically in FIG. 79 may be used for a UAV/drone craft under the direction of an operator/remote pilot provided with the capability to monitor/control the craft in real-time and for dynamic transactions with the system and/or with and autonomous/on-board control function (e.g. with appropriate telemetry/data communications) intending to perform a proposed mission in the managed airspace, such as delivery of a parcel/payload to a location in the airspace and/or passage through the airspace.

According to an exemplary embodiment, the system and craft/operator may initially transact (e.g. by purchase/sale, auction/bid, etc.) to register the craft to the airspace to perform a planned mission in the airspace (e.g. transit through the airspace and/or on a delivery or route to a destination in the airspace).

The craft (e.g. identity, profile/type, capability, account information, etc.) and the mission (e.g. destination/purpose, flight plan, time/priority, etc.) of the craft in the airspace each are registered/evaluated by the system; rights (e.g. priority/status relative to other craft, for routing, etc.) a route (e.g. proposed flyway segments and zone/region access/use timing) and each are obtained by the craft from the system for the mission in the airspace.

Registration of the craft and mission by the system informs the craft and the system of relevant conditions in the airspace (e.g. traffic/status, environmental conditions/weather, events/situations, potential obstructions/alerts, etc.) and facilitates a determination and application of appropriate license/rights and the proper fee/rate to be assessed to the craft/operator to perform the mission on an appropriate route in the airspace; verification of the rights/route for the craft with the system facilitates initiation by the craft/operator of the mission in the airspace.

During the mission the craft is tracked and monitored (e.g. location/tracking, status, etc. by detectors and/or other data communication) as the craft is in transit/passage along the assigned/approved route with corresponding flyway segments and zones/regions in performance of the mission in the airspace; conditions in the airspace (e.g. traffic/status, environmental conditions/weather, events/situations, potential obstructions/alerts, etc.) are monitored and evaluated as the craft performs the mission in the airspace.

Tracking/monitoring by the system of the craft along the route and monitoring/evaluation by the system of conditions in the airspace will continue until the mission to be performed by the craft in the airspace is completed; communication between the system and craft/operator of data/information (e.g. status, location, conditions, traffic, alerts, etc.) during the mission facilitates performance of the mission in the airspace by the craft and administration/management of the airspace by the system.

During the mission, data from tracking/monitoring during the mission may also be communicated between the system and the craft/operator. As indicated, the craft/operator in a dynamic transaction with the system may modify the rights of the craft in the airspace (e.g. by purchase or bid to upgrade or enhance rights or by refund to downgrade or trade rights). Rights as modified will determine the priority/status of the craft and rate/fee for the completion of the mission; rights/status and data from tracking/monitoring (e.g. from detectors and/or obtained from the craft/operator and/or from other sources) may be used by the system for determination of adjustments of fee/rate to be assessed to the craft (e.g. based on detected/actual use of flyway segments, time-weighted use of zones/regions, etc. by the craft in the airspace).

Upon completion by the craft of the mission in the airspace, data may be transmitted to the system from the craft/operator. The system completes data collection and conducts data analysis (e.g. analysis of data collected during the mission and/or of data obtained from the craft/operator and/or other sources during and/or after the mission) to provide a post-mission corroboration/determination of use/access of flyway segments and zones/regions in the airspace by the craft (e.g. based on detected/actual use of flyway segments, time-weighted use of zones/regions, etc. by the craft in the airspace as detected/monitored and reported) and application of the fee/rate to be assessed to the craft for the detected/actual use/access to the airspace by the craft during the mission. Communication/notice to the craft/operator may comprise a post-mission/final accounting provided by the system to the craft to complete the interaction/transaction between the system and the craft/operator (e.g. with final/adjusted invoicing/billing of the appropriate amount due to the appropriate account for the craft/operator for payment).

Operation of Craft—Modify Route/Dynamic (FIG. 80)

Referring to FIG. 80 according to an exemplary embodiment, a process for interaction by UAV/drone craft operating in an airspace with a system for management/administration of the airspace using data/data communications is shown schematically. The process indicated schematically in FIG. 80, may be used for a UAV/drone craft under the direction of an operator/remote pilot provided with the capability to monitor/control the craft in real-time and for dynamic transactions with the system and/or with and autonomous/on-board control function (e.g. with appropriate telemetry/data communications) intending to perform a proposed mission in the managed airspace, such as delivery of a parcel/payload to a location in the airspace and/or passage through the airspace.

According to an exemplary embodiment, the system and craft/operator may initially transact (e.g. by purchase/sale, auction/bid, etc.) to register the craft to the airspace to perform a planned mission in the airspace (e.g. transit through the airspace and/or on a delivery or route to a destination in the airspace).

The craft (e.g. identity, profile/type, capability, account information, etc.) and the mission (e.g. destination/purpose, flight plan, time/priority, etc.) of the craft in the airspace each are registered/evaluated by the system; rights (e.g. priority/status relative to other craft, for routing, etc.), a route (e.g. proposed flyway segments and zone/region access/use timing) and each are obtained by the craft from the system for the mission in the airspace.

Registration of the craft and mission by the system informs the craft and the system of relevant conditions in the airspace (e.g. traffic/status, environmental conditions/weather, events/situations, potential obstructions/alerts, etc.) and facilitates a determination and application of appropriate license/rights and the proper fee/rate to be assessed to the craft/operator to perform the mission on an appropriate route in the airspace; verification of the rights/route for the craft with the system facilitates initiation by the craft/operator of the mission in the airspace.

During the mission the craft is tracked and monitored (e.g. location/tracking, status, etc. by detectors and/or other data communication) as the craft is in transit/passage along the assigned/approved route with corresponding flyway segments and zones/regions in performance of the mission in the airspace; conditions in the airspace (e.g. traffic/status, environmental conditions/weather, events/situations, potential obstructions/alerts, etc.) are monitored and evaluated as the craft performs the mission in the airspace.

Tracking/monitoring by the system of the craft along the route and monitoring/evaluation by the system of conditions in the airspace will continue until the mission to be performed by the craft in the airspace is completed; communication between the system and craft/operator of data/information (e.g. status, location, conditions, traffic, alerts, etc.) during the mission facilitates performance of the mission in the airspace by the craft and administration/management of the airspace by the system.

During the mission, data from tracking/monitoring during the mission may also be communicated between the system and the craft/operator. As indicated, the craft/operator in a dynamic transaction with the system may modify the route of the craft in the airspace (e.g. by purchase or bid to upgrade or enhance rights or by refund to downgrade or trade rights). For example, the craft/operator may wish to modify its operations/route in order to perform an additional parcel pickup or delivery, to cancel/reschedule a previously planned parcel pickup or delivery, to perform additional imaging operations, etc. The route as modified and rights of the craft will apply to determine rate/fee for the completion of the mission; rights/status and data from tracking/monitoring (e.g. from detectors and/or obtained from the craft/operator and/or from other sources) may be used by the system for determination of adjustments of fee/rate to be assessed to the craft (e.g. based on detected/actual use of flyway segments, time-weighted use of zones/regions, etc. by the craft in the airspace).

Upon completion by the craft of the mission in the airspace, data may be transmitted to the system from the craft/operator. The system completes data collection and conducts data analysis (e.g. analysis of data collected during the mission and/or of data obtained from the craft/operator and/or other sources during and/or after the mission) to provide a post-mission corroboration/determination of use/access of flyway segments and zones/regions in the airspace by the craft (e.g. based on detected/actual use of flyway segments, time-weighted use of zones/regions, etc. by the craft in the airspace as detected/monitored and reported) and application of the fee/rate to be assessed to the craft for the detected/actual use/access to the airspace by the craft during the mission. Communication/notice to the craft/operator may comprise a post-mission/final accounting provided by the system to the craft to complete the interaction/transaction between the system and the craft/operator (e.g. with final/adjusted invoicing/billing of the appropriate amount due to the appropriate account for the craft/operator for payment).

Figure 81A:
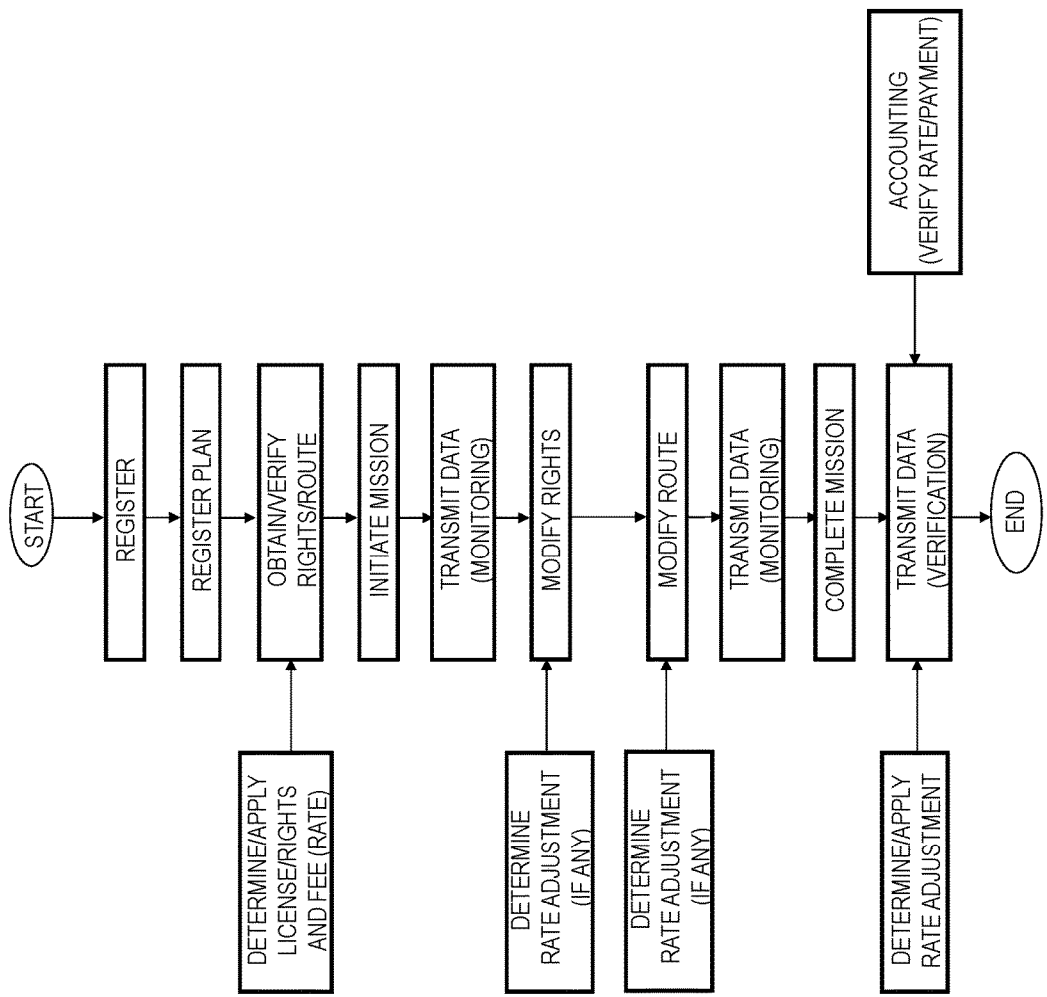
FIG. 81A is a schematic process flow diagram for use/operation of an unmanned aircraft system in the system/airspace according to an exemplary embodiment.
Figure 81B:
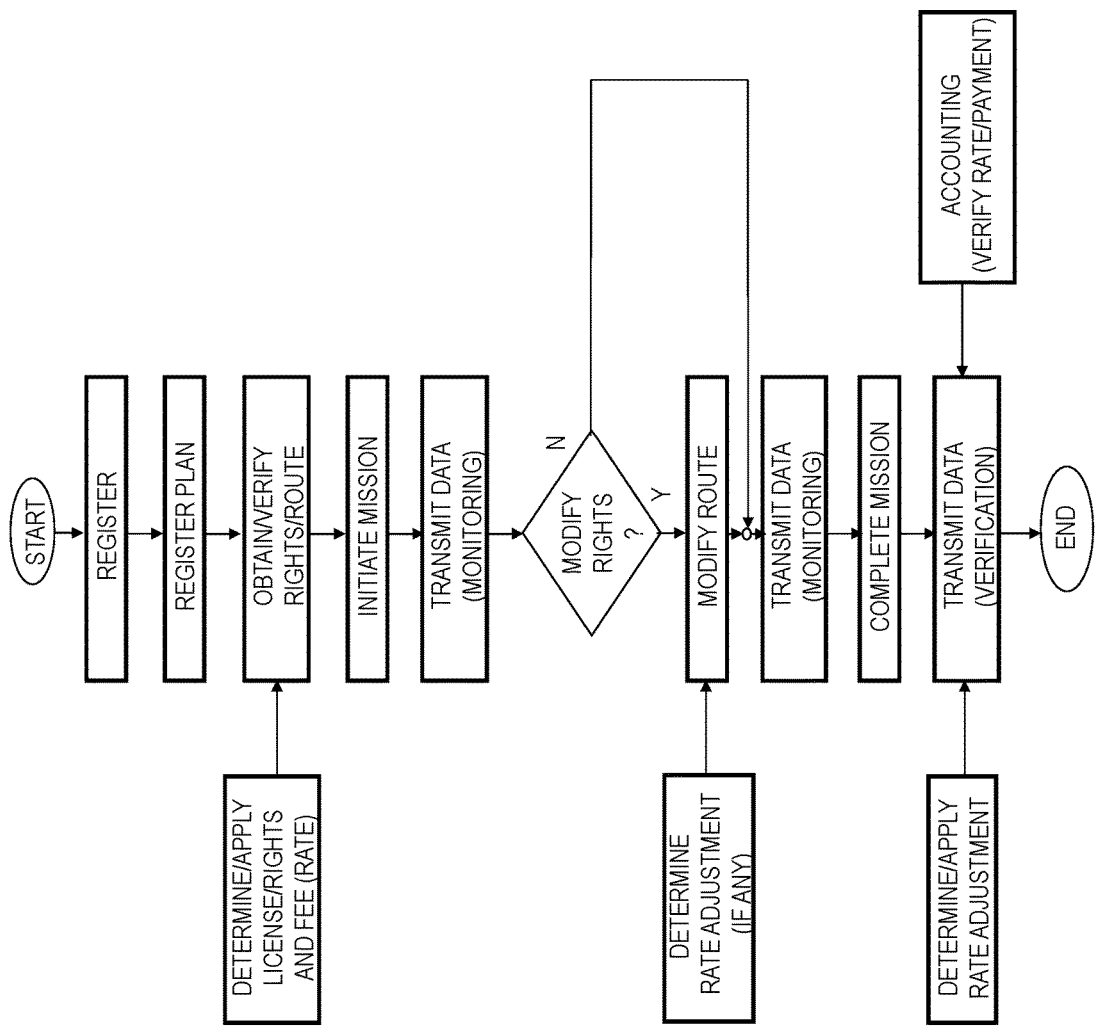
FIG. 81B is a schematic process flow diagram for use/operation of an unmanned aircraft system in the system/airspace according to an exemplary embodiment.
Figure 81C:
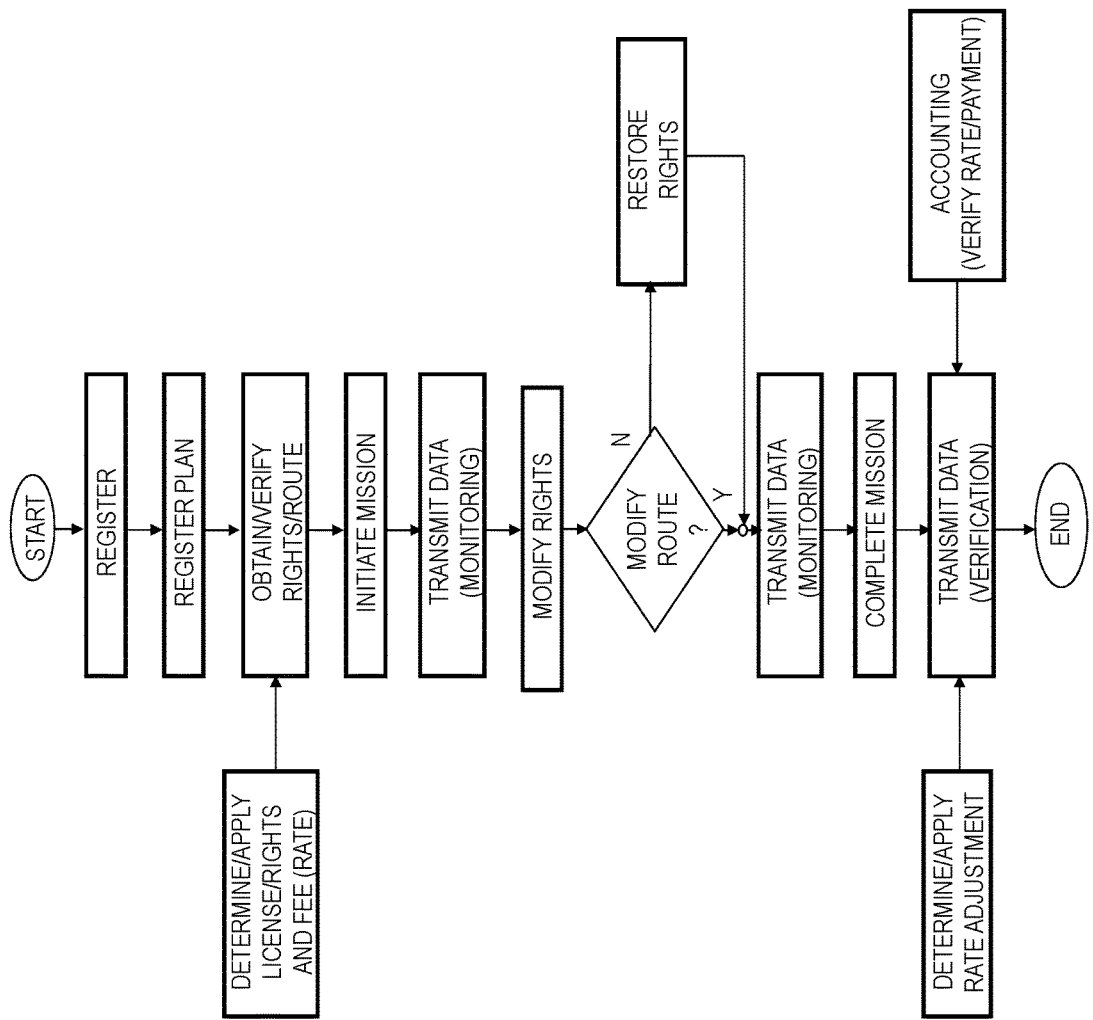
FIG. 81C is a schematic process flow diagram for use/operation of an unmanned aircraft system in the system/airspace according to an exemplary embodiment.

Operation of Craft—Modify Rate/Rights/Route
(FIGS. 81A to 81C)

Referring to FIGS. 81A to 81C according to an exemplary embodiment, a process for interaction by UAV/drone craft operating in an airspace with a system for management/administration of the airspace using data/data communications is shown schematically. The process indicated schematically in FIGS. 81A to 81C may be used for a UAV/drone craft under the direction of an operator/remote pilot provided with the capability to monitor/control the craft in real-time and for dynamic transactions with the system and/or with and autonomous/on-board control function (e.g. with appropriate telemetry/data communications) intending to perform a proposed mission in the managed airspace, such as delivery of a parcel/payload to a location in the airspace and/or passage through the airspace.

According to an exemplary embodiment, the system and craft/operator may initially transact (e.g. by purchase/sale, auction/bid, etc.) to register the craft to the airspace to perform a planned mission in the airspace (e.g. transit through the airspace and/or on a delivery or route to a destination in the airspace).

The craft (e.g. identity, profile/type, capability, account information, etc.) and the mission (e.g. destination/purpose, flight plan, time/priority, etc.) of the craft in the airspace each are registered/evaluated by the system; rights (e.g. priority/status relative to other craft, for routing, etc.) a route (e.g. proposed flyway segments and zone/region access/use timing) and each are obtained by the craft from the system for the mission in the airspace.

Registration of the craft and mission by the system informs the craft and the system of relevant conditions in the airspace (e.g. traffic/status, environmental conditions/weather, events/situations, potential obstructions/alerts, etc.) and facilitates a determination and application of appropriate license/rights and the proper fee/rate to be assessed to the craft/operator to perform the mission on an appropriate route in the airspace; verification of the rights/route for the craft with the system facilitates initiation by the craft/operator of the mission in the airspace.

During the mission the craft is tracked and monitored (e.g. location/tracking, status, etc. by detectors and/or other data communication) as the craft is in transit/passage along the assigned/approved route with corresponding flyway segments and zones/regions in performance of the mission in the airspace; conditions in the airspace (e.g. traffic/status, environmental conditions/weather, events/situations, potential obstructions/alerts, etc.) are monitored and evaluated as the craft performs the mission in the airspace.

Tracking/monitoring by the system of the craft along the route and monitoring/evaluation by the system of conditions in the airspace will continue until the mission to be performed by the craft in the airspace is completed; communication between the system and craft/operator of data/information (e.g. status, location, conditions, traffic, alerts, etc.) during the mission facilitates performance of the mission in the airspace by the craft and administration/management of the airspace by the system.

During the mission, data from tracking/monitoring during the mission may also be communicated between the system and the craft/operator. As indicated, in FIGS. 81A-81C, in a dynamic transaction with the system the craft/operator may modify rights/priority of the craft and may modify the route (e.g. flyway segments and zones/regions) of the craft.

The rights and route of the craft and data from tracking/monitoring (e.g. from detectors and/or obtained from the craft/operator and/or from other sources) may be used by the system for determination of adjustments of fee/rate to be assessed to the craft (e.g. based on detected/actual use of flyway segments, time-weighted use of zones/regions, etc. by the craft in the airspace). See FIG. 81A. According to an alternative embodiment shown schematically in FIG. 81B, the craft/operator in a dynamic transaction with the system can determine whether to modify rights for the craft (e.g. in response to traffic/conditions/time, etc.); if rights of the craft are modified then the craft/operator may modify the route. According to an alternative embodiment shown schematically in FIG. 81C, the craft/operator in a dynamic transaction with the system modify rights/priority for the craft and determine whether to modify the route for the craft (e.g. in response to traffic/conditions/time, changes in parcel pickups or deliveries, changes in mission operations, etc.). If the route is not modified, the craft/operator may restore rights.

During the mission, upon completion by the craft of the mission in the airspace, data may be transmitted to the system from the craft/operator. The system completes data collection and conducts data analysis (e.g. analysis of data collected during the mission and/or of data obtained from the craft/operator and/or other sources during and/or after the mission) to provide a post-mission corroboration/determination of use/access of flyway segments and zones/regions in the airspace by the craft (e.g. based on detected/actual use of flyway segments, time-weighted use of zones/regions, etc. by the craft in the airspace as detected/monitored and reported) and application of the fee/rate to be assessed to the craft for the detected/actual use/access to the airspace by the craft during the mission. Communication/notice to the craft/operator may comprise a post-mission/final accounting provided by the system to the craft to complete the interaction/transaction between the system and the craft/operator (e.g. with final/adjusted invoicing/billing of the appropriate amount due to the appropriate account for the craft/operator for payment).

Incorporation of Present Technology/Systems

The system and method according to exemplary and alternative embodiments may be configured to integrate or operate with present known (and/or future) systems and technology, for example, systems for integrating UAV/drone craft into existing air traffic management systems (e.g. U.S. Patent Application Publication No. 2013/014646 A1), systems for communicating the position of a UAS/aircraft with an air traffic control reporting system/ground control station (e.g. U.S. Pat. No. 8,437,956), flight management systems for UAVs/drones through segregated and non-segregated airspace with facilitated navigation functions such as using guidance setpoints/commands or other data (e.g. U.S. Pat. Nos. 8,515,593, 8,521,340 and 8,543,255) systems providing tools and techniques for computing flight plans incorporating trajectories (having spatial and temporal dimensions) for UAVs and to route/reroute UAVs trajectories around obstacles as the UAVs visit destinations (e.g. U.S. Pat. Nos. 8,082,102 and 6,871,816), UAV systems for executing a mission plan (e.g. U.S. Pat. No. 8,600,602), systems for unmanned vehicle control using X-Y-Z coordinates/coordination and a computing system (e.g. U.S. Pat. No. 8,577,535), systems for data communications with UAV craft (e.g. U.S. Patent Application Publication No. 2012/0299751 and U.S. Pat. No. 7,231,294), systems using data/sensors and communications for communicating location and mitigating risk of aircraft interactions in an airspace (e.g. U.S. Pat. Nos. 8,437,956 and 8,368,584 and 8,380,425) systems for managing flight parameters, terrain and conditions such as weather/wind and/or related communications/data including to facilitate autonomy of UAVs (e.g. U.S. Pat. Nos. 8,355,834, and 7,302,316) systems using transceivers/transponders (such as RFID/DSRC tags with commercial EZ-PASS™ technology for collection of tolls/fares) for vehicles (e.g. U.S. Pat. No. 5,819,234 and U.S. Patent Application Publication No. 2011/0161140 (integrating systems with camera/imaging data communications)), systems providing ground control stations (with user interfaces) and telemetry/telecommand functions and remote/linked communications (such as by wireless data link) with UAVs/unmanned air vehicles (e.g. U.S. Patent Application Publication No. 2007/0244608) systems for zone policy administration for management of entities (such as vehicles) within zones incorporating association of entities and sensors/objects as well as events and rules/policies for entities using data (e.g. U.S. Patent Application Publication No. 2008/0072284). Such systems/technology and patent documents are incorporated by reference in the present application as background for the present inventions.

It is important to note that the construction and arrangement of the elements of the inventions as described in system and method and as shown in the figures above is illustrative only. Although some embodiments of the present inventions have been described in detail in this disclosure, those skilled in the art who review this disclosure will readily appreciate that many modifications are possible without materially departing from the novel teachings and advantages of the subject matter recited. Accordingly, all such modifications are intended to be included within the scope of the present inventions. Other substitutions, modifications, changes and omissions may be made in the design, variations in the arrangement or sequence of process/method steps, operating conditions and arrangement of the preferred and other exemplary embodiments without departing from the spirit of the present inventions.

It is important to note that the system and method of the present inventions can comprise conventional technology (e.g. computing systems, telecommunication systems, networking technology, data storage, data transmission, data/file structures/formats, systems/software, application programs, mobile device technology, etc.) or any other applicable technology (present or future) that has the capability to perform the functions and processes/operations indicated in the FIGURES. All such technology is considered to be within the scope of the present inventions.

The invention claimed is:

1. A method of operating an unmanned aircraft to perform a mission in an airspace comprising zones managed by a management system for the airspace comprising the steps of:
   (a) registering the aircraft with the management system;
   (b) obtaining rights for the aircraft in a transaction with the management system, wherein the rights for the aircraft comprise a priority allowing the aircraft at least one of access to a priority zone and priority over other aircraft in a same priority zone;
   (c) performing the mission;
   wherein the aircraft is to be operated according to terms of the transaction with the management system during the mission in the airspace.

2. The method of claim 1 further comprising the step of transmitting data to the management system.

3. The method of claim 1 wherein the aircraft can be registered by the management system before the mission and monitored by the management system during the mission.

4. The method of claim 1 wherein the aircraft can be charged a rate for use of the airspace determined by the terms of the transaction and data obtained by the management system from data sources.

5. The method of claim 1 further comprising the step of obtaining a route for the aircraft to operate within during the mission.

6. The method of claim 1 wherein the step of obtaining rights in a transaction with the management system comprises transacting a license.

7. The method of claim 6 wherein the license is a dynamic license transacted during the mission to enhance rights of the aircraft.

8. The method of claim 1 wherein rights comprise status for the aircraft.

9. The method of claim 1 wherein the transaction comprises a license for the aircraft to operate in the airspace with rights at a rate.

10. The method of claim 1 wherein the transaction is a dynamic transaction.

11. The method of claim 1 wherein the dynamic transaction is a license.

12. A method of management of an airspace comprising a plurality of flyway segments configured to be used by a plurality of unmanned aircraft comprising the steps of:
    (a) administrating the airspace;
    (b) administrating the aircraft in the airspace, including assigning a priority to each of the plurality of aircraft to allow one or more of the plurality of aircraft to travel at least one of within a priority zone and at a different priority than others of the plurality of aircraft within a same priority zone;
    (c) directing the aircraft in the airspace;
    (d) monitoring conditions in the airspace;
  wherein administrating airspace comprises designation of a set of zones comprising a set of flyway segments in the airspace for operation of aircraft;
  wherein administrating aircraft comprises registration of aircraft to operate in the airspace.

13. The method of claim 12 wherein directing aircraft comprises assigning a route to the aircraft to operate in the airspace.

14. The method of claim 12 wherein administrating the airspace comprises establishing rules for operation of the aircraft in the airspace.

15. The method of claim 12 wherein administrating the airspace comprises issuing a license of rights to aircraft at a rate for use of the airspace.

16. The method of claim 12 wherein administrating aircraft comprises registering an aircraft in a transaction.

17. The method of claim 12 wherein administrating aircraft comprises transacting with aircraft.

18. The method of claim 17 wherein transacting with aircraft comprises issuing a license to an aircraft.

19. The method of claim 17 wherein transacting with aircraft comprises transacting with an operator of the aircraft.

20. The method of claim 12 wherein directing aircraft comprises commanding aircraft to a different route in the airspace.

* * * * *